United States Patent
Limberg

(10) Patent No.: US 10,601,624 B2
(45) Date of Patent: Mar. 24, 2020

(54) COFDM DCM SIGNALING THAT EMPLOYS LABELING DIVERSITY TO MINIMIZE PAPR

(71) Applicant: Allen Le Roy Limberg, Port Charlotte, FL (US)

(72) Inventor: Allen Le Roy Limberg, Port Charlotte, FL (US)

(*) Notice: Subject to any disclaimer, the term of this patent is extended or adjusted under 35 U.S.C. 154(b) by 0 days.

(21) Appl. No.: 16/217,120

(22) Filed: Dec. 12, 2018

(65) Prior Publication Data
US 2020/0028725 A1    Jan. 23, 2020

Related U.S. Application Data

(63) Continuation-in-part of application No. 16/039,259, filed on Jul. 18, 2018, now abandoned, and a continuation-in-part of application No. 16/037,747, filed on Jul. 17, 2018.

(51) Int. Cl.
*H04L 27/34* (2006.01)
*H04L 27/26* (2006.01)

(52) U.S. Cl.
CPC ...... *H04L 27/2618* (2013.01); *H04L 27/2604* (2013.01); *H04L 27/2634* (2013.01); *H04L 27/2684* (2013.01)

(58) Field of Classification Search
CPC ............. H04L 27/2618; H04L 27/2604; H04L 27/2634; H04L 27/2684; H04L 27/2698; H04L 27/2649; H04L 27/38; H04B 7/0885
See application file for complete search history.

(56) References Cited

U.S. PATENT DOCUMENTS

| | | | | |
|---|---|---|---|---|
| 2010/0142612 A1* | 6/2010 | van Rooyen | ......... | H04L 5/0023 375/239 |
| 2010/0226458 A1* | 9/2010 | Dent | ................... | H04L 25/0202 375/296 |
| 2014/0153625 A1* | 6/2014 | Vojcic | ................. | H04L 25/0236 375/224 |
| 2014/0157092 A1* | 6/2014 | Vojcic | ................... | H04L 1/0041 714/776 |
| 2014/0161209 A1* | 6/2014 | Limberg | ............... | H04L 5/0016 375/299 |
| 2015/0155948 A1* | 6/2015 | Chen | ................. | H04B 10/5165 398/188 |

* cited by examiner

Primary Examiner — Syed Haider

(57) ABSTRACT

Transmitting apparatus and receiving apparatus for communication systems use coded orthogonal frequency-division multiplexed (COFDM) dual-subcarrier-modulation (DCM) signals. The same coded data is mapped both to COFDM subcarriers located in the lower-frequency half spectrum of the DCM signal and to COFDM subcarriers located in its upper-frequency half spectrum. Symbol constellation mappings of COFDM subcarriers in those half spectra preferably employ labeling diversity providing peak-to-average power ratio (PAPR) of the COFDM DCM signals substantially reduced from PAPR of double-sideband COFDM signals.

24 Claims, 66 Drawing Sheets

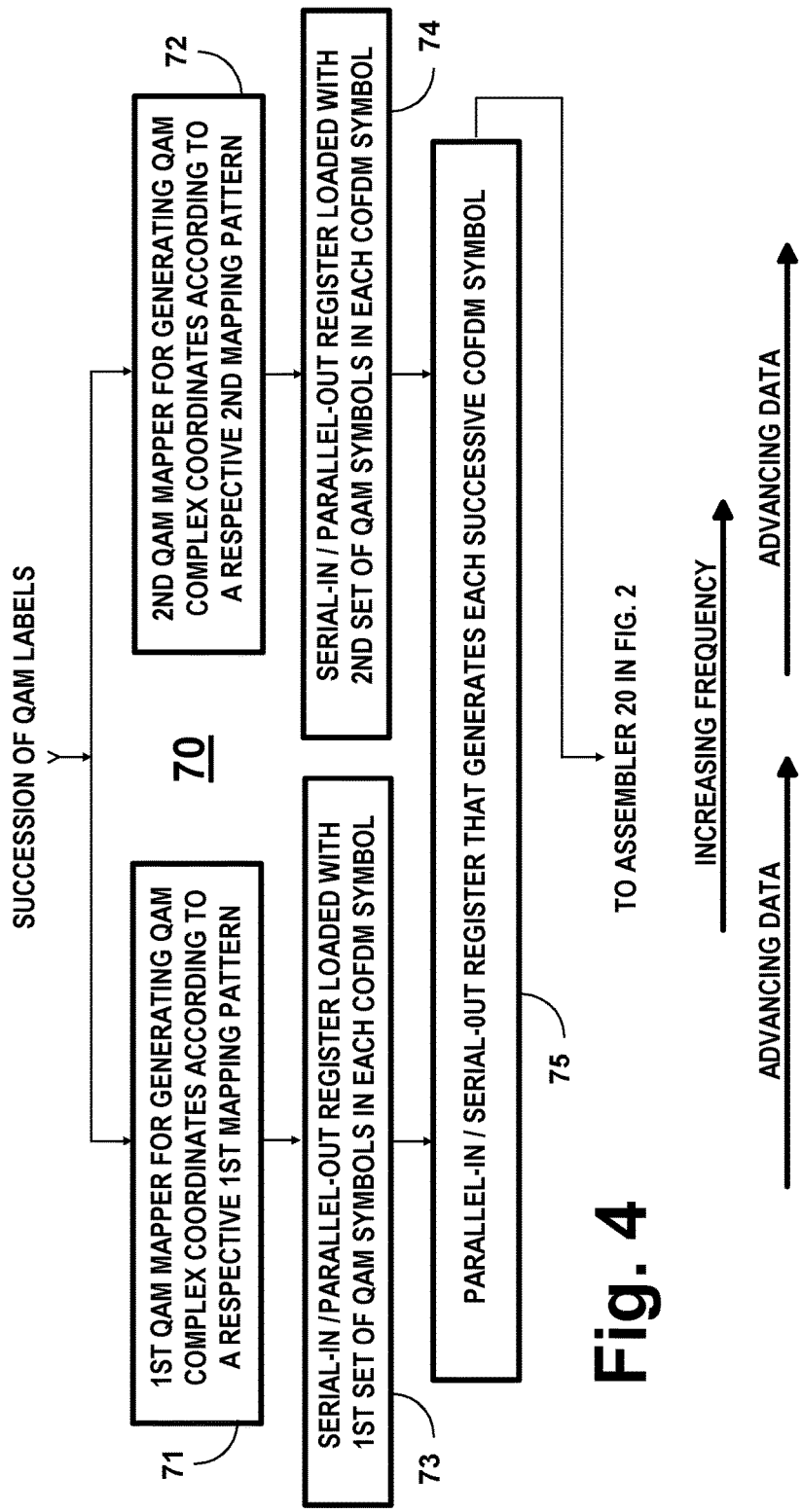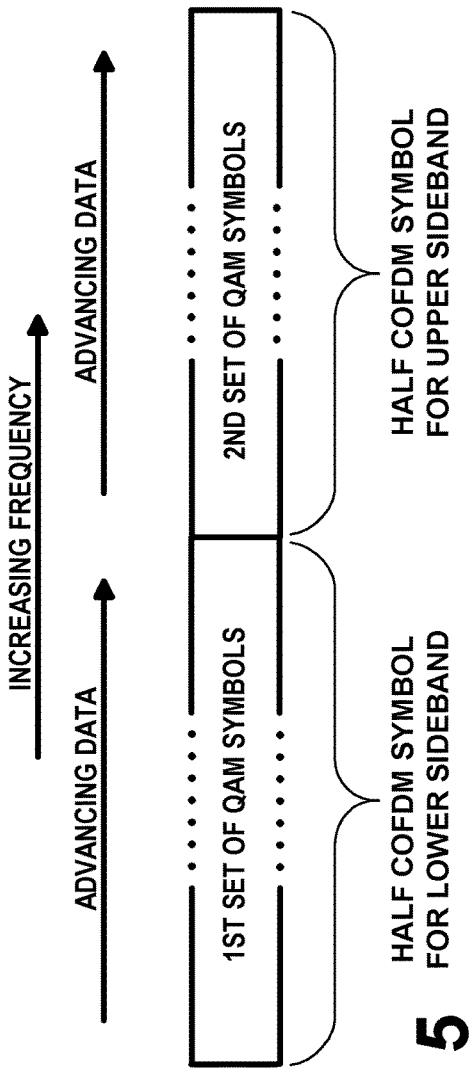
Fig. 4
Fig. 5

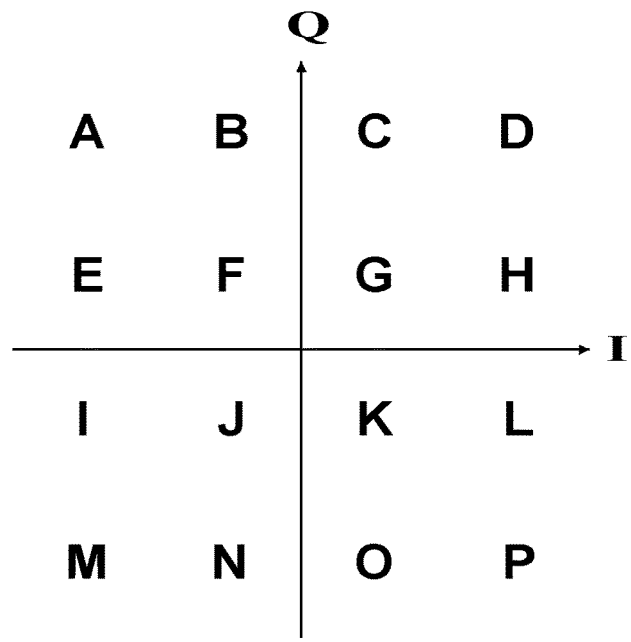
Fig. 6    1st Pattern of Labeling
for 16QAM Mapping
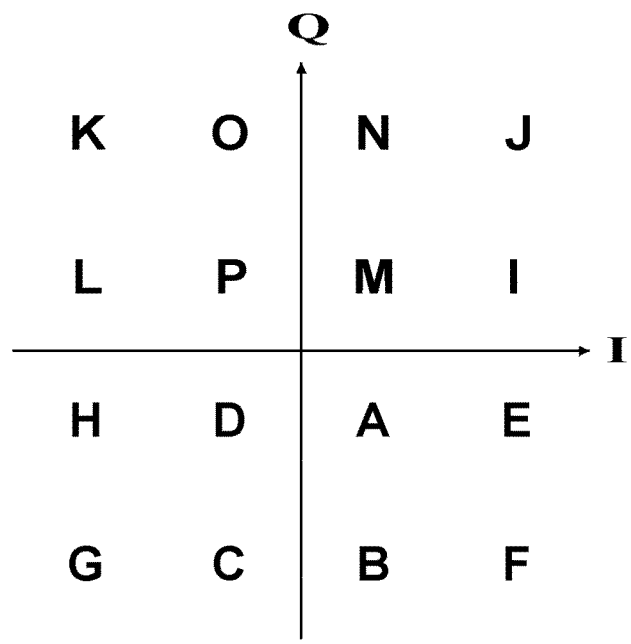
Fig. 7    2nd Pattern of Labeling
for 16QAM Mapping

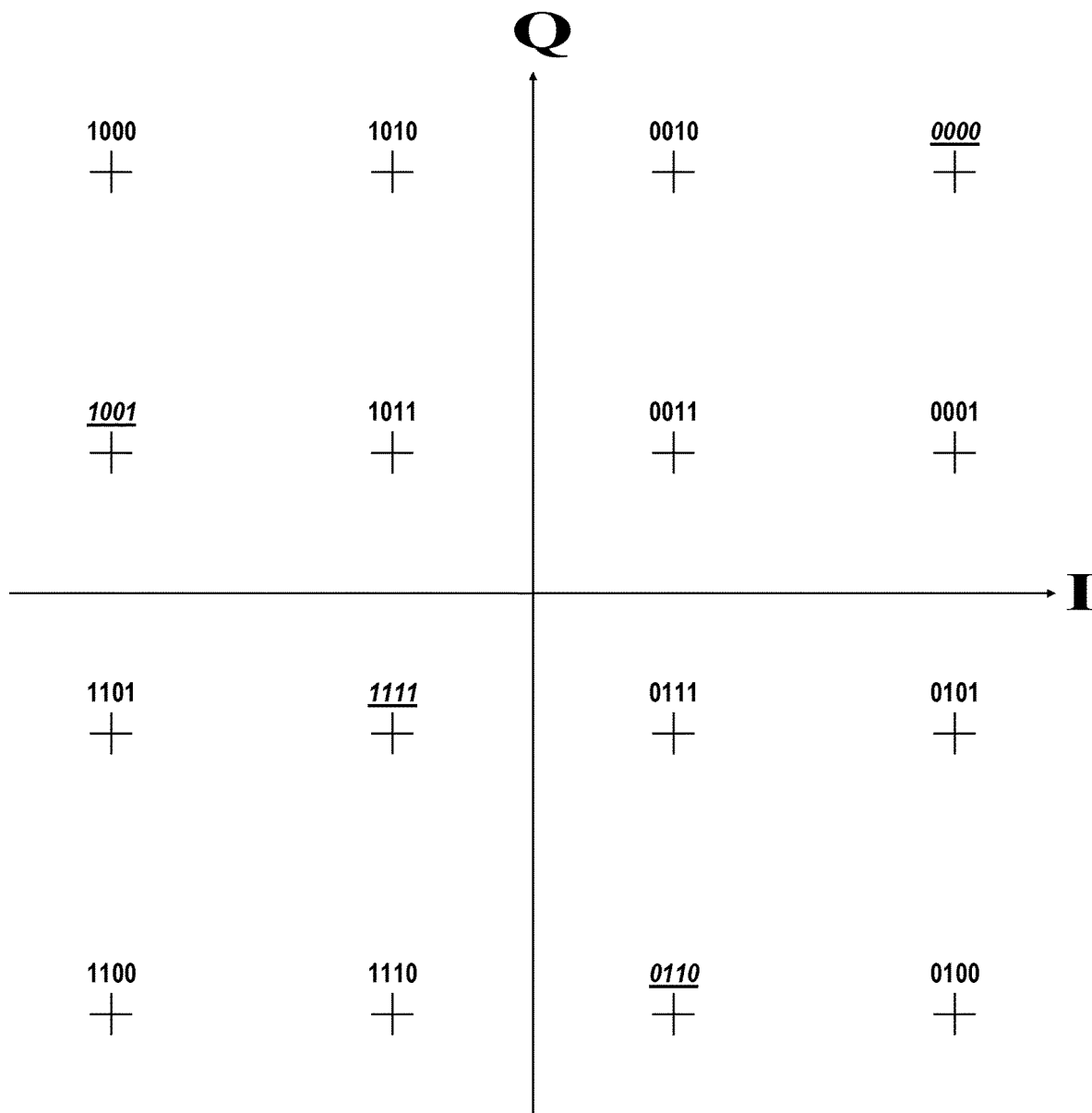
Fig. 8  1st Gray Map of 16QAM
(Corresponds to DVB-T2 Gray Map of 16QAM)

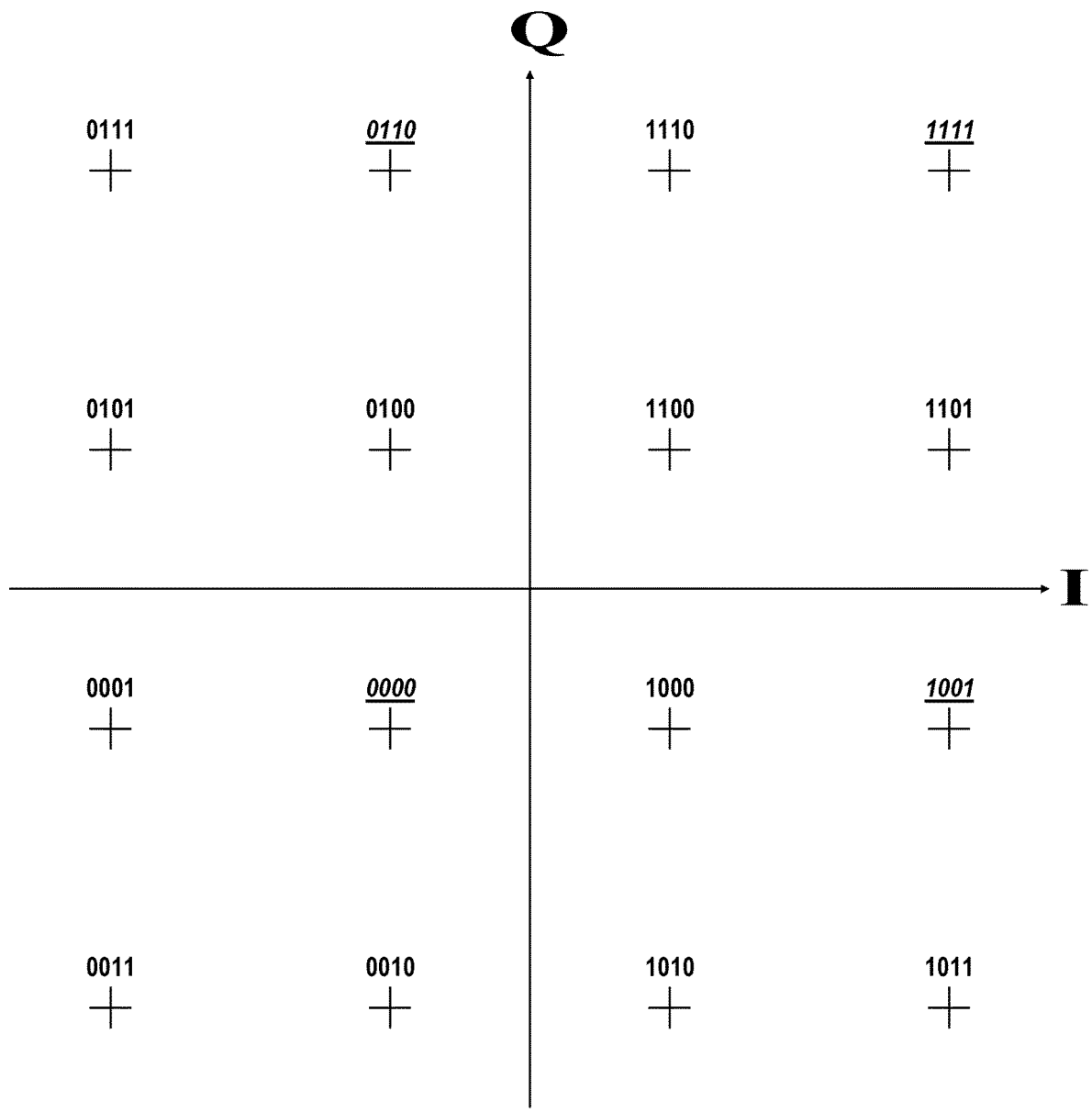
Fig. 9 2<sup>nd</sup> Gray Map of 16QAM
(A preferred labeling diversity from
Fig. 8 DVB-T2 Gray Map of 16QAM)

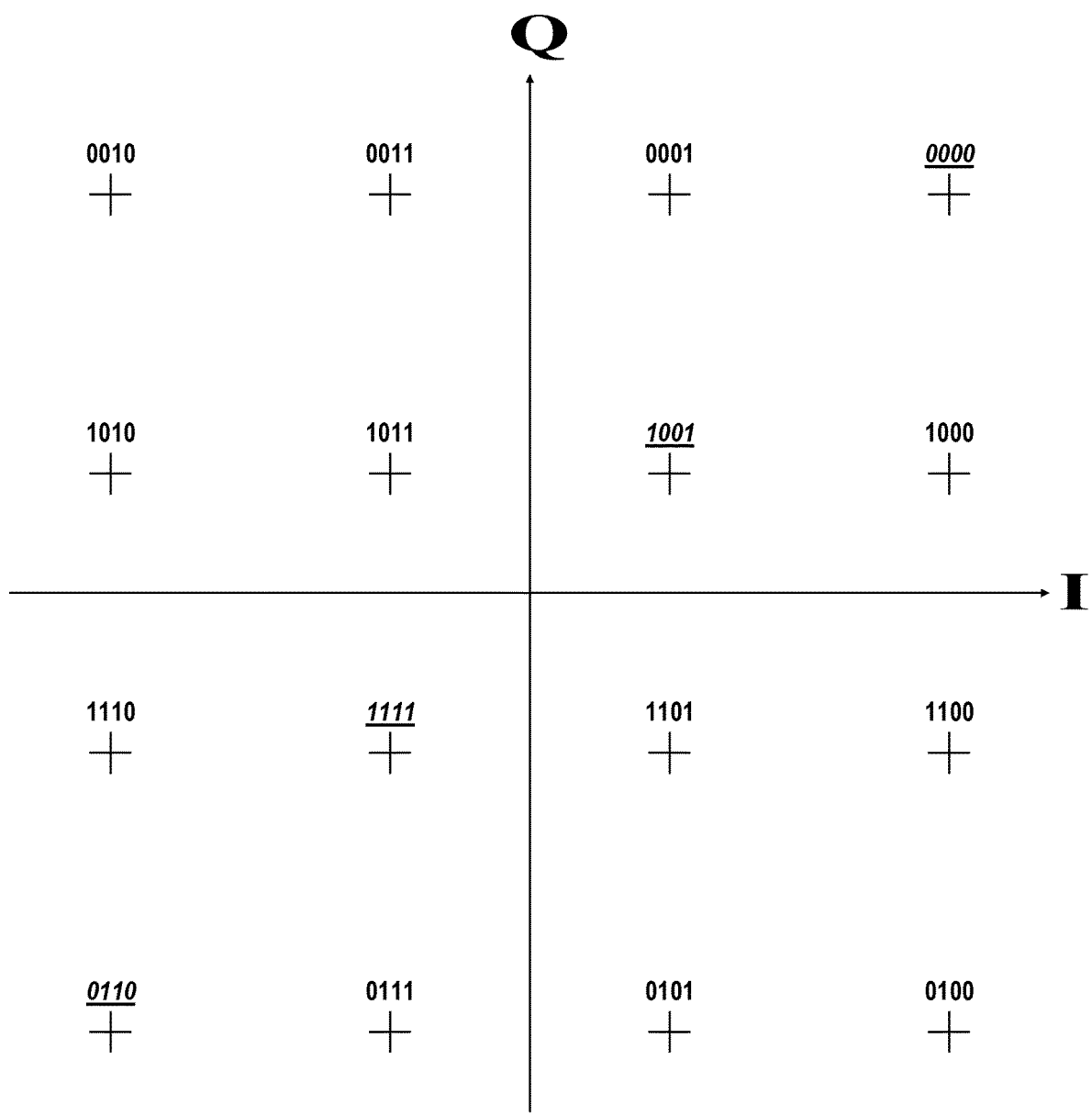
Fig. 10 3rd Gray Map of 16QAM

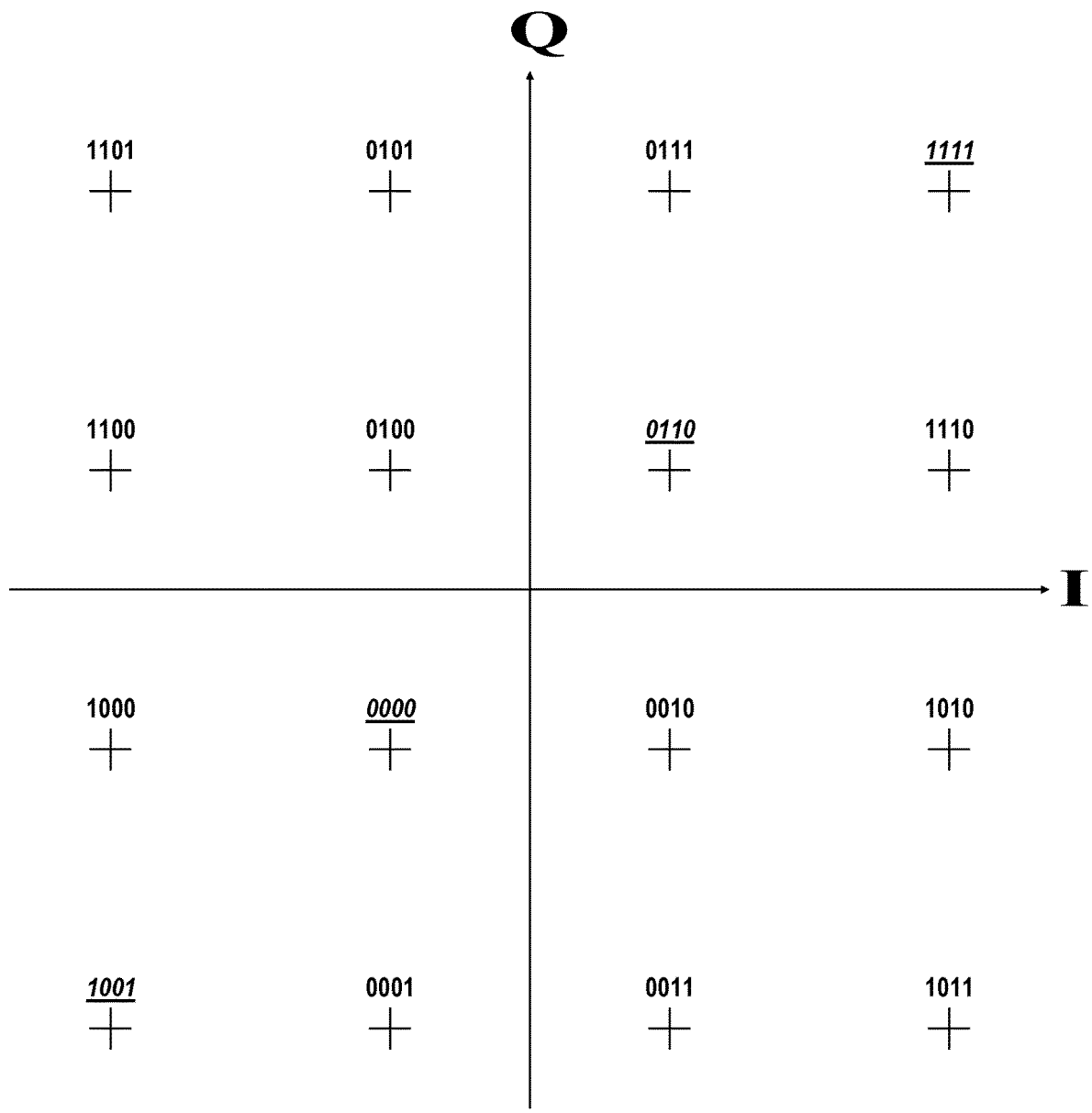
Fig. 11  4th Gray Map of 16QAM
(A preferred labeling diversity from
Fig. 10 third Gray Map of 16QAM)

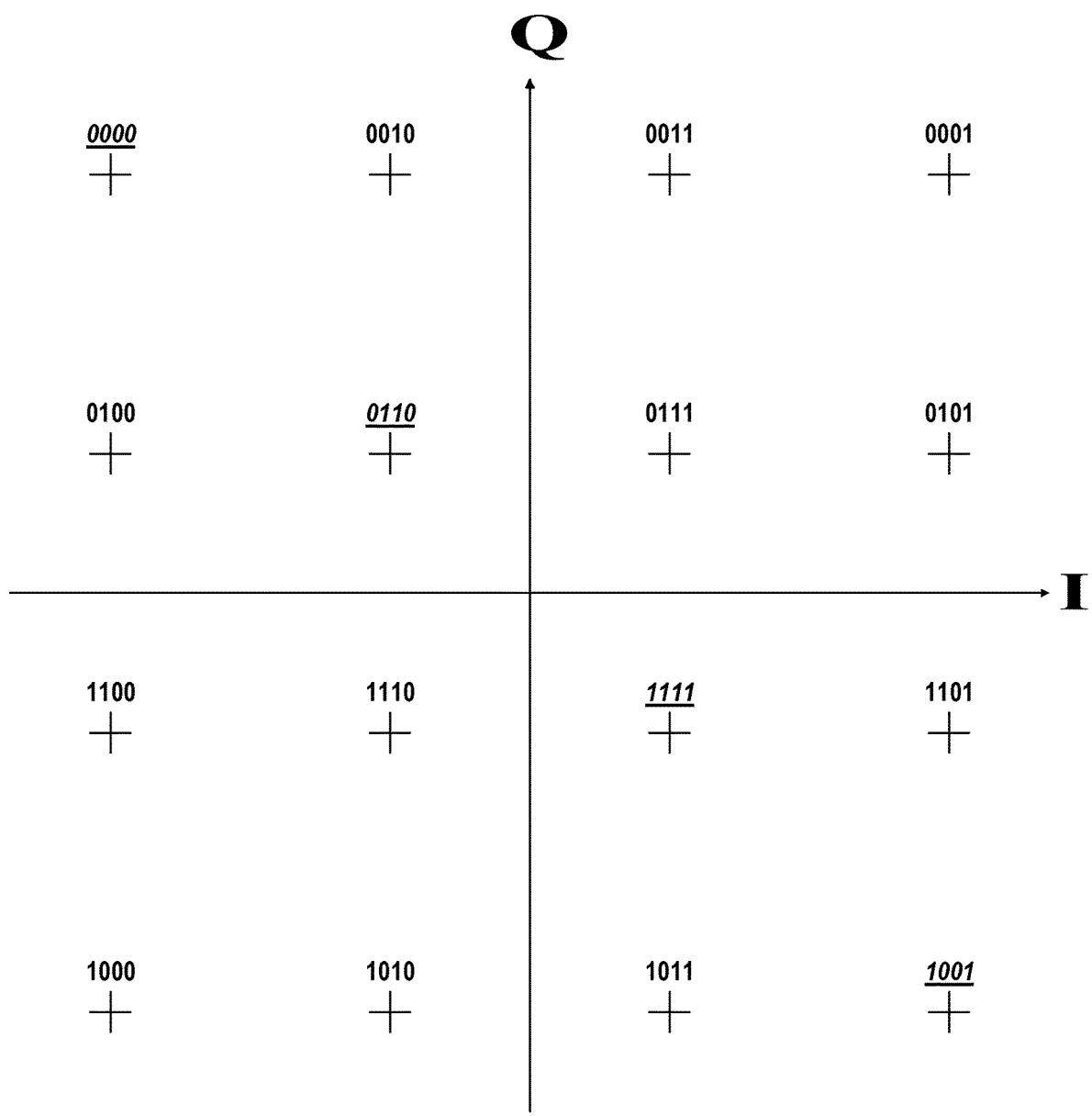
Fig. 12  5th Gray Map of 16QAM

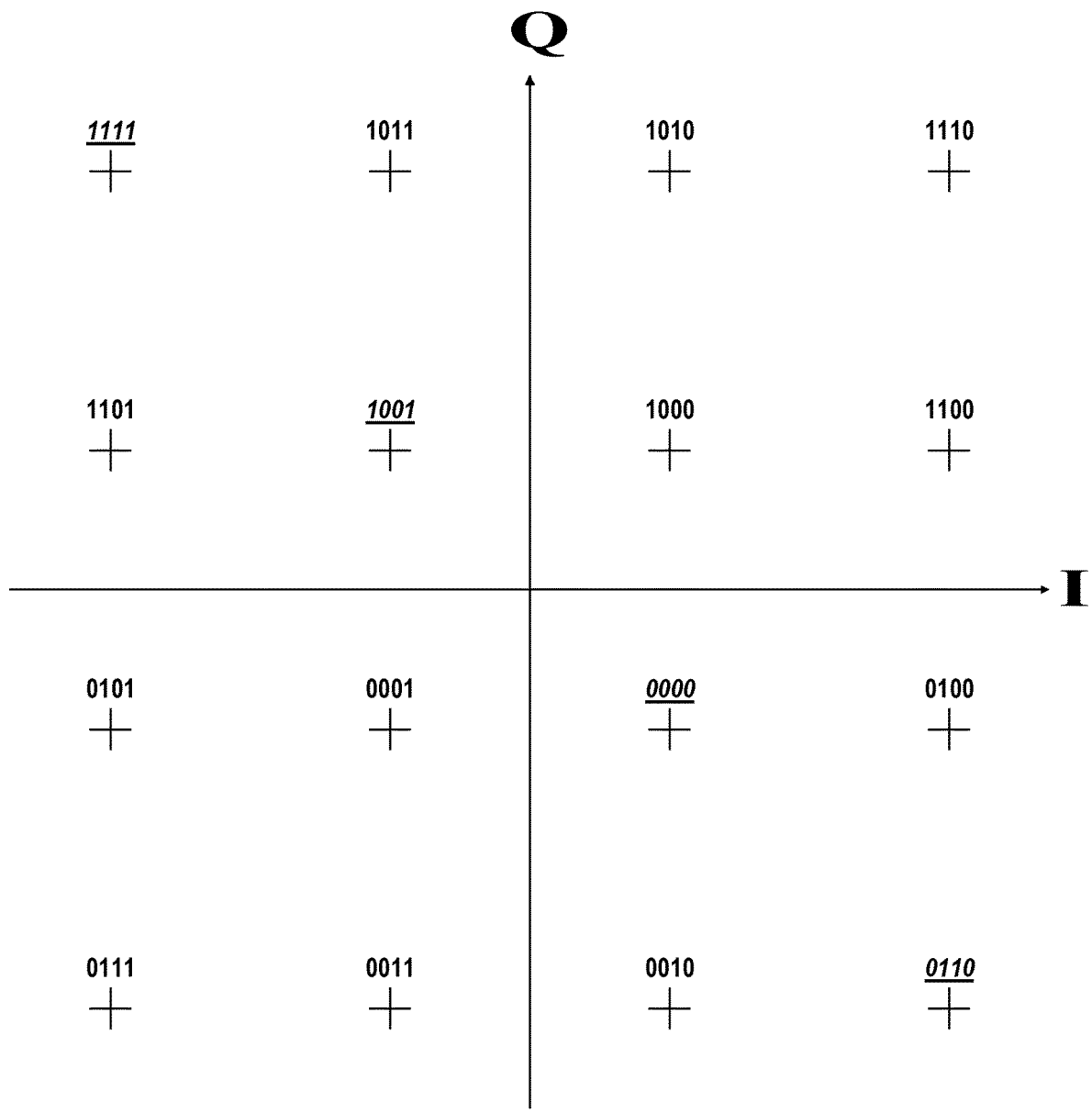
Fig. 13  6th Gray Map of 16QAM
(A preferred labeling diversity from
Fig. 12 fifth Gray Map of 16QAM)

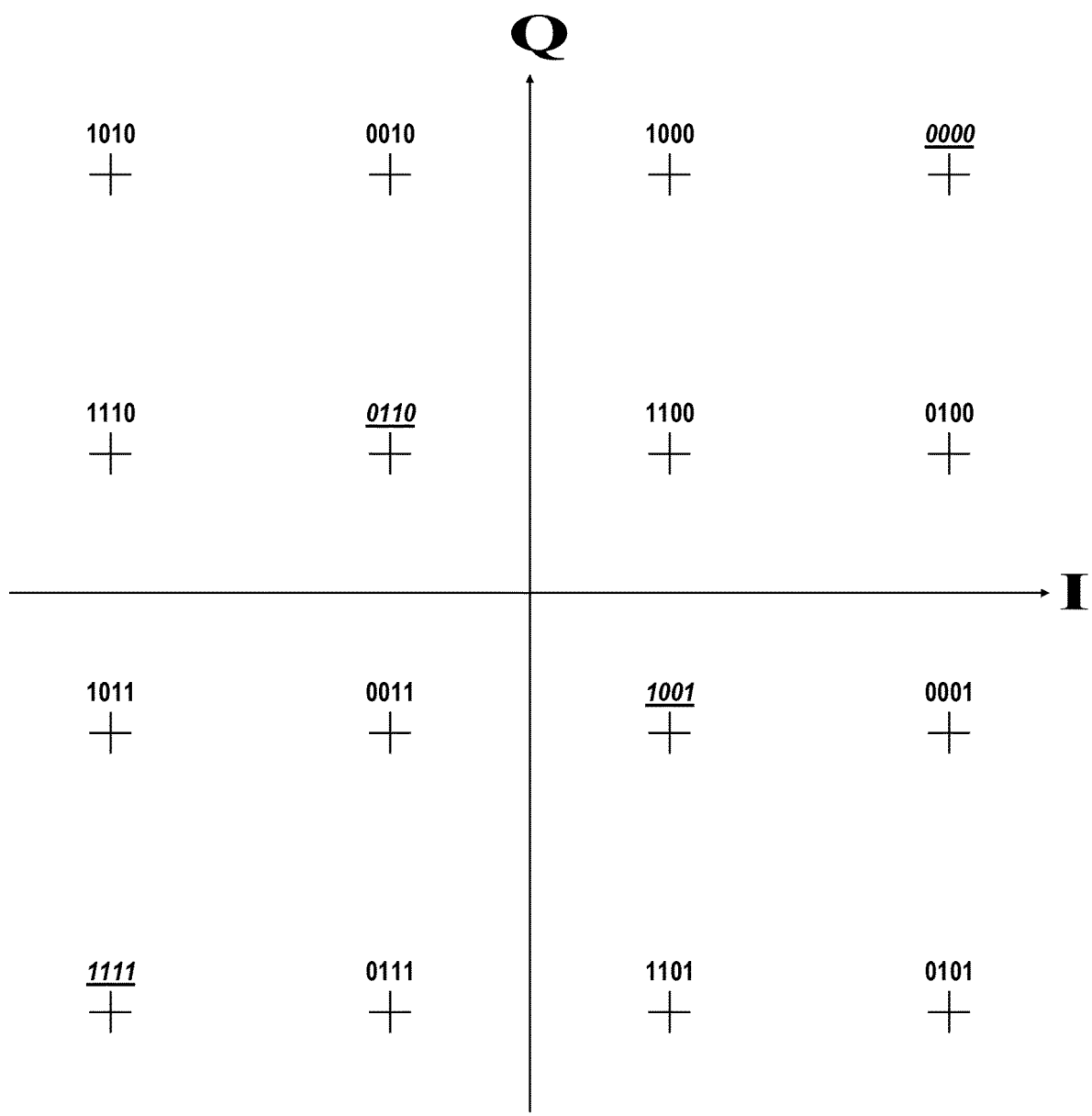
Fig. 14  1st SCM Map of 16QAM

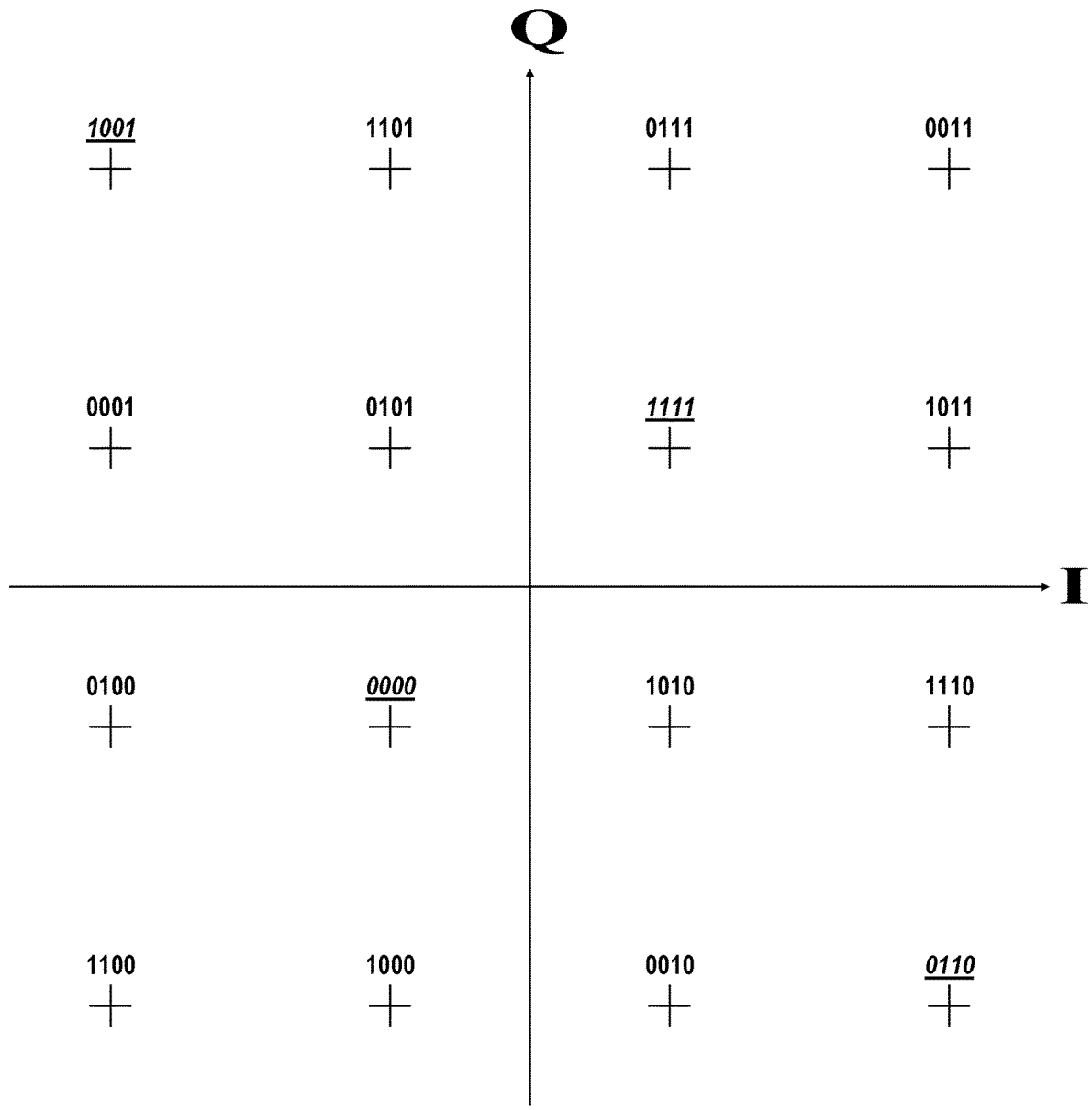
Fig. 15 2nd SCM Map of 16QAM
(A preferred labeling diversity from
Fig. 14 first SCM Map of 16QAM)

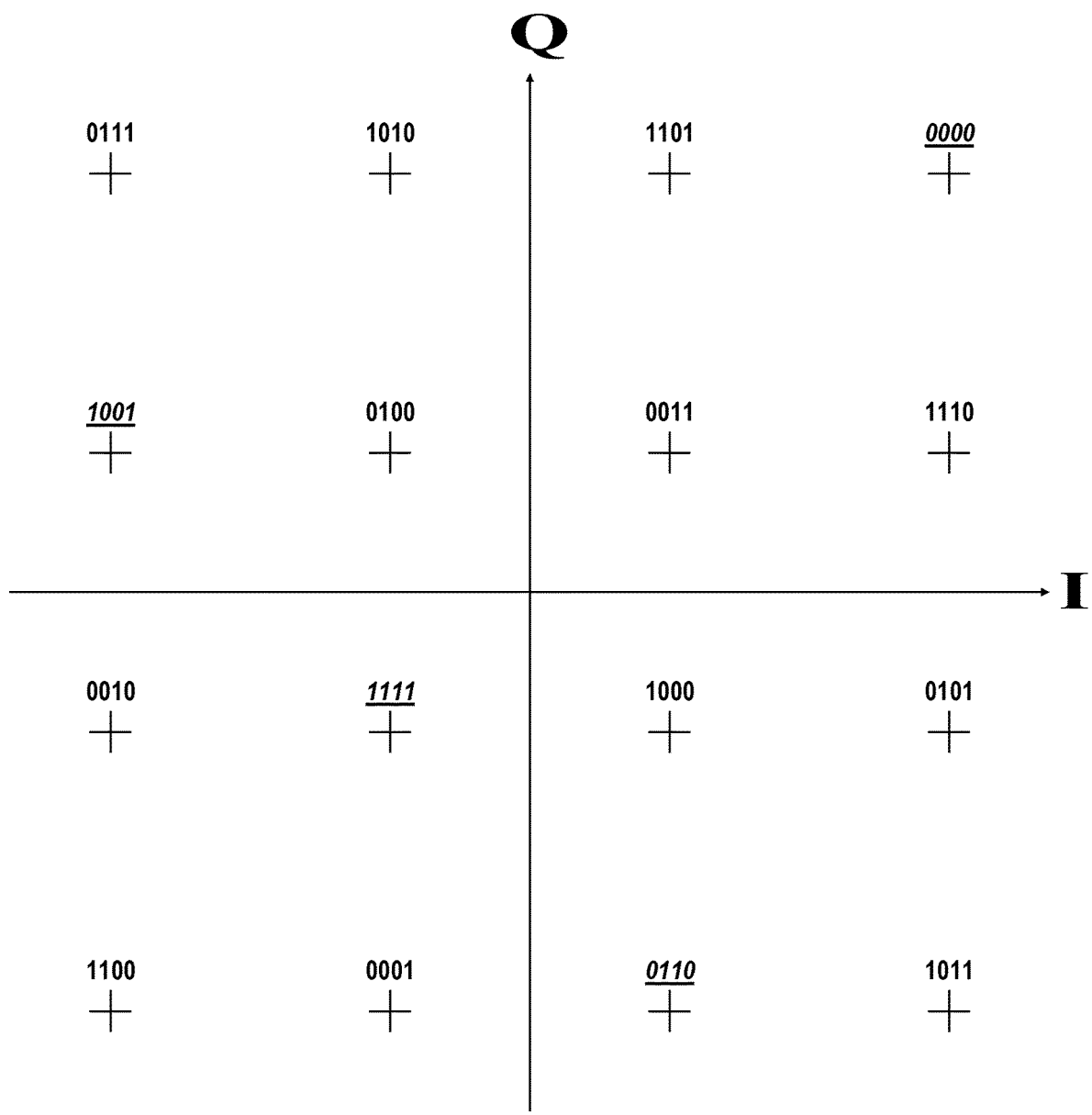
Fig. 16  1st Anti-Gray Map of 16QAM

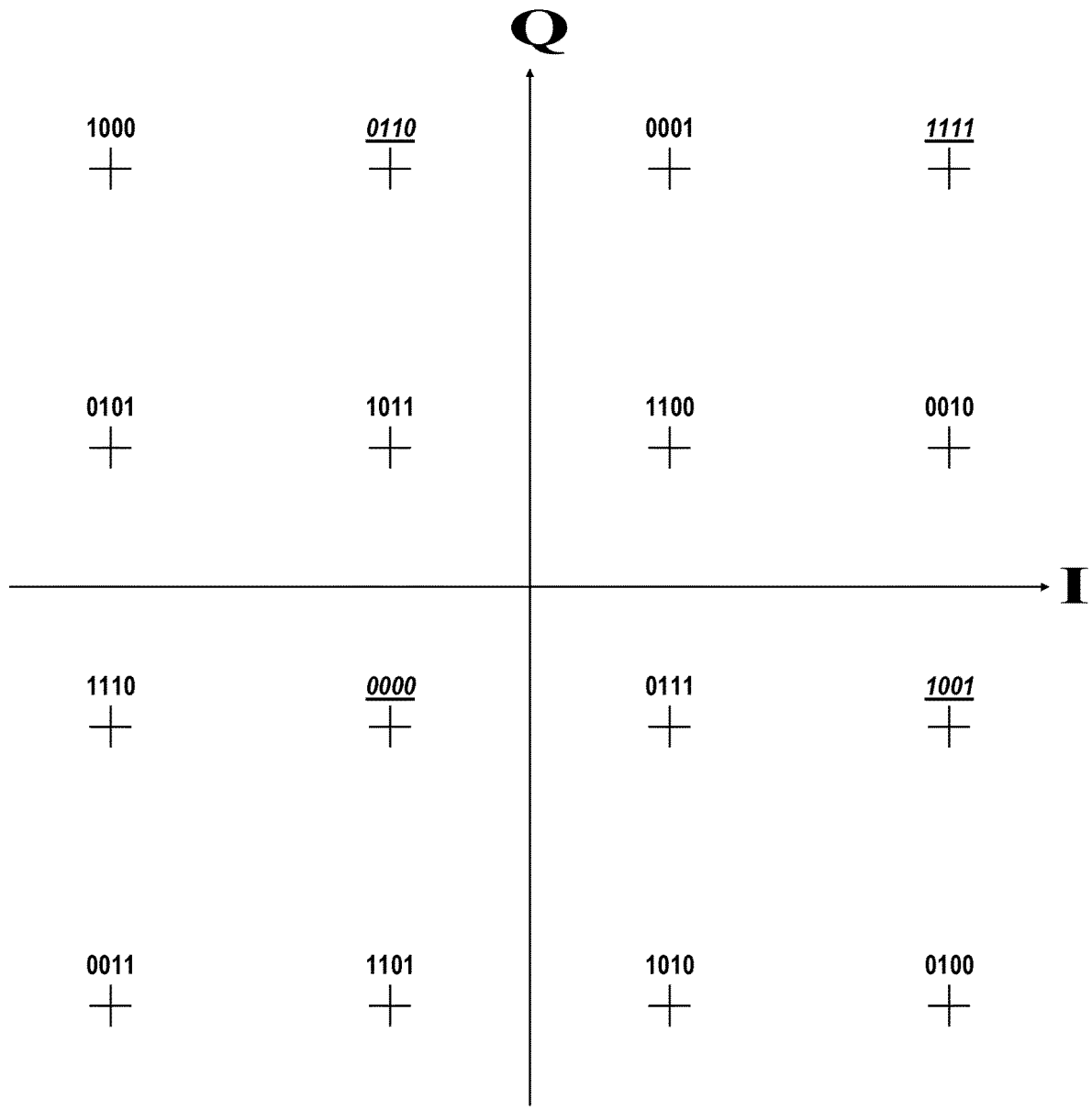
Fig. 17 2nd Anti-Gray Map of 16QAM
(A preferred labeling diversity from
Fig. 16 first anti-Gray Map of 16QAM)

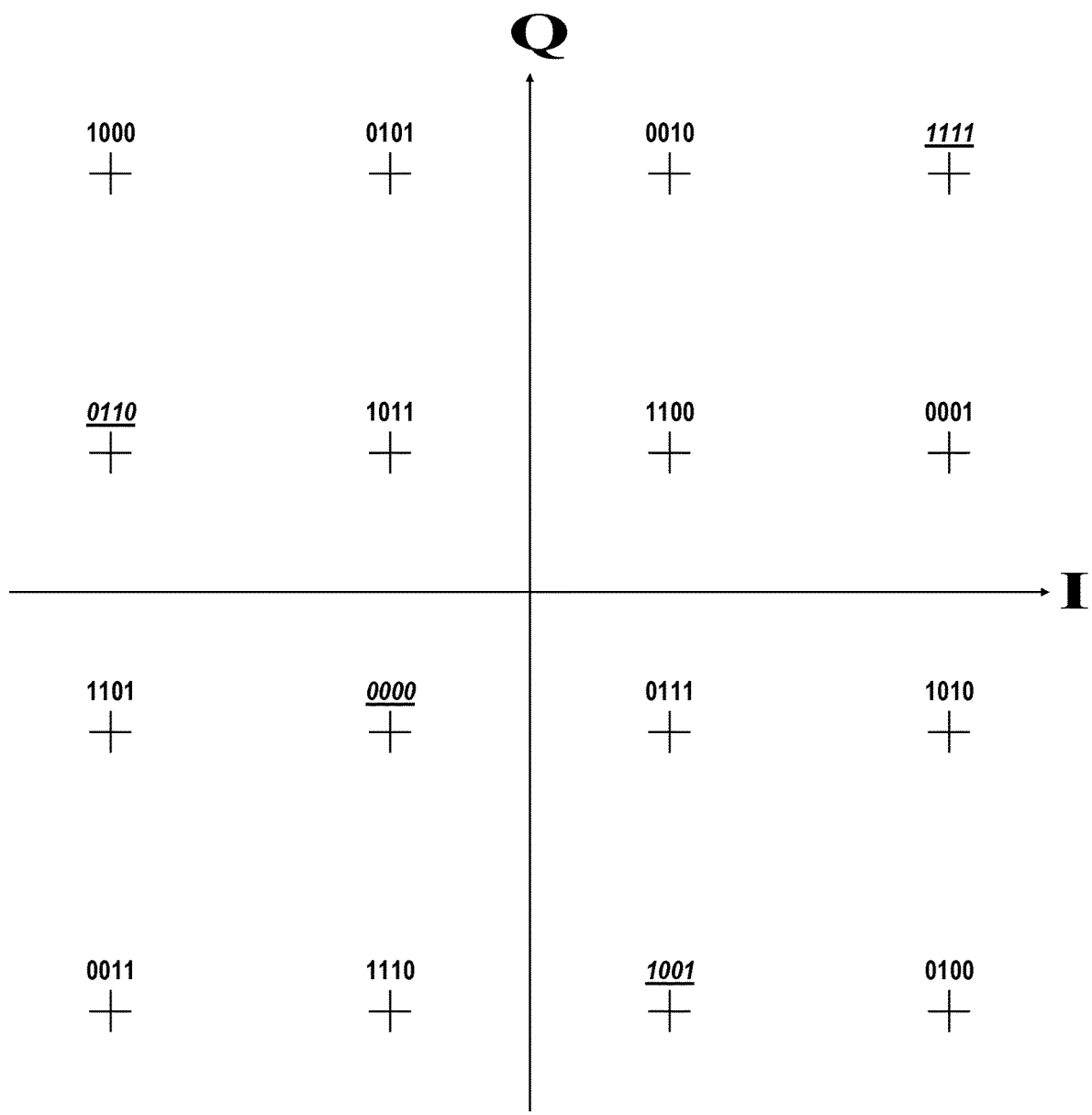
Fig. 18  3rd Anti-Gray Map of 16QAM

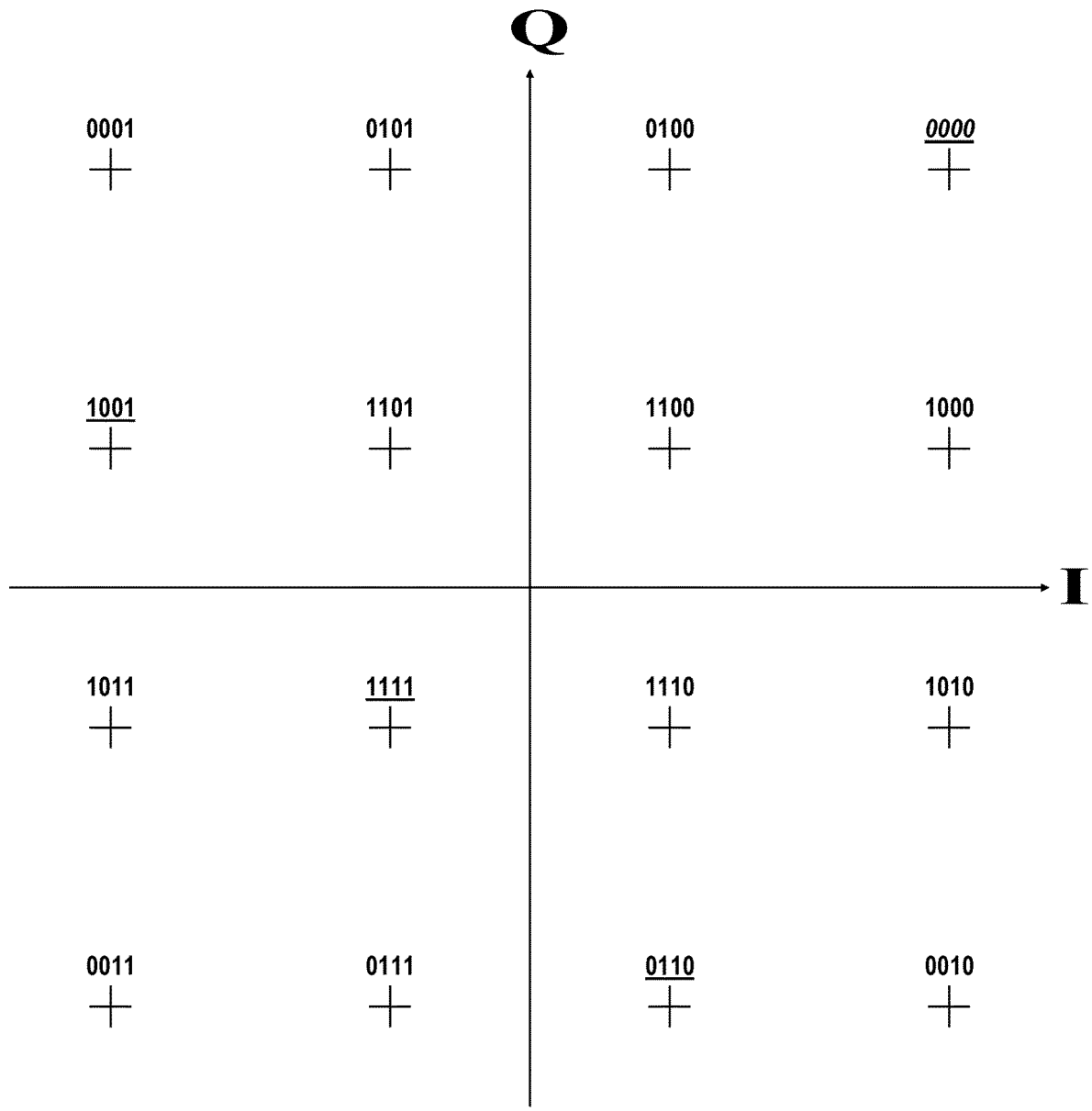
Fig. 19 4th Anti-Gray Map of 16QAM
(Preferred labeling diversity from
Fig. 18 third anti-Gray Map of 16QAM)

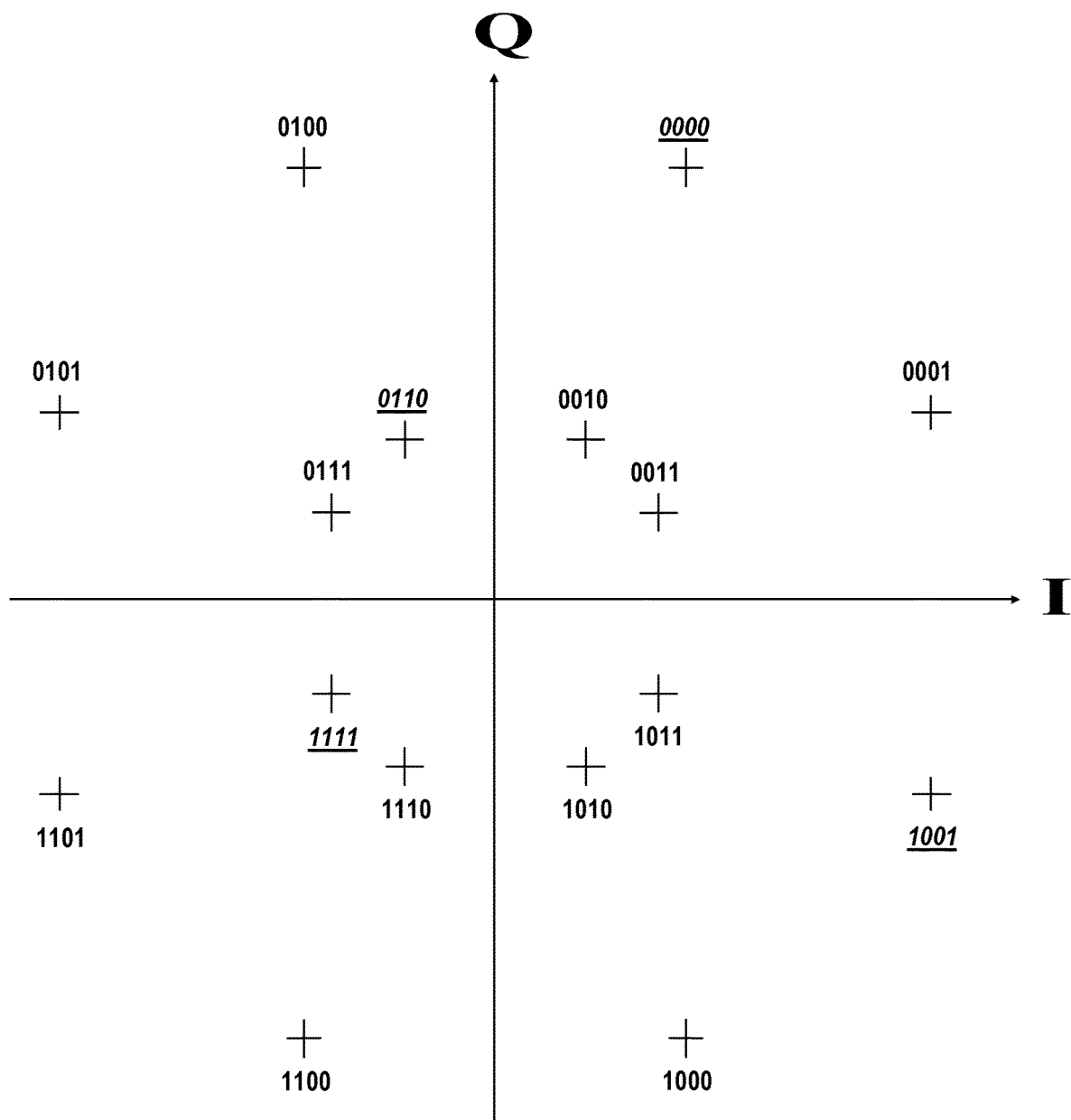
Fig. 20 1st Gray Map of 16APSK
(Corresponds to ATSC-3.0 Gray Map of 16-NUC)

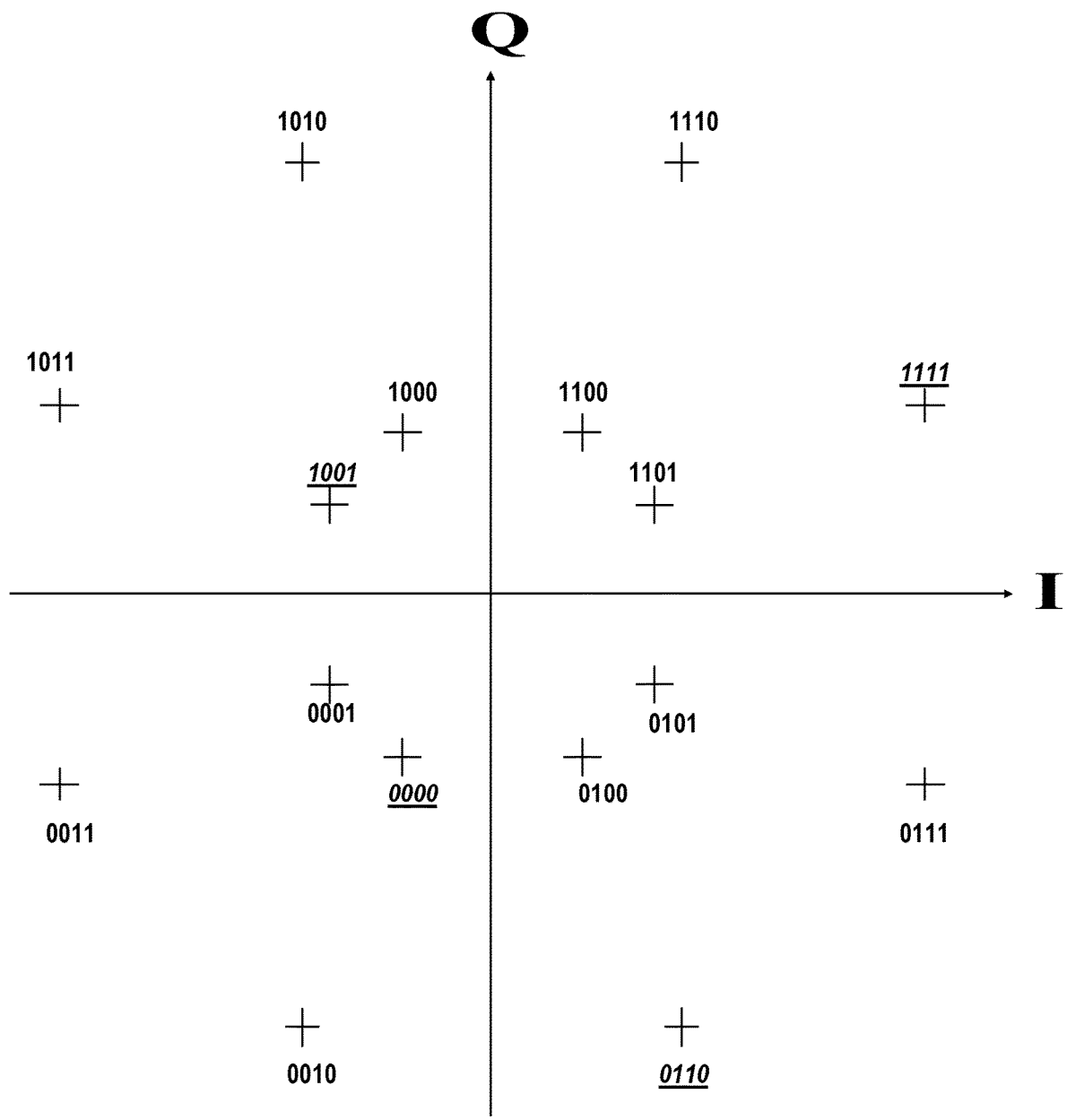
Fig. 21 2nd Gray Map of 16ASPK
(Preferred labeling diversity from
Fig. 20 first Gray Map of 16APSK)

```
              Q
              ↑
  1   2   3   4 │ 5   6   7   8
  9  10  11  12 │13  14  15  16
 17  18  19  20 │21  22  23  24
 25  26  27  28 │29  30  31  32
────────────────┼──────────────── I
 33  34  35  36 │37  38  39  40
 41  42  43  44 │45  46  47  48
 49  50  51  52 │53  54  55  56
 57  58  59  60 │61  62  63  64
```

Fig. 22   1st Pattern of Labeling for 64QAM Mapping

```
              Q
              ↑
 37  45  53  61 │60  52  44  36
 38  46  54  62 │59  51  43  35
 39  47  55  63 │58  50  42  34
 40  48  56  64 │57  49  41  33
────────────────┼──────────────── I
 32  24  16   8 │ 1   9  17  25
 31  23  15   7 │ 2  10  18  26
 30  22  14   6 │ 3  11  19  27
 29  21  13   5 │ 4  12  20  28
```

Fig. 23   2nd Pattern of Labeling for 64QAM Mapping

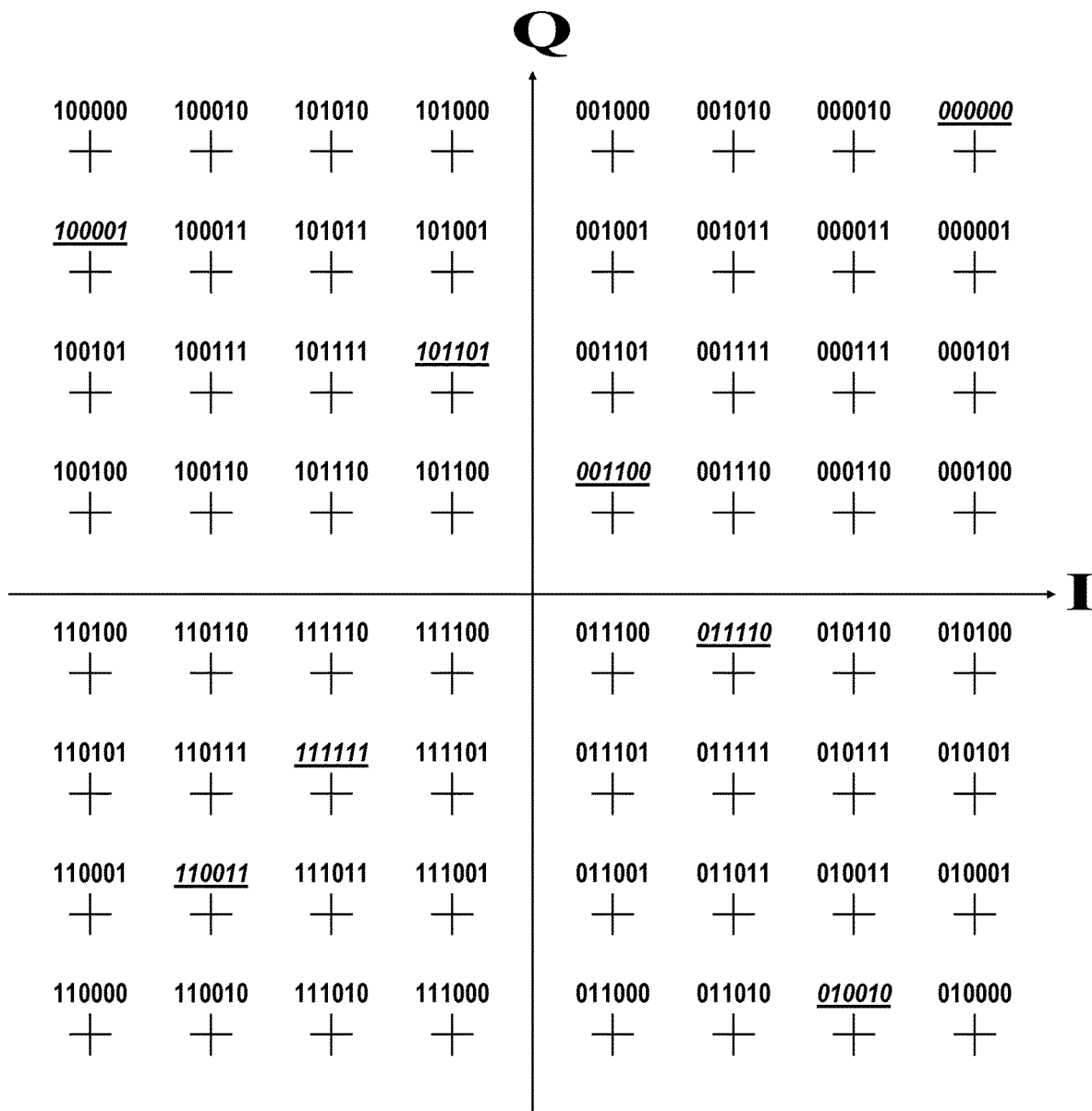
Fig. 24 1st Gray Map of 64QAM
(Corresponds to DVB-T2 Gray Map of 64QAM)

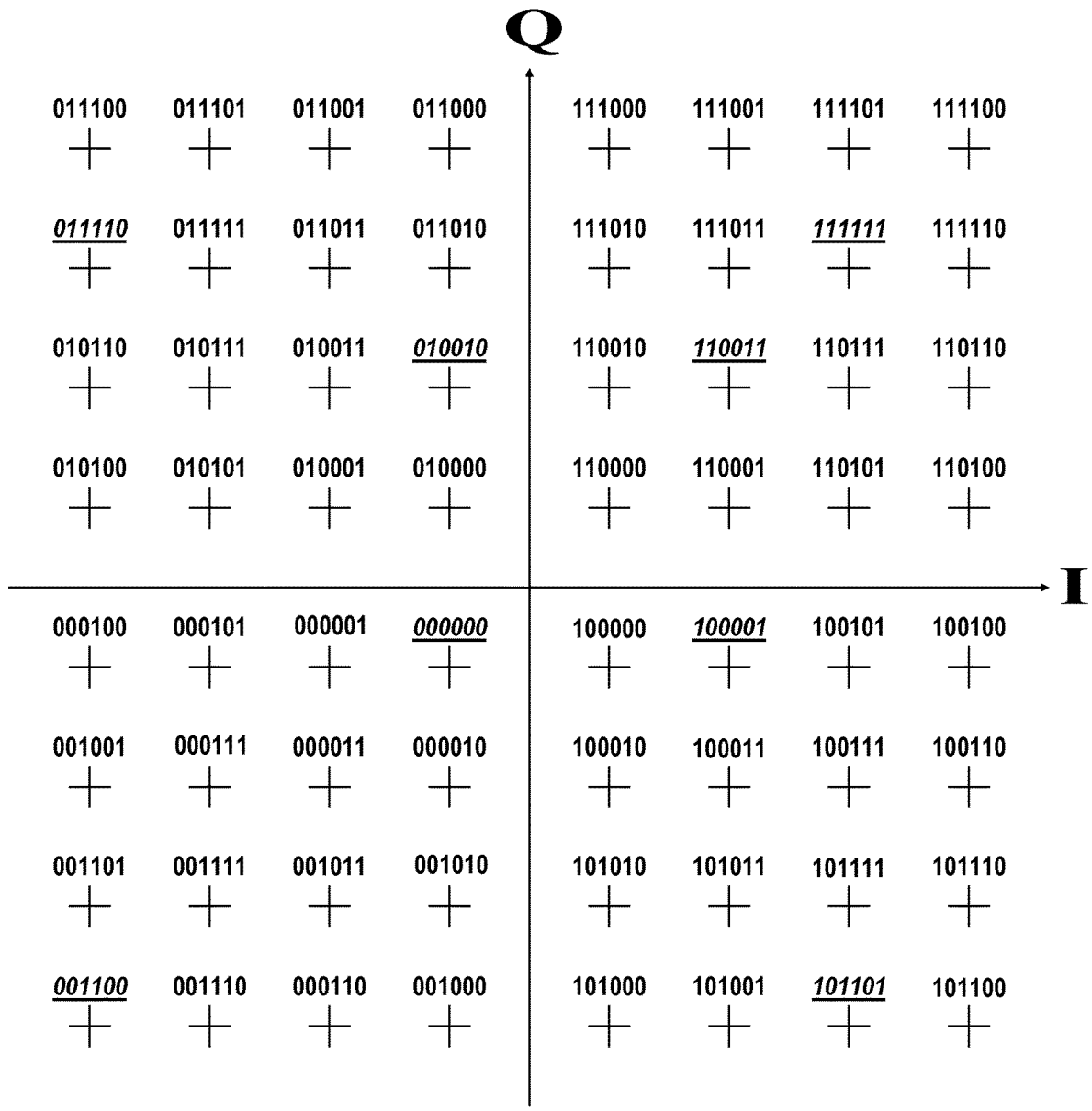
Fig. 25 2nd Gray Map of 64QAM
(A preferred labeling diversity from
Fig. 24 first Gray Map of 64QAM)

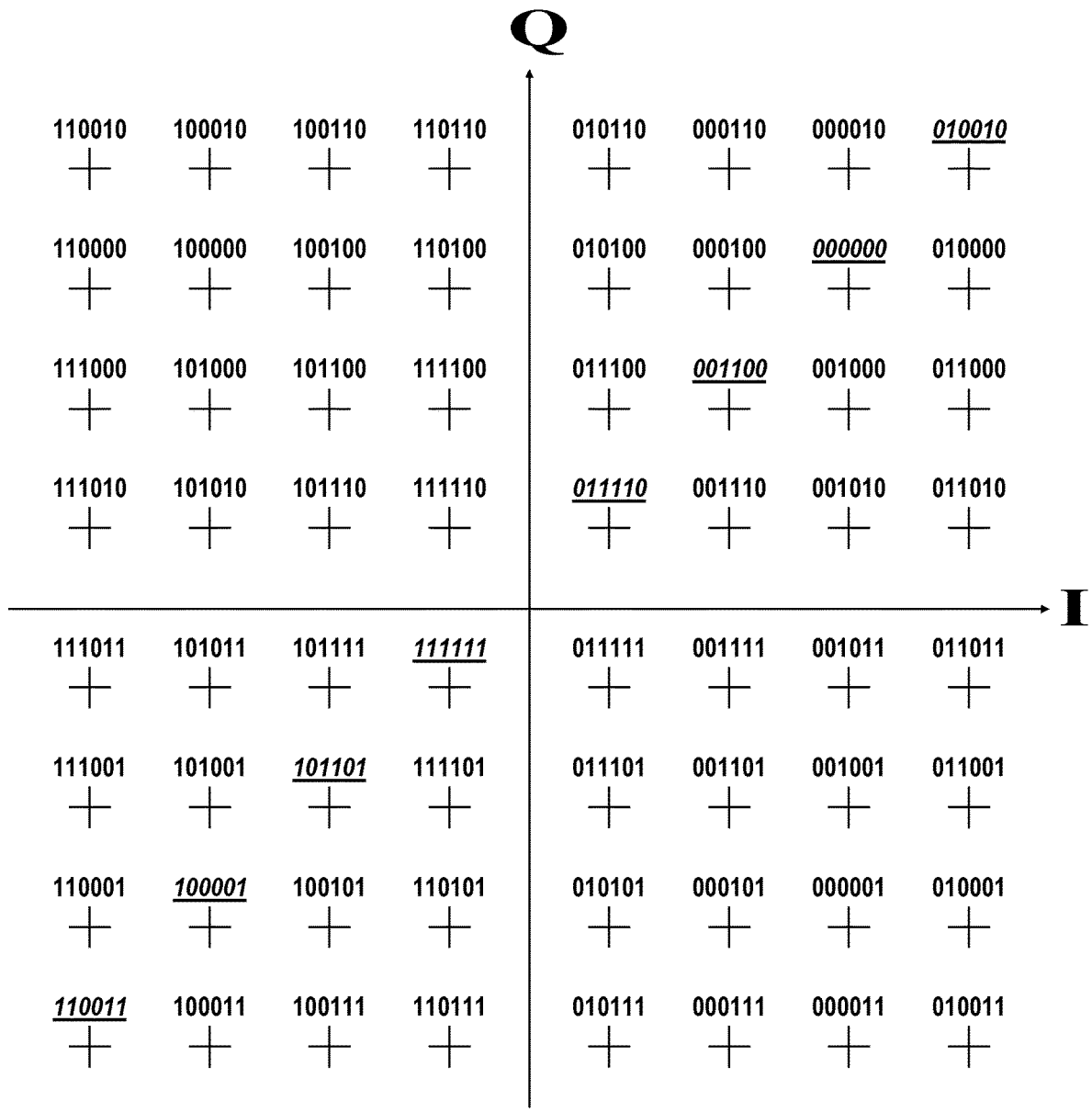
Fig. 26 3rd Gray Map of 64QAM
(Palindromic map labels positioned along diagonal axis through - I, - Q and + I, + Q quadrants)

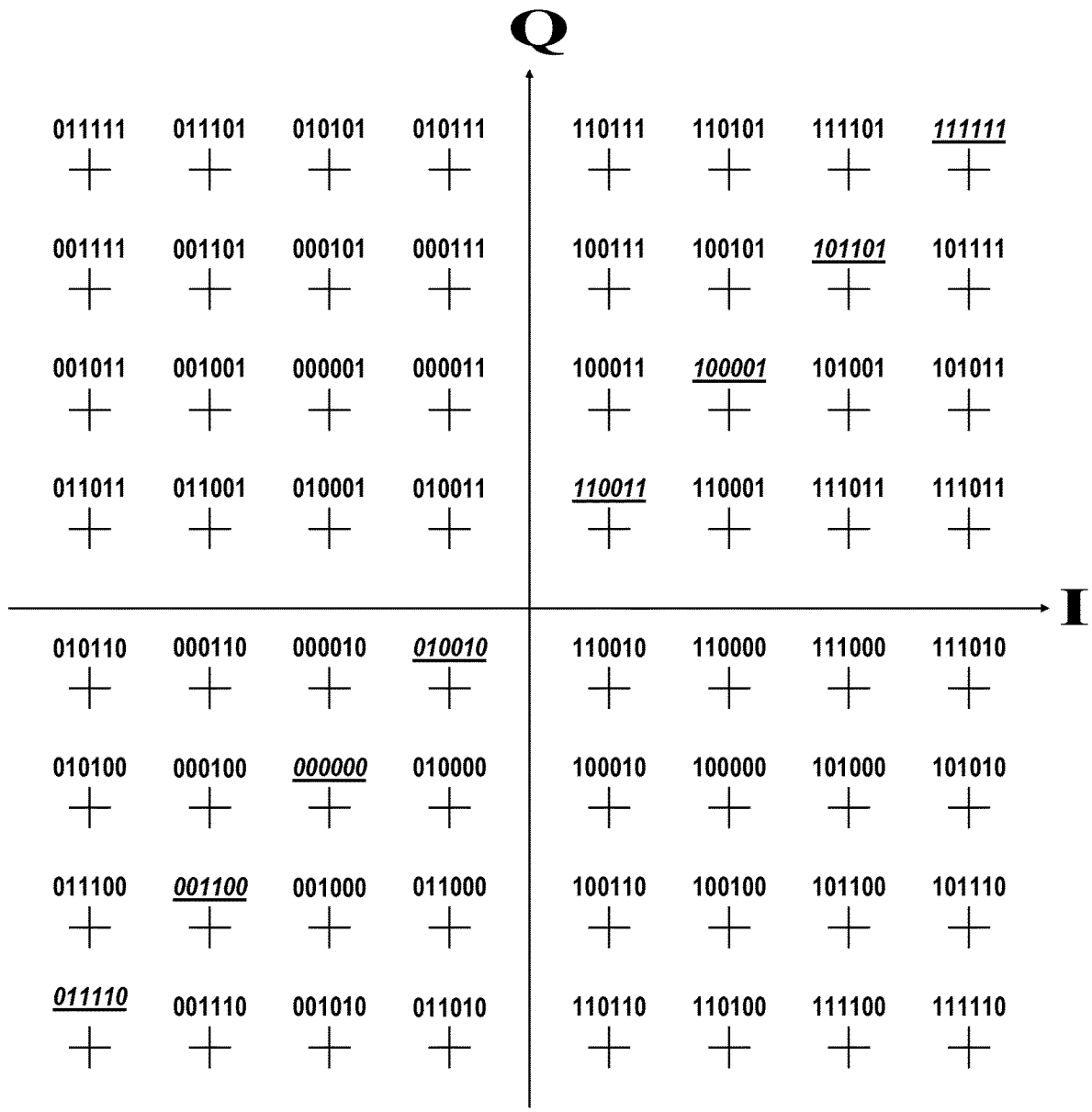
Fig. 27 4th Gray Map of 64QAM
(A preferred labeling diversity from
Fig. 26 third Gray Map of 64QAM)

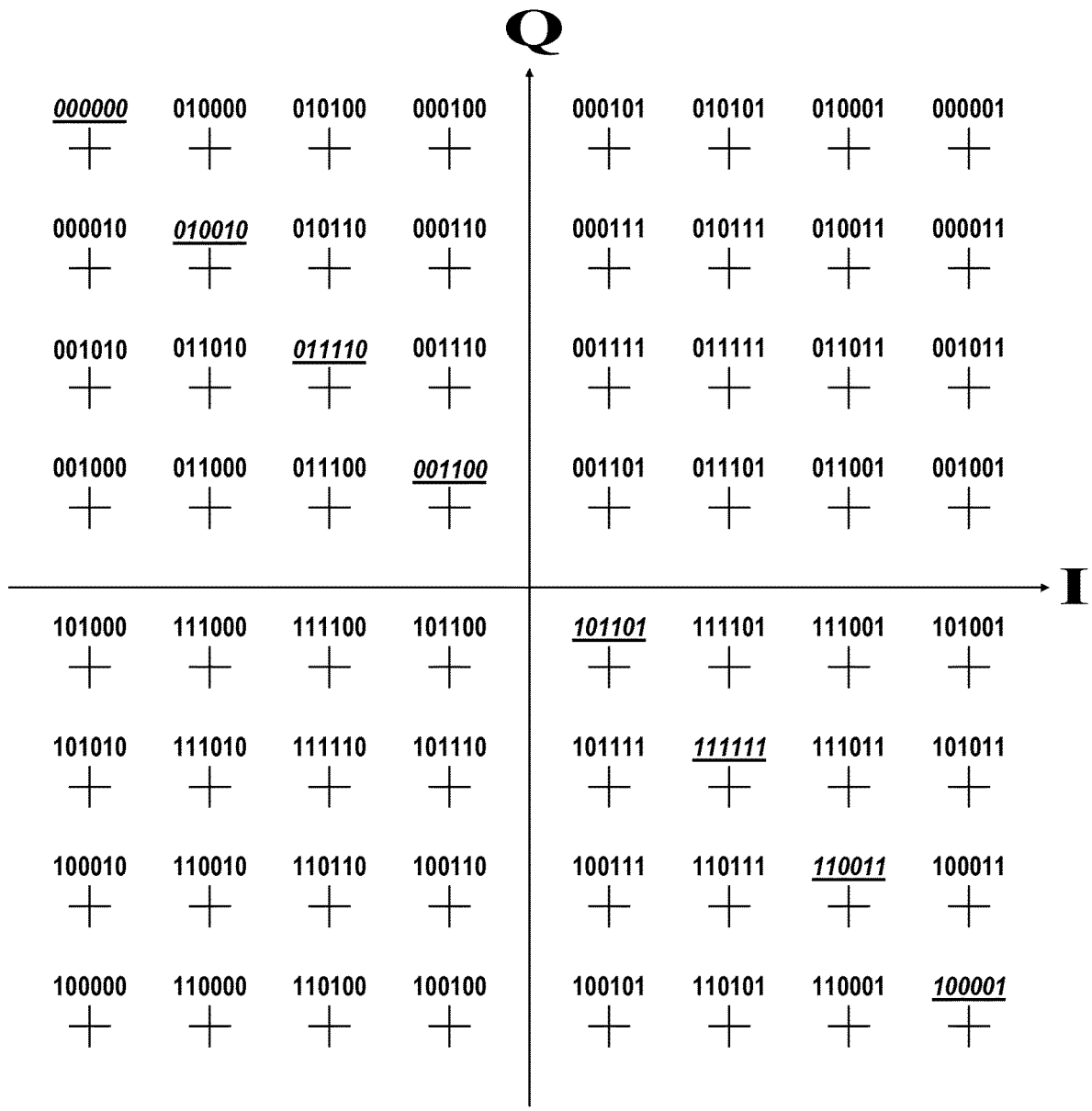
Fig. 28  5th Gray Map of 64QAM
(Palindromic map labels positioned along diagonal axis through - I, + Q and + I, - Q quadrants)

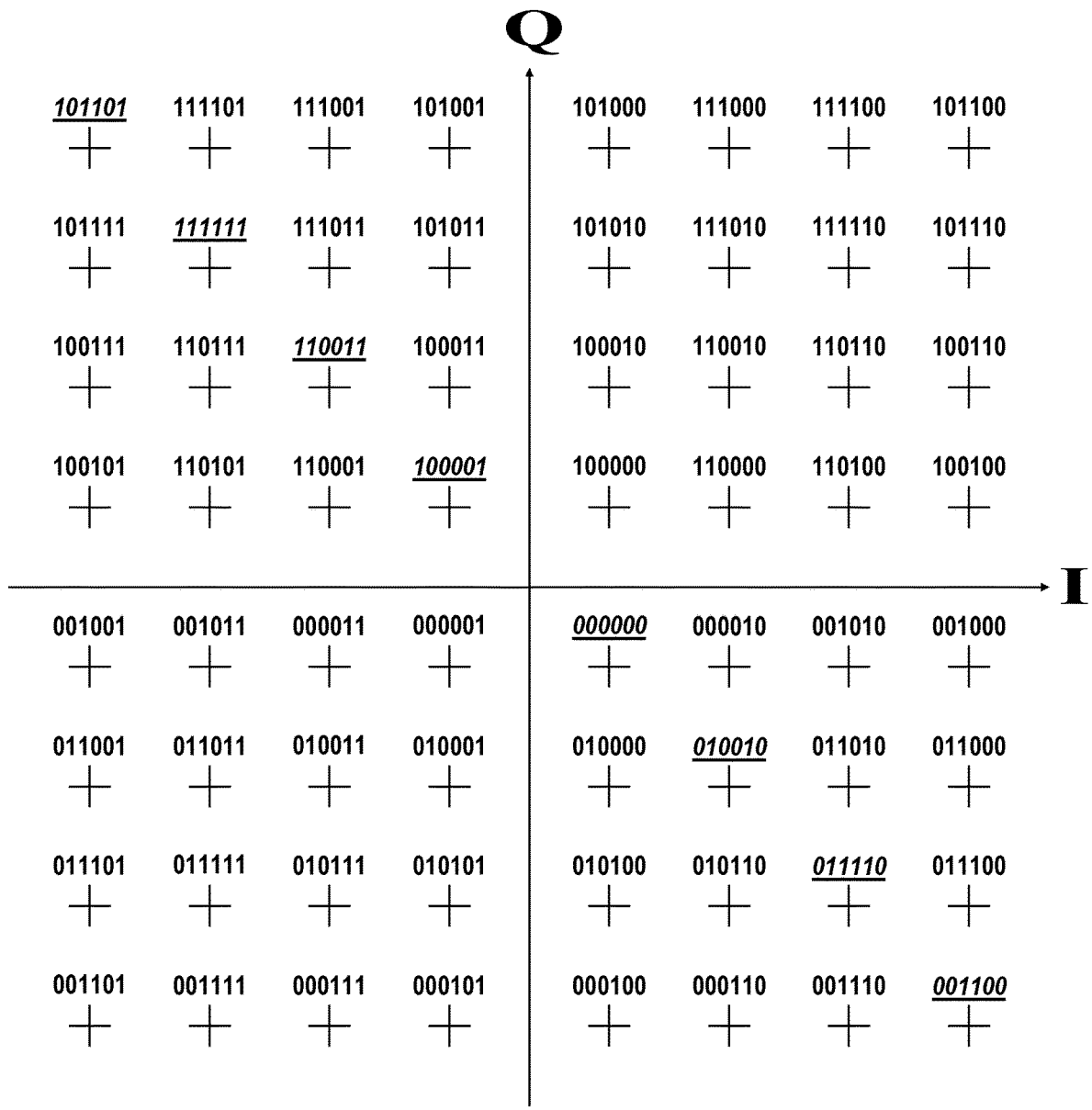
Fig. 29  6ᵗʰ Gray Map of 64QAM
(A preferred labeling diversity from
Fig. 28 fifth Gray Map of 64QAM )

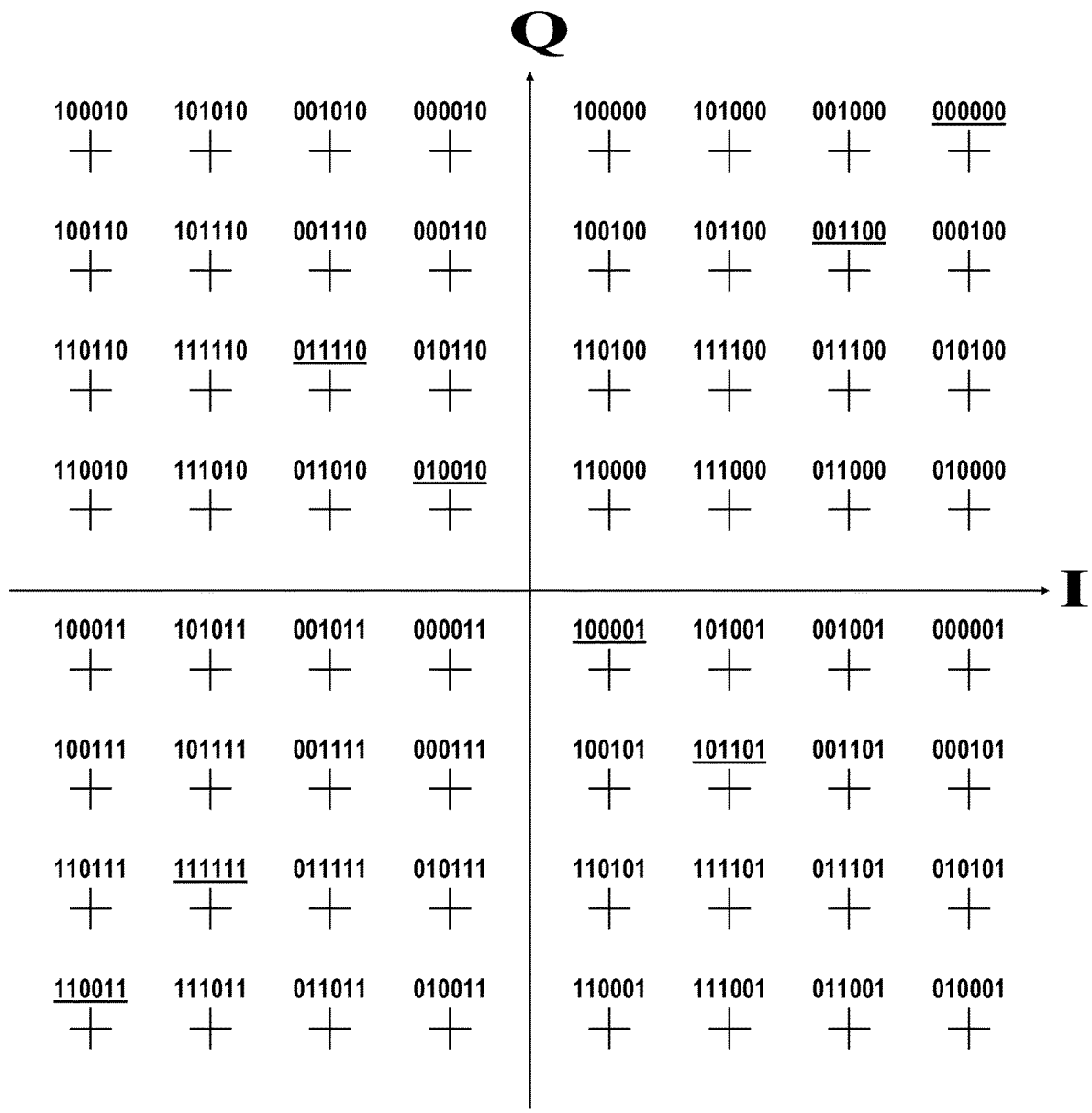
Fig. 30  1st SCM Map of 64QAM

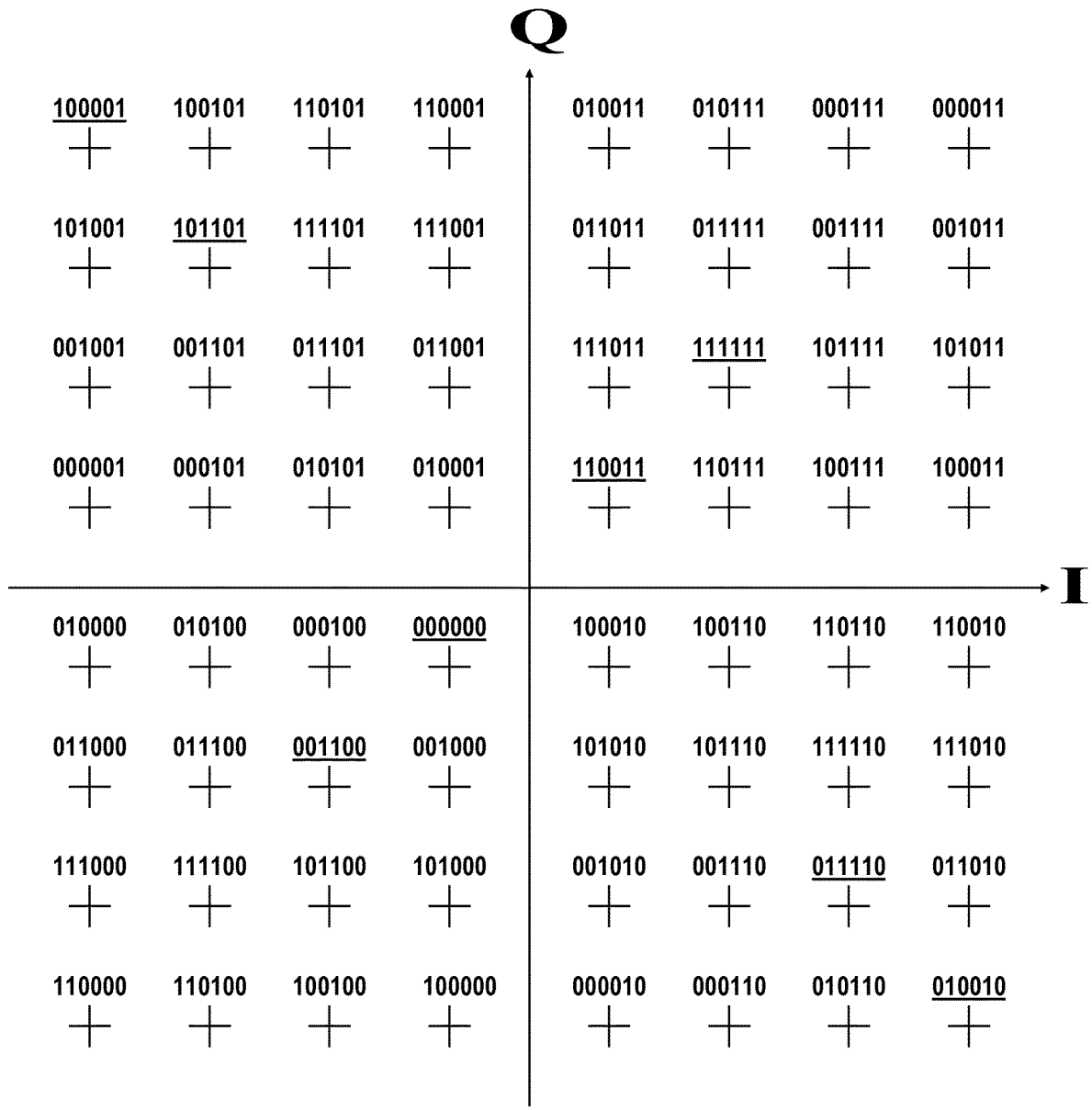
Fig. 31  2nd SCM Map of 64QAM
(A preferred labeling diversity from
Fig. 30 first SCM Map of 64QAM)

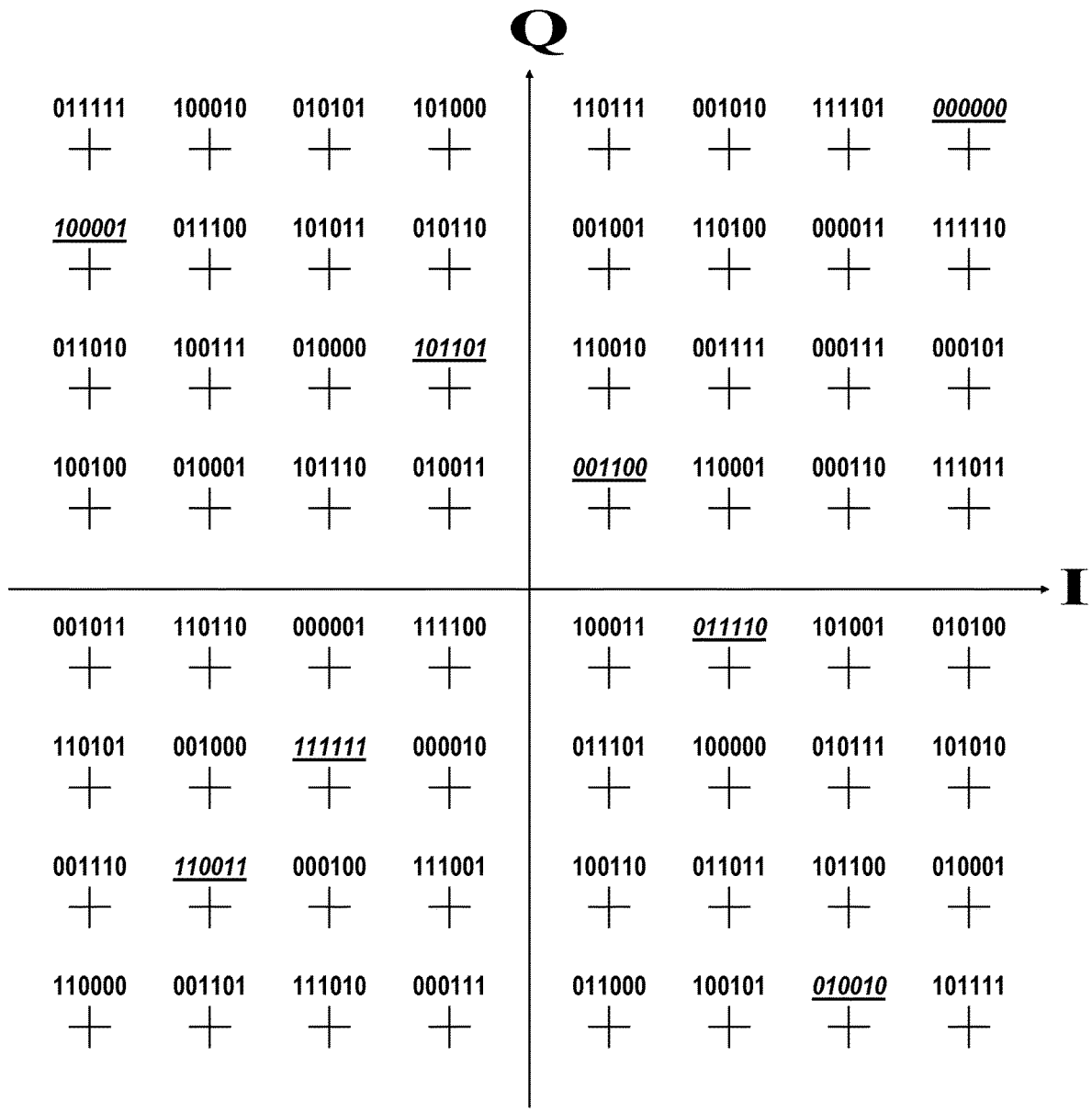
Fig. 32 1st Anti-Gray Map of 64QAM

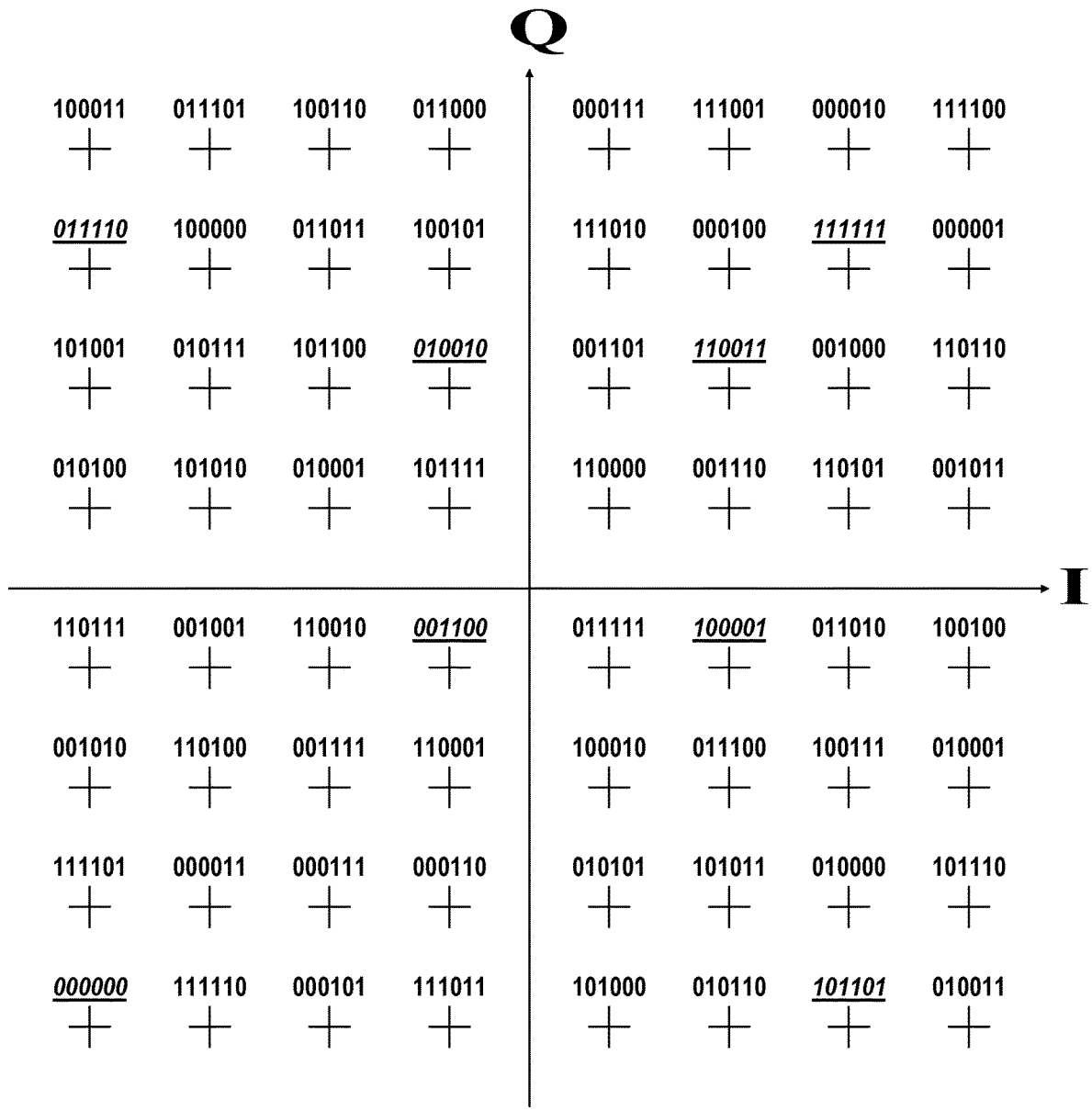
Fig. 33 2nd Anti-Gray Map of 64QAM
(A preferred labeling diversity from
Fig. 32 first anti-Gray Map of 64QAM)

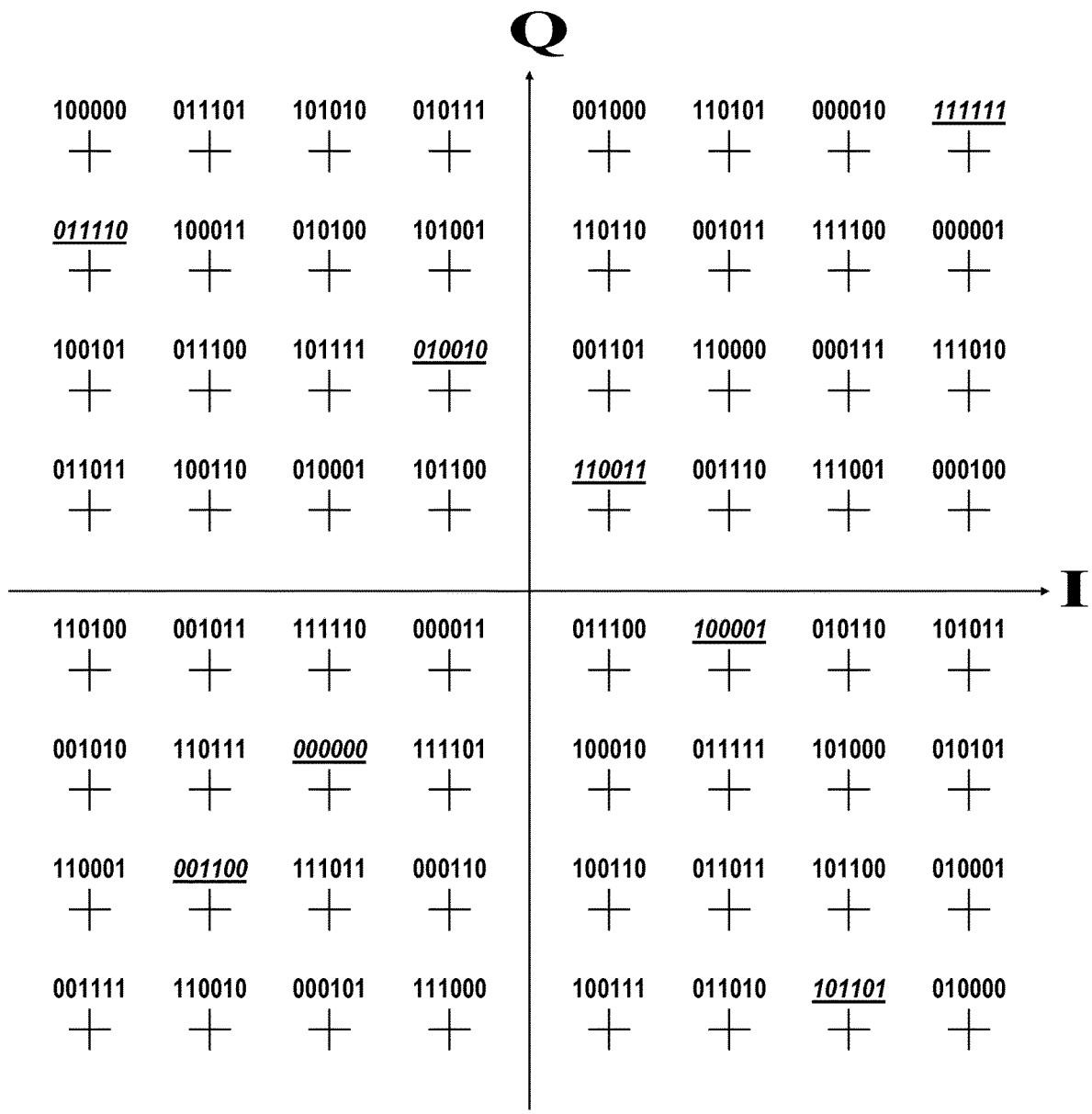
Fig. 34  3rd Anti-Gray Map of 64QAM

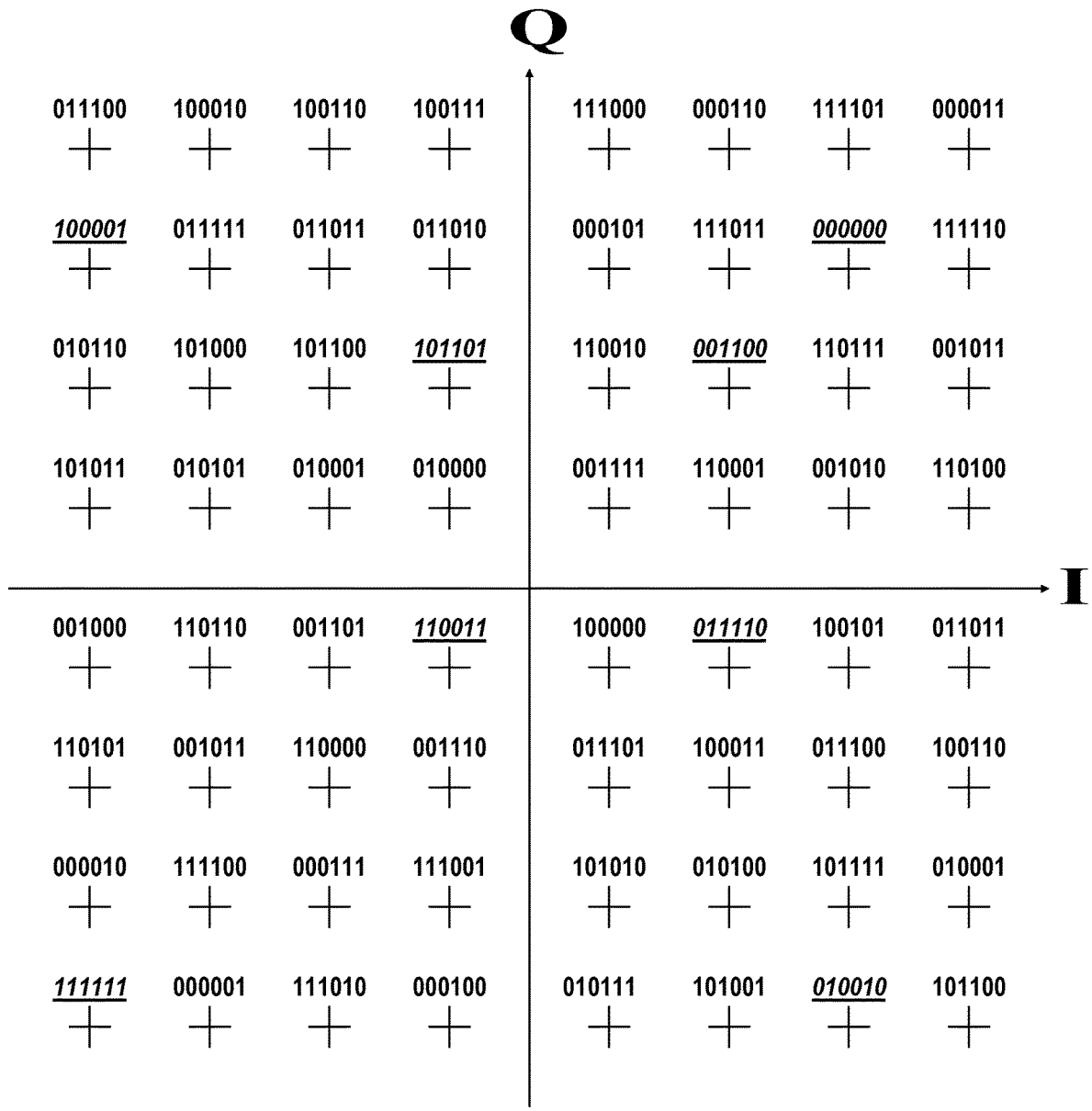
Fig. 35  4th Anti-Gray Map of 64QAM
(A preferred labeling diversity from
Fig. 34 third anti-Gray Map of 64QAM)

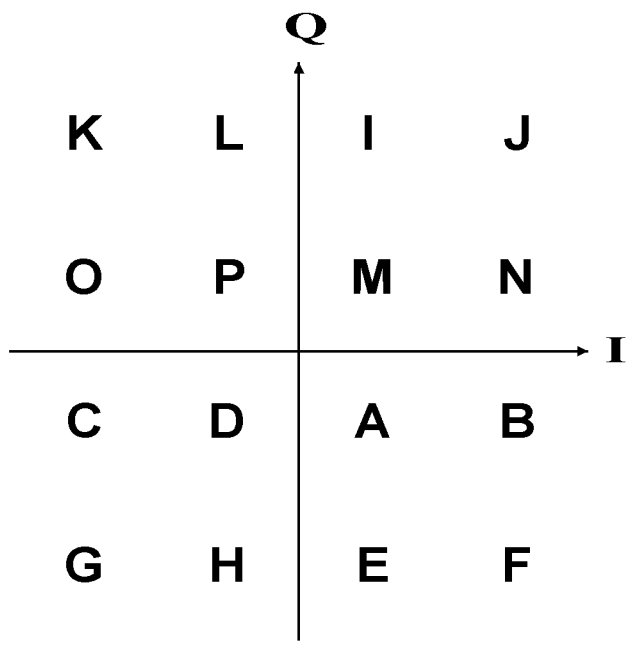
Fig. 36   3rd Pattern of Labeling for 16QAM Mapping
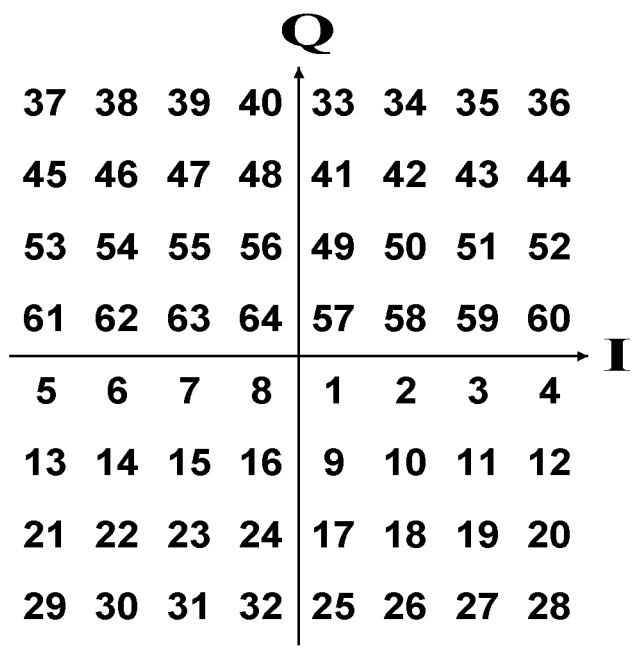
Fig. 37   3rd Pattern of Labeling for 64QAM Mapping

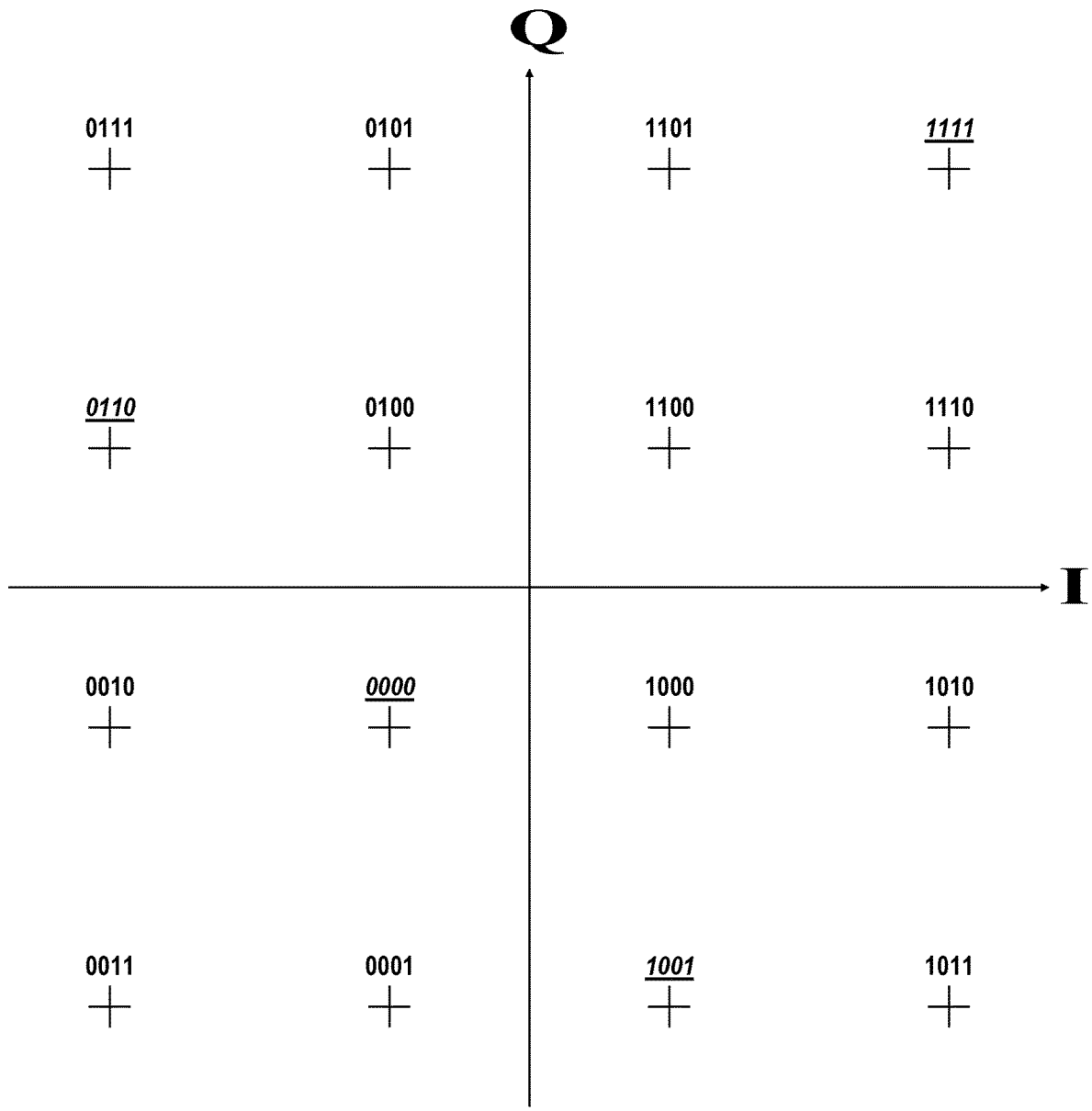
Fig. 38 7th Gray Map of 16QAM
(A preferred labeling diversity from
Fig. 8 DVB-T2 Gray Map of 16QAM)

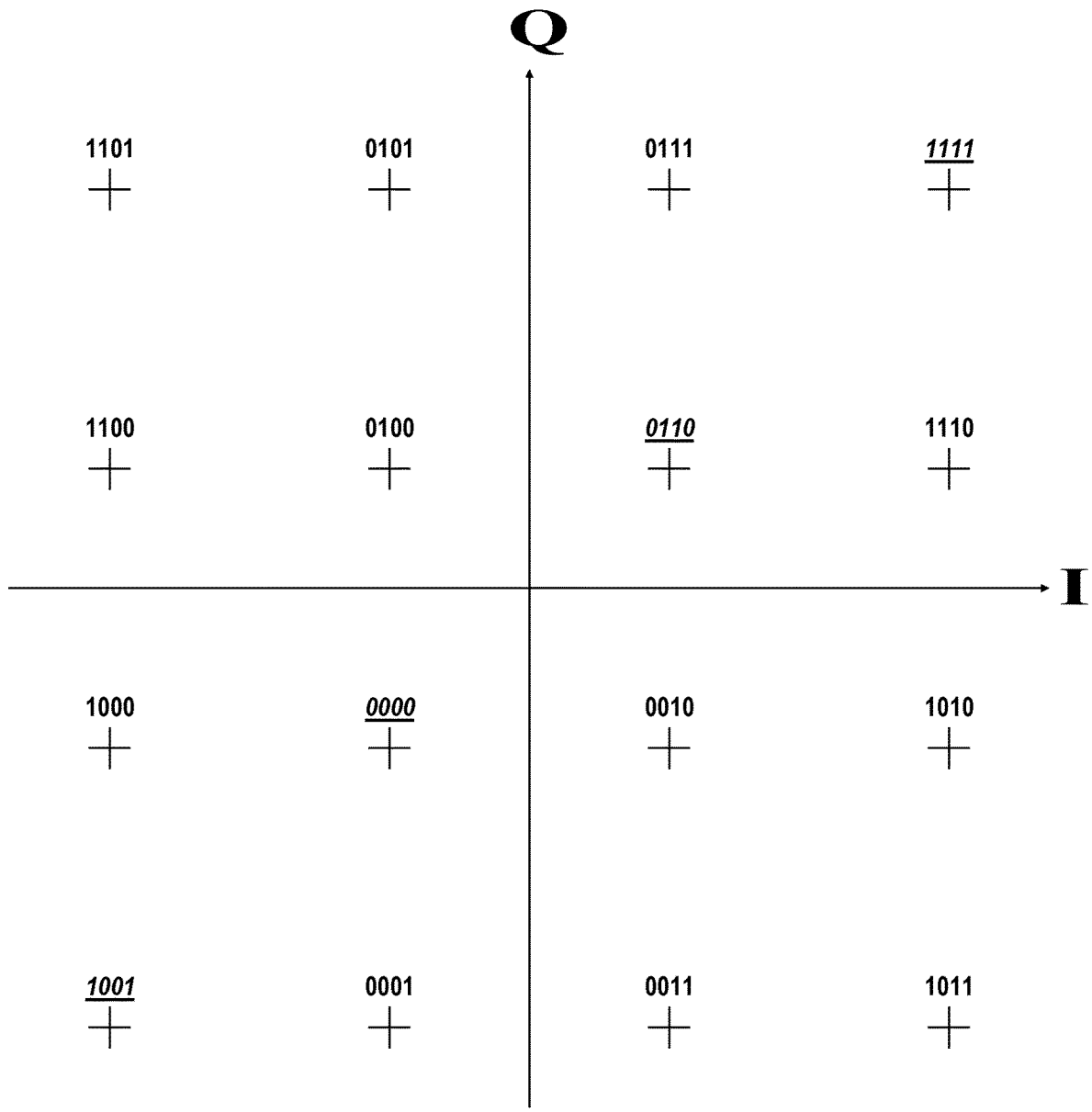
Fig. 39 8th Gray Map of 16QAM
(A preferred labeling diversity from
Fig. 10 third Gray Map of 16QAM)

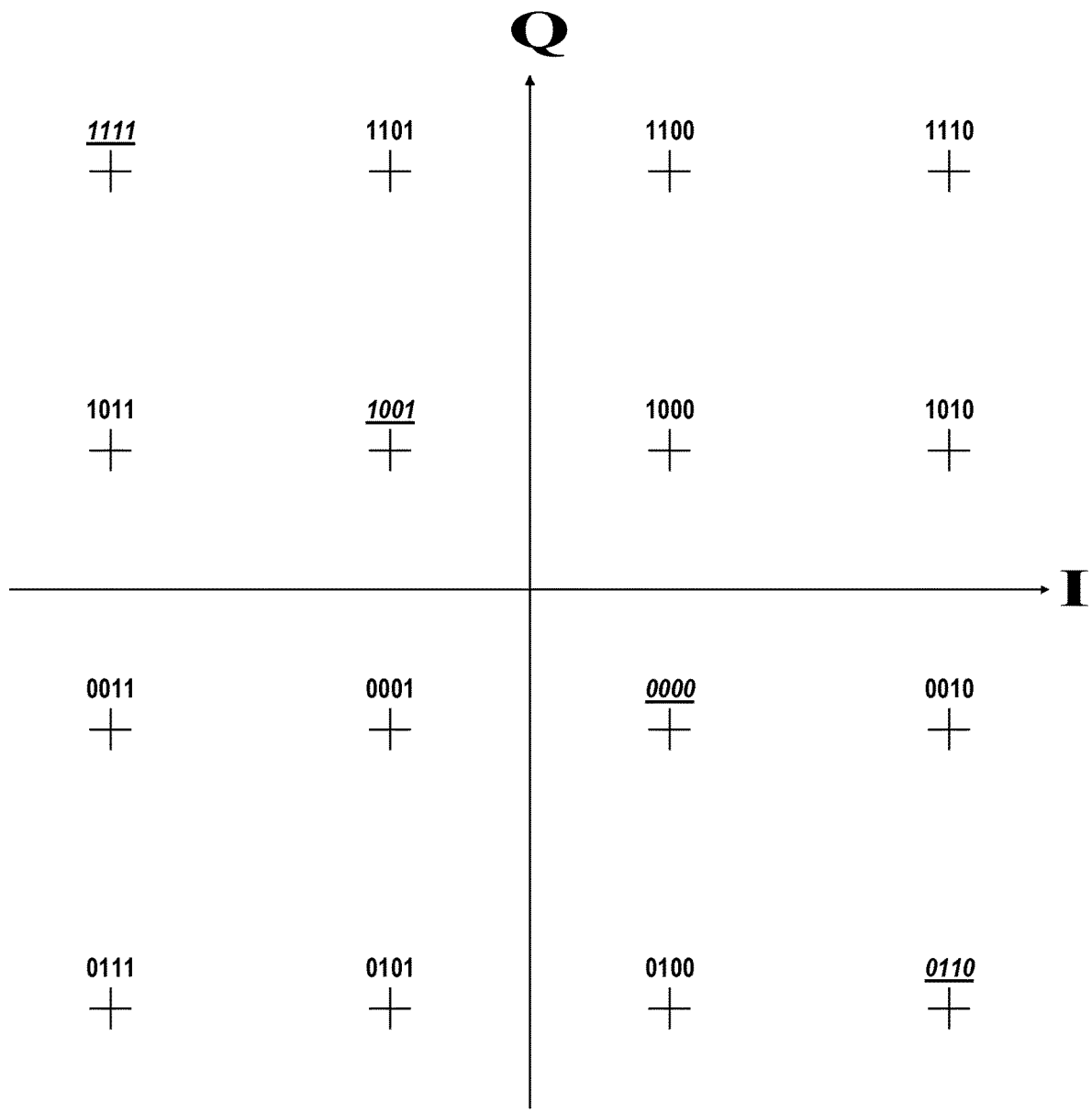
Fig. 40   9th Gray Map of 16QAM
(A preferred labeling diversity from
Fig. 12 fifth Gray Map of 16QAM)

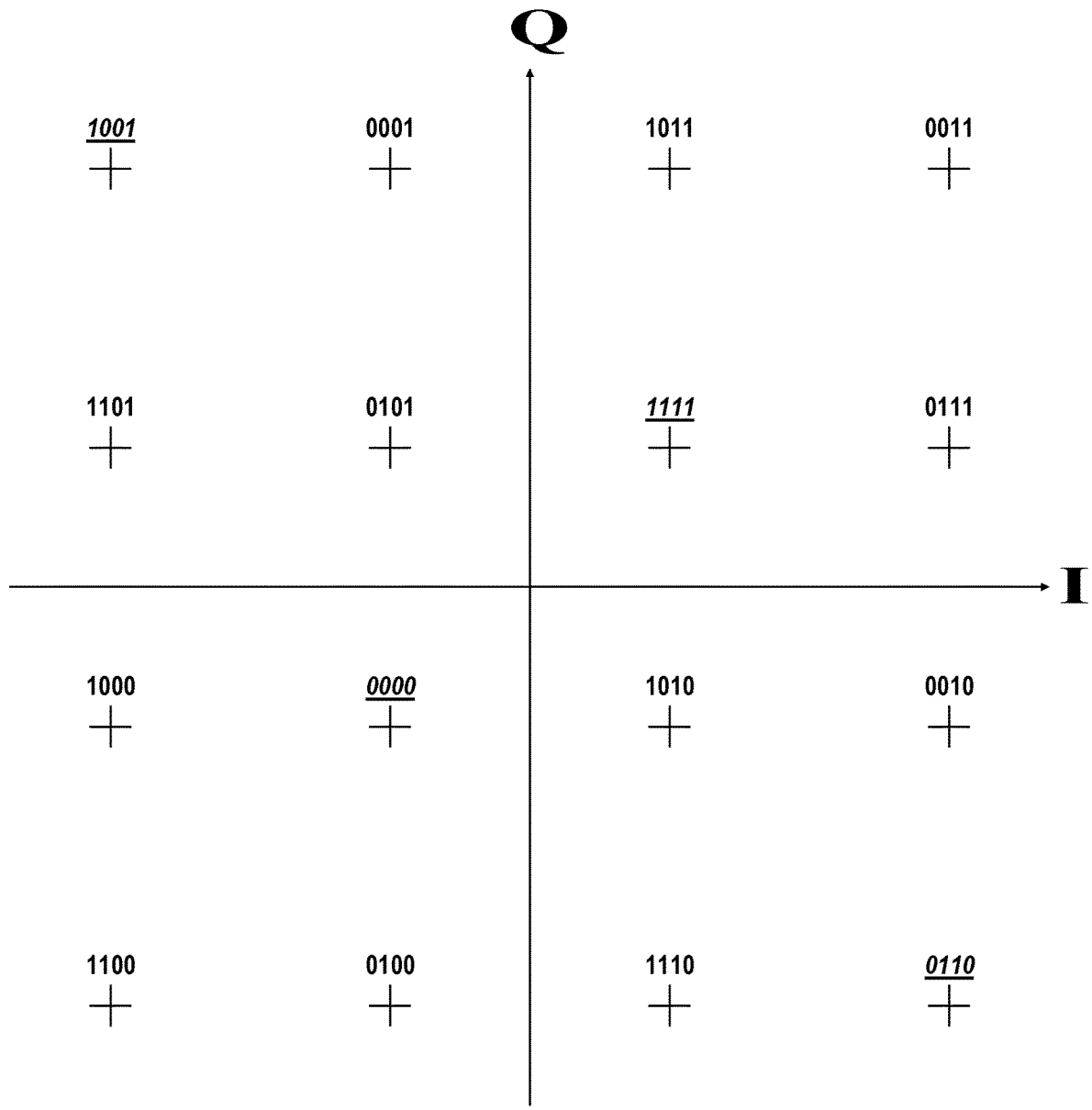
Fig. 41 3rd SCM Map of 16QAM
(A preferred labeling diversity from
Fig. 14 first SCM Map of 16QAM)

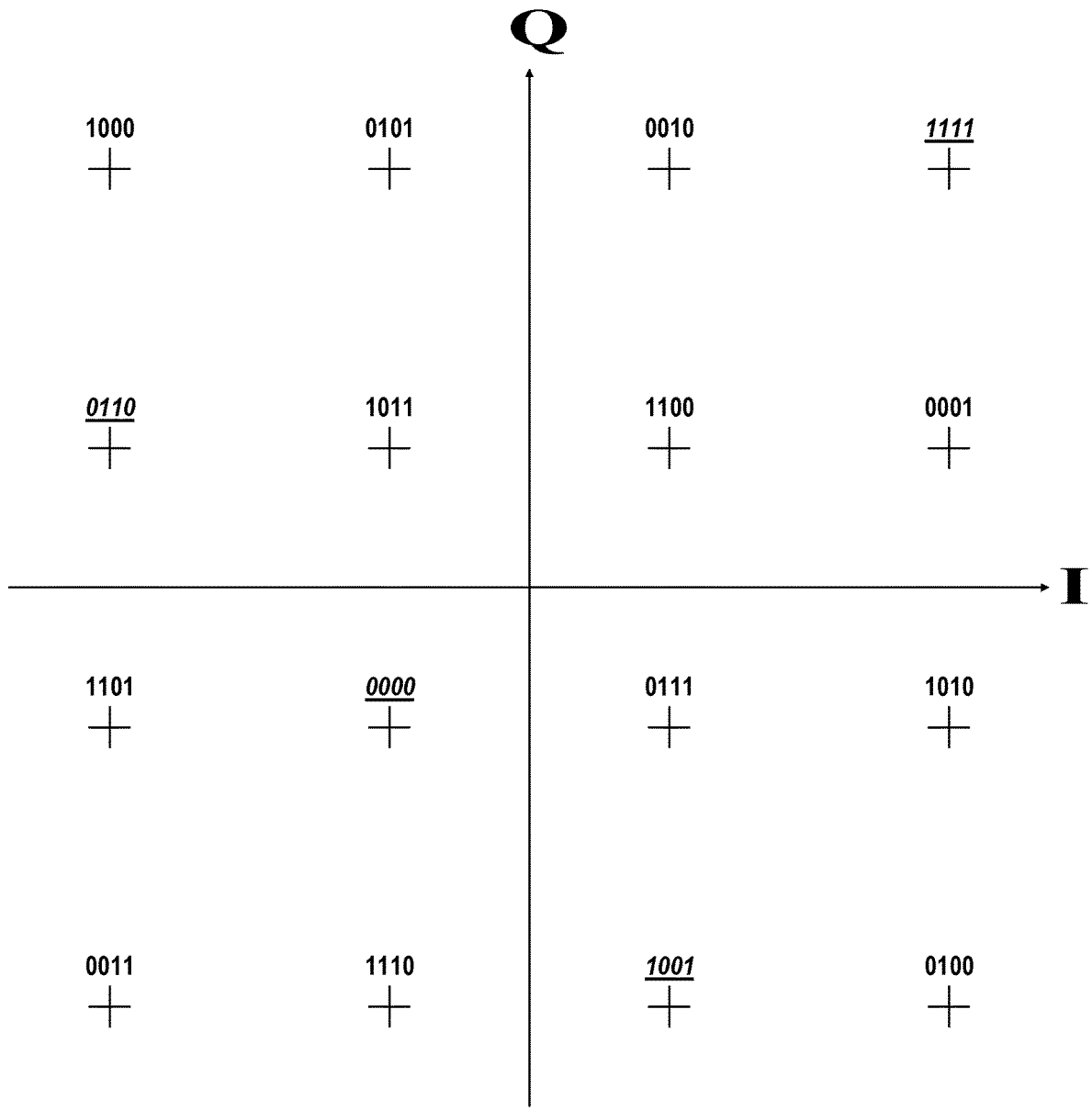
Fig. 42 5th Anti-Gray Map of 16QAM
(A preferred labeling diversity from
Fig.16 first anti-Gray Map of 16QAM)

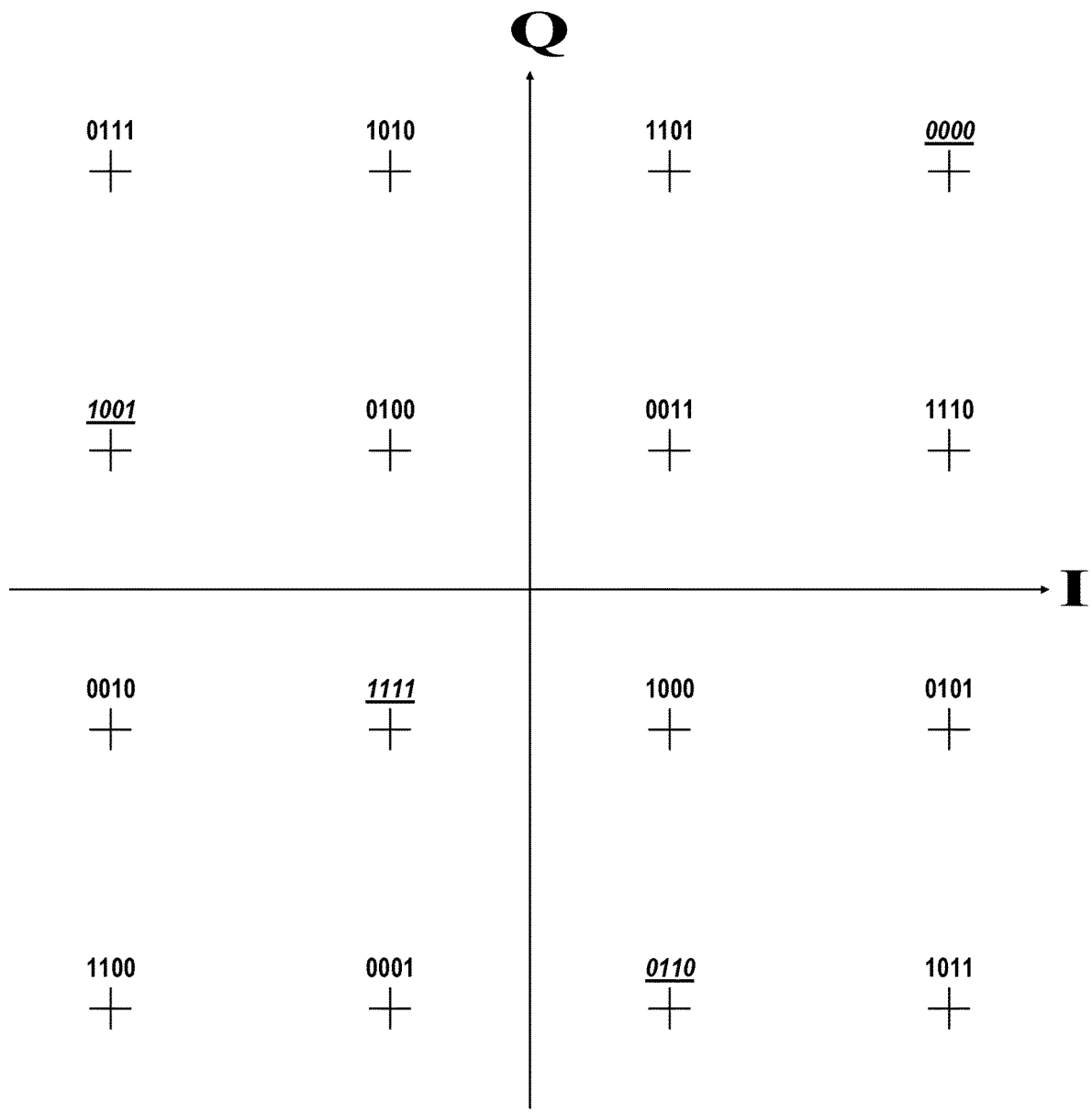
Fig. 43 6th Anti-Gray Map of 16QAM
(A preferred labeling diversity from
Fig. 18 third anti-Gray Map of 16QAM)

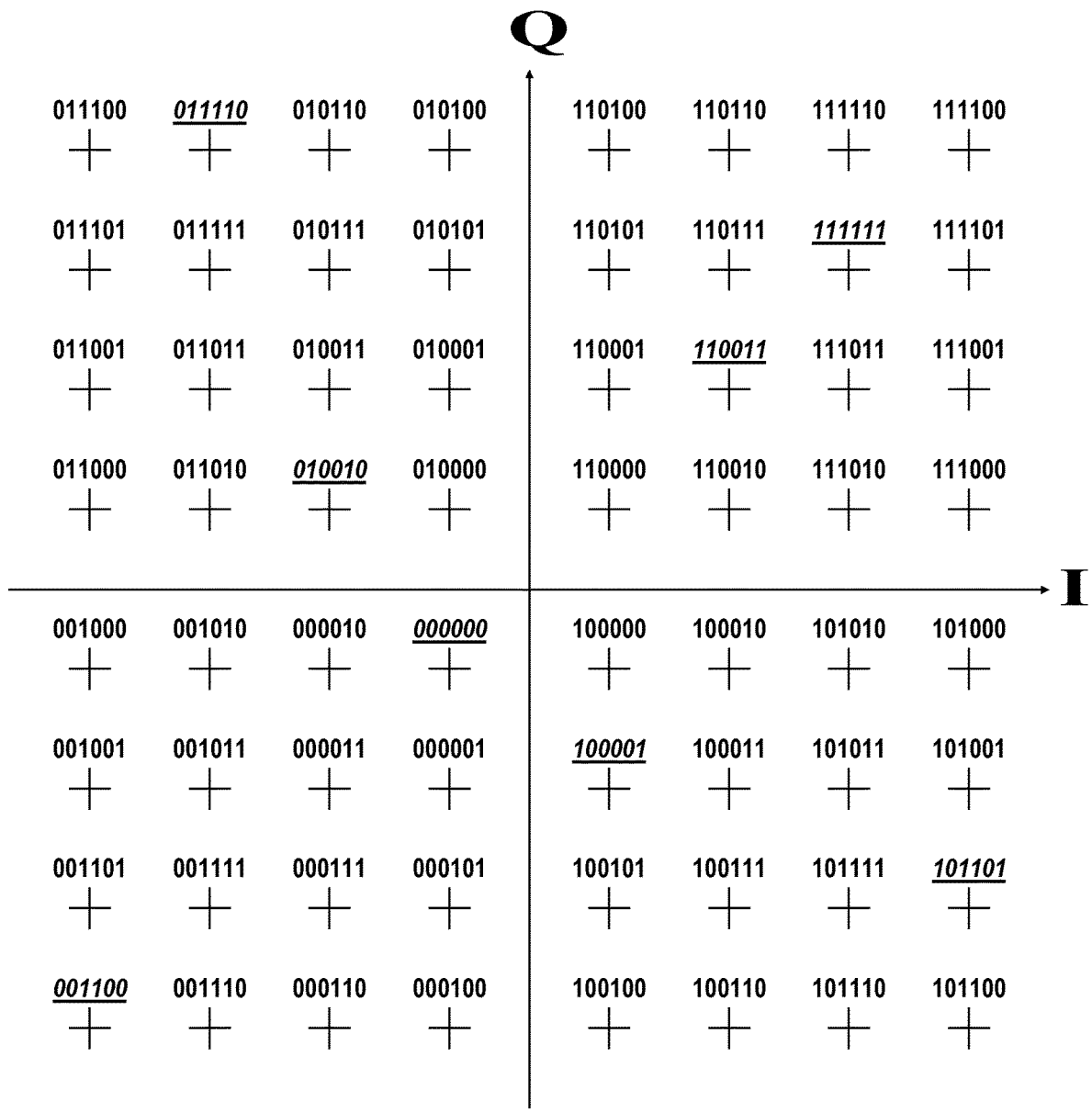
Fig. 44 7th Gray Map of 64QAM
(A preferred labeling diversity from
Fig. 24 first Gray Map of 64QAM)

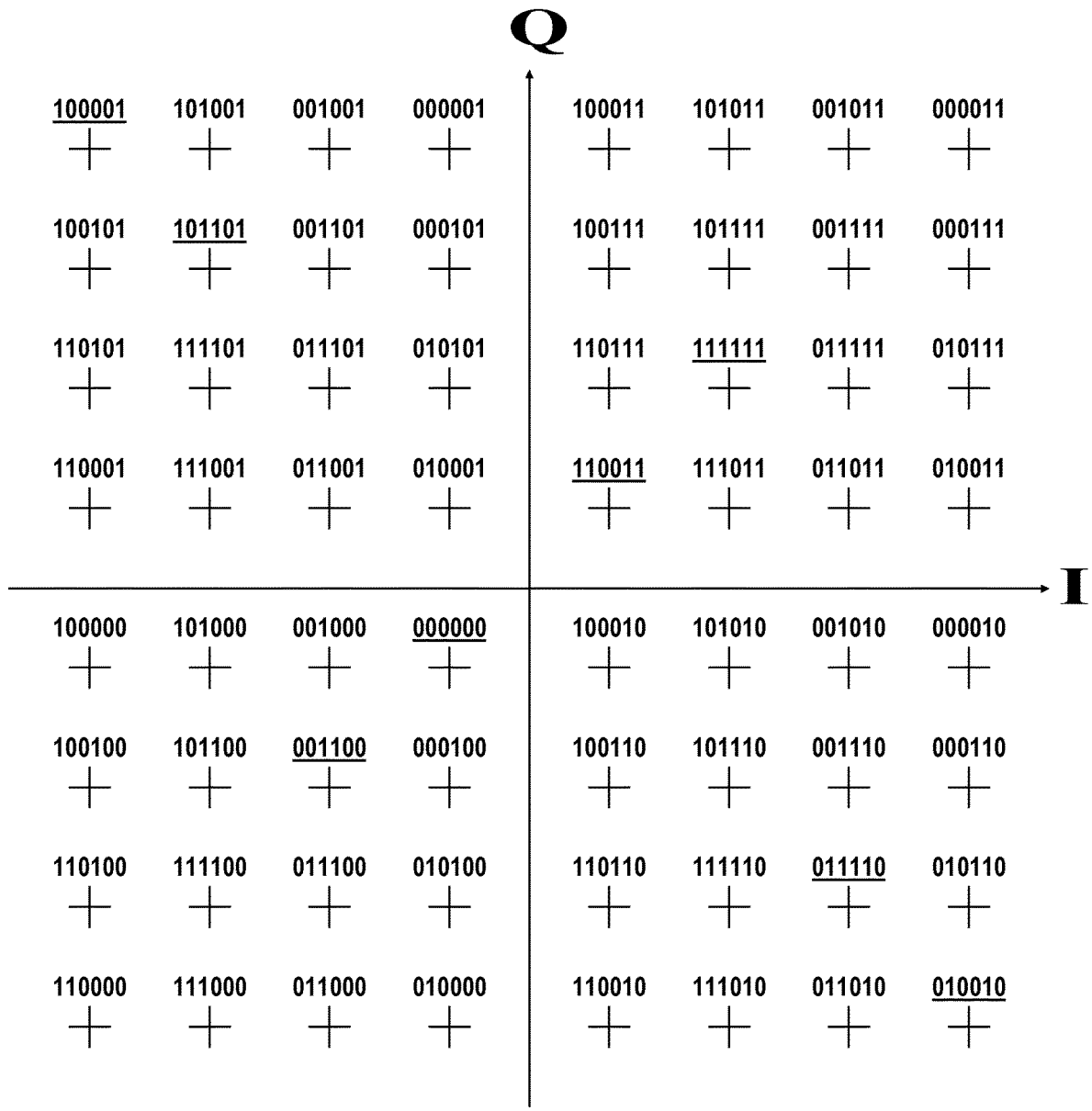
Fig. 45   3rd SCM Map of 64QAM
(A preferred labeling diversity from
Fig. 30 first SCM Map of 64QAM)

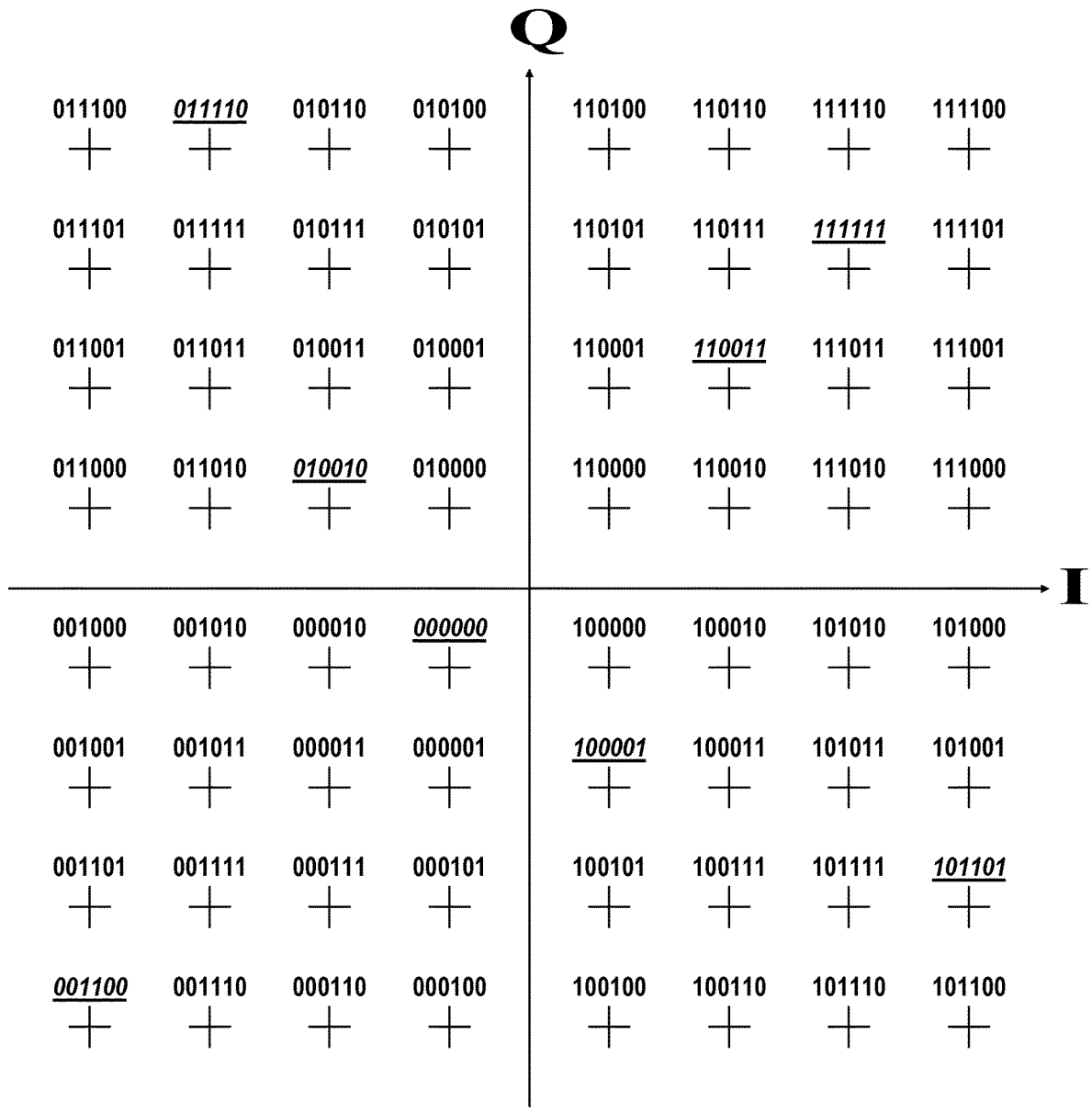
Fig. 46  5th Anti-Gray Map of 64QAM
(A preferred labeling diversity from
Fig. 32 first anti-Gray Map of 64QAM)

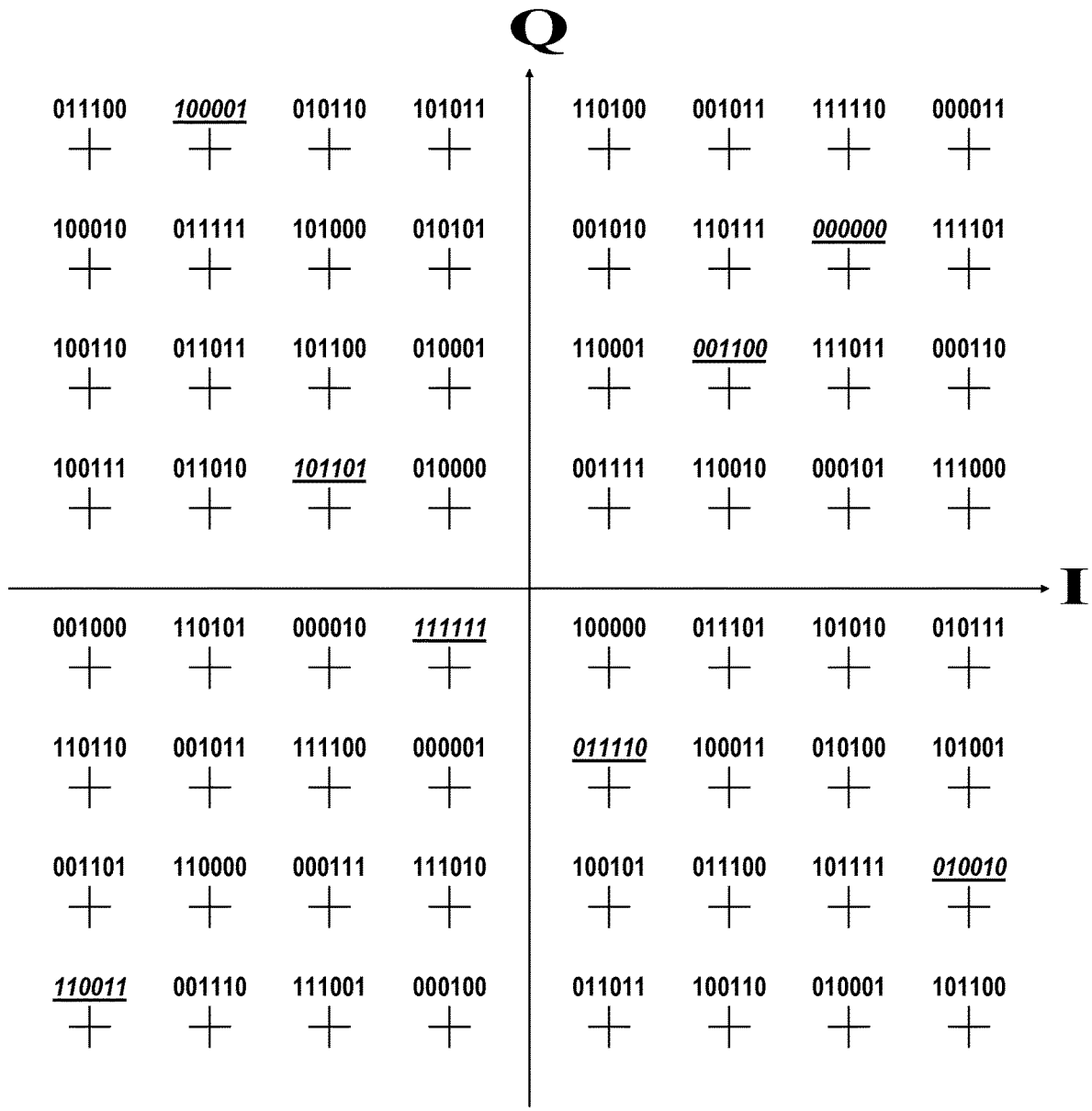
Fig. 47 6th Anti-Gray Map of 64QAM
(A preferred labeling diversity from
Fig. 34 third anti-Gray Map of 64QAM)

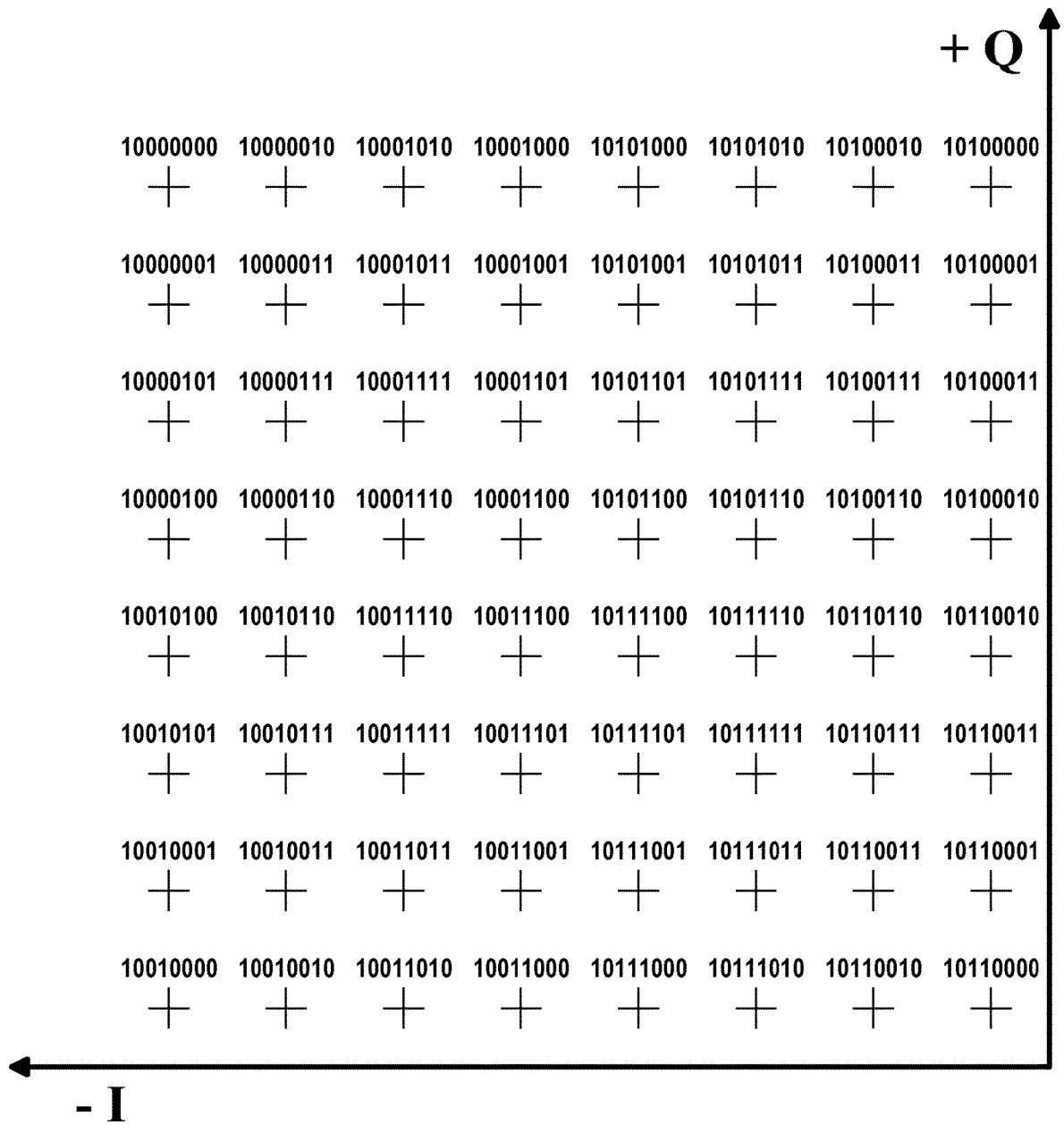
Fig. 48 Gray Mapping for -I,+Q Quadrant of 256QAM as used in DVB-T2 Gray map of 256QAM

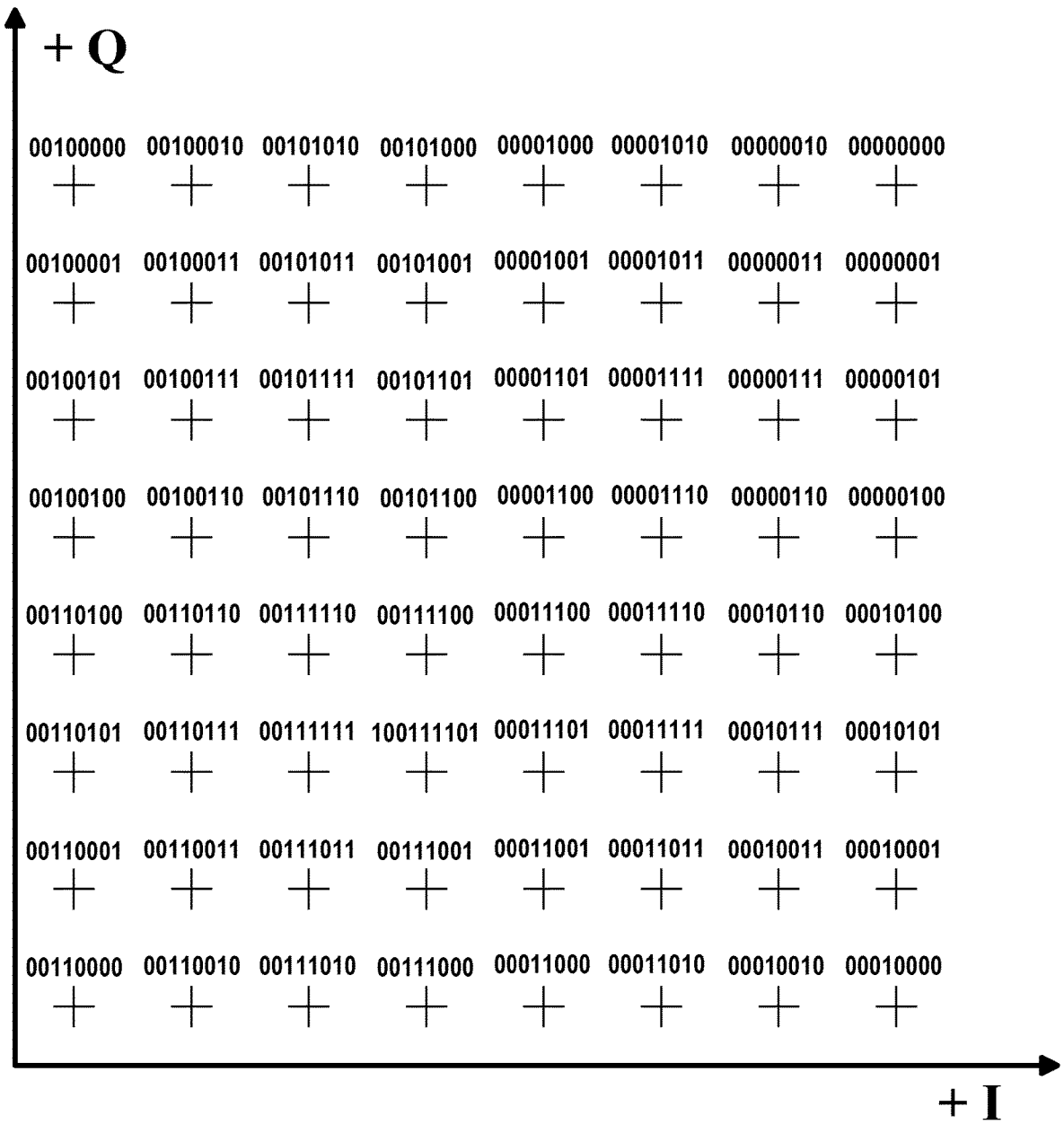
Fig. 49 Gray Mapping for +I,+Q Quadrant of 256QAM as used in DVB-T2 Gray map of 256QAM

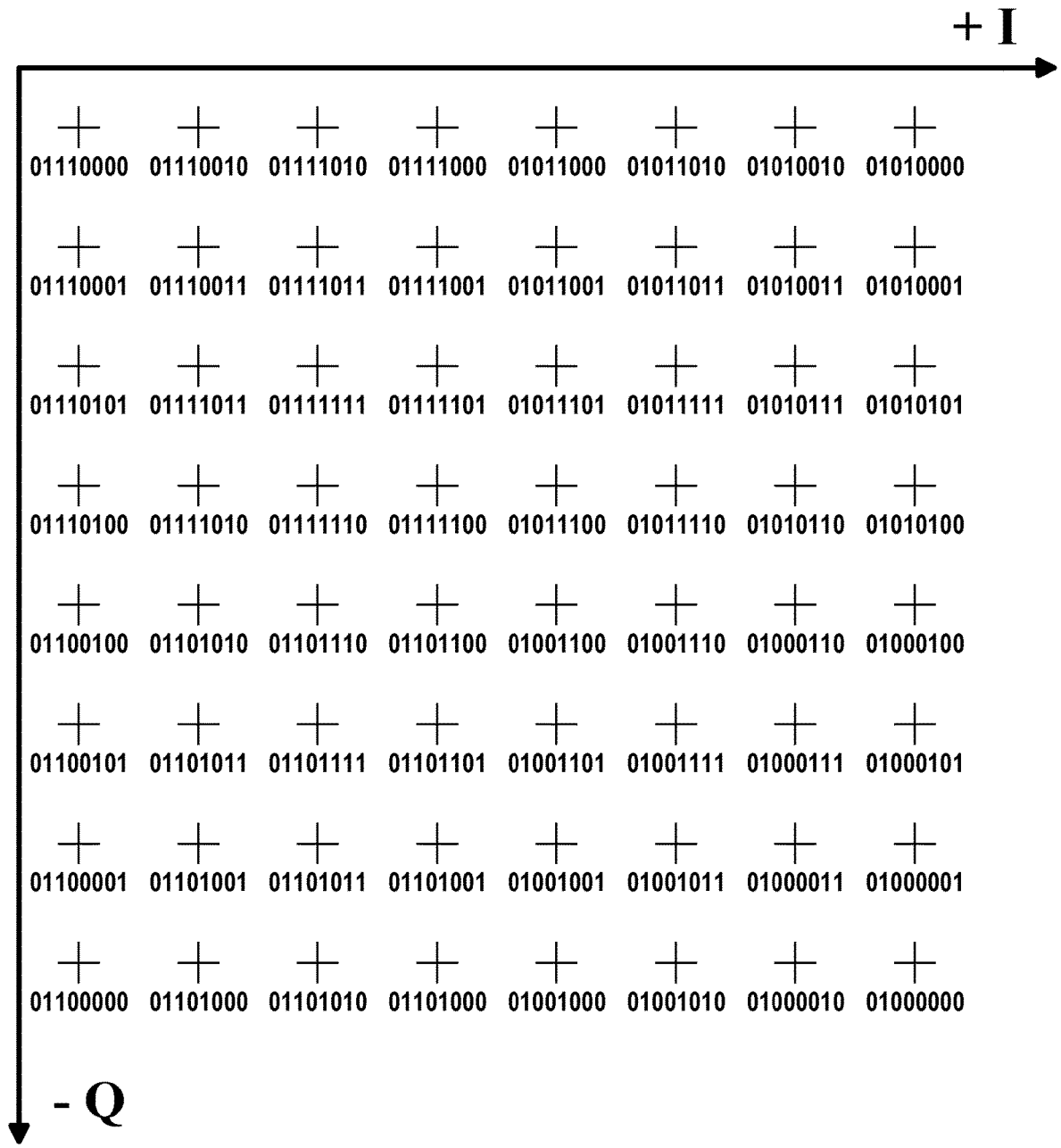
Fig. 50 Gray Mapping for +I,-Q Quadrant of 256QAM as used in DVB-T2 Gray map of 256QAM

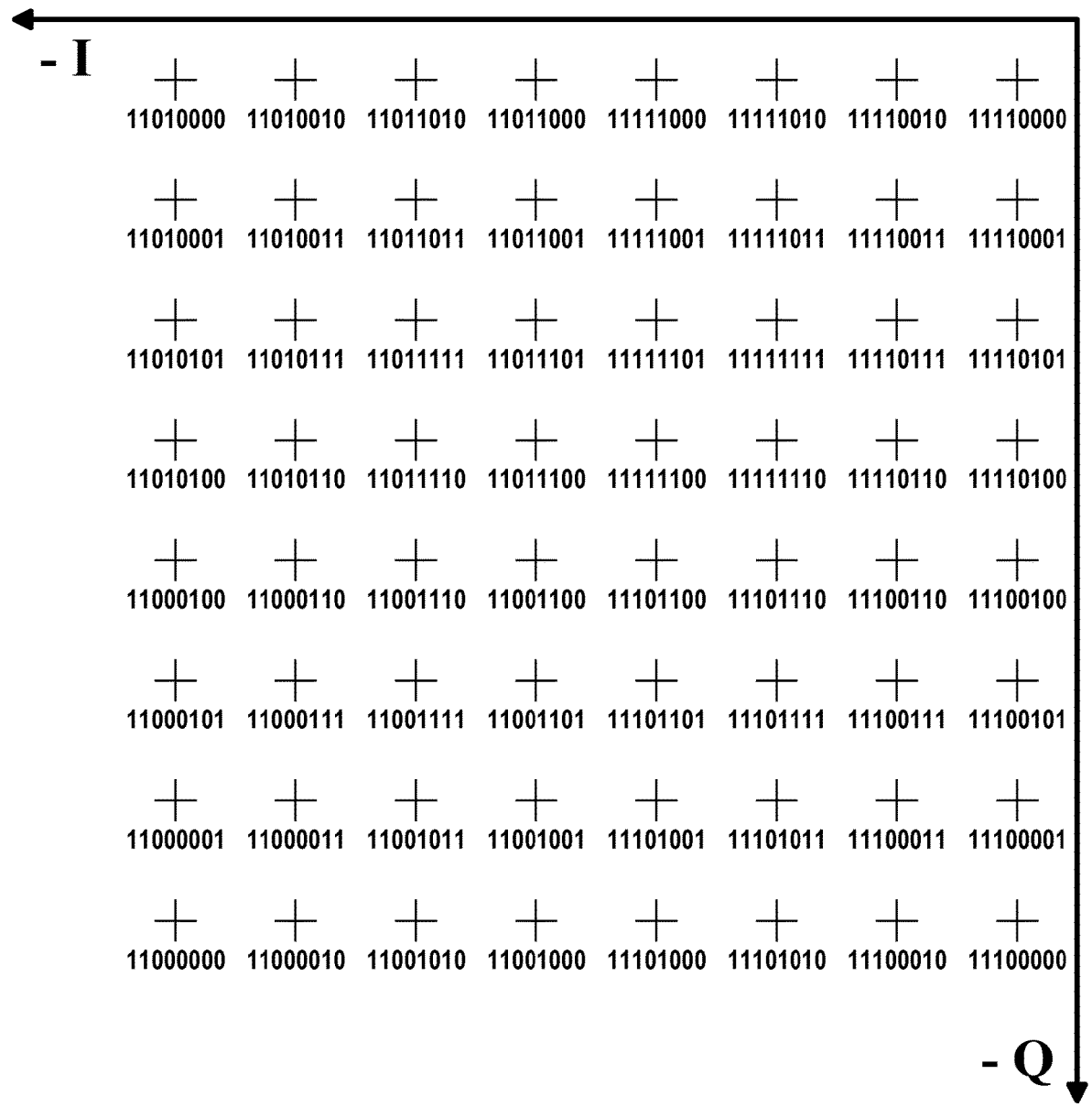
Fig. 51  Gray Mapping for -I,-Q Quadrant of 256QAM as used in DVB-T2 Gray map of 256QAM

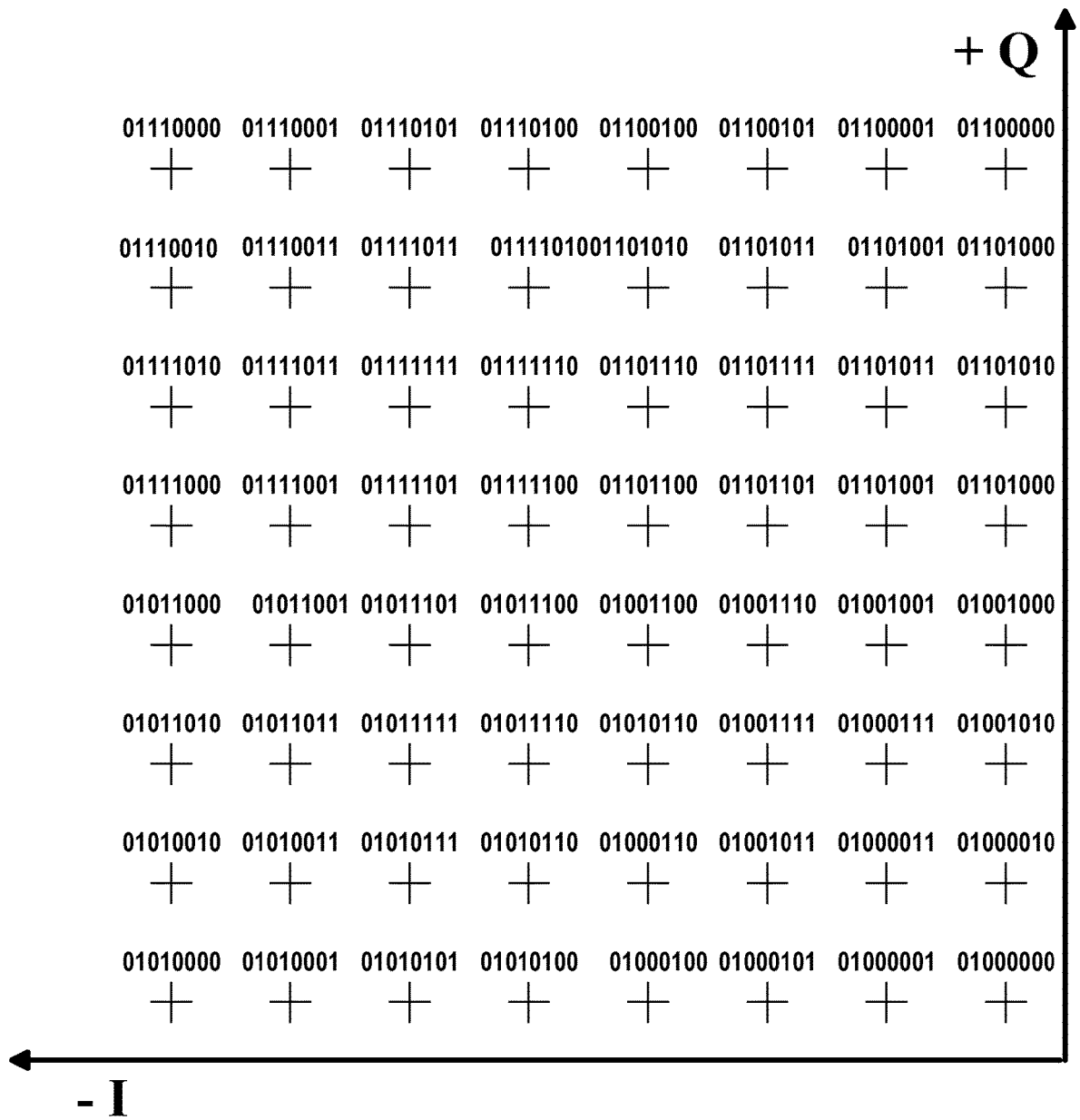
Fig. 52 Gray Mapping for -I,+Q Quadrant of 256QAM Gray map with labeling diversity from DVB-T2 map

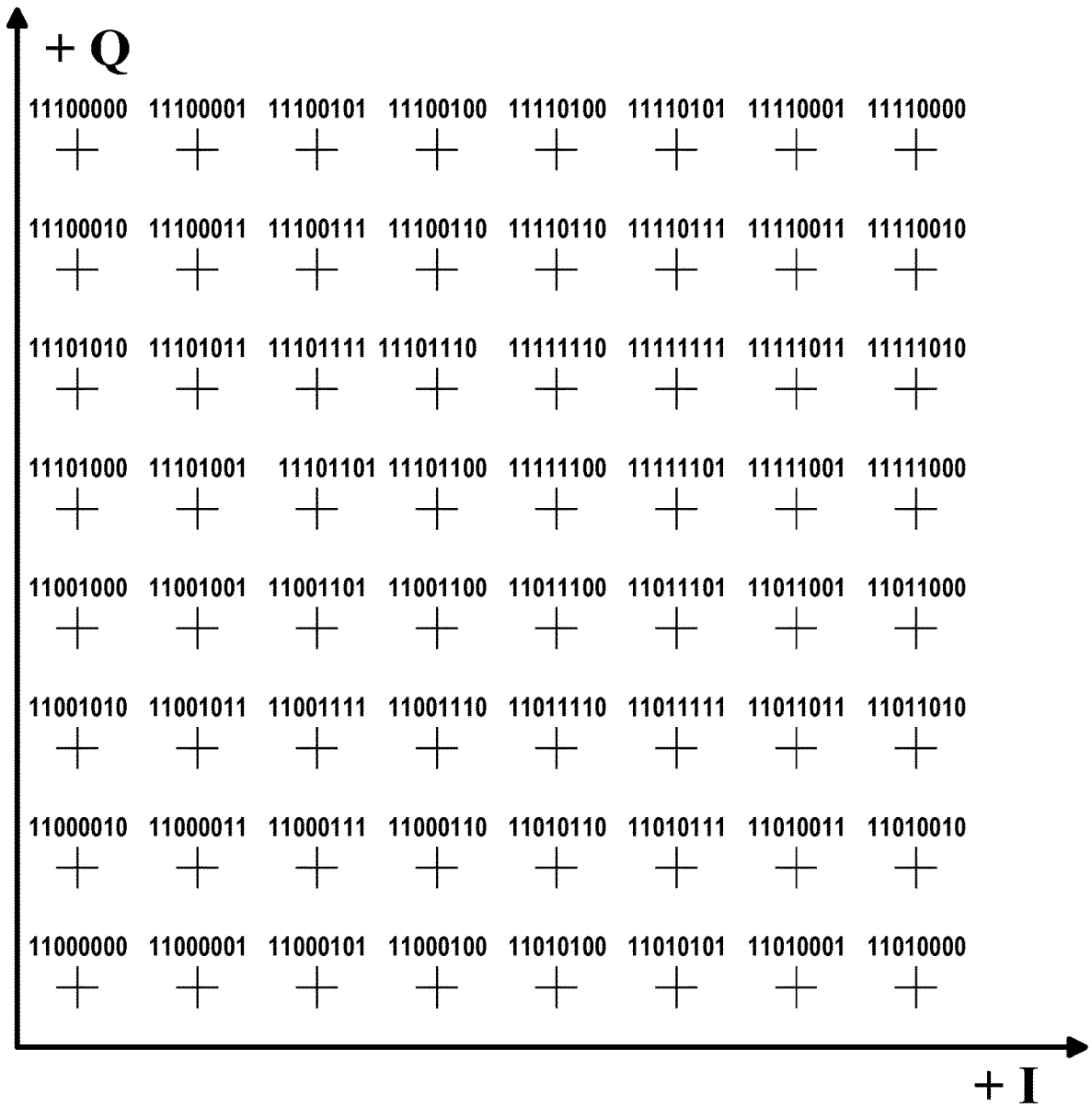
Fig. 53 Gray Mapping for +I,+Q Quadrant of 256QAM Gray map with labeling diversity from DVB-T2 map

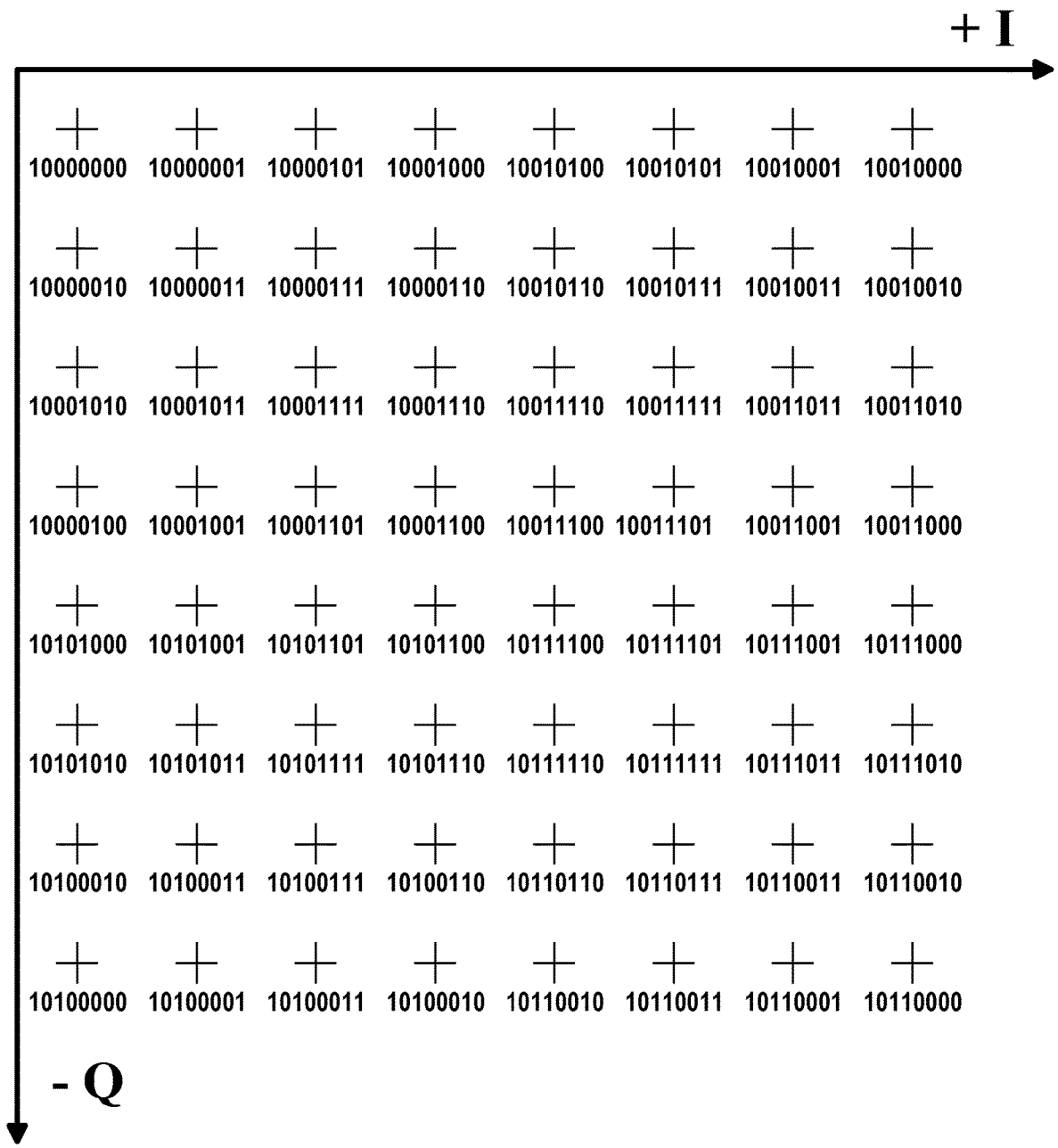
Fig. 54 Gray Mapping for +I,-Q Quadrant of 256QAM Gray map with labeling diversity from DVB-T2 map

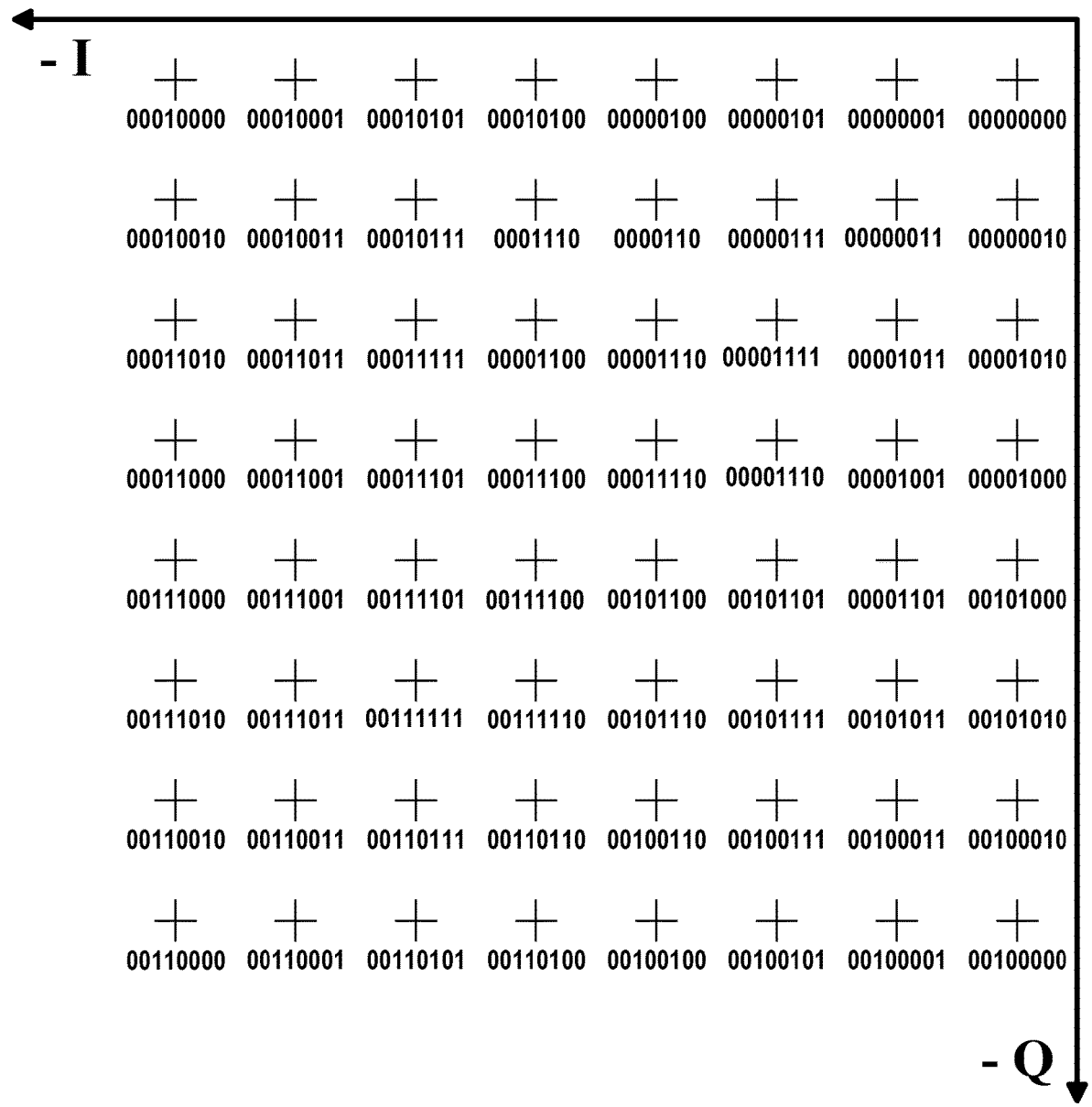
Fig. 55  Gray Mapping for -I,-Q Quadrant of 256QAM Gray map with labeling diversity from DVB-T2 map

COFDM DCM SIGNALING THAT EMPLOYS LABELING DIVERSITY TO MINIMIZE PAPR

This is a continuation-in-part of U.S. patent application Ser. No. 16/037,747 filed 17 Jul. 2018 and of U.S. patent application Ser. No. 16/039,259 filed 18 Jul. 2018.

FIELD OF THE INVENTION

The invention relates to methods of communicating coded orthogonal frequency-division multiplexed (COFDM) dual-subcarrier-modulation (DCM) signals within a communication system, such as a digital television (DTV) broadcasting system. The invention relates more particularly to preferred formats for applying labeling diversity between respective halves of COFDM DCM signals as transmitted, to keep peak-to-average power ration (PAPR) low and to support soft-bit maximal-ratio combining (SBMRC) during the reception of those signals.

BACKGROUND OF THE INVENTION

First and second sets of quadrature-amplitude-modulation (QAM) symbols transmitted parallelly in time can differ in the respective patterns of labeling lattice-points in the two sets of QAM symbol constellations, which constellation rearrangement approach provides "labeling diversity". Labeling diversity can lessen the error in reception of transmitted data accompanied by noise, as compared to that in which the same pattern is used to label lattice-points of the first and second sets of QAM symbols transmitted parallelly in time and demodulated separately to recover respective soft-bit demodulation results. Akram Bin Sediq and Halim Yanikomeroglu described a technique for soft combining soft-bit demodulation results in a paper titled "Performance Analysis of Soft-Bit Maximal Ratio Combining in Cooperative Relay Networks", which was published in *IEEE Transactions on Wireless Communications* (Volume: 8, Issue: 10, October 2009), pp. 4934-4939. This paper referred to this soft combining technique by the name "soft-bit maximal-ratio combining" or by its abbreviation "SBMRC".

Panasonic Corporation sent a paper titled "Enhanced HARQ Method with Signal Constellation Rearrangement" to the TSG-RAN Working Group 1 for discussion during its Meeting #19 held Feb. 27-Mar. 2, 2001 in Las Vegas, Nev., USA. Combining two 16QAM transmissions with labeling diversity between the labeling of the lattice points in their respective square 16QAM symbol constellations was reported to provide a 1.2 dB advantage over Chase combining two 16QAM transmissions without labeling diversity. Combining two 64QAM transmissions with labeling diversity between the labeling of the lattice points in their respective square 64QAM symbol constellations was reported to provide a 1.8 dB advantage over Chase combining two 64QAM transmissions without labeling diversity. Turbo coding rate was ¾, both for 16QAM transmissions and for 64QAM transmissions. The Panasonic Corporation paper was not directed to COFDM signals.

In Gray mapping of QAM, the plural-bit labels of immediately adjacent lattice-points differ in only a single one of their bits. With regard to Gray mapping, it has been shown that a constellation rearrangement approach improves the performance if two or more versions of the same word are transmitted. The constellation rearrangement scheme for Gray mapping is based on different levels of reliability for the bits, depending on the position of the selected 16QAM symbols within the constellation. Consequently, the rearrangement rules focus on changing the location of the rearranged version of the 16QAM symbol to achieve an averaging effect of the levels of reliability. First and second sets of 16QAM symbols transmitted parallelly in time are labeled such that the labeling of each set of 16QAM symbols bits more likely to experience error in the labeling of each set of 16QAM symbols is in accordance with the bits less likely to experience error in the labeling in the other set of 16QAM symbols. For details on constellation rearrangement for 16-QAM Gray mapping, one is referred to U.S. Pat. No. 7,920,645 titled "Data transmissions in a mobile communication system employing diversity and constellation rearrangement of a 16 QAM scheme" granted 5 Apr. 2011 to Alexander Golitschek Edler Von Elbwart, Christian Wengerter and Isamu Yoshi. U.S. Pat. No. 7,957,482 titled "Bit-operated rearrangement diversity for AICO mapping" granted 7 Jun. 2011 to Alexander Golitschek Edler Von Elbwart, Christian Wengerter and Isamu Yoshi describes more extensively the use of labeling diversity for more than one set of 16QAM symbols transmitted parallelly in time. (AICO is the acronym for "Antipodal Inverted Constellation".) The Von Elbwart et alii patents were not directed to COFDM signals.

In June 2005 a paper "Symbol mapping diversity design for multiple packet transmissions" authored by Harvind Samra, Zhi Ding, Peter M. Hahn was published in *IEEE Transactions on Communications* Vol. 53, No. 5, pp. 810-817. The Samra et al. paper presented a simple, but effective method of enhancing and exploiting diversity from multiple packet transmissions in systems that employ nonbinary linear modulations such as phase-shift keying (PSK) and quadrature amplitude modulation (QAM). This diversity improvement results from redesigning the symbol mapping for each packet transmission. Symbol mapping diversity (SMD) requires a small increase in receiver complexity, but provides very substantial reductions of bit error rate when applied to additive white Gaussian noise (AWGN) and flat-fading channels. The general SMD concept was later incorporated in multiple-input/multiple-output (MIMO) and multiple-input/single-output (MISO) communication systems, but was referred to as "labeling diversity" by Maciej Krasicki in his paper "The essence of 16-QAM labeling diversity" published 11 Apr. 2013 in *Electronics Letters*, Vol. 49, issue 8, pp. 567-569.

A 2015 paper "Labeling Diversity for 2×2 WLAN Coded-Cooperative Networks" authored by Saqib Ejaz, Feng-Fan Yang and Hong-Jun Xu was published in *Radio Engineering*, Vol. 24, No. 2, pp. 470-479. Wireless local area networks (WLAN) utilize OFDM signals, and this Ejaz et alii paper considers labeling diversity in QAM of OFDM signals employed in MIMO networks. This Ejaz et al. paper does not propose the application of labeling diversity to QAM of respective sets of OFDM subcarriers within a single COFDM DCM signal. This Ejaz et alii paper does aver that the general idea of labeling diversity can be extended to other high order modulation schemes besides 16QAM. This Ejaz et al. paper reports that labeling diversity has shown promising BER performance improvements in systems without labeling diversity, and that labeling diversity also lowers the Error Floor (EF) region by ensuring error-free feedback during the iterative decoding process.

In the following portion of this specification, in its accompanying drawings and in its accompanying claims the lower-frequency and higher-frequency halves of the complete frequency spectrum of a COFDM signal are respectively referred to in shortened form simply as its "lower sideband" and "upper sideband". The lower and upper sidebands of a COFDM modulated signal that convey the same coded data mirror each other in double-sideband COFDM (abbreviated as DSB-COFDM). The term asymmetric-sideband COFDM (abbreviated as ASB-COFDM) is used herein to specify COFDM in which the lower and the upper sidebands of a COFDM signal convey the same coded data, but do not mirror each other. DSB-COFDM and ASB-COFDM are respective species of COFDM dual-subcarrier-modulation (DCM), which may be referred to as DCM-COFDM. DCM-COFDM uses pairs of OFDM subcarriers, the OFDM subcarriers in each of those pairs conveying the same coded data.

In some species of ASB-COFDM the OFDM subcarriers in each pair of them are separated a uniform distance from each other so as to fall in the lower and the higher halves of frequency spectrum respectively. Such separation improves reliability of reception, especially when there are narrowband interferences. Such species of COFDM DCM are disclosed in patent application US-20170104553-A1 published 13 Apr. 2017, titled "LDPC Tone Mapping Schemes for Dual-Sub-Carrier Modulation in WLAN" and claiming an original filing date of 11 Oct. 2016 for inventors Jian-Han Liu, Sheng-Quan Hu, Tian-Yu Wu and Thomas Edward Pare, Jr. US-20170104553-A1 describes respective mappings of the sets of 16QAM symbols transmitted parallelly in time, which mappings are similar to each other.

Single-sideband COFDM or (SSB-COFDM) modulation of radio-frequency (RF) signals has been used several years for over-the-air broadcasting of DTV in accordance with the DVB-T and DVB-T2 Standards for Digital Video Broadcasting in several countries other than the United States of America and Canada. SSB-COFDM RF signals are now being broadcast in the Republic of South Korea and in the United States of America in accordance with an ATSC 3.0 Standard developed by the Advanced Television Systems Committee, an industry-wide consortium of DTV broadcasters, manufacturers of DTV transmitter apparatus, and manufacturers of DTV receiver apparatus.

In DSB-COFDM the lower and upper halves of the frequency spectrum of the COFDM signal mirror each other. Prior-art receivers for DSB-COFDM RF signals, such as receivers for DTV broadcasting, have folded the frequency spectrum in half by synchrodyning to baseband before applying discrete Fourier transform (DFT) and demapping the resultant quadrature amplitude-modulation (QAM) of COFDM signal subcarriers. The constructive combining of mirrored OFDM subcarriers improves the signal-to-noise ratio (SNR) of reception over an additive-white-Gaussian-noise (AWGN) channel by 3 dB. Receivers that demodulate DSB-COFDM RF signals using either single-sideband (SSB) or asymmetric-sideband (ASB) techniques are described in U.S. patent application Ser. No. 15/641,014 filed by Allen LeRoy Limberg on 3 Jul. 2017, titled "Double-sideband COFDM signal receivers that demodulate unfolded frequency spectrum" and published 1 Feb. 2018. Limberg prescribed individual discrete Fourier transform (DFT) of the lower and upper halves of the frequency spectrum of the COFDM modulation signal and demapping the resulting sets of QAM symbols from those two halves of that frequency spectrum, then diversity combining their corresponding QAM-lattice-point labels. Maximal-ratio combining soft bits of corresponding QAM-lattice-point labels improves SNR of reception over an AWGN channel by 5.5 dB, irrespective of shaping gain. This 2.5 dB better SNR is in line with observations concerning multiple-in/multiple-out (MIMO) reception of COFDM modulation signals from plural-antenna arrays, as reported in U.S. Pat. No. 7,236,548 titled "Bit level diversity combining for COFDM system" issued 26 Jun. 2007 to Monisha Ghosh, Joseph P. Meehan and Xuemei Ouyang. (DSB-COFDM modulation affords some frequency diversity that can help receivers as described in U.S. patent application Ser. No. 15/641,014 to overcome some frequency-selective fading and narrowband interference, so long as neither affects the more central frequencies of the transmission channel.)

U.S. patent application Ser. No. 15/796,834 titled "Communication systems using independent-sideband COFDM" filed 29 Oct. 2017 by Allen LeRoy Limberg was published 3 May 2018 as US-2018-0123857-A1. It describes respective symbol constellation arrangements of QAM subcarriers in the lower and upper sidebands of a COFDM signal differing from each other. Dissimilarity in the respective mapping patterns in the two sets of QAM symbols transmitted parallelly in time is referred to as "labeling diversity" and is described being done to obtain "shaping" gain in addition to diversity gain. US-2018-0123857-A1 also describes respective symbol constellation arrangements of QAM subcarriers in the lower and upper sidebands of a COFDM signal differing from each other, so as to reduce the peak-to-average-power ratio (PAPR) of that COFDM signal.

U.S. patent application Ser. No. 16/039,259 titled "COFDM DCM Communication Systems with Preferred Labeling-Diversity Formats" filed 18 Jul. 2018 by Allen LeRoy Limberg and published 2 May 2019 as US-2018-0132171-A1 describes labeling diversity (sometimes referred to as "symbol recombination") designed to support a soft-bit maximal-ratio combining (SBMRC) procedure. Bits more likely to experience error in lattice-point labels of the mapping pattern for the first set of symbol constellations correspond to bits less likely to experience error in lattice-point labels for the second set of symbol constellations. Bits less likely to experience error in lattice-point labels of the mapping pattern for the first set of symbol constellations correspond to bits more likely to experience error in lattice-point labels for the second set of symbol constellations. The SBMRC procedure is implemented in a receiver by diversity combining pairs of corresponding labels from the first and second sets of symbol constellations. Receivers for two sets of QAM symbols transmitted parallelly in time can thus be designed to exploit labeling diversity to achieve shaping gain significantly larger than that which can be secured from NuQAM—i.e., QAM with non-uniform spacing between labeled points in the QAM symbol constellation mapping. NuQAM offers an SNR gain for the additive white Gaussian noise (AWGN) channel that can quite closely approach the ultimate 1.53 dB limit for geometric shaping gain posited by Shannon, but cannot exceed that limit. Also, NuQAM requires forward-error-correction (FEC) code rates not significantly greater than ½ in order to provide shaping gain, while SBMRC provides significant shaping gains at higher FEC code rates.

In the past, broadcasters' primary concern with high PAPR of COFDM signal was its costing expensive power bills for linear power amplification in the transmitter. Newer designs of COFDM transmitters for broadcast television improve power amplifier efficiency, by using variants of the methods described in U.S. Pat. No. 6,625,430 titled "Method and apparatus for attaining higher amplifier efficiencies at lower power levels" granted 23 Sep. 2003 to Peter J. Doherty. Accordingly, PAPR reduction techniques have become less likely to be resorted to. However, the large PAPR of COFDM also causes problems in receiver apparatus that are not avoided and indeed may be exacerbated by using a Doherty method in the broadcast transmitter. These problems concern maintaining linearity in the radio-frequency (RF) amplifier, in the intermediate-frequency (IF) amplifier (if used) and in the analog-to-digital (A-to-D) converter.

U.S. Pat. No. 8,040,963 titled "Method for reducing peak-to-average power ratio in an OFDM transmission system" claiming a 20 Oct. 2006 priority date was granted 18 Oct. 2011 to Ondrej Hlinka, Ondrej Hrdlicka and Pavol Svac. The patent describes PAR reduction based on a complementary parity coding in which the coding rules are derived from an appropriate auto-correlation property of transmitted symbol sequences. The techniques were also described by P. Svac and O. Hrdlicka in a paper titled "A high peak-to-average power ratio reduction in OFDM systems by ideal N/2-shift aperiodic auto-correlation property" presented as part of the *Joint IST Workshop on Mobile Future,* 2006 within the *Symposium on Trends in Communications* '06 held 24-27 Jun. 2006 in Bratislava, Slovakia. This paper and U.S. Pat. No. 8,040,963 assert that a significant PAPR reduction of 6 dB, independent of the number of subcarriers, can be achieved in OFDM by assuring the appropriate auto-correlation property of transmitted data symbol sequences. Binary phase-shift keying (BPSK) data symbols were arranged in paired sequences, each successive pair of sequences being transmitted in a respective OFDM symbol.

COFDM can use a technique symmetric cancellation coding (SCC) in which OFDM carriers are arranged in pairs, the QAM of each of the two OFDM carriers in a pair being antipodal to the QAM of the other. While such SCC has been used principally implementing intercarrier interference (ICI) cancellation, it is reported to reduce PAPR of COFDM in a paper titled "Analysis of Coherent and Non-Coherent Symmetric Cancellation Coding for OFDM Over a Multipath Rayleigh Fading Channel" Abdullah S. Alaraimi and Takeshi Hashimoto presented at the *IEEE 64th Vehicular Technology Conference* held 25-28 Sep. 2006 in Montreal, Quebec, Canada. Alaraimi and Hashimoto's simulations using 2-dimensional modulation of OFDM subcarriers found 0.5 dB lowering of the PAPR of COFDM when SCC was employed. The particular size of the COFDM modulation constellations employed in the simulations was not specified in this paper.

Significantly greater lowering of the PAPR of COFDM is obtained from labeling diversity other than that provided by SCC, according to a paper titled "PAPR Performance of Dual Carrier Modulation using Improved Data Allocation Scheme" that Soobum Cho and Sang Kyo Park presented at the 13*th International Conference on Advanced Communication Technology* (*ICACT* 2011) held 13-16 Feb. 2011 in Seoul, Republic of Korea. Their dual carrier modulation (DCM) spaces the OFDM subcariers N/2 carriers apart to maximize frequency diversity, N being the total number of carriers in the OFDM signal. FIG. 4 of that paper shows PAPR of OFDM DCM being about 2.5 dB less than PAPR of conventional OFDM, when 16QAM of OFDM subcarriers is used. The two 16QAM mapping patterns Cho and Park used to secure lower PAPR were described earlier by Martin Geoffrey Leach and Peter Anthony Borowski in a patent application titled "Signal decoding systems" and published 4 Sep. 2008 as US-2008-0212694-A1.

Superposition coded modulation (SCM) is described in detail by Li Peng, Jun Tong, Xiaojun Yuan and Qinghua Guo in their paper "Superposition Coded Modulation and Iterative Linear MMSE Detection", *IEEE Journal on Selected Areas in Communications,* Vol. 27, No. 6, August 2009, pp. 995-1004. In the SCM these authors particularly describe, the four quadrants of square 16QAM symbol constellations are each Gray mapped independently from the others and from the pair of bits in the map label specifying that quadrant. Peng et alli studied iterative linear minimum-mean-square-error (LMMSE) detection being used in the reception of SCM and found that SCM offers an attractive solution for highly complicated transmission environments with severe interference. Peng et alli analyzed the impact of signaling schemes on the performance of iterative LMMSE detection to prove that among all possible signaling methods, SCM maximizes the output signal-to-noise/interference ratio (SNIR) in the LMMSE estimates during iterative detection. Their paper describes measurements that were made to demonstrate that SCM outperforms other signaling methods when iterative LMMSE detection is applied to multi-user/multi-antenna/multipath channels.

Jun Tong and Li Peng in a subsequent paper "Performance analysis of superposition coded modulation", *Physical Communication,* Vol. 3, September 2010, pp. 147-155, separate superposition coded modulation into two general classes: single-code superposition coded modulation (SC-SCM) and multi-code superposition coded modulation (MC-SCM). In SC-SCM the bits in the superposed code layers are generated using a single encoder. SC-SCM can be viewed as conveying a special BICM scheme over successive SCM constellations. In MC-SCM the bits in the superposed code layers are generated using a plurality of encoders supplying respective codewords. MC-SCM can be viewed as conveying special-case multi-level coding (MLC) scheme over successive SCM constellations.

Single carrier modulation is referred to as "SCM" in some texts other than this, but hereafter in this document the acronym "SCM" will be used exclusively to refer to superposition coded modulation. SCM can be used to convey a single codestream, rather than more than one codestream. The forms of mapping used for square QAM symbol constellations are the principal concern in the invention treated in this text, not the conveying of a plurality of codestreams concurrently. Accordingly, embodiments of the invention specifically described herein employ SC-SCM.

The above-referenced Limberg U.S. patent application Ser. No. 16/039,259 titled "COFDM DCM communication systems with preferred labeling-diversity formats" disclosed various forms of COFDM DCM signal. In certain of these forms of COFDM DCM signal the quadrature amplitude modulation (QAM) of COFDM subcarriers is Gray mapped to position palindromic lattice-point labels along one of the diagonals of each square QAM constellation. A palindrome is a word that reads the same both forward and backward. A palindromic lattice-point label is one that exhibits the same successive bit pattern reading from right to left as reading from left to right. There are four palindromic lattice-point labels in a square 16QAM symbol constellation, namely: 0000, 0110, 1001 and 1111. There are eight palindromic lattice-point labels in a square 64QAM symbol constellation, namely: 000000, 001100, 010010, 011110, 100001, 101101, 110011 and 111111. U.S. patent application Ser. No. 16/039,259 also discloses square 16QAM constellations in which the four palindromic lattice-point labels 0000, 0110, 1001 and 1111 are positioned in respective corners in each of the 16QAM symbol constellations in a first set of them and are clustered together around the center of each of the 16QAM symbol constellations in a second set of them. This can be achieved by using superposition coded modulation— i. e., by SCM mapping of lattice point labels of lattice points in the 16QAM constellations. U.S. patent application Ser. No. 16/039,259 also revealed that soft-bit maximal-ratio combining (SBMRC) can be applied not just to Gray mapping, but also to SCM mapping.

There is a wide amount of prior art which retrospectively considered is pertinent to improvements over "single-sideband" COFDM for radio-frequency transmissions in single-channel applications such as digital television (DTV) broadcasting. However, there appears to have been no "road map" to guide skilled systems designers for such single-channel applications in selecting from the wide amount of such prior art in other communication systems to optimize single-channel radio-frequency transmissions. The need for such a "road map" is evidenced by the recently adopted ATSC 3.0 Standard for DTV Broadcasting using decades-old "single-sideband" COFDM technology, despite the Advanced Television Systems Committee comprising experts in design of the various components of DTV systems charged with selecting the best-of-the-best known technology for the newer standard.

SUMMARY OF THE INVENTION

The invention in its various aspects is embodied in a communication system, such as a digital television (DTV) broadcasting system, that employs coded orthogonal frequency-division multiplexed (COFDM) dual-subcarrier-modulation (DCM). The same data is conveyed both by subcarriers in the lower-frequency half of a COFDM DCM signal and also by subcarriers in the upper-frequency half of that DCM signal. Preferably, the ordering of subcarriers modulated by given coded data is the same in both the lower- and upper-frequency halves of the COFDM DCM signal, so a receiver thereof can be better able to overcome narrow-band interference and frequency-selective fading that may occur in mid-channel. The quadrature-amplitude-modulation (QAM) symbols or amplitude-phase-shift-keying (APSK) symbols in the lower-frequency half of the DCM signal are mapped in accordance with a first labeling pattern, and those QAM or APSK symbols in the upper-frequency half of the DCM signal are mapped in accordance with a second labeling pattern. In this specification and the claims following it QAM or APSK symbols are considered to be species of coded complex-modulation symbols or CCM symbols. The first and second mapping patterns each have the same number of labeled lattice points as the other one, but differ in the labeling of their corresponding lattice points so as to afford labeling diversity between them.

This labeling diversity supports soft-bit maximal-ratio combining (SBMRC) in preferred receivers for COFDM DCM signals. These preferred receivers demodulate the asymmetric lower and upper sidebands of the DCM signal separately and subsequently use SBMRC for diversity combining the respective soft-bit results of the two demodulation procedures to recover coded data. SBMRC followed by decoding of forward-error-correction (FEC) coding can substantially reduce bit-error ratio (BER) in recovered data and thus allow greater range of reception of COFDM signals that have been transmitted with given power.

Principal aspects of the invention concern minimizing the peak-to-average-power ratio (PAPR) of the COFDM DCM signal by employing labeling diversity between a first mapping pattern for QAM or APSK symbols in the lower-frequency half of the COFDM DCM signal and a second mapping pattern for QAM or APSK symbols in the upper-frequency half of the COFDM DCM signal. The reduction in PAPR of COFDM DCM signals using square QAM constellations is significant enough that using APSK or NuQAM is no longer necessary and their more complex demapping procedures can be avoided. Implementing SBMRC is only a secondary consideration, since unfortunately designs of first and second mappings of the COFDM DCM signal that best implement SBMRC are apt not to minimize PAPR.

BRIEF DESCRIPTION OF THE DRAWINGS

FIG. 4 is a detailed schematic diagram of any of a number of cascade connections as can be used in respective physical layer pipes of the FIG. 2 portion of the transmitter apparatus for COFDM DCM signal, each of which cascade connections comprises a parallel pair of mappers to QAM symbol constellations and a subsequent frequency interleaver.

FIG. 5 is an illustration of the preferred response of the frequency interleaver depicted in FIG. 4.

FIG. 6 depicts a first generic pattern of labeling the lattice points of square 16QAM symbol constellations, as used in QAM symbols in first halves of COFDM symbols in a COFDM DCM signal.

FIG. 7 depicts a second generic pattern of labeling the lattice points of square 16 QAM symbol constellations, as used in QAM symbols in second halves of COFDM symbols in a COFDM DCM signal.

FIG. 8 depicts a first Gray mapping of square 16QAM symbol constellations, as prescribed in the DVB-T2 Standards for Digital Video Broadcasting.

FIG. 9 depicts a second Gray mapping of square 16QAM symbol constellations with lattice-point labels positioned to provide labeling diversity from the FIG. 8 first Gray mapping of 16QAM symbol constellations that is preferred for reducing PAPR of a COFDM DCM signal using the FIG. 8 Gray mapping of 16QAM symbol constellations with another.

FIG. 10 depicts a third Gray mapping of square 16QAM symbol constellations with palindromic lattice-point labels 0110, 1111, 1001 and 0000 positioned successively along a diagonal of the mapping crossing the −I,−Q and +I,+Q quadrants of that mapping.

FIG. 11 depicts a fourth Gray mapping of square 16QAM symbol constellations with lattice-point labels positioned to provide labeling diversity from the FIG. 10 third Gray mapping of 16QAM symbol constellations that is preferred for reducing PAPR of a COFDM DCM signal using the FIG. 10 Gray mapping of 16QAM symbol constellations with another.

FIG. 12 depicts a fifth Gray mapping of square 16QAM symbol constellations with palindromic lattice-point labels 0000, 0110, 1111 and 1001 positioned successively along a diagonal of the mapping crossing the −I,+Q and +I,−Q quadrants of that mapping.

FIG. 13 depicts a sixth Gray mapping of square 16QAM symbol constellations with lattice-point labels positioned to provide labeling diversity from the FIG. 12 fifth Gray mapping of square 16QAM symbol constellations that is preferred for reducing PAPR of a COFDM DCM signal using the FIG. 12 Gray mapping of 16QAM symbol constellations with another.

FIG. 14 depicts a first SCM mapping of square 16QAM symbol constellations, which mapping corresponds to that suggested by Li Peng, Jun Tong, Xiaojun Yuan and Qinghua Guo in their paper "Superposition Coded Modulation and Iterative Linear MMSE Detection" cited supra.

FIG. 15 depicts a second SCM mapping of square 16QAM symbol constellations with lattice-point labels positioned to provide labeling diversity from the FIG. 14 first SCM mapping of 16QAM symbol constellations that is preferred for reducing PAPR of a COFDM DCM signal using the FIG. 14 SCM mapping of 16QAM symbol constellations with another.

FIG. 16 depicts a first anti-Gray mapping of square 16QAM symbol constellations.

FIG. 17 depicts a second anti-Gray mapping of square 16QAM symbol constellations with lattice-point labels positioned to provide labeling diversity from the FIG. 16 first anti-Gray mapping of 16QAM symbol constellations that is preferred for reducing PAPR of a COFDM DCM signal using the FIG. 16 anti-Gray mapping of 16QAM symbol constellations with another.

FIG. 18 depicts a third anti-Gray mapping of square 16QAM symbol constellations with lattice-point labels that ones-complement similarly positioned ones in the FIG. 16 first anti-Gray mapping of 16QAM symbol constellations to provide labeling diversity from that FIG. 16 first anti-Gray mapping of 16QAM symbol constellations.

FIG. 19 depicts a fourth anti-Gray mapping of square 16QAM symbol constellations with lattice-point labels positioned to provide labeling diversity from the FIG. 18 third anti-Gray mapping of 16QAM symbol constellations that is preferred for reducing PAPR of a COFDM DCM signal using the FIG. 18 anti-Gray mapping of 16QAM symbol constellations with another.

FIG. 20 depicts a first Gray mapping of 16APSK symbol constellations, which mapping corresponds to the mapping of a 16-NUC mapping prescribed in the ATSC-3.0 Standard for DTV Broadcasting.

FIG. 21 depicts a second Gray mapping of 16APSK symbol constellations with lattice-point labels positioned to provide labeling diversity from the FIG. 20 first Gray mapping of 16APSK symbol constellations that is preferred for reducing PAPR of a COFDM DCM signal using the FIG. 20 Gray mapping of 16APSK symbol constellations with another.

FIG. 22 depicts a first generic pattern of labeling the lattice points of square 64QAM symbol constellations, as used in QAM symbols in a first half of COFDM symbols in a COFDM DCM signal.

FIG. 23 depicts a second generic pattern of labeling the lattice points of square 64QAM symbol constellations, as used in QAM symbols in a second half of COFDM symbols in a COFDM DCM signal.

FIG. 24 depicts a first Gray mapping of square 64QAM symbol constellations, as prescribed in the DVB-T2 Standards for Digital Video Broadcasting.

FIG. 25 depicts a second Gray mapping of square 64QAM symbol constellations with lattice-point labels positioned to provide labeling diversity from the FIG. 34 first Gray mapping of 64QAM symbol constellations that is preferred for reducing PAPR of a COFDM DCM signal using the FIG. 34 Gray mapping of 64QAM symbol constellations with another.

FIG. 26 depicts a third Gray mapping of square 64QAM symbol constellations with palindromic lattice-point labels 110011, 100001, 101101, 111111, 011110, 001100, 000000 and 010010 positioned successively along a diagonal of the mapping crossing the −I,−Q and +I,+Q quadrants of that mapping.

FIG. 27 depicts a fourth Gray mapping of square 64QAM symbol constellations with lattice-point labels positioned to provide labeling diversity from the FIG. 26 third Gray mapping of square 64QAM symbol constellations that is preferred for reducing PAPR of a COFDM DCM signal using the FIG. 26 Gray mapping of 64QAM symbol constellations with another.

FIG. 28 depicts a fifth Gray mapping of square 64QAM symbol constellations with palindromic lattice-point labels 0000, 010010, 011110, 001100, 101101, 111111, 110011 and 100001 positioned along a diagonal of the mapping crossing the −I,+Q and +I,−Q quadrants of that mapping.

FIG. 29 depicts a sixth Gray mapping of square 64QAM symbol constellations with lattice-point labels positioned to provide labeling diversity from the FIG. 28 fifth Gray mapping of square 64QAM symbol constellations that is preferred for reducing PAPR of a COFDM DCM signal using the FIG. 28 Gray mapping of 64QAM symbol constellations with another.

FIG. 30 depicts a first SCM mapping of square 64QAM symbol constellations.

FIG. 31 depicts a second SCM mapping of square 64QAM symbol constellations with lattice-point labels positioned to provide labeling diversity from the FIG. 30 first SCM mapping of 64QAM symbol constellations that is preferred for reducing PAPR of a COFDM DCM signal using the FIG. 30 SCM mapping of 64QAM symbol constellations with another.

FIG. 32 depicts a first anti-Gray mapping of square 64QAM symbol constellations.

FIG. 33 depicts a second anti-Gray mapping of square 64QAM symbol constellations with lattice-point labels positioned to provide labeling diversity from the FIG. 32 first anti-Gray mapping of 64QAM symbol constellations that is preferred for reducing PAPR of a COFDM DCM signal using the FIG. 32 anti-Gray mapping of 64QAM symbol constellations with another.

FIG. 34 depicts a third anti-Gray mapping of square 64QAM symbol constellations with lattice-point labels that ones-complement similarly positioned ones in the FIG. 32 first anti-Gray mapping of 64QAM symbol constellations to provide labeling diversity from that FIG. 32 first anti-Gray mapping of 64QAM symbol constellations.

FIG. 35 depicts a fourth anti-Gray mapping of square 64QAM symbol constellations with lattice-point labels positioned to provide labeling diversity from the FIG. 34 third anti-Gray mapping of 64QAM symbol constellations that is preferred for reducing PAPR of a COFDM DCM signal using the FIG. 34 anti-Gray mapping of 64QAM symbol constellations with another.

FIG. 36 depicts a third generic pattern of labeling the lattice points of square 16QAM symbol constellations, as used in QAM symbols in a second half of COFDM symbols in a COFDM DCM signal.

FIG. 37 depicts a third generic pattern of labeling the lattice points of square 64QAM symbol constellations, as used in QAM symbols in a second half of COFDM symbols in a COFDM DCM signal.

FIG. 38 depicts a seventh Gray mapping of square 16QAM symbol constellations with lattice-point labels positioned to provide labeling diversity from the FIG. 8 first Gray mapping of 16QAM symbol constellations that is preferred for reducing PAPR of a COFDM DCM signal.

FIG. 39 depicts an eighth Gray mapping of square 16QAM symbol constellations with lattice-point labels positioned to provide labeling diversity from the FIG. 10 third Gray mapping of 16QAM symbol constellations that is preferred for reducing PAPR of a COFDM DCM signal.

FIG. 40 depicts a ninth Gray mapping of square 16QAM symbol constellations with lattice-point labels positioned to provide labeling diversity from the FIG. 12 fifth Gray mapping of 16QAM symbol constellations that is preferred for reducing PAPR of a COFDM DCM signal.

FIG. 41 depicts a third SCM mapping of square 16QAM symbol constellations with lattice-point labels positioned to provide labeling diversity from the FIG. 14 first SCM mapping of 16QAM symbol constellations that is preferred for reducing PAPR of a COFDM DCM signal using the FIG. 14 SCM mapping of 16QAM symbol constellations with another.

FIG. 42 depicts a fifth anti-Gray mapping of square 16QAM symbol constellations with lattice-point labels positioned to provide labeling diversity from the FIG. 16 first anti-Gray mapping of 16QAM symbol constellations that is preferred for reducing PAPR of a COFDM DCM signal using the FIG. 16 anti-Gray mapping of 16QAM symbol constellations with another.

FIG. 43 depicts a sixth anti-Gray mapping of square 16QAM symbol constellations with lattice-point labels positioned to provide labeling diversity from the FIG. 18 third anti-Gray mapping of 16QAM symbol constellations that is preferred for reducing PAPR of a COFDM DCM signal using the FIG. 18 anti-Gray mapping of 16QAM symbol constellations with another.

FIG. 44 depicts a seventh Gray mapping of square 64QAM symbol constellations with lattice-point labels positioned to provide labeling diversity from the FIG. 24 first Gray mapping of 64QAM symbol constellations that is preferred for reducing PAPR of a COFDM DCM signal using the FIG. 24 Gray mapping of 64QAM symbol constellations with another.

FIG. 45 depicts a third SCM mapping of square 64QAM symbol constellations with lattice-point labels positioned to provide labeling diversity from the FIG. 30 first SCM mapping of 64QAM symbol constellations that is preferred for reducing PAPR of a COFDM DCM signal using the FIG. 30 SCM mapping of 64QAM symbol constellations with another.

FIG. 46 depicts a fifth anti-Gray mapping of square 64QAM symbol constellations with lattice-point labels positioned to provide labeling diversity from the FIG. 32 first anti-Gray mapping of 64QAM symbol constellations that is preferred for reducing PAPR of a COFDM DCM signal using the FIG. 32 anti-Gray mapping of 64QAM symbol constellations with another.

FIG. 47 depicts a sixth anti-Gray mapping of square 64QAM symbol constellations with lattice-point labels positioned to provide labeling diversity from the FIG. 34 third anti-Gray mapping of 64QAM symbol constellations that is preferred for reducing PAPR of a COFDM DCM signal using the FIG. 34 anti-Gray mapping of 64QAM symbol constellations with another.

FIGS. 48, 49, 50 and 51 depict respective quadrants of a first Gray mapping of square 256QAM symbol constellations, as prescribed in the DVB-T2 Standards for Digital Video Broadcasting.

FIGS. 52, 53, 54 and 55 depict respective quadrants of a second Gray mapping of square 256QAM symbol constellations with lattice-point labels positioned to provide labeling diversity from the first Gray mapping of 256QAM symbol constellations depicted in FIGS. 48-31, which second Gray mapping of 256QAM symbol constellations is preferred for reducing PAPR of a COFDM DCM signal using that first Gray mapping of 256QAM symbol constellations with another.

FIGS. 63 and 57 together form a schematic diagram of the general structure of receiver apparatus for COFDM DCM signals using respective phase-shift methods to respond separately to the concurrent lower-frequency and upper-frequency sidebands of those signals.

FIGS. 66 and 57 together form a schematic diagram of a variant of the receiver apparatus for demodulation of COFDM DCM signal that is depicted in FIGS. 59 and 57, digital circuitry depicted in FIG. 66 replacing some of the analog circuitry depicted in FIG. 59.

FIGS. 67 and 57 together form a schematic diagram of the general structure of receiver apparatus for demodulation of COFDM DCM signals using phase-shift methods modified in a first manner.

FIGS. 68 and 57 together form a schematic diagram of a variant of the receiver apparatus for demodulation of COFDM DCM signals depicted in FIGS. 67 and 57, digital circuitry depicted in FIG. 68 replacing some of the analog circuitry depicted in FIG. 67.

FIGS. 70 and 57 together form a schematic diagram of the general structure of receiver apparatus for COFDM DCM signals using Weaver methods.

FIGS. 71 and 57 together form a schematic diagram of receiver apparatus for demodulation of COFDM DCM signals using modified phase-shift methods to respond separately to the concurrent lower-frequency and upper-frequency sidebands of those signals after discrete Fourier transforms of those sidebands are computed.

DETAILED DESCRIPTION

Figure 1:
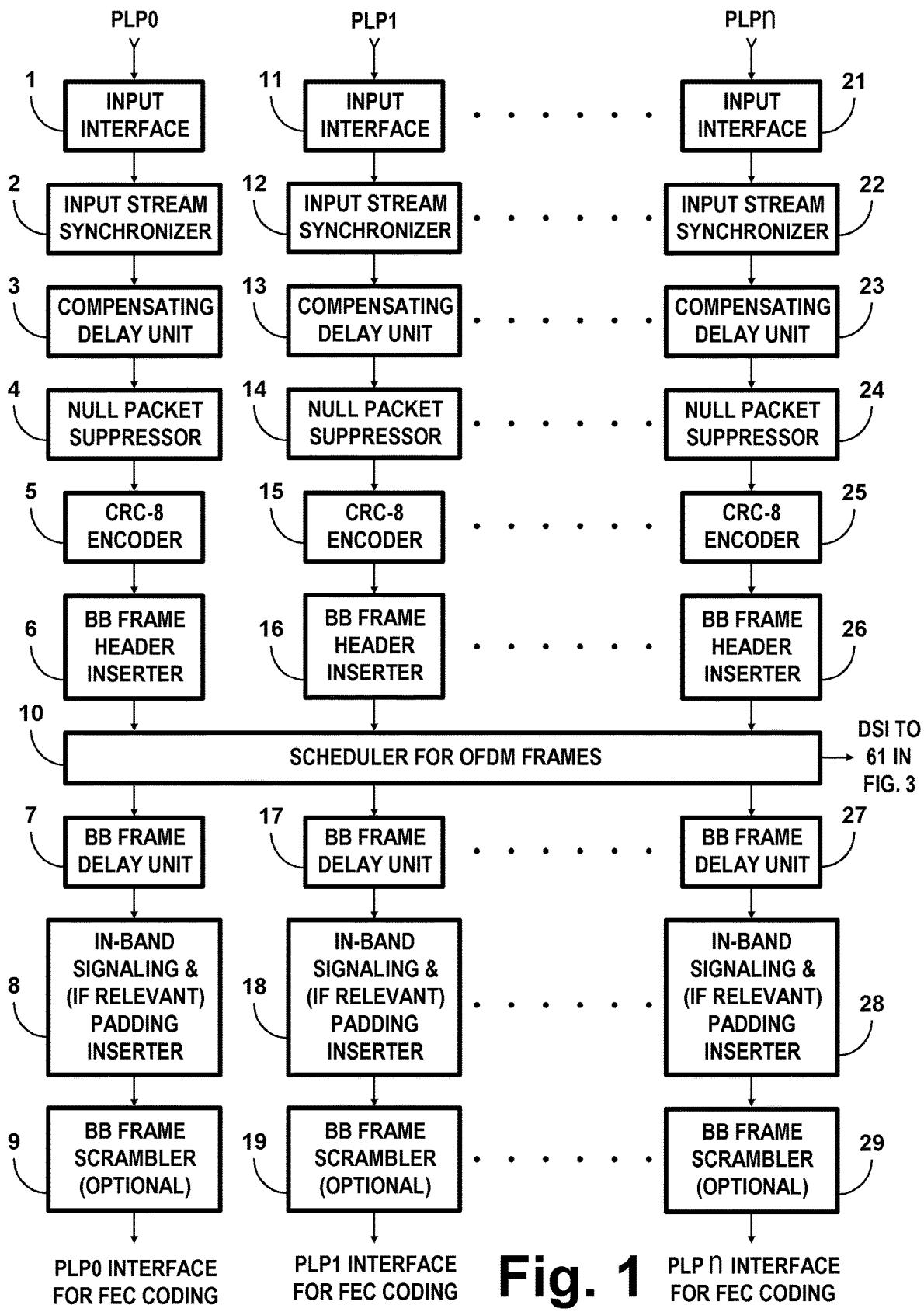
FIGS. 1, 2 and 3 together form a schematic diagram of transmitter apparatus for COFDM DCM signal.
Figure 2:
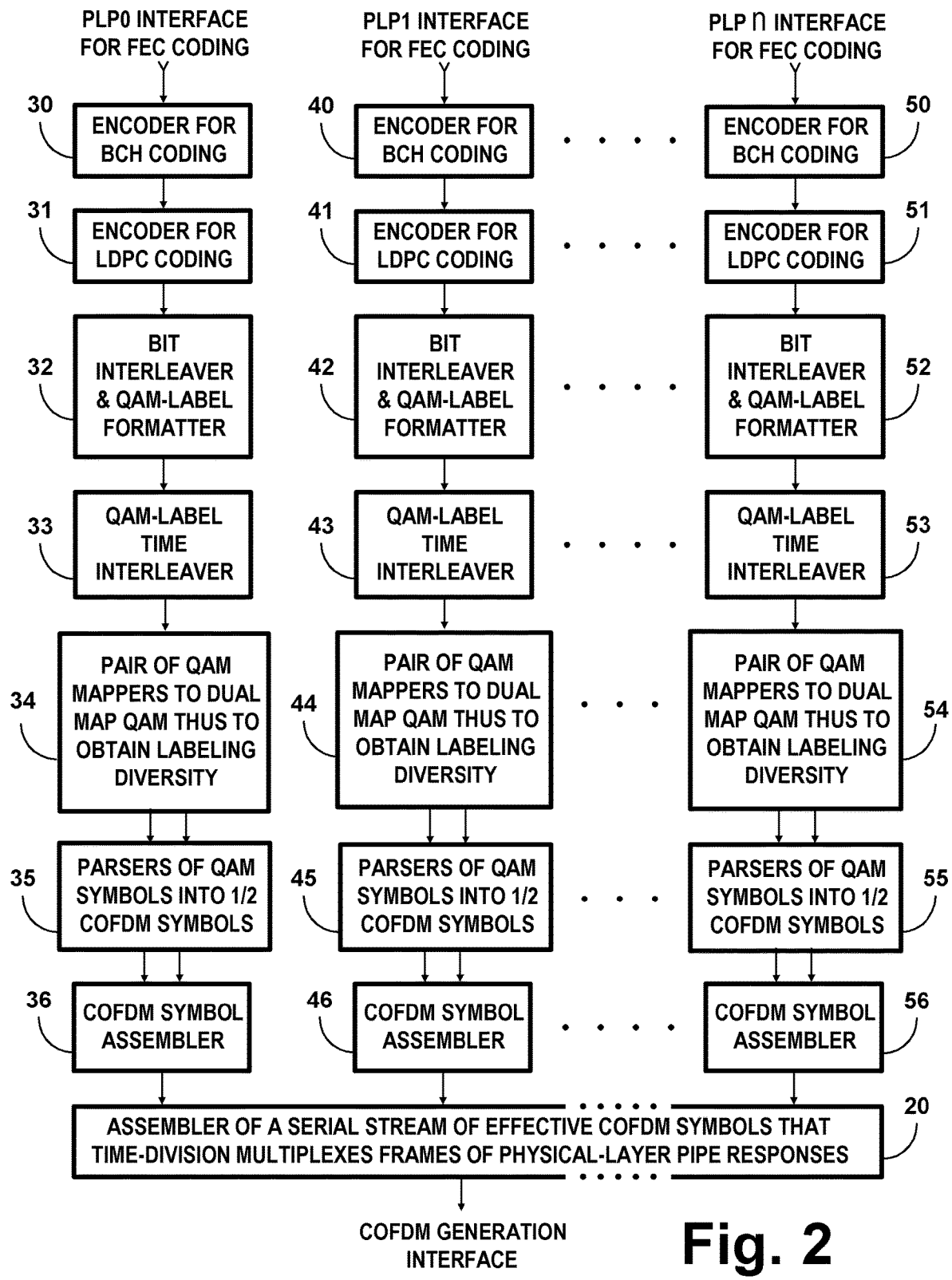
Figure 3:
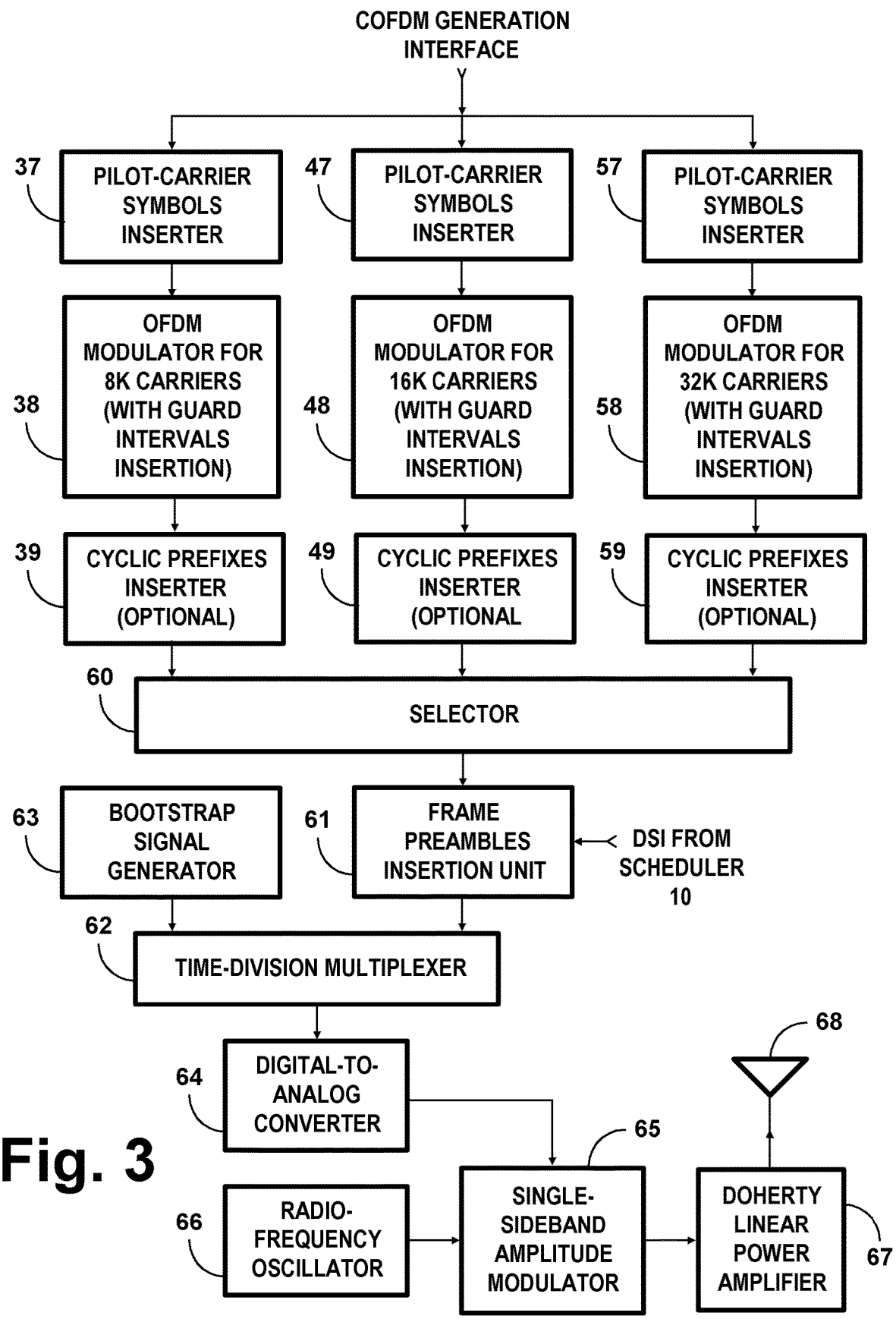

FIGS. 1, 2 and 3 depict a DTV transmitter apparatus generating COFDM signals designed for reception by DTV receivers. FIG. 1 depicts apparatus for generating baseband frames (BBFRAMES) at physical-layer-pipe (PLP) interfaces. FIG. 2 depicts apparatus for generating bit-wise forward-error-correction (FEC) coding and subsequent COFDM symbol blocks responsive to the BBFRAMEs supplied at the PLP interfaces. FIG. 3 depicts apparatus for generating and transmitting radio-frequency COFDM signals. Much of the DTV transmitter apparatus depicted in FIGS. 1, 2 and 3 is similar to that specified in European Telecommunications Standards Institute (ETSI) standard EN 302 755 V1.3.1 published in April 2012, titled "Digital Video Broadcasting (DVB); Frame structure channel coding and modulation for a second-generation digital terrestrial television broadcasting system (DVB-T2)", and incorporated herein by reference.

A scheduler 10 for interleaving time-slices of services to be broadcast to stationary DTV receivers is depicted in the middle of FIG. 1. The scheduler 10 schedules transmissions of time slices for a number (n+1) of physical layer pipes (PLPs), n being a positive integer at least zero. FIGS. 1 and 2 identify these PLPs by the letters "PLP" followed respectively by consecutive positive integers of a modulo-(n+1) numbering system. The scheduler 10 also generates and schedules dynamic scheduling information (DSI) for application to an additional PLP depicted in FIG. 3, which additional PLP generates OFDM symbol blocks that convey the DSI and first layer conformation specifications in respective pilot symbols P1 and P2 in preambles of OFDM frames. Recommended practice is that at least the physical layer pipe PLP0 is a so-called "common" PLP used for transmitting data, such as a program guide, relating to the other "data" PLPs. The common PLP or PLPs are transmitted in each OFDM frame following the P1 and P2 pilot symbols, but before the data PLP or PLPs. A data PLP may be of a first type transmitted as a single slice per OFDM frame, or a data PLP may be of a second type transmitted as a plurality of sub-slices disposed in non-contiguous portions of each OFDM frame to achieve greater time diversity.

FIG. 1 depicts the (n+1)th physical layer pipe PLP0 comprising elements 1-6 in cascade connection before the scheduler 10 and further comprising elements 7-9 in cascade connection after the scheduler 10, but before a PLP0 interface for forward-error-correction (FEC) coding. More specifically, FIG. 1 indicates that a PLP0 stream of logical digital data is supplied to the input port of an input interface 1, the output port of which connects to the input port of an input stream synchronizer 2. The output port of the input stream synchronizer 2 connects to the input port of a compensating delay unit 3, the output port of which connects to the input port of a null-packet suppressor 4. The output port of the null-packet suppressor 4 connects to the input port of a CRC-8 encoder 5 operative at user packet level, the output port of which connects to the input port of an inserter 6 of headers for baseband (BB) frames. The output port of the BBFRAME header inserter 6 connects to a respective input port of the scheduler 10. The physical layer pipe PLP0 continues following the scheduler 10, with FIG. 1 showing a respective output port of the scheduler 10 connecting to the input port of a delay unit 7 for delaying baseband (BB) frames. FIG. 1 shows the output port of the BBFRAME delay unit 7 connecting to the input port of an inserter 8 for inserting in-band signaling into BBFRAMEs, which in-band signaling essentially consists of dynamic scheduling information (DSI) generated by the scheduler 10, and/or for inserting padding into the BBFRAME. Padding is inserted in circumstances when the user data available for transmission is insufficient to fill a BBFRAME completely, or when an integer number of user packets is required to be allocated to a BBFRAME. FIG. 1 shows the output port of the inserter 8 connecting to the input port of a BBFRAME scrambler 9, which data randomizes bits of the BBFRAME supplied from the output port of the BBFRAME scrambler 9 as the PLP0 interface for FEC coding. In practice the delay unit 7, the inserter 8 and the BBFRAME scrambler 9 are realized by suitable configuration of a multi-port random-access memory.

FIG. 1 depicts the first physical layer pipe PLP1 comprising elements 11-16 in cascade connection before the scheduler 10 and further comprising elements 17-19 in cascade connection after the scheduler 10, but before a PLP1 interface for forward-error-correction (FEC) coding. More specifically, FIG. 1 indicates that a PLP1 stream of logical digital data is supplied to the input port of an input interface 11, the output port of which connects to the input port of an input stream synchronizer 12. The output port of the input stream synchronizer 12 connects to the input port of a compensating delay unit 13, the output port of which connects to the input port of a null-packet suppressor 14. The output port of the null-packet suppressor 14 connects to the input port of a CRC-8 encoder 15 operative at user packet level, the output port of which connects to the input port of an inserter 16 of headers for BBFRAMEs. The output port of the BBFRAME header inserter 16 connects to a respective input port of the scheduler 10. The physical layer pipe PLP1 continues following the scheduler 10, with FIG. 1 showing a respective output port of the scheduler 10 connecting to the input port of a delay unit 17 for delaying BBFRAMEs. FIG. 1 shows the output port of the BBFRAME delay unit 17 connecting to the input port of an inserter 18 for inserting in-band signaling into BBFRAMEs, which in-band signaling essentially consists of DSI generated by the scheduler 10, and/or for inserting padding into the BBFRAME. FIG. 1 shows the output port of the inserter 18 connecting to the input port of a BBFRAME scrambler 19, which data-randomizes bits of the BBFRAME supplied from the output port of the BBFRAME scrambler 19 as the PLP1 interface for FEC coding. In practice the delay unit 17, the inserter 18 and the BBFRAME scrambler 19 are realized by suitable operation of a multi-port random-access memory.

FIG. 1 depicts the (n)th physical layer pipe PLPn comprising elements 21-26 in cascade connection before the scheduler 10 and further comprising elements 27-29 in cascade connection after the scheduler 10, but before a PLPn interface for forward-error-correction (FEC) coding. More specifically, FIG. 1 indicates that a PLPn stream of logical digital data is supplied to the input port of an input interface 21, the output port of which connects to the input port of an input stream synchronizer 22. The output port of the input stream synchronizer 22 connects to the input port of a compensating delay unit 23, the output port of which connects to the input port of a null-packet suppressor 24. The output port of the null-packet suppressor 24 connects to the input port of a CRC-8 encoder 25 operative at user packet level, the output port of which connects to the input port of an inserter 26 of headers for BBFRAMEs. The output port of the BBFRAME header inserter 26 connects to a respective input port of the scheduler 10. The physical layer pipe PLPn continues following the scheduler 10, with FIG. 1 showing a respective output port of the scheduler 10 connecting to the input port of a delay unit 27 for delaying BBFRAMEs. FIG. 1 shows the output port of the BBFRAME delay unit 27 connecting to the input port of an inserter 28 for inserting in-band signaling into BBFRAMEs, which in-band signaling essentially consists of dynamic scheduling information (DSI) generated by the scheduler 10, and/or for inserting padding into the BBFRAME. FIG. 1 shows the output port of the inserter 28 connecting to the input port of a BBFRAME scrambler 29, which data randomizes bits of the BBFRAME supplied from the output port of the BBFRAME scrambler 29 as the PLPn interface for FEC coding. In practice the delay unit 27, the inserter 28 and the BBFRAME scrambler 29 are apt to be realized by appropriate operation of a multi-port random-access memory.

The input stream synchronizers 2, 12, 22 etc. are operable to guarantee Constant Bit Rate (CBR) and constant end-to-end transmission delay for any input data format when there is more than one input data format. Some transmitters may omit ones of the input stream synchronizers 2, 12, 22 etc. or ones of the compensating delay units 3, 13, 23 etc. For some Transport-Stream (TS) input signals, a large percentage of null-packets may be present in order to accommodate various bit-rate services in a constant bit-rate TS. In such case, to avoid unnecessary transmission overhead, the null-packet suppressors 4, 14, 24 etc. identify TS null-packets from the packet-identification (PID) sequences in their packet headers and remove those TS null-packets from the data streams to be scrambled by the BBFRAME scramblers 9, 19, 29 etc. This removal is done in a way such that the removed null-packets can be re-inserted in the receiver in the exact positions they originally were in, thus guaranteeing constant bit-rate and avoiding the need for updating the Program Clock Reference (PCR) or time-stamp. Further details of the operation of the input stream synchronizers 2, 12, 22 etc.; the compensating delay units 3, 13, 23 etc.; and the null-packet suppressors 4, 14, 24 etc. can be gleaned from ETSI standard EN 302 755 V1.3.1 for DVB-T2.

FIG. 2 specifically indicates FEC coding to be concatenated BCH/LDPC coding composed of Bose-Chaudhuri-Hocquenghem (BCH) outer block coding and low-density parity-check (LDPC) inner block coding, which FEC coding is currently favored in the DVB-T2 broadcasting art. Alternatively, the FEC coding can take any one of a variety of other forms, including concatenated Reed-Solomon (RS) outer coding and turbo inner coding—e.g., as specified by the earlier DVB-T broadcast standard.

FIG. 2 depicts the (n+1)th physical layer pipe PLP0 further comprising elements 30-38 in cascade connection after the PLP0 interface for FEC coding, but before a respective input port of an assembler 20 for assembling a serial stream of effective COFDM symbols. More specifically, FIG. 2 depicts an encoder 30 for BCH coding with its input port connected to receive the PLP0 FEC-coding interface signal from the output port of the BBFRAME scrambler 9 and with its output port connected to the input port of an encoder 31 for LDPC coding. The output port of the encoder 31 connects to the input port of a bit interleaver and QAM-label formatter 32. FIG. 2 depicts the output port of the bit interleaver and QAM-label formatter 32 connected to the input port of a time interleaver 33 for successive QAM labels. The time interleaver 33 shuffles the order of the QAM symbols in each successive FEC block. This shuffling implements cyclic delay diversity (CDD) that helps the FEC coding to overcome fading. The output port of the QAM-label time interleaver 33 connects to the respective input ports of a pair 34 of QAM mappers for dual mapping successive QAM labels to the complex coordinates of respective successions of QAM symbol constellations. The two QAM mappers in the pair 34 of them map same coded data to QAM of their respective OFDM carriers according to respective patterns that differ from each other, thereby to implement labeling diversity. In the case of transmissions broadcast for reception by mobile DTV receivers, these QAM symbol constellations are apt to be square 16QAM symbol constellations, square 64QAM symbol constellations or 16APSK symbol constellations, by way of specific examples.

In the case of transmissions broadcast for reception by stationary DTV receivers, these QAM symbol constellations are most likely to be square 64QAM symbol constellations, although square 256QAM symbol constellations or even square 1024QAM symbol constellations could be used. Going from 16QAM to 64QAM symbol constellations increases the number of bits in lattice-point labels from four to six, increasing channel capacity 50%. Going from 16QAM to 256QAM symbol constellations increases the number of bits in lattice-point labels from four to eight, doubling channel capacity, but the increase of channel capacity over that for 64QAM symbol constellations is only 33%. Going from 256QAM to 1024QAM symbol constellations increases the number of bits in lattice-point labels from eight to ten, for a 20% increase in channel capacity. The diminishing increases in channel capacity for larger than 64QAM symbol constellations probably do not justify the extra risk of error caused by noise. Stronger FEC coding necessary to overcome these errors will decrease channel capacity, offsetting increase in channel capacity owing to a larger QAM symbol constellation.

The respective output ports of the pair 34 of QAM mappers are connected for supplying first and second sets of successive QAM symbol constellations to respective input ports of parsers 35 of the first and second sets of successive of QAM symbols into respective successions of half COFDM symbols. These successions of half COFDM symbols are supplied to first and second input ports of a COFDM symbol assembler 36, which responds to their half COFDM symbols alternately to generate complete COFDM symbols. The output port of the COFDM symbol assembler 36 is connected to a respective input port of the assembler 20 of a serial stream of effective COFDM symbols, in which frames of PLP responses from the various physical layer pipes are time-division multiplexed. Together the parsers 35 and the COFDM symbol assembler 36 combine to provide a COFDM symbol generator for arranging successive ones of the first set of QAM symbols in first prescribed order in initial halves of successive COFDM symbols and arranging successive ones of the second set of QAM symbols in second prescribed order in final halves of successive COFDM symbols.

FIG. 2 depicts the first physical layer pipe PLP1 further comprising elements 40-46 in cascade connection after the PLP1 interface for FEC coding, but before a respective input port of [an] the assembler 20 for assembling a serial stream of effective COFDM symbols. More specifically, FIG. 2 depicts an encoder 40 for BCH coding with its input port connected to receive the PLP1 FEC-coding interface signal from the output port of the BBFRAME scrambler 19 and with its output port connected to the input port of an encoder 41 for LDPC coding. The output port of the encoder 41 is connected to the input port of a bit interleaver and QAM-label formatter 42. FIG. 2 depicts the output port of the bit interleaver and QAM-label formatter 42 connected to the input port of a time interleaver 43 for successive QAM labels. The time interleaver 43 shuffles the order of the QAM symbols in each successive FEC block. This shuffling implements cyclic delay diversity that helps the FEC coding to overcome fading. The output port of the QAM-label time interleaver 43 connects to the respective input ports of pair 44 of QAM mappers for dual mapping successive QAM labels to the complex coordinates of respective successions of QAM symbol constellations. The two QAM mappers in the pair 44 of them map same coded data to QAM of their respective OFDM carriers according to respective patterns that differ from each other, thereby to implement labeling diversity.

The respective output ports of the pair 44 of QAM mappers are connected for supplying first and second sets of successive QAM symbol constellations to respective input ports of parsers 45 of the first and second sets of successive of QAM symbols into respective successions of half COFDM symbols. These successions of half COFDM symbols are supplied to first and second input ports of a COFDM symbol assembler 46, which responds to their half COFDM symbols alternately to generate complete COFDM symbols. The output port of the COFDM symbol assembler 46 is connected to a respective input port of [an] the assembler 20 of a serial stream of effective COFDM symbols, in which frames of PLP responses from the various physical layer pipes are time-division multiplexed. Together the parsers 45 and the COFDM symbol assembler 46 combine to provide a COFDM symbol generator for arranging successive ones of the first set of QAM symbols in first prescribed order in initial halves of successive COFDM symbols and arranging successive ones of the second set of QAM symbols in second prescribed order in final halves of successive COFDM symbols.

FIG. 2 depicts the (n)th physical layer pipe PLPn further comprising elements 50-55 in cascade connection after the PLP0 interface for FEC coding, but before a respective input port of the assembler 20 for assembling a serial stream of effective COFDM symbols. More specifically, FIG. 2 depicts an encoder 50 for BCH coding with its input port connected to receive the PLPn FEC-coding interface signal from the output port of the BBFRAME scrambler 29 and with its output port connected to the input port of an encoder 51 for LDPC coding. The output port of the encoder 51 is connected to the input port of bit interleaver and QAM-label formatter 52. FIG. 2 depicts the output port of the bit interleaver and QAM-label formatter 52 connected to the input port of a time interleaver 53 for successive QAM labels. The time interleaver 53 shuffles the order of the QAM symbols in each successive FEC block. This shuffling implements cyclic delay diversity (CDD) that helps the FEC coding to overcome fading. The output port of the QAM-label time interleaver 53 connects to the respective input ports of a pair 54 of QAM mappers for dual mapping successive QAM labels to the complex coordinates of respective successions of QAM symbol constellations. The two QAM mappers in the pair 54 of them map same coded data to QAM of their respective OFDM carriers according to respective patterns that differ from each other, thereby to implement labeling diversity.

The respective output ports of the pair 54 of QAM mappers are connected for supplying first and second sets of successive QAM symbol constellations to respective input ports of parsers 55 of the first and second sets of successive of QAM symbols into respective successions of half COFDM symbols. These successions of half COFDM symbols are supplied to first and second input ports of a COFDM symbol assembler 56, which responds to their half COFDM symbols alternately to generate complete COFDM symbols. The output port of the COFDM symbol assembler 56 is connected to a respective input port of the assembler 20 of a serial stream of effective COFDM symbols, in which frames of PLP responses from the various physical layer pipes are time-division multiplexed. Together the parsers 55 and the COFDM symbol assembler 56 combine to provide a COFDM symbol generator for arranging successive ones of the first set of QAM symbols in first prescribed order in initial halves of successive COFDM symbols and arranging successive ones of the second set of QAM symbols in second prescribed order in final halves of successive COFDM symbols.

Customarily there is a number of other physical layer pipes besides PLP0, PLP1 and PLPn, which other physical layer pipes are identified by the prefix PLP followed by respective ones of consecutive numbers two through (n−1). Each of the PLPs, n+1 in number, may differ from the others in at least one aspect. One possible difference between these n+1 PLPs concerns the natures of the FEC coding these PLPs respectively employ. The current trend is to use concatenated BCH coding and LDPC block coding for the FEC coding, but concatenated Reed-Solomon coding and convolutional coding have been used in the past. EN 302 755 V1.3.1 for DVB-T2 specifies a block size of 64,800 bits for normal FEC frames as a first alternative, and a block size of 16,200 bits is specified for short FEC frames as a second alternative. Also, a variety of different LDPC code rates are authorized. PLPs may differ in the number of OFDM carriers involved in each of their spectral samples, which affects the size of the DFT used for demodulating those OFDM carriers. Another possible difference between PLPs concerns the natures of the QAM symbol constellations (or possibly other modulation symbol constellations) they respectively employ.

FIG. 2 indicates that the output port of the assembler 20 of a serial stream of effective COFDM symbols, in which frames of PLP responses from the various physical layer pipes are time-division multiplexed, connects to subsequent elements via a COFDM generation interface depicted in both FIGS. 2 and 3. These subsequent elements are depicted in FIG. 3, which indicates where pilot carrier symbols are inserted into the effective COFDM symbol to generate complete COFDM symbols to be supplied to at least one COFDM modulator. Preferably, the pilot carrier symbols for modulating the OFDM carriers in the upper sideband of the COFDM DCM signal are similar to those specified for DSB-COFDM signal in the ATSC 3.0 Standard for DTV Broadcasting and are similarly positioned in each COFDM frame, and the pilot carrier symbols for modulating the OFDM carriers in the lower sideband of the COFDM DCM signal mirror those in the upper sideband both as to modulation and positioning in each COFDM frame.

FIG. 3 depicts a pilot-carrier symbols insertion unit 37 having an input port connected for receiving the serial stream of effective COFDM symbols supplied from the FIG. 2 assembler 20 thereof via the COFDM generation interface. The pilot-carrier symbols insertion unit 37 inserts pilot carrier symbols into the effective COFDM symbols to generate complete COFDM symbols suitable for a subsequent 8K inverse fast Fourier transform (I-FFT). The output port of the pilot-carrier symbols insertion unit 37 is connected for supplying complete COFDM symbols to the input port of an OFDM modulator 38 which performs that subsequent 8K I-FFT. I.e., the pilot-carrier symbols insertion unit 37 cooperates with the assembler 20 of a serial stream of effective COFDM symbols to form a COFDM symbol generator for supplying complete COFDM symbols to the OFDM modulator 38 that is the initial element of a subsequent generator of COFDM DCM radio-frequency signal. Guard interval insertion following each COFDM symbol is subsumed within the 8K I-FFT procedure in the OFDM modulator 38. In customary practice somewhat fewer than the nominal eight thousand subcarriers are generated by the 8K I-FFT procedure. In preferred practice, cyclic prefixes are disposed in respective guard intervals, and for implementing such option FIG. 3 depicts a cyclic prefixes inserter 39 included within the connection of the output port of the OFDM modulator 38 to a respective input port of a subsequent selector 60.

FIG. 3 depicts a pilot-carrier symbols insertion unit 47 having an input port connected for receiving the serial stream of effective COFDM symbols supplied from the FIG. 2 assembler 20 thereof via the COFDM generation interface. The pilot-carrier symbols insertion unit 47 inserts pilot carrier symbols into the effective COFDM symbols to generate complete COFDM symbols suitable for a subsequent 16K I-FFT. The output port of the pilot-carrier symbols insertion unit 47 is connected for supplying complete COFDM symbols to the input port of an OFDM modulator 48 which performs that subsequent 16K I-FFT. I.e., the pilot-carrier symbols insertion unit 47 cooperates with the assembler 20 of a serial stream of effective COFDM symbols to form a COFDM symbol generator for supplying complete COFDM symbols to the OFDM modulator 48 that is the initial element of a subsequent generator of COFDM DCM radio-frequency signal. Guard interval insertion following each COFDM symbol is subsumed within the 16K I-FFT procedure in the OFDM modulator 38. In customary practice somewhat fewer than the nominal sixteen thousand subcarriers are generated by the 16K I-FFT procedure. In preferred practice, cyclic prefixes are disposed in respective guard intervals, and for implementing such option FIG. 3 depicts a cyclic prefixes inserter 49 included within the connection of the output port of the OFDM modulator 48 to a respective input port of the subsequent selector 60.

FIG. 3 depicts a pilot-carrier symbols insertion unit 57 having an input port connected for receiving the serial stream of effective COFDM symbols supplied from the FIG. 2 assembler 20 thereof via the COFDM generation interface. The pilot-carrier symbols insertion unit 57 inserts pilot carrier symbols into the effective COFDM symbols to generate complete COFDM symbols suitable for a subsequent 32K I-FFT. The output port of the pilot-carrier symbols insertion unit 57 is connected for supplying complete COFDM symbols to the input port of an OFDM modulator 58 which performs that subsequent 32K I-FFT. I.e., the pilot-carrier symbols insertion unit 57 cooperates with the assembler 20 of a serial stream of effective COFDM symbols to form a COFDM symbol generator for supplying complete COFDM symbols to the OFDM modulator 58 that is the initial element of a subsequent generator of COFDM DCM radio-frequency signal. Guard interval insertion following each COFDM symbol is subsumed within the 32K I-FFT procedure in the OFDM modulator 58. In customary practice somewhat fewer than the nominal thirty-two thousand subcarriers are generated by the 32K I-FFT procedure. In preferred practice, cyclic prefixes are disposed in respective guard intervals, and for implementing such option FIG. 3 depicts a cyclic prefixes inserter 59 included within the connection of the output port of the OFDM modulator 58 to a respective input port of the subsequent selector 60.

Clipping methods of PAPR reduction necessarily involve distortion that tends to increase bit errors and thus tax iterative soft decoding of error-correction coding more. Furthermore, the PAPR reduction method using a complementary-power pair of QAM mappers suppresses occasional power peaks, which the various clipping methods of PAPR reduction rely upon to be markedly effective. Even so, most COFDM transmitter apparatus permits some clipping of power peaks that tend to occur infrequently, even where the power amplifier is of Doherty type. This is permitted in recognition of practical limitations on linearity in COFDM receiver apparatuses. However, band-limit filtering designed to suppress widening of the frequency spectrum caused by such clipping should follow the power amplifier for final-radio-frequency COFDM signal.

FIG. 3 further depicts a selector 60 having respective input ports to which the output ports of the guard intervals insertion units 39, 49 and 65 respectively connect. FIG. 3 depicts the output port of the selector 60 connected to the input port of a frame preambles insertion unit 61. The pilot-carrier symbol insertion unit 37, the OFDM modulator 38, any subsequent cyclic prefixes inserter 39 may be selectively powered, being powered only when transmissions using close to 8K OFDM carriers are made. Elements 37, 38 and 39 may all be omitted in some transmitters. The pilot-carrier symbols insertion unit 47, the OFDM modulator 48, any subsequent cyclic prefixes inserter 49 may be selectively powered, being powered only when transmissions using close to 16K OFDM carriers are made. Elements 47, 48 and 49 may all be omitted in some transmitters. The pilot-carrier symbols insertion unit 57, the OFDM modulator 58, any subsequent cyclic prefixes inserter 59 may be selectively powered, being powered only when transmissions using close to 32K OFDM carriers are made. All the elements 57, 58 and 59 may be omitted in some transmitters.

FIG. 3 shows the output port of the frame preambles insertion unit 61 connected to one of the two input ports of a time-division multiplexer 62. The other of the two input ports of the time-division multiplexer 62 is connected for receiving a bootstrap signal that a bootstrap signal generator 63 supplies from its output port. The bootstrap signal is an innovation introduced by developers of the ATSC 3.0 Digital Television Standards. It conveys metadata descriptive of the transmission standard used for DTV broadcasting and critical information concerning the configuration of receivers for receiving DTV broadcasts made in accordance with that standard. The bootstrap signal is conveyed by an OFDM signal using a set of carriers that are apt to differ in frequencies in a defined way from the set of carriers used for COFDM transmission of DTV signal. The OFDM signal conveying the bootstrap is of narrower bandwidth (typically 4.5 MHz) than the 6 MHz, 7 MHz or 8 MHZ signals currently used for DTV in various countries around the world. The baseband bootstrap signal developed for the ATSC 3.0 Digital Television Standards comprises a Zadoff-Chu sequence, which identifies the basic standard governing the DTV broadcasting, and a set of repetitive pseudo-random-noise sequences that convey further metadata. This is described more fully in ATSC Standard A/321, System Discovery and Signaling (Doc. A/321:2016, approved 23 Mar. 2016).

(The RF oscillator 66 combines with the SSB amplitude modulator 65 to constitute a generator of COFDM DCM radio-frequency signal. Owing to arrangements of first and second sets of successive QAM symbols in the frequency spectrum carried out by at least one preceding generator of COFDM symbols, the lower-frequency sideband of this RF signal conveys the first set of successive QAM symbols and the upper-frequency sideband of this RF signal conveys a second set of successive QAM symbols. The amplitude modulator 65 supplies RF analog COFDM signal from an output port thereof to the input port of a linear power amplifier 67, which is preferably of Doherty type to reduce the likelihood of clipping on peaks of RF signal amplitude. FIG. 3 shows the output port of the linear power amplifier 67 connected for driving amplified RF analog COFDM signal power to a transmission antenna 68. FIG. 3 omits showing some DTV transmitter details, such as band-shaping filters for the RF signals.

FIG. 3 shows a single-sideband amplitude modulator 65 connected for modulating an RF carrier wave of the frequency of the ultimate transmissions from the transmission antenna 68. In actual commercial practice the SSB amplitude modulator 65 is apt to be connected for modulating a carrier wave of intermediate frequency (IF). An up-converter converts the analog COFDM carriers in the SSB amplitude modulator 65 response to final radio frequencies and is connected for supplying them from its output port to the input port of the linear power amplifier 67. In some designs for the DTV transmitter the DAC 64 is designed to compensate for non-linear transfer functions of the SSB amplitude modulator 65, of the up-converter if used, and of the linear power amplifier 67.

The frame preambles inserted by the frame preambles insertion unit 61 convey the conformation of each OFDM frame structure and also convey the dynamic scheduling information (DSI) produced by the scheduler 10. This information is conveyed using at least some of OFDM carriers also used for conveying the baseband OFDM information in the input signals to the frame preambles insertion unit 61. The OFDM carriers supplied by the bootstrap signal generator 63 are apt to have different frequencies than OFDM carriers used for conveying the baseband OFDM information in the input signals to the frame preambles insertion unit 61. The OFDM carriers supplied by the bootstrap signal generator 63 are constrained to a narrower bandwidth than the OFDM carriers used for conveying the baseband OFDM information in the input signals to the frame preambles insertion unit 61. The bootstrap signal conveys basic information as to the standard to which OFDM broadcasts conform, the bandwidth of the RF channel, and the size of the I-FFT used in the broadcasting of groups of OFDM frames, for example. If bootstrap signals are not used in the standard used for COFDM broadcasting, the elements 62 and 65 will be omitted, and the output port of the frame preambles insertion unit 61 will connect directly to the input port of the digital-to-analog converter 64.

FIG. 4 is a detailed schematic diagram of representative structure 70 for any one of a number of cascade connections in respective physical layer pipes of the FIG. 2 portion of COFDM transmitter apparatus, which structure 70 is configured so as to generate separate half COFDM symbols to be transmitted in lower and upper sidebands respectively of the COFDM signal. Each of these cascade connections comprises a respective pair of QAM mappers to QAM symbol constellations, followed by a respective COFDM symbol assembler. One of these cascade connections comprises the elements 34, 35 and 36 in PLP0. Another of these cascade connections comprises the elements 44, 45 and 46 in PLP1. Still another of these cascade connections comprises the elements 54, 55 and 56 in PLPn.

FIG. 4 shows any one of the respective pairs 34, 44, 54 etc. of mappers to QAM symbol constellations in the physical layer pipes PLP0, PLP1, PLPn etc. as consisting of a respective first QAM mapper 71 and a respective second QAM mapper 72. The respective input ports of the QAM mappers 71 and 72 are each connected for receiving the same succession of QAM lattice-point labels from a foregoing element, such as one of the QAM-label time interleavers 33, 43, 53 etc. Serial-input/parallel-output registers 73 and 74 correspond to the subsequent one of the pairs of parsers 35, 45, 55 etc. A parallel-input/serial-output (PISO) register 75 is configured as a COFDM symbol assembler of a type that is preferred for the respective COFDM symbol assemblers 36, 46, 56 etc. In the physical layer pipes PLP0, PLP1, PLPn etc.

The output port of the first QAM mapper 71 is connected for serially supplying the complex coordinates of a first set of QAM symbols to the input port of the serial-input/parallel-output register 73, which is capable of storing the complex coordinates of QAM symbols for inclusion in the lower-sideband half of each COFDM symbol. The output port of the second QAM mapper 72 is connected for serially supplying the complex coordinates of a second set of QAM symbols to the input port of the serial-input/parallel-output register 74, which is capable of storing the complex coordinates of QAM symbols for inclusion in the upper-sideband half of each COFDM symbol. The parallel output ports of the serial-input/parallel-output registers 73 and 74 are connected for delivering complex coordinates of respective first and second sets of QAM symbols as half COFDM symbols to the parallel input ports of the parallel-input/serial-output register 75, the output port of which connects to a respective input port of the assembler 20 in FIG. 2.

FIG. 5 illustrates the serial response that the parallel-input/serial-output register 75 is designed to supply from its serial output port to that one of the input ports of the assembler 20. Such response is obtained by appropriately connecting ones of the parallel output ports of the serial-input/parallel-output registers 73 and 74 to appropriate ones of the parallel input ports of the parallel-input/serial-output register 75. The complete first set of QAM symbols as generated by the first QAM mapper 71 for inclusion in a half COFDM symbol to be transmitted in the lower sideband of the COFDM DCM signal is followed by the complete second set of QAM symbols as generated by the second QAM mapper 71 for inclusion in a half COFDM symbol to be transmitted in the upper sideband of the COFDM DCM signal. This causes the SSB amplitude modulator 65 depicted in FIG. 3 to generate asymmetric-sideband amplitude modulation, presuming the principal carrier to be completely suppressed. The FIG. 5 frequency interleaving format spreads all the QAM symbols conveying the same information the maximum possible uniform distance in the frequency domain.

FIGS. 6 and 7 respectively depict first and second generic patterns of the labeling of lattice points of square 16QAM symbol constellations in respective half COFDM symbols in a COFDM DCM signal. The letters A, B, C, D, E, F, G, H, I, J, K, L, M, N, O and P represent respective four-bit lattice-point labels in each of the square 16QAM symbol constellations. The positions of the labels for lattice points in each of the square 16QAM symbol constellations are mapped against an in-phase (I) axis and quadrature-phase (Q) axis within a two-dimensional complex plane. The corresponding labels of lattice points in these first and second generic patterns exhibit a labeling diversity that supports soft-bit maximal-ratio combining (SBMRC) in preferred receivers for COFDM DCM signals, which receivers demodulate the asymmetric lower- and upper-frequency halves of a COFDM DCM signal separately and subsequently diversity combine soft-bit results of the two demodulation procedures to recover coded data.

Furthermore, this labeling diversity is one preferred for reducing the PAPR of a COFDM DCM signal using different generic patterns of labeling lattice points of square 16QAM symbol constellations in first and second halves of each successive COFDM symbol. The energies of the labels A, D, M and P are each high in the FIG. 6 first generic pattern of labeling, owing to their outside corner positions therein. However, the energies of the labels A, D, M and P are each low in the FIG. 7 second generic pattern of labeling, so the instantaneous power of a COFDM DCM signal associated with any the labels A, D, M and P tends to be of an average value. The energies of the labels F, G, J and K are each high in the FIG. 7 second generic pattern of labeling, owing to their outside corner positions therein. However, the energies of the labels F, G, J and K are each low in the FIG. 6 first generic pattern of labeling, so the instantaneous power of a COFDM DCM signal associated with any the labels F, G, J and K also tends to be of an average value. The energies of the labels B, C, E, H, I, L, N and O are each of intermediate value in both the FIG. 6 and FIG. 7 generic patterns, so the instantaneous power of a COFDM DCM signal associated with any the labels B, C, E, H, I, L, N and O also tends to be of an average value.

The lattice-point labels A, B, E and F in the −I, +Q quadrant of the FIG. 6 first generic pattern of labeling appear in the +I, −Q quadrant of the FIG. 7 second generic pattern of labeling. The lattice-point labels C, D, G and H in the +I, +Q quadrant of the FIG. 6 first generic pattern of labeling appear in the −I, −Q quadrant of the FIG. 7 second generic pattern of labeling. The lattice-point labels I, J, M and N in the −I, −Q quadrant of the FIG. 6 first generic pattern of labeling appear in the +I, +Q quadrant of the FIG. 7 second generic pattern of labeling. The lattice-point labels K, L, 0 and P in the +I, −Q quadrant of the FIG. 6 first generic pattern of labeling appear in the −I, +Q quadrant of the FIG. 7 second generic pattern of labeling. That is, the lattice point labels in any quadrant of the FIG. 6 first generic pattern of labeling appear in the antipodally opposed quadrant of the FIG. 7 second generic pattern of labeling. Generally, then, the first and second generic patterns of the lattice-point labeling of square 16QAM symbol constellations depicted in FIGS. 6 and 7 entail symmetric cancellation coding (SCC) to some degree. The paired OFDM subcarriers are not adjacent to each other in the frequency spectrum, however, so this SCC will not cancel intercarrier interference (ICI).

This SCC significantly reduces the PAPR of the COFDM DCM signal, however, by reducing the large peak power associated with beginning of the sampling period for each OFDM symbol, when the energies of all OFDM carriers are at their maximum. There is slippage in relative phasings of the paired OFDM subcarriers over the duration of an OFDM symbol sampling period. Such slippage tends to reduce the incidence of high peaks in the COFDM signal during much of the sampling period of a COFDM symbol. However, over a long OFDM symbol sampling period, occasionally the energies of many OFDM carriers may be simultaneously at or near their maxima.

FIGS. 8 and 9 respectively depict first and second Gray maps of lattice points in 16QAM symbol constellations that the QAM mappers 71 and 72 respectively provide in a physical layer pipe in some COFDM DCM transmitter apparatuses embodying aspects of the invention. The lattice points of the FIG. 8 first Gray map of 16QAM symbol constellations are labeled as prescribed in European standard ETSI EN 302 755 published in April 2012 and titled *Digital Video Broadcasting (DVB); Frame structure, channel coding and modulation for a second-generation digital terrestrial television broadcasting system (DVB-T2)*. The FIG. 8 Gray map governs quadrature amplitude modulation (QAM) of a respective set of OFDM carriers that transmit coded data in one of the sidebands of an ASB-COFDM signal, and the FIG. 9 Gray map governs quadrature amplitude modulation (QAM) of a respective set of OFDM carriers that transmit coded data in the other one of the sidebands of that ASB-COFDM signal. The patterns of labeling lattice points in these first and second Gray maps of square 16QAM symbol constellations respectively follow the first and second generic patterns of labeling lattice points depicted in FIGS. 6 and 7. Accordingly, the labeling diversity between FIG. 8 first Gray map and the FIG. 9 second Gray map can be used to minimize the PAPR of COFDM DCM signals and to support soft-bit maximal-ratio combining (SBMRC) in preferred receivers for COFDM DCM signals.

FIGS. 10 and 11 respectively depict third and fourth Gray maps of lattice points in 16QAM symbol constellations that the QAM mappers 71 and 72 respectively provide in a physical layer pipe in some COFDM DCM transmitter apparatuses embodying aspects of the invention. The FIG. 10 third Gray map positions the palindromic lattice-point labels 0110, 1111, 1001 and 0000 successively along a diagonal of the mapping crossing the −I, −Q and +I,+Q quadrants of that mapping. The FIG. 10 Gray map governs quadrature amplitude modulation (QAM) of a respective set of OFDM carriers that transmit coded data in one of the sidebands of an ASB-COFDM signal, and the FIG. 11 Gray map governs quadrature amplitude modulation (QAM) of a respective set of OFDM carriers that transmit coded data in the other one of the sidebands of that ASB-COFDM signal. The patterns of labeling lattice points in these third and fourth Gray maps of square 16QAM symbol constellations respectively follow the first and second generic patterns of labeling lattice points depicted in FIGS. 6 and 7. Accordingly, the labeling diversity between FIG. 10 third Gray map and the FIG. 11 fourth Gray map can be used to minimize the PAPR of COFDM DCM signals and to support soft-bit maximal-ratio combining (SBMRC) in preferred receivers for COFDM DCM signals.

FIGS. 12 and 13 respectively depict fifth and sixth Gray maps of lattice points in 16QAM symbol constellations that the QAM mappers 71 and 72 respectively provide in a physical layer pipe in some COFDM DCM transmitter apparatuses embodying aspects of the invention. The FIG. 12 fifth Gray map positions the palindromic lattice-point labels 0000, 0110, 1111 and 1001 successively along a diagonal of the mapping crossing the −I, +Q and +I,−Q quadrants of that mapping. The FIG. 12 Gray map governs quadrature amplitude modulation (QAM) of a respective set of OFDM carriers that transmit coded data in one of the sidebands of an ASB-COFDM signal, and the FIG. 13 Gray map governs quadrature amplitude modulation (QAM) of a respective set of OFDM carriers that transmit coded data in the other one of the sidebands of that ASB-COFDM signal. The patterns of labeling lattice points in these fifth and sixth Gray maps of square 16QAM symbol constellations respectively follow the first and second generic patterns of labeling lattice points depicted in FIGS. 6 and 7. Accordingly, the labeling diversity between FIG. 12 fifth Gray map and the FIG. 13 sixth Gray map can be used to minimize the PAPR of COFDM DCM signals and to support soft-bit maximal-ratio combining (SBMRC) in preferred receivers for COFDM DCM signals.

FIGS. 14 and 15 respectively depict first and second SCM maps of lattice points in 16QAM symbol constellations that the QAM mappers 71 and 72 respectively provide in a physical layer pipe in some COFDM DCM transmitter apparatuses embodying aspects of the invention. FIG. 14 SCM mapping of square 16QAM symbol constellations corresponds to that suggested by Li Peng, Jun Tong, Xiaojun Yuan and Qinghua Guo in their paper "Superposition Coded Modulation and Iterative Linear MMSE Detection" cited supra. The FIG. 14 SCM map governs quadrature amplitude modulation (QAM) of a respective set of OFDM carriers that transmit coded data in one of the sidebands of an ASB-COFDM signal, and the FIG. 15 SCM map governs quadrature amplitude modulation (QAM) of a respective set of OFDM carriers that transmit coded data in the other one of the sidebands of that ASB-COFDM signal. The patterns of labeling lattice points in these first and second SCM maps of square 16QAM symbol constellations respectively follow the first and second generic patterns of labeling lattice points depicted in FIGS. 6 and 7. Accordingly, the labeling diversity between FIG. 14 first SCM map and the FIG. 15 second SCM map can be used to minimize the PAPR of COFDM DCM signals and to support soft-bit maximal-ratio combining (SBMRC) in preferred receivers for COFDM DCM signals.

A pattern of labels of lattice points for an anti-Gray mapping of 16QAM symbol constellations can be derived from any Gray mapping according to a first method, wherein there is bit-complementing of labels that would be in the A, C, F, H, I, K, N and P positions in the FIG. 6 first generic pattern of labeling lattice points in 16QAM symbol constellations. Another pattern of labeling for anti-Gray mapping of lattice points in 16QAM symbol constellations can be derived from any Gray mapping according to a second method, wherein there is bit-complementing of labels that would be in the B, D, E, G, J, L, M and O positions in the FIG. 6 first generic pattern of labeling lattice points in 16QAM symbol constellations.

FIGS. 16 and 17 respectively depict first and second anti-Gray maps of lattice points in 16QAM symbol constellations that the QAM mappers 71 and 72 respectively provide in a physical layer pipe in some COFDM DCM transmitter apparatuses embodying aspects of the invention. The FIG. 16 first anti-Gray map is derived from the FIG. 7 first Gray map using the first derivation method described supra. The FIG. 16 anti-Gray map governs quadrature amplitude modulation (QAM) of a respective set of OFDM carriers that transmit coded data in one of the sidebands of an ASB-COFDM signal, and the FIG. 17 anti-Gray map governs QAM of a respective set of OFDM carriers that transmit coded data in the other one of the sidebands of that ASB-COFDM signal. The patterns of labeling lattice points in these first and second anti-Gray maps of square 16QAM symbol constellations respectively follow the first and second generic patterns of labeling lattice points depicted in FIGS. 6 and 7. Accordingly, the labeling diversity between FIG. 16 and FIG. 17 anti-Gray maps can be used to minimize the PAPR of COFDM DCM signals and to support soft-bit maximal-ratio combining (SBMRC) in preferred receivers for COFDM DCM signals.

FIGS. 18 and 19 respectively depict third and fourth anti-Gray maps of lattice points in 16QAM symbol constellations that the QAM mappers 71 and 72 respectively provide in a physical layer pipe in some COFDM DCM transmitter apparatuses embodying aspects of the invention. The FIG. 18 third anti-Gray map is derived from the FIG. 7 first Gray map using the second derivation method described supra. The FIG. 18 anti-Gray map governs quadrature amplitude modulation (QAM) of a respective set of OFDM carriers that transmit coded data in one of the sidebands of an ASB-COFDM signal, and the FIG. 19 anti-Gray map governs QAM of a respective set of OFDM carriers that transmit coded data in the other one of the sidebands of that ASB-COFDM signal. The patterns of labeling lattice points in these third and fourth anti-Gray maps of square 16QAM symbol constellations respectively follow the first and second generic patterns of labeling lattice points depicted in FIGS. 6 and 7. Accordingly, the labeling diversity between FIG. 18 and FIG. 19 anti-Gray maps can be used to minimize the PAPR of COFDM DCM signals and to support soft-bit maximal-ratio combining (SBMRC) in preferred receivers for COFDM DCM signals.

FIG. 20 depicts a first Gray mapping of 16APSK symbol constellations, which mapping corresponds to the mapping of a 16-NUC mapping prescribed in the ATSC-3.0 Standard for DTV Broadcasting. ("NUC" is an acronym for "non-uniform constellation".) FIG. 21 depicts a second Gray mapping of 16APSK symbol constellations with lattice-point labels positioned to provide labeling diversity from the FIG. 20 first Gray mapping of 16APSK symbol constellations that is preferred for reducing PAPR of a COFDM DCM signal using the FIG. 20 Gray mapping of 16APSK symbol constellations with another (e. g., the FIG. 21 second) Gray mapping of 16APSK symbol constellations.

The labeling of lattice points of the FIG. 21 second Gray map of 16APSK can be generated by the following procedure, proceeding from the labeling of the lattice points of the FIG. 20 first Gray map of 16APSK. The FIG. 20 first Gray map is modified by exchanging labels of the lattice points in the outer ring of them with respective lattice points in the inner ring of them that are directed similarly from the center of the 16APSK constellation. The foregoing changes average out the power of lattice points in the original and modified FIG. 20 Gray maps, so the PAPR of COFDM DCM signals that use the original and modified FIG. 20 Gray maps is substantially lower than the PAPR of DSB-COFDM signals that use just one of these Gray maps in both its lower and upper sidebands. The FIG. 21 second Gray map of 16APSK symbol constellations is generated by rotating the modified FIG. 20 first Gray map of 16APSK in the mapping plane by 180° around its zero-modulation center. The 180° rotation of the modified first Gray map is an application of the symmetric cancellation coding (SCC) technique, which reduces by a fraction of a decibel the PAPR of COFDM DCM signals using the first and second Gray maps of 16APSK symbol constellations as compared to the PAPR of COFDM DCM signals using the original and modified first Gray maps of 16APSK symbol constellations.

First and second mappings of square QAM symbol constellations respectively used in the upper and lower sidebands of COFDM DCM signals can be designed to secure PAPR that is low enough to rival the PAPR of COFDM DCM signals using first and second mappings of circular APSK constellations respectively in their upper and lower sidebands. So, COFDM DCM signals using first and second mappings of APSK symbol constellations are less interesting alternatives with regard to reducing PAPR. Furthermore, dual demapping square QAM symbol constellations to obtain pairs of soft-bit map labels suitable for SBMRC is more readily and satisfactorily done than dual demapping APSK symbol constellations to obtain pairs of soft-bit map labels suitable for SBMRC. The low PAPR of COFDM DCM signals using properly designed first and second mappings of square QAM symbol constellations in their upper and lower sidebands respectively also makes the use of cruciform QAM constellations a considerably less interesting approach to reducing PAPR.

FIGS. 22 and 23 respectively depict first and second generic patterns of the labeling of lattice points of square 64QAM symbol constellations in respective half COFDM symbols in a COFDM DCM signal. There are too few letters in the alphabet, even an extended one, to represent respective six-bit lattice-point labels in each of the square 64QAM symbol constellations. So, the respective six-bit lattice-point labels in each of the square 64QAM symbol constellations are represented by the successive numerals 1 through 64 in each of these generic patterns. The positions of the labels for lattice points in each of the square 64QAM symbol constellations are mapped against an in-phase (I) axis and a quadrature-phase (Q) axis within a two-dimensional complex plane.

A method for generating the FIG. 23 second generic pattern of the labeling of lattice points of square 64QAM symbol constellations from the FIG. 22 first generic pattern is in general applicable to all sizes of square QAM constellations, including larger-size square QAM symbol constellations and including square 16QAM symbol constellations. The FIG. 22 first generic pattern is modified by flipping each of its −I,+Q and +I,−Q quadrants over by rotating it 180° about the diagonal axis running through these two quadrants. The FIG. 22 first generic pattern is further modified by flipping each of its +I,+Q and −I,−Q quadrants over by rotating it 180° about the diagonal axis running through these two quadrants. Then, the FIG. 22 first generic pattern as so modified and further modified is rotated 180° in the complex mapping plane, such rotation being around the zero-modulation center of the generic patterns of lattice-point labeling.

The corresponding labels of lattice points in these FIG. 22 and FIG. 23 generic patterns for labeling lattice points of 64QAM symbol constellations exhibit labeling diversity that supports soft-bit maximal-ratio combining (SBMRC) in preferred receivers for COFDM DCM signals, which receivers demodulate the asymmetric lower- and upper-frequency halves of a COFDM DCM signal separately and subsequently diversity combine soft-bit results of the two demodulation procedures to recover coded data. Furthermore, this labeling diversity is one preferred for reducing the PAPR of a COFDM DCM signal using different generic patterns of labeling lattice points of square 64QAM. The combined powers for a pair of corresponding labels in the FIG. 22 and FIG. 23 generic patterns will vary somewhat, however, depending on the positions of those labels within those generic patterns. The largest possible COFDM DCM signal will only be 1.68 dB larger than the smallest possible COFDM DCM signal, and PAPR will only be about 0.76 dB.

FIGS. 24 and 25 respectively depict first and second Gray maps of lattice points in 64QAM symbol constellations that the QAM mappers 71 and 72 respectively provide in a physical layer pipe in some COFDM DCM transmitter apparatuses embodying aspects of the invention. The lattice points of the FIG. 24 first Gray map of 64QAM symbol constellations are labeled as prescribed in the above-referenced European standard ETSI EN 302 755. The FIG. 24 Gray map governs quadrature amplitude modulation (QAM) of a respective set of OFDM carriers that transmit coded data in one of the sidebands of an ASB-COFDM signal, and the FIG. 25 Gray map governs QAM of a respective set of OFDM carriers that transmit coded data in the other one of the sidebands of that ASB-COFDM signal. The patterns of labeling lattice points in these first and second Gray maps of square 64QAM symbol constellations respectively follow the first and second generic patterns of labeling lattice points depicted in FIGS. 22 and 23. Accordingly, the labeling diversity between FIG. 24 first Gray map and the FIG. 25 second Gray map can be used to minimize the PAPR of COFDM DCM signals and to support soft-bit maximal-ratio combining (SBMRC) in preferred receivers for COFDM DCM signals.

FIGS. 26 and 27 respectively depict third and fourth Gray maps of lattice points in 64QAM symbol constellations that the QAM mappers 71 and 72 respectively provide in a physical layer pipe in some COFDM DCM transmitter apparatuses embodying aspects of the invention. The FIG. 26 third Gray map positions the palindromic lattice-point labels 110011, 100001, 101101, 111111, 011110, 001100, 000000 and 010010 successively along a diagonal of the mapping crossing the −I, −Q and +I,+Q quadrants of that mapping. The FIG. 26 Gray map governs quadrature amplitude modulation (QAM) of a respective set of OFDM carriers that transmit coded data in one of the sidebands of an ASB-COFDM signal, and the FIG. 27 Gray map governs quadrature amplitude modulation (QAM) of a respective set of OFDM carriers that transmit coded data in the other one of the sidebands of that ASB-COFDM signal. The patterns of labeling lattice points in these third and fourth Gray maps of square 64QAM symbol constellations respectively follow the first and second generic patterns of labeling lattice points depicted in FIGS. 22 and 23. Accordingly, the labeling diversity between FIG. 26 third Gray map and the FIG. 27 fourth Gray map can be used to minimize the PAPR of COFDM DCM signals and to support soft-bit maximal-ratio combining (SBMRC) in preferred receivers for COFDM DCM signals.

FIGS. 28 and 29 respectively depict fifth and sixth Gray maps of lattice points in 64QAM symbol constellations that the QAM mappers 71 and 72 respectively provide in a physical layer pipe in some COFDM DCM transmitter apparatuses embodying aspects of the invention. The FIG. 28 fifth Gray map positions the palindromic lattice-point labels 000000, 010010, 011110, 001100, 101101, 111111, 110011 and 100001 successively along a diagonal of the mapping crossing the −I, +Q and +I, −Q quadrants of that mapping. The FIG. 28 Gray map governs quadrature amplitude modulation (QAM) of a respective set of OFDM carriers that transmit coded data in one of the sidebands of an ASB-COFDM signal, and the FIG. 29 Gray map governs QAM of a respective set of OFDM carriers that transmit coded data in the other one of the sidebands of that ASB-COFDM signal. The patterns of labeling lattice points in these fifth and sixth Gray maps of square 64QAM symbol constellations respectively follow the first and second generic patterns of labeling lattice points depicted in FIGS. 22 and 23. Accordingly, the labeling diversity between FIG. 28 fifth Gray map and the FIG. 29 sixth Gray map can be used to minimize the PAPR of COFDM DCM signals and to support soft-bit maximal-ratio combining (SBMRC) in preferred receivers for COFDM DCM signals.

FIGS. 30 and 31 respectively depict first and second SCM maps of lattice points in 64QAM symbol constellations that the QAM mappers 71 and 72 respectively provide in a physical layer pipe in some COFDM DCM transmitter apparatuses embodying aspects of the invention. The FIG. 30 SCM map governs quadrature amplitude modulation (QAM) of a respective set of OFDM carriers that transmit coded data in one of the sidebands of an ASB-COFDM signal, and the FIG. 31 SCM map governs QAM of a respective set of OFDM carriers that transmit coded data in the other one of the sidebands of that ASB-COFDM signal. The patterns of labeling lattice points in these first and second SCM maps of square 64QAM symbol constellations respectively follow the first and second generic patterns of labeling lattice points depicted in FIGS. 22 and 23. Accordingly, the labeling diversity between FIG. 30 first SCM map and the FIG. 31 second SCM map can be used to minimize the PAPR of COFDM DCM signals and to support soft-bit maximal-ratio combining (SBMRC) in preferred receivers for COFDM DCM signals.

A pattern of labels of lattice points for an anti-Gray mapping of 64QAM symbol constellations can be derived from any Gray mapping according to a first method, wherein there is bit-complementing of labels that would be in the 1, 3, 5, 7, 10, 12, 14, 16, 17, 19, 21, 23, 26, 28, 30, 32, 33, 35, 37, 39, 42, 44, 46, 48, 49, 51, 53, 55, 58, 60, 62 and 64 positions in the FIG. 22 first generic pattern of labeling lattice points in 64QAM symbol constellations. Another pattern of labeling for anti-Gray mapping of lattice points in 64QAM symbol constellations can be derived from any Gray mapping according to a second method, wherein there is bit-complementing of labels that would be in the 2, 4, 6, 8, 9, 11, 13, 15, 18, 20, 22, 24, 25, 27, 29, 31, 34, 36, 38, 40, 41, 43, 45, 47, 50, 52, 54, 56, 57, 59, 61 and 63 positions in the FIG. 23 first generic pattern of labeling lattice points in 64QAM symbol constellations.

FIGS. 32 and 33 respectively depict first and second anti-Gray maps of lattice points in 64QAM symbol constellations that the QAM mappers 71 and 72 respectively provide in a physical layer pipe in some COFDM DCM transmitter apparatuses embodying aspects of the invention. The FIG. 32 first anti-Gray map is derived from the FIG. 24 first Gray map using the first derivation method described supra. The FIG. 32 anti-Gray map governs quadrature amplitude modulation (QAM) of a respective set of OFDM carriers that transmit coded data in one of the sidebands of an ASB-COFDM signal, and the FIG. 33 anti-Gray map governs quadrature amplitude modulation (QAM) of a respective set of OFDM carriers that transmit coded data in the other one of the sidebands of that ASB-COFDM signal. The patterns of labeling lattice points in these first and second anti-Gray maps of square 64QAM symbol constellations respectively follow the first and second generic patterns of labeling lattice points depicted in FIGS. 22 and 23. Accordingly, the labeling diversity between FIG. 32 and FIG. 33 anti-Gray maps can be used to minimize the PAPR of COFDM DCM signals and to support soft-bit maximal-ratio combining (SBMRC) in preferred receivers for COFDM DCM signals.

FIGS. 34 and 35 respectively depict third and fourth anti-Gray maps of lattice points in 64QAM symbol constellations that the QAM mappers 71 and 72 respectively provide in a physical layer pipe in some COFDM DCM transmitter apparatuses embodying aspects of the invention. The FIG. 34 third anti-Gray map is derived from the FIG. 24 first Gray map using the second derivation method described supra. The FIG. 34 anti-Gray map governs quadrature amplitude modulation (QAM) of a respective set of OFDM carriers that transmit coded data in one of the sidebands of an ASB-COFDM signal, and the FIG. 35 anti-Gray map governs quadrature amplitude modulation (QAM) of a respective set of OFDM carriers that transmit coded data in the other one of the sidebands of that ASB-COFDM signal. The patterns of labeling lattice points in these third and fourth anti-Gray maps of square 64QAM symbol constellations respectively follow the first and second generic patterns of labeling lattice points depicted in FIGS. 22 and 23. Accordingly, the labeling diversity between FIG. 34 and FIG. 35 anti-Gray maps can be used to minimize the PAPR of COFDM DCM signals and to support soft-bit maximal-ratio combining (SBMRC) in preferred receivers for COFDM DCM signals.

FIGS. 6 and 36 respectively depict first and third generic patterns of the labeling of lattice points of square 16QAM symbol constellations in respective half COFDM symbols in a COFDM DCM signal. The corresponding labels of lattice points in these first and third generic patterns exhibit a labeling diversity that supports soft-bit maximal-ratio combining (SBMRC) in preferred receivers for COFDM DCM signals, which receivers demodulate the asymmetric lower-frequency and upper-frequency halves of a COFDM DCM signal separately and subsequently diversity combine soft-bit results of the two demodulation procedures to recover coded data.

Furthermore, this labeling diversity is one preferred for reducing the PAPR of a COFDM DCM signal using different generic patterns of labeling lattice points of square 16QAM symbol constellations in first and second halves of each successive COFDM symbol. The energies of the labels A, D, M and P are each high in the FIG. 6 first generic pattern of labeling, owing to their outside corner positions therein. However, the energies of the labels A, D, M and P are each low in the FIG. 36 third generic pattern of labeling, so the instantaneous power of a COFDM DCM signal associated with any the labels A, D, M and P tends to be of an average value. The energies of the labels F, G, J and K are each high in the FIG. 36 third generic pattern of labeling, owing to their outside corner positions therein. However, the energies of the labels F, G, J and K are each low in the FIG. 6 first generic pattern of labeling, so the instantaneous power of a COFDM DCM signal associated with any the labels F, G, J and K also tends to be of an average value. The energies of the labels B, C, E, H, I, L, N and O are each of intermediate value in both the FIG. 6 and FIG. 36 generic patterns, so the instantaneous power of a COFDM DCM signal associated with any the labels B, C, E, H, I, L, N and O also tends to be of an average value.

The lattice-point labels A, B, E and F in the −I, +Q quadrant of the FIG. 6 first generic pattern of labeling appear in the +I, Q quadrant of the FIG. 36 third generic pattern of labeling. The lattice-point labels C, D, G and H in the +I, +Q quadrant of the FIG. 6 first generic pattern of labeling appear in the −I, −Q quadrant of the FIG. 36 third generic pattern of labeling. The lattice-point labels I, J, M and N in the −I, −Q quadrant of the FIG. 6 first generic pattern of labeling appear in the +I, +Q quadrant of the FIG. 36 third generic pattern of labeling. The lattice-point labels K, L, O and P in the +I, −Q quadrant of the FIG. 6 first generic pattern of labeling appear in the −I, +Q quadrant of the FIG. 36 third generic pattern of labeling. That is, the lattice point labels in any quadrant of the FIG. 6 first generic pattern of labeling appear in the antipodally opposed quadrant of the FIG. 36 third generic pattern of labeling. With regard to their A, D, F, G, J, K, M and P labels the first and third generic patterns of the lattice-point labeling of square 16QAM symbol constellations depicted in FIGS. 6 and 36 entail symmetric cancellation coding (SCC) to similar degree as was the case in regard to the first and second generic patterns of labeling depicted in FIGS. 6 and 7. Unlike the FIG. 7 second generic pattern of lattice-point labeling, the B, C, E, H, I, L, N and O labels in the FIG. 36 third generic pattern of the lattice-point labeling are not in exactly opposite phase with the corresponding B, C, E, H, I, L, N and O labels in the FIG. 6 first generic pattern of lattice-point labeling. However, the B, C, E, H, I, L, N and O labels in the FIG. 36 third generic pattern of the lattice-point labeling are disposed in quadrants diametrically opposite to the quadrants that the corresponding B, C, E, H, I, L, N and O labels are disposed in the FIG. 6 first generic pattern of lattice-point labeling. This reduces the likelihood of large peak power resulting from a long succession of one of the B, C, E, H, I, L, N and O labels occurring in the coded data. It also helps reduce peak power at the beginning of an OFDM symbol sampling period.

FIGS. 38 and 8 respectively depict seventh and first Gray maps of lattice points in 16QAM symbol constellations that the QAM mappers 71 and 72 respectively provide in a physical layer pipe in some COFDM DCM transmitter apparatuses embodying aspects of the invention. The FIG. 8 Gray map governs quadrature amplitude modulation (QAM) of a respective set of OFDM carriers that transmit coded data in one of the sidebands of an ASB-COFDM signal, and the FIG. 38 Gray map governs quadrature amplitude modulation (QAM) of a respective set of OFDM carriers that transmit coded data in the other one of the sidebands of that ASB-COFDM signal. Interestingly, similarly positioned map labels in these seventh and first Gray maps of square 16QAM symbol constellations are bit-complementary to each other. The patterns of labeling lattice points in these first and seventh Gray maps of square 16QAM symbol constellations respectively follow the first and third generic patterns of labeling lattice points depicted in FIGS. 6 and 36. Accordingly, the labeling diversity between FIG. 8 first Gray map and the FIG. 38 seventh Gray map can be used to minimize the PAPR of COFDM DCM signals and to support soft-bit maximal-ratio combining (SBMRC) in preferred receivers for COFDM DCM signals.

FIGS. 39 and 10 respectively depict eighth and third Gray maps of lattice points in 16QAM symbol constellations that the QAM mappers 71 and 72 respectively provide in a physical layer pipe in some COFDM DCM transmitter apparatuses embodying aspects of the invention. The FIG. 10 Gray map governs quadrature amplitude modulation (QAM) of a respective set of OFDM carriers that transmit coded data in one of the sidebands of an ASB-COFDM signal, and the FIG. 39 Gray map governs quadrature amplitude modulation (QAM) of a respective set of OFDM carriers that transmit coded data in the other one of the sidebands of that ASB-COFDM signal. Interestingly, similarly positioned map labels in these eighth and third Gray maps of square 16QAM symbol constellations are bit-complementary to each other. The patterns of labeling lattice points in these third and eighth Gray maps of square 16QAM symbol constellations respectively follow the first and third generic patterns of labeling lattice points depicted in FIGS. 6 and 36. Accordingly, the labeling diversity between FIG. 10 third Gray map and the FIG. 39 eighth Gray map can be used to minimize the PAPR of COFDM DCM signals and to support soft-bit maximal-ratio combining (SBMRC) in preferred receivers for COFDM DCM signals.

FIGS. 40 and 12 respectively depict ninth and fifth Gray maps of lattice points in 16QAM symbol constellations that the QAM mappers 71 and 72 respectively provide in a physical layer pipe in some COFDM DCM transmitter apparatuses embodying aspects of the invention. The FIG. 12 Gray map governs quadrature amplitude modulation (QAM) of a respective set of OFDM carriers that transmit coded data in one of the sidebands of an ASB-COFDM signal, and the FIG. 40 Gray map governs quadrature amplitude modulation (QAM) of a respective set of OFDM carriers that transmit coded data in the other one of the sidebands of that ASB-COFDM signal. Interestingly, similarly positioned map labels in these ninth and fifth Gray maps of square 16QAM symbol constellations are bit-complementary to each other. The patterns of labeling lattice points in these fifth and ninth Gray maps of square 16QAM symbol constellations respectively follow the first and third generic patterns of labeling lattice points depicted in FIGS. 6 and 36. Accordingly, the labeling diversity between FIG. 12 fifth Gray map and the FIG. 40 ninth Gray map can be used to minimize the PAPR of COFDM DCM signals and to support soft-bit maximal-ratio combining (SBMRC) in preferred receivers for COFDM DCM signals.

FIGS. 41 and 14 respectively depict third and first SCM maps of lattice points in 16QAM symbol constellations that the QAM mappers 71 and 72 respectively provide in a physical layer pipe in some COFDM DCM transmitter apparatuses embodying aspects of the invention. The FIG. 14 SCM map governs quadrature amplitude modulation (QAM) of a respective set of OFDM carriers that transmit coded data in one of the sidebands of an ASB-COFDM signal, and the FIG. 41 SCM map governs quadrature amplitude modulation (QAM) of a respective set of OFDM carriers that transmit coded data in the other one of the sidebands of that ASB-COFDM signal. The patterns of labeling lattice points in these first and third SCM maps of square 16QAM symbol constellations respectively follow the first and third generic patterns of labeling lattice points depicted in FIGS. 6 and 36. Accordingly, the labeling diversity between FIG. 14 first SCM map and the FIG. 41 third SCM map can be used to minimize the PAPR of COFDM DCM signals and to support soft-bit maximal-ratio combining (SBMRC) in preferred receivers for COFDM DCM signals.

FIGS. 42 and 16 respectively depict fifth and first anti-Gray maps of lattice points in 16QAM symbol constellations that the QAM mappers 71 and 72 respectively provide in a physical layer pipe in some COFDM DCM transmitter apparatuses embodying aspects of the invention. The FIG. 16 anti-Gray map governs quadrature amplitude modulation (QAM) of a respective set of OFDM carriers that transmit coded data in one of the sidebands of an ASB-COFDM signal, and the FIG. 42 anti-Gray map governs QAM of a respective set of OFDM carriers that transmit coded data in the other one of the sidebands of that ASB-COFDM signal. Interestingly, similarly positioned map labels in these fifth and first anti-Gray maps of square 16QAM symbol constellations are bit-complementary to each other. Furthermore, the FIG. 42 fifth anti-Gray map corresponds to the FIG. 18 third anti-Gray map. The patterns of labeling lattice points in these first and fifth anti-Gray maps of square 16QAM symbol constellations respectively follow the first and third generic patterns of labeling lattice points depicted in FIGS. 6 and 36. Accordingly, the labeling diversity between FIG. 16 and FIG. 42 anti-Gray maps can be used to minimize the PAPR of COFDM DCM signals and to support soft-bit maximal-ratio combining (SBMRC) in preferred receivers for COFDM DCM signals.

FIGS. 43 and 18 respectively depict sixth and third anti-Gray maps of lattice points in 16QAM symbol constellations that the QAM mappers 71 and 72 respectively provide in a physical layer pipe in some COFDM DCM transmitter apparatuses embodying aspects of the invention. The FIG. 18 anti-Gray map governs quadrature amplitude modulation (QAM) of a respective set of OFDM carriers that transmit coded data in one of the sidebands of an ASB-COFDM signal, and the FIG. 43 anti-Gray map governs QAM of a respective set of OFDM carriers that transmit coded data in the other one of the sidebands of that ASB-COFDM signal. Interestingly, similarly positioned map labels in these sixth and third anti-Gray maps of square 16QAM symbol constellations are bit-complementary to each other. Furthermore, the FIG. 43 sixth anti-Gray map corresponds to the FIG. 16 first anti-Gray map. The patterns of labeling lattice points in these third and sixth anti-Gray maps of square 16QAM symbol constellations respectively follow the first and third generic patterns of labeling lattice points depicted in FIGS. 6 and 36. Accordingly, the labeling diversity between FIG. 18 and FIG. 19 anti-Gray maps can be used to minimize the PAPR of COFDM DCM signals and to support soft-bit maximal-ratio combining (SBMRC) in preferred receivers for COFDM DCM signals.

FIG. 37 depicts a third generic pattern of labeling the lattice points of square 64QAM symbol constellations, as used in QAM symbols in a second half of COFDM symbols in a COFDM DCM signal. The corresponding labels of lattice points in these first and third generic patterns exhibit a labeling diversity that supports soft-bit maximal-ratio combining (SBMRC) in preferred receivers for COFDM DCM signals, which receivers demodulate the asymmetric lower- and upper-frequency halves of a COFDM DCM signal separately and subsequently diversity combine soft-bit results of the two demodulation procedures to recover coded data. Furthermore, this labeling diversity is one preferred for reducing the PAPR of a COFDM DCM signal using different generic patterns of labeling lattice points of square 64QAM symbol constellations in first and second halves of each successive COFDM symbol. The combined powers for a pair of corresponding labels in the FIG. 22 and FIG. 37 generic patterns will vary somewhat, however, depending on the positions of those labels within those first and third generic patterns.

FIGS. 44 and 24 respectively depict seventh and first Gray maps of lattice points in 64QAM symbol constellations that the QAM mappers 71 and 72 respectively provide in a physical layer pipe in some COFDM DCM transmitter apparatuses embodying aspects of the invention. The FIG. 24 Gray map governs quadrature amplitude modulation (QAM) of a respective set of OFDM carriers that transmit coded data in one of the sidebands of an ASB-COFDM signal, and the FIG. 44 Gray map governs QAM of a respective set of OFDM carriers that transmit coded data in the other one of the sidebands of that ASB-COFDM signal. The patterns of labeling lattice points in these first and seventh Gray maps of square 64QAM symbol constellations respectively follow the first and third generic patterns of labeling lattice points depicted in FIGS. 22 and 37. Accordingly, the labeling diversity between FIG. 24 first Gray map and the FIG. 44 seventh Gray map can be used to minimize the PAPR of COFDM DCM signals and to support soft-bit maximal-ratio combining (SBMRC) in preferred receivers for COFDM DCM signals.

FIGS. 45 and 30 respectively depict third and first SCM maps of lattice points in 64QAM symbol constellations that the QAM mappers 71 and 72 respectively provide in a physical layer pipe in some COFDM DCM transmitter apparatuses embodying aspects of the invention. The FIG. 30 SCM map governs quadrature amplitude modulation (QAM) of a respective set of OFDM carriers that transmit coded data in one of the sidebands of an ASB-COFDM signal, and the FIG. 45 SCM map governs QAM of a respective set of OFDM carriers that transmit coded data in the other one of the sidebands of that ASB-COFDM signal. The patterns of labeling lattice points in these first and third SCM maps of square 64QAM symbol constellations respectively follow the first and third generic patterns of labeling lattice points depicted in FIGS. 22 and 37. Accordingly, the labeling diversity between FIG. 30 first SCM map and the FIG. 45 third SCM map can be used to minimize the PAPR of COFDM DCM signals and to support soft-bit maximal-ratio combining (SBMRC) in preferred receivers for COFDM DCM signals.

FIGS. 46 and 32 respectively depict fifth and first anti-Gray maps of lattice points in 64QAM symbol constellations that the QAM mappers 71 and 72 respectively provide in a physical layer pipe in some COFDM DCM transmitter apparatuses embodying aspects of the invention. The FIG. 32 anti-Gray map governs quadrature amplitude modulation (QAM) of a respective set of OFDM carriers that transmit coded data in one of the sidebands of an ASB-COFDM signal, and the FIG. 46 anti-Gray map governs quadrature amplitude modulation (QAM) of a respective set of OFDM carriers that transmit coded data in the other one of the sidebands of that ASB-COFDM signal. The patterns of labeling lattice points in these first and fifth anti-Gray maps of square 64QAM symbol constellations respectively follow the first and third generic patterns of labeling lattice points depicted in FIGS. 22 and 37. Accordingly, the labeling diversity between the FIG. 32 and FIG. 46 anti-Gray maps can be used to minimize the PAPR of COFDM DCM signals and to support soft-bit maximal-ratio combining (SBMRC) in preferred receivers for COFDM DCM signals.

FIGS. 47 and 34 respectively depict sixth and third anti-Gray maps of lattice points in 64QAM symbol constellations that the QAM mappers 71 and 72 respectively provide in a physical layer pipe in some COFDM DCM transmitter apparatuses embodying aspects of the invention. The FIG. 34 anti-Gray map governs quadrature amplitude modulation (QAM) of a respective set of OFDM carriers that transmit coded data in one of the sidebands of an ASB-COFDM signal, and the FIG. 46 anti-Gray map governs quadrature amplitude modulation (QAM) of a respective set of OFDM carriers that transmit coded data in the other one of the sidebands of that ASB-COFDM signal. The patterns of labeling lattice points in these third and sixth anti-Gray maps of square 64QAM symbol constellations respectively follow the first and third generic patterns of labeling lattice points depicted in FIGS. 22 and 37. Accordingly, the labeling diversity between the FIG. 34 and FIG. 47 anti-Gray maps can be used to minimize the PAPR of COFDM DCM signals and to support soft-bit maximal-ratio combining (SBMRC) in preferred receivers for COFDM DCM signals.

FIGS. 48, 49, 50 and 51 depict respective quadrants of a first Gray mapping of square 256QAM symbol constellations, as prescribed in the DVB-T2 Standards for Digital Video Broadcasting. FIGS. 52, 53, 54 and 55 depict respective quadrants of a second Gray mapping of square 256QAM symbol constellations with lattice-point labels positioned to provide labeling diversity from the first Gray mapping of 256QAM symbol constellations depicted in FIGS. 48-51, which second Gray mapping of 256QAM symbol constellations is preferred for reducing PAPR of a COFDM DCM signal using that first Gray mapping of 256QAM symbol constellations with another (e. g., the second) Gray mapping of 256QAM symbol constellations.

The labeling of lattice points of the second Gray map of 256QAM depicted in FIGS. 52-55 can be generated by the following procedure, proceeding from the labeling of the lattice points of the first Gray map of 256QAM depicted in FIGS. 48-51. The FIG. 48 −I,+Q quadrant of the first Gray map is flipped over by rotating it 180° about its diagonal axis running through the lattice points 10010000 and 10100000. The FIG. 49 +I,+Q quadrant of the first Gray map is flipped over by rotating it 180° about its diagonal axis running through the lattice points 00100000 and 00001000. The FIG. 50 +I,−Q quadrant of the first Gray map is flipped over by rotating it 180° about its diagonal axis running through the lattice points 01010000 and 01100000. The FIG. 51 −I,−Q quadrant of the first Gray map is flipped over by rotating it 180° about its diagonal axis running through the lattice points 11100010 and 11010000. These foregoing steps of the procedure average out the power of lattice points in the original and modified maps of FIGS. 48-51, so the PAPR of COFDM DCM signals that use the original and modified maps of FIGS. 48-51 is substantially lower than the PAPR of DSB-COFDM signals that use just one of the original and modified maps of FIGS. 48-51 in both its lower and upper sidebands. The second Gray map of 256QAM symbol constellations is generated by rotating the modified first Gray map in the mapping plane by 180° around its zero-modulation center. The 180° rotation of the modified first Gray map is an application of the symmetric cancellation coding (SCC) technique, which reduces by a fraction of a decibel the PAPR of COFDM DCM signals using the first and second Gray maps of 256QAM symbol constellations as compared to the PAPR of COFDM DCM signals using the original and modified first Gray maps of 256QAM symbol constellations.

A person skilled in the art of COFDM signal design is apt to recognize that any of the pairs of mapping patterns with preferred labeling diversity as described supra can be modified similarly in various ways without impairing that preferred labeling diversity between them. Two mapping patterns with preferred labeling diversity between them can each be rotated the same amount around its center in the mapping plane, for example. By way of further example, two mapping patterns with preferred labeling diversity between them can each be flipped over similarly in the mapping plane. The order of bits in the map labels of the two maps can all be modified the same way, without impairing preferred labeling diversity between the two mappings. Also, pairs of 256QAM maps with preferred labeling diversity to reduce PAPR of a COFDM DCM signal can be used that use SCM mapping or anti-Gray mapping. The precepts concerning the design of maps for square 16QAM symbol constellations and square 64QAM symbol constellations can be extended to designing maps for square 256QAM symbol constellations and even larger square QAM symbol constellations.

Figure 56:
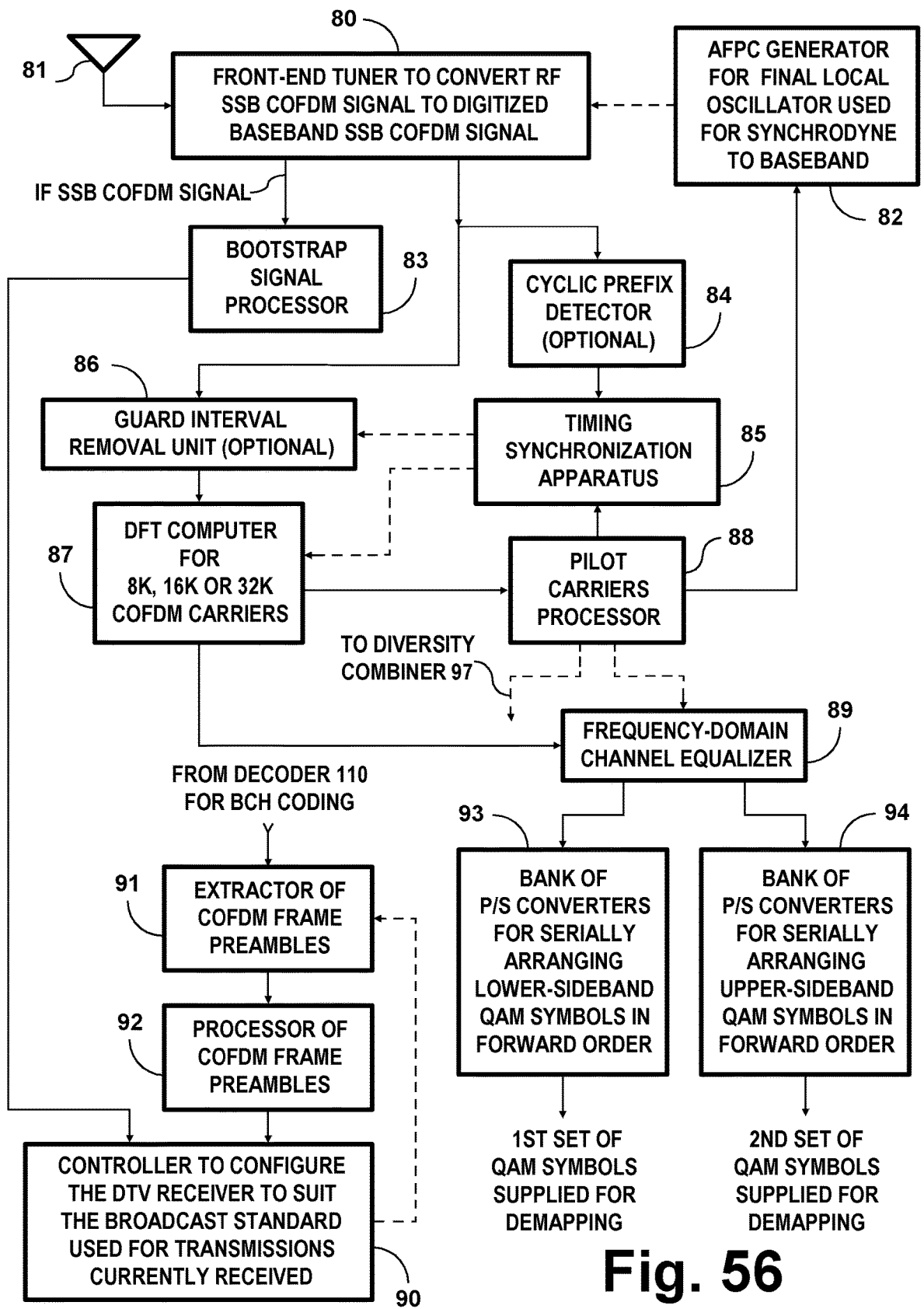
FIGS. 56 and 57 together form a schematic diagram of the general structure of single-sideband receiver apparatus adapted for receiving COFDM DCM signals.

FIG. 56 shows the initial portion of a receiver designed for iterative-diversity reception of COFDM signals as transmitted at VHF or UHF by a DTV transmitter, such as the one depicted in FIGS. 1, 2 and 3. A front-end tuner 80 of the receiver selects its input signal from one of the radio-frequency (RF) signals captured by a reception antenna 81. The front-end tuner 80 can be of a double-conversion type composed of initial single-conversion super-heterodyne receiver circuitry for converting the selected RF single-sideband COFDM signal to an intermediate-frequency (IF) single-sideband COFDM signal followed by circuitry for performing a final conversion of that IF COFDM signal to baseband single-sideband COFDM signal. The initial conversion circuitry typically comprises a tunable RF amplifier for RF single-sideband COFDM signal incoming from the reception antenna, a tunable first local oscillator, a first mixer for heterodyning the amplified RF single-sideband COFDM signal with local oscillations from the first local oscillator to obtain the IF single-sideband COFDM signal, and an intermediate-frequency (IF) amplifier for the IF single-sideband COFDM signal. Typically, the front-end tuner 80 further includes a synchronous demodulator for performing the final conversion from IF single-sideband COFDM signal to baseband single-sideband COFDM signal and an analog-to-digital converter for digitizing that baseband signal. Synchronous demodulation circuitry typically comprises a final local oscillator with automatic frequency and phase control (AFPC) of its oscillations, a second mixer for synchrodyning amplified IF single-sideband COFDM signal with local oscillations from the final local oscillator to obtain the baseband single-sideband COFDM signal, and a low-pass filter for suppressing image signal accompanying the baseband single-sideband COFDM signal. In some designs of the front-end tuner 80, synchronous demodulation is performed in the analog regime before subsequent analog-to-digital conversion of the resulting complex baseband single-sideband COFDM signal. In other designs of the front-end tuner 80, analog-to-digital conversion is performed before synchronous demodulation is performed in the digital regime.

Simply stated, the front-end tuner 80 converts radio-frequency single-sideband COFDM signal received at its input port to digitized samples of baseband single-sideband COFDM signal supplied from its output port. Typically, the digitized samples of the real component of the baseband single-sideband COFDM signal are alternated with digitized samples of the imaginary component of that baseband signal for arranging the complex baseband single-sideband COFDM signal in a single stream of digital samples. FIG. 56 depicts an AFPC generator 82 for generating the automatic frequency and phase control (AFPC) signal for controlling the final local oscillator within the front-end tuner 80.

The output port of the front-end tuner 80 is connected for supplying digitized samples of baseband single-sideband COFDM signal to the respective input ports of a bootstrap signal processor 83 and a cyclic prefix detector 84. The cyclic prefix detector 84 differentially combines the digitized samples of baseband single-sideband COFDM signal with those samples as delayed by the duration of an effective COFDM symbol. Nulls in the difference signal so generated should occur, marking the guard intervals of the baseband single-sideband COFDM signal. The nulls are processed to reduce any corruption caused by noise and to generate better-defined indications of the phasing of COFDM symbols. The output port of the cyclic prefix detector 84 is connected to supply these indications to a first of two input ports of timing synchronization apparatus 85.

A first of two output ports of the timing synchronization apparatus 85 is connected for supplying gating control signal to the control input port of a guard-interval-removal unit 86, the signal input port of which is connected for receiving digitized samples of baseband COFDM signal from the output port of the front-end tuner 80. The output port of the guard-interval-removal unit 86 is connected for supplying the input port of discrete-Fourier-transform computer 87 with windowed portions of the baseband single-sideband COFDM signal that contain effective COFDM samples. A second of the output ports of the timing synchronization apparatus 85 is connected for supplying the DFT computer 87 with synchronizing information concerning the effective COFDM samples.

The indications concerning the phasing of COFDM symbols that the cyclic prefix detector 84 supplies to the timing synchronization apparatus 85 are sufficiently accurate for initial windowing of a baseband single-sideband COFDM signal that the guard-interval-removal unit 86 supplies to the DFT computer 87. A first output port of the DFT computer 87 is connected for supplying demodulation results for at least all of the pilot carriers in parallel to the input port of a pilot carriers processor 88, and a second output port of the DFT computer 87 is connected for supplying demodulation results for each of the COFDM carriers to the input port of a frequency-domain channel equalizer 89. The processor 88 selects the demodulation results concerning pilot carriers for processing, part of which processing generates weighting coefficients for channel equalization filtering in the frequency domain. A first of four output ports of the processor 88 that are explicitly shown in FIG. 56 is connected for supplying these weighting coefficients (via wiring depicted as a dashed-line connection) to the frequency-domain channel equalizer 89, which uses those weighting coefficients for adjusting its responses to the demodulation results for each of the COFDM carriers.

A second of the output ports of the pilot carriers processor 88 that are explicitly shown in FIG. 56 is connected for supplying more accurate window-positioning information to the second input port of the timing synchronization apparatus 85. This window-positioning information is an adjustment generated by a feedback loop that seeks to minimize the noise accompanying pilot carriers, which noise increases owing to intercarrier interference from adjoining modulated carriers when window positioning is not optimal.

A third of the output ports of the pilot carriers processor 88 explicitly shown in FIG. 56 is connected for forwarding unmodulated pilot carriers to the input port of the AFPC generator 82. The real components of the unmodulated pilot carriers are multiplied by their respective imaginary components in the AFPC generator 82. The resulting products are summed and low-pass filtered to develop the AFPC signal that the AFPC generator 82 supplies to the front-end tuner 80 for controlling the final local oscillator therein. Other methods to develop AFPC signals for the final local oscillator in the front-end tuner 80 are also known, variants of which can replace or supplement the method described above.

E.g., the complex digital samples from the tail of each half OFDM symbol are multiplied by the conjugates of corresponding digital samples from the cyclic prefix of the half OFDM symbol. The resulting products are summed and low-pass filtered to develop the AFPC signal that the AFPC generator 82 supplies to the front-end tuner 80 for controlling the final local oscillator therein. This method is a variant of a known method to develop AFPC signals in receivers for double-sideband COFDM signals described in U.S. Pat. No. 5,687,165 titled "Transmission system and receiver for orthogonal frequency-division multiplexing signals, having a frequency-synchronization circuit", which was granted to Flavio Daffara and Ottavio Adami on 11 Nov. 1997.

Figure 57:
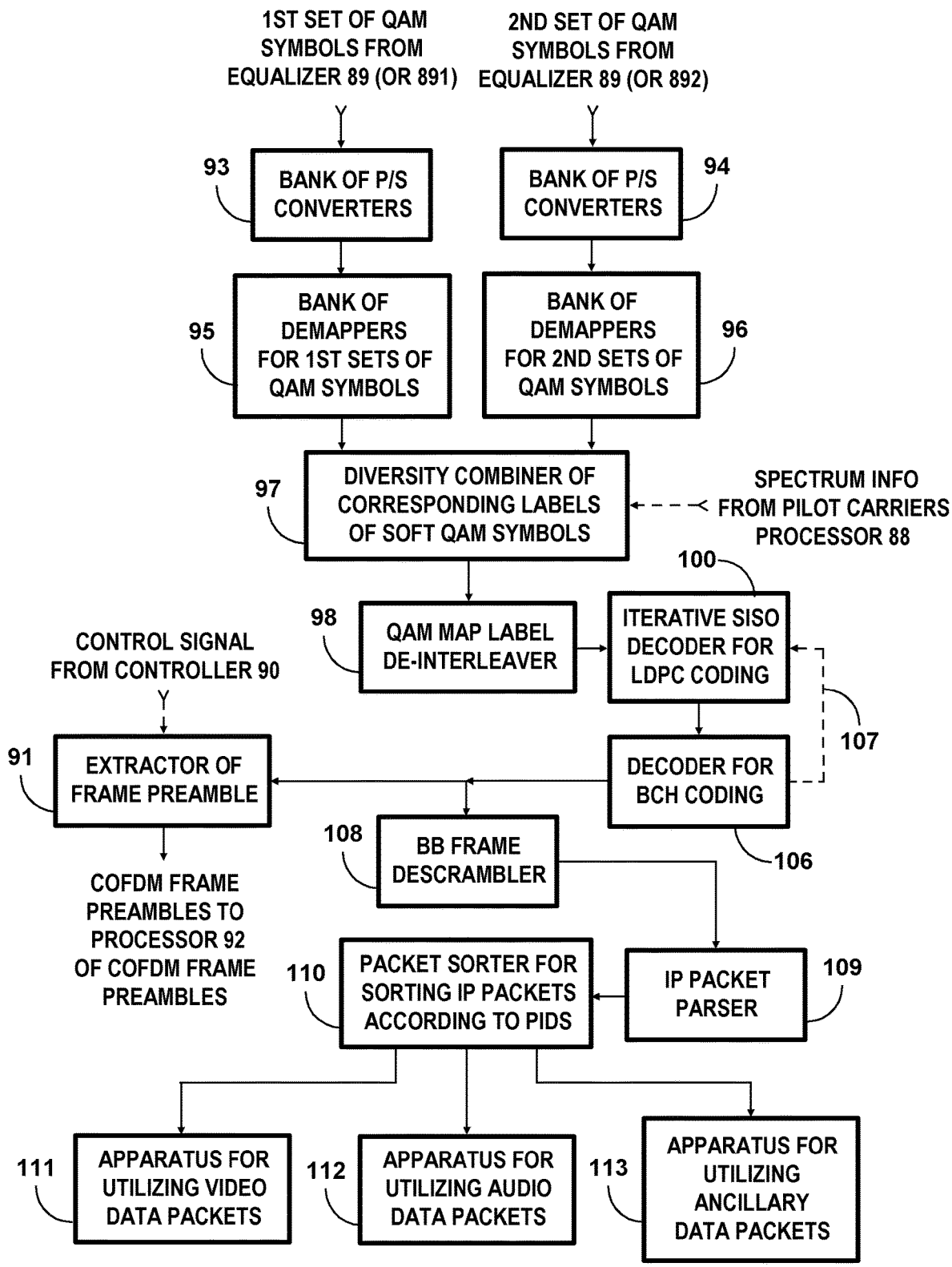

FIG. 56 indicates that a fourth of the output ports of the pilot carriers processor 88 is connected to a diversity combiner 97 (depicted in FIG. 57). Through such connection the pilot carriers processor 88 furnishes information concerning the frequency spectrum of each successive COFDM symbol, which the diversity combiner 97 can use to determine how it will combine its input signals to generate its output signal.

The DFT computer 87 is configured so it can demodulate any one of 8K, 16K and 32K options as to the number of OFDM carriers. The correct option is chosen responsive to an instruction from a controller 90 that generates a number of instructions used to configure the COFDM receiver to suit the broadcast standard used transmissions currently received. To keep the drawings from being too cluttered to be easily understood, they do not explicitly illustrate the multitudinous connections from the controller 90 to the elements of the receiver controlled by respective instructions from the controller 90.

As noted supra, the second output port of the DFT computer 87 is connected to supply demodulated complex digital samples of the complex coordinates of QAM symbol constellations in parallel to the input port of the frequency-domain channel equalizer 89. To implement a simple form of frequency-domain channel equalization, the pilot carriers processor 88 measures the amplitudes of the demodulated pilot carriers to determine basic weighting coefficients for various portions of the frequency spectrum. The pilot carriers processor 88 then interpolates among the basic weighting coefficients to generate respective weighting coefficients supplied to the frequency-domain channel equalizer 89 with which to multiply the complex coordinates of QAM symbol constellations supplied from the DFT computer 87. Various alternative types of frequency-domain channel equalizer are also known.

An extractor 91 of COFDM frame preambles selects them from COFDM frames of decoded data supplied from a decoder 106 for BCH coding, which decoder 106 is depicted in FIG. 53. The output port of the extractor 91 of COFDM frame preambles connects to the input port of a processor 92 of the COFDM frame preambles. The controller 90 is connected for responding to elements of COFDM frame preambles forwarded to a second of its input ports from an output port of the COFDM frame preambles processor 92.

The controller 90 is connected for responding to elements of the bootstrap signal forwarded to a first of its input ports from an output port of the bootstrap signal processor 83. The controller 90 supplies COFDM data frame information to the pilot carriers processor 88, which data frame information can be generated responsive to baseband bootstrap signal that the bootstrap signal processor supplies to the controller 90. Since the bootstrap signal is not always received acceptably free of error, it is good design to provide a source alternative to the bootstrap signal processor 83 for supplying the controller 90 back-up information as to the nature of received DTV signal. Such a source is necessary if bootstrap signal is not transmitted or if the receiver does not include a bootstrap signal processor. Accordingly the response of a decoder 106 for BCH coding, which decoder 106 is depicted in FIG. 57, is supplied to input port of an extractor 91 of FEC frame preambles from the decoder 106 response. If the frame preamble at the beginning of each COFDM data frame is repeated, the extractor 91 readily detects when frame preambles occur by correlating successive COFDM symbols in the response from the decoder 106 in accordance with the well-known Schmidl-Cox method. The output port of the extractor 91 of FEC frame preambles is connected for supplying them to the input port of a processor 92 of COFDM frame preambles. The output port of the processor 92 of COFDM frame preambles is connected for supplying an input port of the controller 90 with information as to the nature of received DTV signal, the interconnection between which ports may comprise a plurality of separate connections. FIG. 56 shows a connection from the controller 90 to the extractor 91 of FEC frame preambles through which connection the controller 90 can supply the extractor 91 a control signal including predictions of when FEC frame preambles are expected to occur.

Responsive to information supplied from the bootstrap signal processor 83 or from the processor 92 of COFDM frame preambles, the controller 90 prescribes the basic sample rate and the size of I-FFT that the controller 90 instructs the DFT computer 87 to use in its operation regarding DTV signal. The controller 90 instructs the channel equalizer 89 and the banks 93 and 94 of parallel-input/serial-output converters to configure themselves to suit the size of DFT that the controller 90 instructs the DFT computer 87 to generate.

The frequency-domain channel equalizer 89 is connected for supplying complex coordinates of the QAM symbol constellations from the lower-frequency half COFDM symbol, in parallel and in forward spectral order, to the bank 93 of parallel-to-serial (P/S) converters. One of these P/S converters as selected by the controller 90 supplies the complex coordinates of a first set of QAM symbol constellations extracted from the lower-frequency halves of successive COFDM symbols. The frequency-domain channel equalizer 89 is further connected for supplying complex coordinates of the QAM symbol constellations from the higher-frequency half COFDM symbol, in parallel and in forward spectral order, to the bank 94 of parallel-to-serial (P/S) converters. One of these P/S converters as selected by the controller 90 supplies the complex coordinates of a second set of QAM symbol constellations extracted from the higher-frequency halves of successive COFDM symbols. "Forward spectral order" refers to the complex coordinates of each successive QAM symbol constellation from a half COFDM symbol having been conveyed by the COFDM subcarrier next higher in frequency than that having conveyed its predecessor QAM symbol. Each of the banks 93 and 94 of P/S converters comprises respective P/S converters that are appropriate for half the number of OFDM carriers that can convey data in a COFDM symbol of prescribed size. The pair of P/S converters selected for current reception is determined by a control signal that the controller 90 supplies in common to each of the banks 93 and 94 of P/S converters.

The first sets of QAM symbol constellations are those that originate from the first mapping procedures in the COFDM transmitter apparatus and are supplied from the output port of the bank 93 of P/S converters to the input port of a bank 95 of demappers for the first sets of QAM symbol constellations, as depicted in FIG. 57. The second sets of QAM symbol constellations are those that originate from the second mapping procedures in the COFDM transmitter apparatus and are supplied from the output port of the bank 94 of P/S converters to the input port of a bank 96 of demappers for the second sets of QAM symbol constellations, as depicted in FIG. 57. Each of the banks 95 and 96 of demappers comprises a respective set of QAM demappers for different sizes of QAM symbol constellations—e.g., one for square 16QAM, one for square 64QAM, one for square 256QAM, and possibly one for larger-size square QAM or for APSK. The pair of demappers selected for current reception is determined by a control signal that the controller 90 supplies in common to each of the banks 95 and 96 of QAM demappers.

The pairs of QAM demappers in the banks 95 and 96 of demappers could be paired Gray demappers, paired SCM demappers, paired natural demappers, paired anti-Gray demappers, paired "optimal" demappers of various types or some mixture of those types of paired demappers. However, if the demapping results from the antiphase-energy QAM demappers are to be maximal-ratio combined at bit level to improve effective SNR for AWGN reception, it is strongly recommended that QAM symbol constellations be Gray mapped or SCM mapped. It is practical for each of the QAM demappers to constitute a plurality of read-only memories (ROMs), one for each bit of map labeling, addressed by the complex coordinates descriptive of the current QAM symbol. Each ROM is read to provide a "hard" bit followed by a confidence factor indicating how likely that bit is to be correct. Customarily these confidence factors are expressed as logarithm of likelihood ratios (LLRs). The order of bits in a pair of Gray or SCM lattice-point labels can be similarly shuffled from ones depicted in FIGS. 6-41 to facilitate alternative demapping procedures that demap the in-phase and quadrature-phase components of QAM symbols separately from each other.

The confidence factors are usually based, at least in substantial part, on judgments of the distance of the complex coordinates descriptive of the current QAM symbol from the edges of the bin containing the "hard" bit. The confidence factors can be further based on whether or not the bin containing the "hard" bit is at an edge of the current QAM symbol constellation and, if so, whether the complex coordinates descriptive of that current QAM symbol closely approach that edge or even pass beyond it. The confidence factor that the "hard" bit is correct is increased if the complex coordinates descriptive of that current QAM symbol closely approach a symbol constellation edge or even pass beyond it. This increase applies to all bits in the map label. This effect obtains if mapping of QAM symbol constellations is Gray mapping or is SCM mapping.

FIG. 57 shows connections from the output ports of the banks 95 and 96 of demappers to respective input ports of a diversity combiner 97 of corresponding soft QAM labels operative at bit level. Each soft QAM label is composed of a plurality of "soft" bits. Each of these "soft" bits constitutes a "hard" bit and a confidence factor that that "hard" bit has been correctly decided; this confidence factor is conventionally expressed as a logarithm of likelihood ratio (LLR). This information is utilized in subsequent soft decoding procedures of the FEC coding reproduced in interleaved form from the diversity combiner 97. The output port of the diversity combiner 97 serially supplies soft bits of successive QAM labels to the input port of a bit de-interleaver 98 as soft bits of interleaved LDPC coding.

FIG. 57 shows the read-output port of the QAM map label de-interleaver 98 connected to the input port of an iterative soft-input/soft-output (SISO) decoder 100 for LDPC coding. FIG. 57 further shows the output port of the decoder 100 connected for supplying the results of its decoding LDPC coding to the input port of a decoder 106 of BCH coding. FIG. 57 shows a control connection 107 from the decoder 106 of BCH coding back to the decoder 100 of LDPC coding, through which connection 107 the decoder 106 sends an indication of when it has decoded a correct BCH codeword. This indication signals the decoder 100 of LDPC coding that it can discontinue iterative decoding before reaching a limit on the maximum number of iterations permitted, which early discontinuation of iterative decoding conserves power consumption by the receiver. The output port of the decoder 106 is connected for supplying the results of its decoding BCH coding to the input port of a BB Frame descrambler 108, which includes a de-jitter buffer and null-packet re-inserter that are not explicitly shown in FIG. 57.

FIG. 57 shows the output port of the BB Frame descrambler 108 connected to supply IP packets to the input port of an internet-protocol packet parser 109. The output port of the IP packet parser 109 is connected to supply IP packets to a packet sorter 110 for sorting IP packets according to their respective packet identifiers (PIDs) to one of the respective input ports of apparatus 111 for utilizing video data packets, apparatus 112 for utilizing audio data packets, and apparatus 113 for utilizing ancillary data packets.

FIG. 57 depicts a single SISO decoder 100 for LDPC coding in cascade connection with a single decoder 106 for BCH coding thereafter. In actual practice there are apt to be at least two such cascade connections available, suitable to respective different sizes of FEC code blocks, with one of these cascade connections selected for supplying decoded data to the input port of the BB frame descrambler 108 in accordance with instructions from the controller 90. Alternatively, decoders for other types of FEC coding replace the decoders 100 and 106 in other receiver apparatus embodying aspects of the invention. For example, a cascade connection of decoders for concatenated RS and turbo coding is used instead of the cascade connection of decoders 100 and 106.

Not all COFDM communication systems will concatenate BCH coding and LDPC coding. Cyclic redundancy check (CRC) coding can be used instead of BCH coding for detecting the successful conclusion of LDPC decoding. In such case, the general structure of COFDM receiver apparatus depicted in FIGS. 56 and 57 is modified to replace the decoder 106 for BCH coding with a decoder for CRC coding. However, unlike the decoder 106 for BCH coding, the decoder for CRC coding will be in capable of correcting remnant errors from iterative decoding of LDPC coding. LDPC coding that lends itself to being successfully decoded in a few iterations will allow the decoder 106 to be replaced by direct connection from the SISO decoder 100 to the input port of the BB Frame descrambler 108. The LDPC block coding that has customarily been used in DTV broadcasting can be replaced with LDPC convolutional coding. Forward-error-correction coding can be used that does not incorporate LDPC coding at all. The techniques for PAPR reduction using single-time retransmission can be applied if multi-level coding (MLC) is used, rather than bit-interleaved coded modulation (BICM). If MLC is used, there is less reason to consider replacing uniform QAM of OFDM carriers with non-uniform QAM than there is for BICM. (Incidentally, convolutional LDPC coding is better adapted to MLC than is block LDPC coding.)

Figure 58:
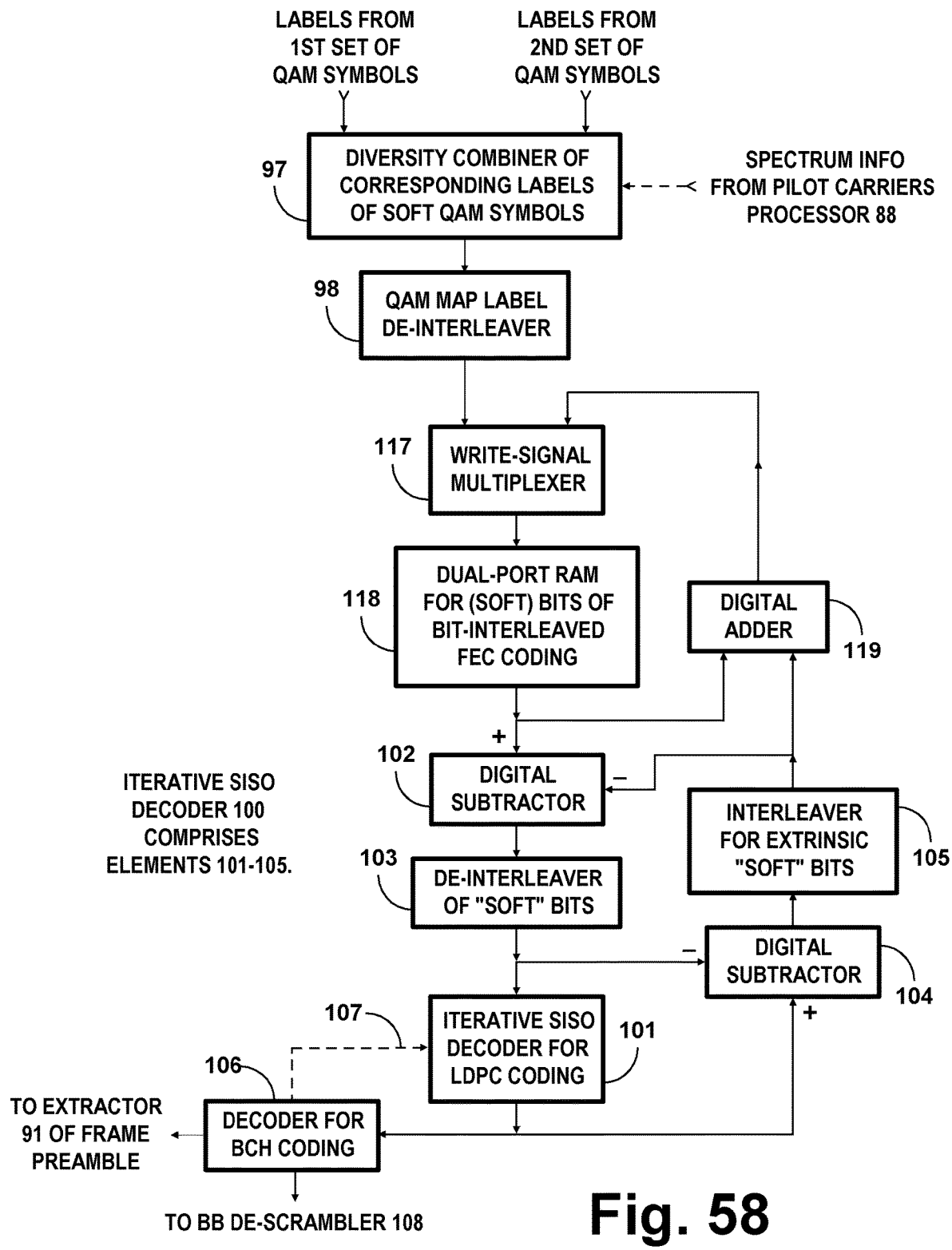
FIG. 58 is a detailed schematic diagram of modifications made to the receiver apparatus shown in FIG. 57 to arrange for performing soft-demapping and soft-decoding procedures iteratively in accordance with the "turbo" principle.

FIG. 58 is a detailed schematic diagram of modifications made to the receiver apparatus shown in FIG. 57. FIG. 58 depicts the iterative SISO decoder 100 for bit-interleaved LDPC coding in further detail as comprising an iterative SISO decoder 101 for LDPC coding, a digital subtractor 102, a de-interleaver 103 of "soft" bits, a digital subtractor 104 and an interleaver 105 for extrinsic "soft" bits. FIG. 58 further depicts a write-signal multiplexer 117, a dual-port random-access memory 118 and a digital adder 119 arranged to cooperate with demappers of QAM symbols to perform soft-demapping and soft-decoding procedures iteratively in accordance with the "turbo" principle. U.S. Pat. No. 6,353,911 titled "Iterative demapping" granted 5 Mar. 2002 to Stefan ten Brink provides generic description of an arrangement for performing such soft-demapping and soft-decoding procedures, which arrangement includes an adaptive QAM demapper. A question that arises with regard to a receiver which includes two QAM demappers, one for the lower sideband of an COFDM DCM signal and the other for its upper sideband, concerns how adaptive demapping can be implemented.

FIG. 58 shows the output port of the diversity combiner 97 connected via the QAM map label de-interleaver 98 to a first of two input ports of the write-signal multiplexer 117. The output port of the multiplexer 117 connects to the write-input port of the dual-port random-access memory 118. The diversity combiner 97 periodically supplies soft bits of time-interleaved LDPC-coded data to the input port of the QAM map label de-interleaver 98. The de-interleaver 98 response is supplied to a first input port of the write-signal multiplexer 117, thence to be written into the dual-port RAM 118 via its write-input port. The read-output port of the dual-port RAM 118 connects to a first addend-input port of the digital adder 119, the second addend-input port of which adder 119 is connected for receiving a bit-interleaved extrinsic error signal. The sum output port of the adder 119 connects to the second of the two input ports of the write-signal multiplexer 117.

The read-output port of the dual-port RAM 118 is further connected for supplying a posteriori soft demapping results to the minuend-input port of the digital subtractor 102. The subtrahend-input port of the digital subtractor 102 is connected for receiving the bit-interleaved extrinsic error signal from the output port of the interleaver 105 for extrinsic "soft" bits. The difference output port of the digital subtractor 102 connects to the input port of the de-interleaver 103 for bit-interleaved soft bits. The output port of the de-interleaver 103 connects to the input port of the soft-input/soft-output (SISO) decoder 101 for LDPC coding and further connects to the subtrahend input port of the digital subtractor 104. The minuend input port of the subtractor 104 is connected to receive the soft bits of decoding results from the output port of the SISO decoder 101. The subtractor 104 generates soft extrinsic data bits by comparing the soft output bits supplied from the SISO decoder 101 with soft input bits supplied to the SISO decoder 101. The output port of the subtractor 104 is connected to supply these soft extrinsic data bits to the input port of the bit-interleaver 105, which is complementary to the de-interleaver 103. The output port of the bit-interleaver 105 is connected for feeding back bit-interleaved soft extrinsic data bits to the second addend-input port of the digital adder 119, therein to be additively combined with previous a posteriori soft demapping results read from the dual-port RAM 118 to generate updated a priori soft demapping results to write over the previous ones temporarily stored within that memory 118.

More specifically, the RAM 118 is read concurrently with memory within the bit-interleaver 105, and the soft bits read out in LLR form from the memory 118 are supplied to the first input port of the digital adder 119. The adder 119 adds the interleaved soft extrinsic bits fed back via the interleaver 105 to respective ones of the soft bits of a posteriori soft demapping results read from the RAM 118 to generate updated a priori soft demapping results supplied from the sum output port of the adder 119 to the write-input port of the RAM 118 via the write signal multiplexer 117. The soft bits of previous a posteriori demapping results temporarily stored in the RAM 118 are each written over after its being read and before another soft bit is read.

The output port of the bit-interleaver 105 is also further connected for feeding back bit-interleaved soft extrinsic data bits to the subtrahend input port of the subtractor 102. The subtractor 102 differentially combines the bit-interleaved soft extrinsic data bits fed back to it with respective ones of soft bits of the a posteriori demapping results read from the RAM 118, to generate soft extrinsic data bits for the adaptive soft demapper from the difference-output port of the subtractor 102 for application to the input port of the de-interleaver 103. As thus far described, the SISO decoder 101 and the adaptive soft demapper (comprising elements 97, 98 and 117-119) are in a turbo loop connection with each other, and the turbo cycle of demapping QAM constellations and decoding LDPC can be iterated many times to reduce bit errors in the BCH coding that the SISO decoder 101 finally supplies from its output port to the input port of the decoder 106 for BCH coding. Successful correction of BCH codewords can be used for terminating iterative demapping and decoding of LDPC coding after fewer turbo cycles than the maximum number permitted.

Figure 59:
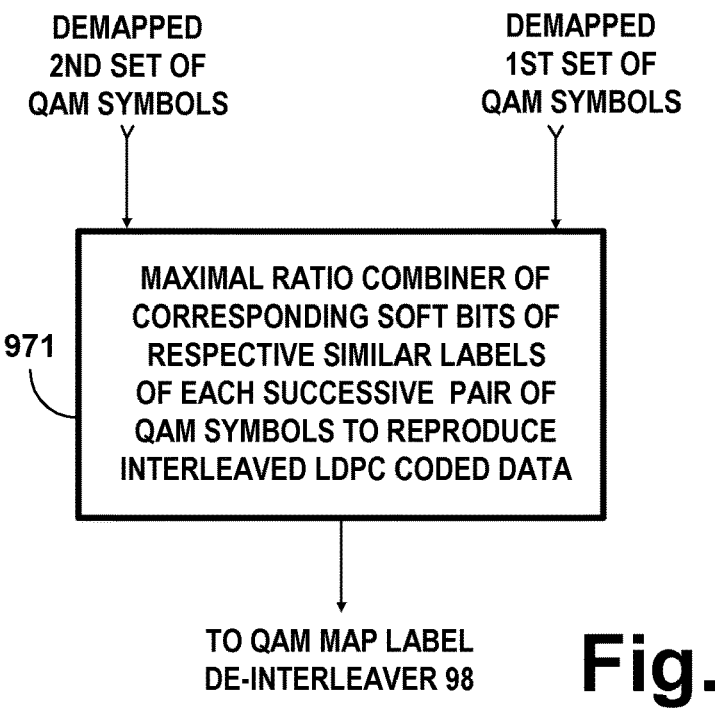
FIG. 59 is a schematic diagram of a diversity combiner that can be used for combining the results of dual QAM demapping in either of the configurations depicted in FIGS. 57 and 58, which diversity combiner comprises a maximal-ratio combiner of corresponding soft bits of respective similar labels of each successive pair of QAM symbols from dual QAM-symbol demapping procedures, which maximal-ratio combiner is operative on soft bits at bit level, rather than at symbol level.

FIG. 59 depicts a soft-bit maximal ratio combiner 971 that is a representative specific structure for the diversity combiner 97. The output port of the soft-bit maximal ratio combiner 971 corresponds to the output port of diversity combiner 97, connecting to the input port of the QAM map label de-interleaver 98. A first of the two input ports of the maximal-ratio combiner 971 is connected to receive the demapped first set of QAM symbols, and the second of the two input ports of the maximal-ratio combiner 971 is connected to receive the demapped second set of QAM symbols. Thus, soft-bit maximal-ratio combining at bit level is performed after QAM demapping, rather than before. Maximal-ratio combining soft bits of corresponding QAM-lattice-point labels improves SNR of reception over an AWGN channel by at least 5.5 dB.

Each of the banks 95 and 96 of demappers of QAM symbols comprises a plurality of read-only memories (ROMs), one ROM for each bit of a particular size of QAM map label, which ROMs each receive as input address thereto the complex coordinates descriptive of a current one of a succession of QAM symbols. Each ROM considers the QAM modulation to range over a square arrangement of square "bins", each of which bins has a respective map label associated therewith. Each ROM generates a respective "soft" bit, a bit metric composed of the more likely one of the "hard" bits 1 and 0 accompanied by a confidence factor. Customarily, the confidence factor is expressed in digitized numerical form as a logarithm of likelihood ratio (LLR) indicating how likely the accompanying decision as to the "hard" bit is correct. The soft-bit maximal-ratio combiner 971 considers 1 and 0 "hard" bits as sign bits when combining the LLRs of each successive pair of "soft" bits in a signed addition. The sign bit of the resultant sum determines the "hard" bit in the "soft" bit response from the maximal-ratio combiner 971 and the rest of this resultant sum determines the LLR of the correctness of this "hard" bit in the "soft" bit response from the maximal-ratio combiner 971.

Each ROM in a demapper of QAM symbols, which ROM is associated with a particular bit of map labeling, can support soft-bit maximal-ratio combining (SBMRC) in the following manner. When the result from demodulating the QAM modulation addresses the center point of the square bin identified by a particular map label, LLR of the particular bit is a value associated with a high level of confidence that the bit is correct. The LLR of the particular bit is reduced from that value when the result from demodulating QAM modulation addresses a point in that square bin approaching a boundary between that square bin and an adjoining square bin associated with opposite hard-bit value. When such boundary is reached the level of confidence in the particular bit being correct is reduced to no more than half its level at the center point of the bin.

Consider how soft-bit maximal-ratio combining (SBMRC) works when a pair of QAM demappers in respective ones of the banks 95 and 96 of demappers are designed to demap 16QAM symbol constellations Gray mapped per the FIG. 8 first Gray map and either the FIG. 9 second Gray map or the FIG. 38 seventh Gray map. The following effects of the treatment of LLRs during SBMRC are worthy of particular notice. Owing to these various effects (among others) the performance of SBMRC is better than with simply decreasing the value of LLR toward all four edges of each of the square bins that are identified by respective map labels. The LLRs of the initial two bits in the 0000, 0100, 1000 and 1100 map labels are maintained at highest value throughout the bins they identify in the FIG. 8 first Gray map, but not in the bins they identify in the FIG. 9 second Gray map or in the FIG. 38 seventh Gray map. The LLRs of the initial two bits in the 0011, 0111, 1011 and 1111 map labels are maintained at highest value throughout the bins they identify in the FIG. 9 second Gray map or in the FIG. 38 seventh Gray map, but not in the bins they identify in the FIG. 8 first Gray map. The following observations indicate that, owing to better SBMRC performance, the labeling diversity between the FIG. 9 second Gray map and FIG. 8 first Gray map is preferable over the labeling diversity between the FIG. 38 seventh Gray map and the FIG. 8 first Gray map. The LLRs of the initial bits in the 0001, 0101, 1001 and 1101 map labels are maintained at highest value throughout the bins they identify in the FIG. 8 first Gray map and in the FIG. 9 second Gray map, but not in the bins these map labels identify in the FIG. 38 seventh Gray map. The LLRs of the second bits in the 0010, 0110, 1010 and 1110 map labels are maintained at highest value throughout the bins they identify in the FIG. 8 first Gray map and in the FIG. 9 second Gray map, but not in the bins these map labels identify in the FIG. 38 seventh Gray map.

Consider how soft-bit maximal-ratio combining (SBMRC) works when a pair of QAM demappers in respective ones of the banks 95 and 96 of demappers are designed to demap 16QAM symbol constellations Gray mapped per the FIG. 10 third Gray map and either the FIG. 11 fourth Gray map or the FIG. 39 eighth Gray map. The following effects of the treatment of LLRs during SBMRC are worthy of particular notice. Owing to these various effects (among others) the performance of SBMRC is better than with simply decreasing the value of LLR toward all four edges of each of the square bins that are identified by respective map labels. The LLRs of the middle two bits in the 0000, 0010, 0100 and 0110 map labels are maintained at highest value throughout the bins they identify in the FIG. 10 third Gray map, but not in the bins they identify in the FIG. 11 fourth Gray map or in the FIG. 39 eighth Gray map. The LLRs of the middle two bits in the 1001, 1011, 1101 and 1111 map labels are maintained at highest value throughout the bins they identify in the FIG. 11 fourth Gray map or in the FIG. 39 eighth Gray map, but not in the bins they identify in the FIG. 10 third Gray map. The following observations indicate that, owing to better SBMRC performance, the labeling diversity between the FIG. 11 fourth Gray map and FIG. 10 third Gray map is preferable over the labeling diversity between the FIG. 39 eighth Gray map and the FIG. 10 third Gray map. The LLRs of the second bits in the 0001, 0011, 0101 and 0111 map labels are maintained at highest value throughout the bins they identify in the FIG. 10 third Gray map and in the FIG. 11 fourth Gray map, but not in the bins these map labels identify in the FIG. 39 eighth Gray map. The LLRs of the third bits in the 1000, 1010, 1100 and 1110 map labels are maintained at highest value throughout the bins they identify in the FIG. 10 third Gray map and in the FIG. 11 fourth Gray map, but not in the bins these map labels identify in the FIG. 39 eighth Gray map.

Consider how soft-bit maximal-ratio combining (SBMRC) works when a pair of QAM demappers in respective ones of the banks 95 and 96 of demappers are designed to demap 16QAM symbol constellations Gray mapped per the FIG. 12 fifth Gray map and either the FIG. 13 sixth Gray map or the FIG. 40 ninth Gray map. The following effects of the treatment of LLRs during SBMRC are worthy of particular notice. Owing to these various effects (among others) the performance of SBMRC is better than with simply decreasing the value of LLR toward all four edges of each of the square bins that are identified by respective map labels. The LLRs of the initial bits in the 0000, 0001, 1000 and 1001 map labels are maintained at highest value throughout the bins they identify in the FIG. 12 fifth Gray map, but not in the bins they identify in the FIG. 13 sixth Gray map or in the FIG. 40 ninth Gray map. The LLRs of the initial and final bits in the 0110, 0111, 1110 and 1111 map labels are maintained at highest value throughout the bins they identify in the FIG. 13 sixth Gray map or in the FIG. 40 ninth Gray map, but not in the bins they identify in the FIG. 12 fifth Gray map. The following observations indicate that, owing to better SBMRC performance, the labeling diversity between the FIG. 13 sixth Gray map and FIG. 12 fifth Gray map is preferable over the labeling diversity between the FIG. 40 ninth Gray map and the FIG. 12 fifth Gray map. The LLRs of the initial bits in the 0010, 0011, 1010 and 1011 map labels are maintained at highest value throughout the bins they identify in the FIG. 12 fifth Gray map and in the FIG. 13 sixth Gray map, but not in the bins these map labels identify in the FIG. 40 ninth Gray map. The LLRs of the final bits in the 0100, 0101, 1100 and 1101 map labels are maintained at highest value throughout the bins they identify in the FIG. 12 fifth Gray map and in the FIG. 13 sixth Gray map, but not in the bins these map labels identify in the FIG. 40 ninth Gray map.

Consider how soft-bit maximal-ratio combining (SB-MRC) works when a pair of QAM demappers in respective ones of the banks 95 and 96 of demappers are designed to demap 16QAM symbol constellations Gray mapped per the FIG. 14 first SCM map and either the FIG. 15 second SCM map or the FIG. 41 third SCM map. The following effects of the treatment of LLRs during SBMRC are worthy of particular notice. Owing to these various effects (among others) the performance of SBMRC is better than with simply decreasing the value of LLR toward all four edges of each of the square bins that are identified by respective map labels. The LLRs of the final two bits in the 0000, 0101, 1010 and 1111 map labels are maintained at highest value throughout the bins they identify in the FIG. 14 first SCM map, but not in the bins they identify in the FIG. 15 second SCM map or in the FIG. 41 third SCM map. The LLRs of the final two bits in the 0011, 0110, 1001 and 1100 map labels are maintained at highest value throughout the bins they identify in the FIG. 15 second SCM map or in the FIG. 41 third SCM map, but not in the bins they identify in the FIG. 14 first SCM map. The following observations indicate that, owing to better SBMRC performance, the labeling diversity between the FIG. 15 second SCM map and FIG. 14 first SCM map is preferable over the labeling diversity between the FIG. 41 third SCM map and the FIG. 14 first SCM map. The LLRs of the final bits in the 0010, 0111, 1000 and 1101 map labels are maintained at highest value throughout the bins they identify in the FIG. 14 first SCM map and in the FIG. 15 second SCM map, but not in the bins these map labels identify in the FIG. 41 third SCM map. The LLRs of the third bits in the 0001, 0100, 1011 and 1110 map labels are maintained at highest value throughout the bins they identify in the FIG. 14 first SCM map and in the FIG. 15 second SCM map, but not in the bins these map labels identify in the FIG. 41 third SCM map.

Soft-bit maximal-ratio combining (SBMRC) can be done when a pair of QAM demappers in respective ones of the banks 95 and 96 of demappers are designed to demap 16QAM symbol constellations anti-Gray mapped per the FIG. 16 first anti-Gray map and either the FIG. 17 second anti-Gray map or the FIG. 42 fifth anti-Gray map. Soft-bit maximal-ratio combining (SBMRC) can also be done when a pair of QAM demappers in respective ones of the banks 95 and 96 of demappers are designed to demap 16QAM symbol constellations anti-Gray mapped per the FIG. 18 third anti-Gray map and either the FIG. 19 fourth anti-Gray map or the FIG. 43 sixth anti-Gray map. However, SBMRC produces fewer salutary effects for anti-Gray mapping than for Gray or SCM mapping This is so for QAM symbol constellations larger than 16QAM ones as well.

Consider how soft-bit maximal-ratio combining (SB-MRC) can be done when a pair of QAM demappers in respective ones of the banks 95 and 96 of demappers are designed to demap 64QAM symbol constellations Gray mapped per the FIG. 24 first Gray map and either the FIG. 25 second Gray map or the FIG. 44 seventh Gray map. The following effects of the treatment of LLRs during SBMRC are worthy of particular notice. Owing to these various effects (among others) the performance of SBMRC is better than with simply decreasing LLR toward all four edges of each of the square bins identified by a respective map label. In the FIG. 24 first Gray map, in the FIG. 25 second Gray map and in the FIG. 44 seventh Gray map the LLRs of the initial two bits in the map labels 000011, 000111, 001011, 001111, 010011, 010111, 011011, 011111, 100011, 100111, 101011, 101111, 110011, 110111, 111011 and 111111 are maintained at highest value throughout the bins they identify. In the FIG. 24 first Gray map the LLRs of the initial four bits in the corner map labels 000000, 010000, 100000 and 110000 are maintained at highest value throughout the bins they identify, but not in the bins those map labels identify in the FIG. 25 Gray map or in the FIG. 44 seventh Gray map. In the FIG. 24 first Gray map the LLRs of the initial two bits in the map labels 000001, 000010, 000101, 001010, 010001, 010010, 010101, 011010, 100001, 100010, 100101, 101010, 110001, 110010, 110010, 110101 and 111010 are maintained at highest value throughout the bins they identify, but not in the bins those map labels identify in the FIG. 25 Gray map or in the FIG. 44 seventh Gray map. In the FIG. 24 first Gray map the LLRs of the initial bits in the map labels 000100, 010100, 100100 and 110100 are maintained at highest value throughout the bins they identify, but not in the bins those map labels identify in the FIG. 25 second Gray map or in the FIG. 44 seventh Gray map. In the FIG. 24 first Gray map the LLRs of the second bits in the map labels 001000, 011000, 101000 and 111000 are maintained at highest value throughout the bins they identify, but not in the bins those map labels identify in the FIG. 25 second Gray map or in the FIG. 44 seventh Gray map. In the FIG. 25 second Gray map and in the FIG. 44 seventh Gray map the LLRs of the initial four bits in the corner map labels 001100, 011100, 101100 and 111100 are maintained at highest value throughout the bins they identify, but not in the bins those map labels identify in the FIG. 24 first Gray map. In the FIG. 25 second Gray map and in the FIG. 44 seventh Gray map the LLRs of the initial two bits in the map labels 000110, 001001, 001101, 001110, 010110, 011001, 011101, 011110, 100110, 101001, 101101, 101110, 110110, 111001 and 111101 are maintained at highest value throughout the bins they identify, but not in the bins those map labels identify in the FIG. 24 first Gray map. In the FIG. 25 second Gray map and in the FIG. 44 seventh Gray map the LLRs of the initial bits in the map labels 000100, 010100, 100100 and 110100 are maintained at highest value throughout the bins they identify, but not in the bins those map labels identify in the FIG. 24 first Gray map. In the FIG. 25 second Gray map and in the FIG. 44 seventh Gray map the LLRs of the second bits in the map labels 001000, 011000, 101000 and 111000 are maintained at highest value throughout the bins they identify, but not in the bins those map labels identify in the FIG. 24 first Gray map.

Effects at the edges of QAM symbol constellation can be used to advantage. Note that the LLRs of the third-from-left bits of the leftmost, rightmost and two center columns of map labels in the FIG. 24 first Gray map and in the FIG. 44 seventh Gray map can be maintained at highest value throughout the bins they identify. The LLRs of the third-from-left bits of the corresponding map labels in the FIG. 25 second Gray map can also be maintained at highest value throughout the bins they identify, but those map labels will be positioned in the uppermost, lowermost and two center rows of map labels. Note that the LLRs of the fourth-from-left bits of the uppermost, lowermost and two center rows of map labels in the FIG. 24 first Gray map and in the FIG. 44 seventh Gray map can be maintained at highest value throughout the bins they identify. The LLRs of the fourth-from-left bits of the corresponding map labels in the FIG. 25 second Gray map can also be maintained at highest value throughout the bins they identify, but those map labels will be positioned in the leftmost, rightmost and two center columns of map labels. These benefits of edge effects of Gray-mapped 64QAM symbols constellations are noted to lesser degree in other Gray mappings and to much less degree in SCM mappings.

Consider how soft-bit maximal-ratio combining (SB-MRC) can be done when a pair of QAM demappers in respective ones of the banks 95 and 96 of demappers are designed to demap 64QAM symbol constellations Gray mapped per the FIG. 26 third Gray map and the FIG. 27 fourth Gray map. The following effects of the treatment of LLRs during SBMRC are worthy of particular notice. Owing to these various effects (among others) the performance of SBMRC is better than with simply decreasing LLR toward all four edges of each of the square bins identified by a respective map label. In the FIG. 26 third Gray map and in the FIG. 27 fourth Gray map the LLRs of the initial and final bits in the map labels 000000, 000001, 000010, 000011, 000100, 000101, 000110, 000111, 001000, 001001, 001100, 001101, 010000, 010001, 011000, 011001, 100000, 100001, 100010, 100011, 100100, 100101, 100110, 100111, 101001, 101010, 101100, 101101, 110000, 110001, 111000 and 111001 are maintained at highest value throughout the bins they identify. In the FIG. 26 third Gray map the LLRs of the initial, middle two, and final bits in the corner map labels 010010, 010011, 110010 and 110011 are maintained at highest value throughout the bins they identify, but not in the bins those map labels identify in the FIG. 27 fourth Gray map. In the FIG. 26 third Gray map the LLRs of the initial bits in the map labels 011010, 011011, 111010 and 111011 are maintained at highest value throughout the bins they identify, but not in the bins those map labels identify in the FIG. 27 fourth Gray map. In the FIG. 26 third Gray map the LLRs of the final bits in the map labels 010110, 010111, 110110 and 110111 are maintained at highest value throughout the bins they identify, but not in the bins those map labels identify in the FIG. 27 fourth Gray map. In the FIG. 27 fourth Gray map the LLRs of the initial, middle two, and final bits in the corner map labels 011110, 011111, 111110 and 111111 are maintained at highest value throughout the bins they identify, but not in the bins those map labels identify in the FIG. 26 third Gray map. In the FIG. 27 fourth Gray map the LLRs of the initial and final bits in the map labels 001010, 001011, 001110, 001111, 010100, 010101, 011100, 011101, 101010, 101011, 101110, 101111, 110100, 110101, 111100 and 111101 are maintained at highest value throughout the bins they identify, but not in the bins those map labels identify in the FIG. 26 third Gray map. In the FIG. 27 fourth Gray map the LLRs of the initial bits in the map labels 010110, 011011, 111010 and 111011 are maintained at highest value throughout the bins they identify, but not in the bins those map labels identify in the FIG. 26 third Gray map. In the FIG. 27 fourth Gray map the LLRs of the final bits in the map labels 010111, 011010, 110110 and 110111 are maintained at highest value throughout the bins they identify, but not in the bins those map labels identify in the FIG. 26 third Gray map.

Consider how soft-bit maximal-ratio combining (SBMRC) can be done when a pair of QAM demappers in respective ones of the banks 95 and 96 of demappers are designed to demap 64QAM symbol constellations Gray mapped per the FIG. 28 fifth Gray map and the FIG. 29 sixth Gray map. The following effects of the treatment of LLRs during SBMRC are worthy of particular notice. Owing to these various effects (among others) the performance of SBMRC is better than with simply decreasing LLR toward all four edges of each of the square bins identified by a respective map label. In the FIG. 28 fifth Gray map and in the FIG. 29 sixth Gray map the LLRs of the initial and final bits in the map labels 010010, 010110, 011010, 011110, 010011, 010111, 011011, 011111, 110010, 110110, 111010, 111110, 110011, 110111, 111011 and 111111 are maintained at highest value throughout the bins they identify. In the FIG. 28 fifth Gray map the LLRs of the initial, middle two, and final bits in the corner map labels 000000, 000001, 100000 and 100001 are maintained at highest value throughout the bins they identify, but not in the bins those map labels identify in the FIG. 29 sixth Gray map. In the FIG. 28 fifth Gray map the LLRs of the initial and final bits in the map labels 000010, 000011, 001010, 001011, 010000, 010001, 010100, 010101, 100010, 100011, 101010, 101011, 110000, 110001, 110100 and 110101 are maintained at highest value throughout the bins they identify, but not in the bins those map labels identify in the FIG. 29 sixth Gray map. In the FIG. 28 fifth Gray map the LLRs of the initial bits in the map labels 000100, 000101, 100100 and 100101 are maintained at highest value throughout the bins they identify, but not in the bins those map labels identify in the FIG. 29 sixth Gray map. In the FIG. 28 fifth Gray map the LLRs of the final bits in the map labels 001000, 001001, 101000 and 101001 are maintained at highest value throughout the bins they identify, but not in the bins those map labels identify in the FIG. 29 sixth Gray map. In the FIG. 29 sixth Gray map the LLRs of the initial, middle two, and final bits in the corner map labels 001100, 001101, 101100 and 101101 are maintained at highest value throughout the bins they identify, but not in the bins those map labels identify in the FIG. 28 fifth Gray map. In the FIG. 29 sixth Gray map the LLRs of the initial and final bits in the map labels 000110, 000111, 001000, 001110, 001111, 011000, 011001, 011100, 011101, 100110, 100111, 101110, 101111, 111000, 111001, 111100 and 111101 are maintained at highest value throughout the bins they identify, but not in the bins those map labels identify in the FIG. 28 fifth Gray map. In the FIG. 29 sixth Gray map the LLRs of the initial bits in the map labels 000100, 000101, 101000 and 101001 are maintained at highest value throughout the bins they identify, but not in the bins those map labels identify in the FIG. 28 fifth Gray map. In the FIG. 29 sixth Gray map the LLRs of the final bits in the map labels 001000, 001001, 100100 and 100101 are maintained at highest value throughout the bins they identify, but not in the bins those map labels identify in the FIG. 28 fifth Gray map.

Consider how soft-bit maximal-ratio combining (SB-MRC) can be done when a pair of QAM demappers in respective ones of the banks 95 and 96 of demappers are designed to demap 64QAM symbol constellations SCM mapped per the FIG. 30 first SCM map and either the FIG. 31 second SCM map or the FIG. 45 third SCM map. The following effects of the treatment of LLRs during SBMRC are worthy of particular notice. Owing to these various effects (among others) the performance of SBMRC is better than with simply decreasing LLR toward all four edges of each of the square bins identified by a respective map label. In the FIG. 30 first SCM map, in the FIG. 31 second SCM map and in the FIG. 45 third SCM map the LLRs of the final two bits in the map labels 001100, 001101, 001110, 001111, 011100, 011101, 011110, 011111, 101100, 101101, 101110, 101111, 111100, 111101, 111110 and 111111 are maintained at highest value throughout the bins they identify. In the FIG. 30 first SCM map the LLRs of all except the two middle bits in the corner map labels 000000, 010001, 100010 and 110011 are maintained at highest value throughout the bins they identify, but not in the bins those map labels identify in the FIG. 31 second SCM map or in the FIG. 45 third SCM map. In the FIG. 30 first SCM map the LLRs of the final two bits in the map labels 000100, 000101, 001000, 001010, 010100, 010101, 011001, 011011, 100110, 100111, 101000, 101010, 110110, 110111, 111001 and 111011 are maintained at highest value throughout the bins they identify, but not in the bins those map labels identify in the FIG. 31 second SCM map or in the FIG. 45 third SCM map. In the FIG. 30 first SCM map the LLRs of the penultimate bits in the map labels 000001, 010000, 100011, 110010 and 111101 are maintained at highest value throughout the bins they identify, but not in the bins those map labels identify in the FIG. 31 second SCM map or in the FIG. 45 third SCM map. In the FIG. 30 first SCM map the LLRs of the final bits in the map labels 000010, 010011, 100000, and 110001 are maintained at highest value throughout the bins they identify, but not in the bins those map labels identify in the FIG. 31 second SCM map or in the FIG. 45 third SCM map. In the FIG. 31 second SCM map and in the FIG. 45 third SCM map the LLRs of all except the two middle bits in the corner map labels 0000011, 010010, 100001 and 110000 are maintained at highest value throughout the bins they identify, but not in the bins those map labels identify in the FIG. 30 first SCM map. In the FIG. 31 second SCM map and in the FIG. 45 third SCM map the LLRs of the final two bits in the map labels 000110, 000111, 001001, 001011, 001101, 010110, 010111, 011000, 011010, 100100, 100101, 101011, 110100, 110101, 111000 and 111010 are maintained at highest value throughout the bins they identify, but not in the bins those map labels identify in the FIG. 30 first SCM map. In the FIG. 31 second SCM map the LLRs of the penultimate bits in the map labels 000001, 010000, 100011 and 110010 are maintained at highest value throughout the bins they identify, but not in the bins those map labels identify in the FIG. 30 first SCM map. In the FIG. 31 second SCM map the LLRs of the final bits in the map labels 000010, 010011, 100000 and 110001 are maintained at highest value throughout the bins they identify, but not in the bins those map labels identify in the FIG. 30 first SCM map. In the FIG. 45 third SCM map the LLRs of the penultimate bits in the map labels 000010, 010011, 100000 and 110001 are maintained at highest value throughout the bins they identify, but not in the bins those map labels identify in the FIG. 30 first SCM map. In the FIG. 45 third SCM map the LLRs of the final bits in the map labels 000001, 010000, 100011 and 110010 are maintained at highest value throughout the bins they identify, but not in the bins those map labels identify in the FIG. 30 first SCM map. Note that the initial bits of the leftmost and rightmost columns of map labels in the FIG. 30 first SCM map. and in the FIG. 45 third SCM map can be maintained at highest value throughout the bins they identify.

The demappers for a pair of 64-lattice-pont symbol constellations or a pair of larger symbol constellations can be modified to use larger LLRs for bits of map labels that do not change in any of the bins surrounding the bin identified by that map label. Such modifications increase the efficacy of the SBMRC.

Maximal-ratio combining of frequency-diverse QAM signals is superior to other well-known types of diversity combining when those signals are afflicted by AWGN, atmospheric noise, Johnson noise within the receiver, or imperfect filtering of power from an alternating-current power source. However, maximal-ratio combining of frequency-diverse QAM signals performs less satisfactorily when one QAM signal is corrupted by burst noise or in-channel interfering signal and the other is not. These various conditions of unsatisfactory reception will cause errors in the reproduction of soft bits of FEC-coded data from the maximal-ratio combiner 971. The erroneous bits are dispersed by the QAM map label de-interleaver 98 and by a de-interleaver of soft "bits" within the iterative SISO decoder 100 for LDPC coding, which improves the chances for those erroneous bits to be corrected during the decoding of the forward-error-correction (FEC) coding by the decoders 100 and 106.

Figure 60:
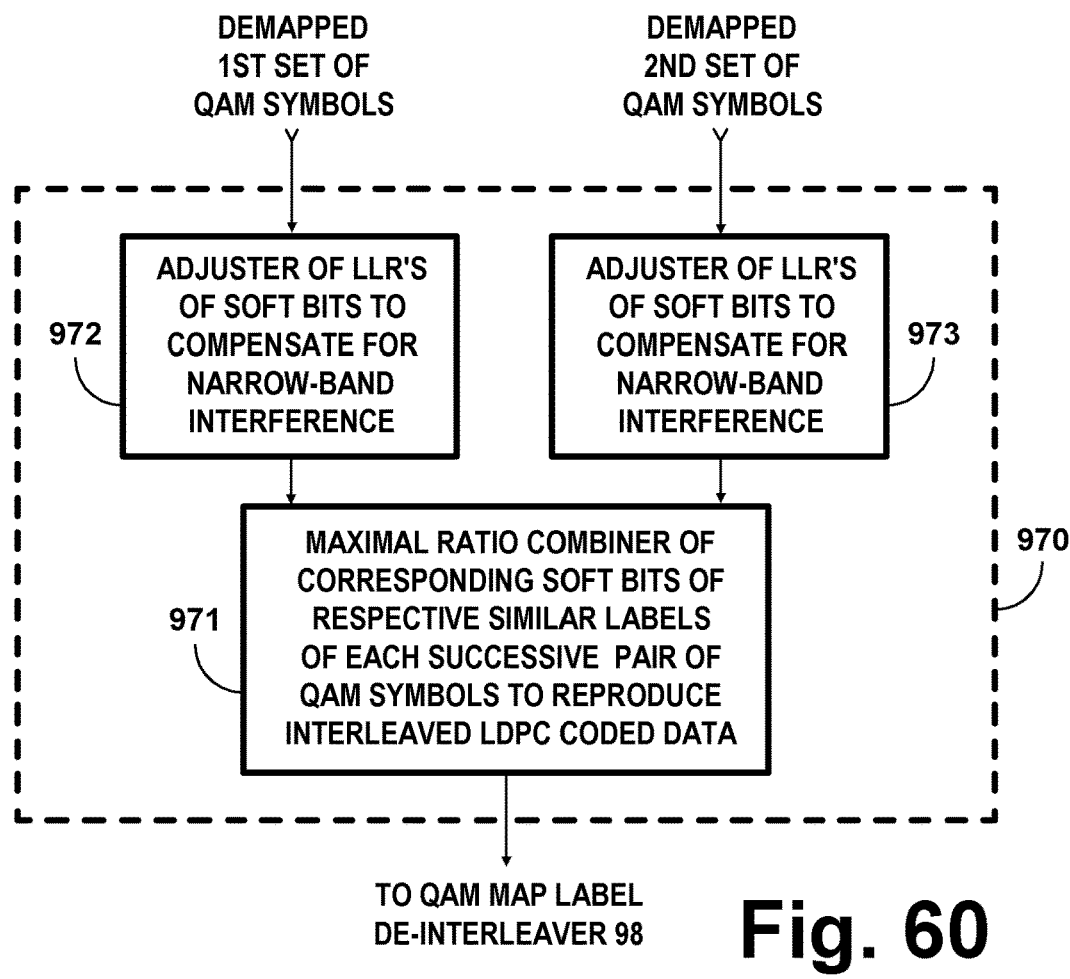
FIG. 60 is a schematic diagram of a diversity combiner that can be used for combining the results of dual QAM demapping either of the configurations depicted in FIGS. 57 and 58, which diversity combiner comprises a maximal-ratio combiner operative on soft bits at bit level, rather than at symbol level, the results of the dual QAM demappers being adjusted prior to application to the maximal-ratio combiner thus to implement a degree of selective diversity combining.

FIG. 60 depicts a more complex representative specific structure 970 for the diversity combiner 97, which structure 970 includes the maximal-ratio combiner 971. The structure 970 further includes an adjuster 972 of the LLRs of soft bits of the demapped first set of QAM symbols before their application to the first input port of the maximal-ratio combiner 971. The structure 970 also further includes an adjuster 973 of the LLRs of soft bits of the demapped second set of QAM symbols before their application to the second input port of the maximal-ratio combiner 971. The adjuster 972 reduces the LLRs of soft bits of the demapped first set of QAM symbols supplied to the maximal-ratio combiner 971 when the hard bit portions of those soft bits are well out of normal mapping range, so as to compensate for narrow-band interference or drop-outs in received signal strength. The adjuster 973 reduces the LLRs of soft bits of the demapped second set of QAM symbols supplied to the maximal-ratio combiner 971 when the hard bit portions of those soft bits are well out of normal mapping range, so as to compensate for narrow-band interference and/or for drop-outs in received signal strength. Designs for the adjusters 972 and 973 can, for example, employ techniques similar to those described by Pertti Alapuranen in U.S. Pat. No. 8,775,907 granted to him 8 Jul. 2014 and titled "Orthogonal frequency division multiplexing symbol diversity combiner for burst interference mitigation".

When dual QAM mapping procedures are applied to a single-sideband COFDM signal, so its frequency spectrum is as illustrated in FIG. 5, the lower and upper half spectra can be detected by heterodyning them with beat-frequency oscillations of nominally the same frequency as a pilot tone at the juncture of those half spectra. These procedures treat the SSB amplitude-modulation signal as an independent-sideband (ISB) signal. These procedures are appreciably less likely to be affected by adjacent-channel interference than the previously described procedures that heterodyne the single-sideband COFDM signal with beat-frequency oscillations of nominally the same frequency as a pilot tone at an edge of the RF channel.

Figure 61:
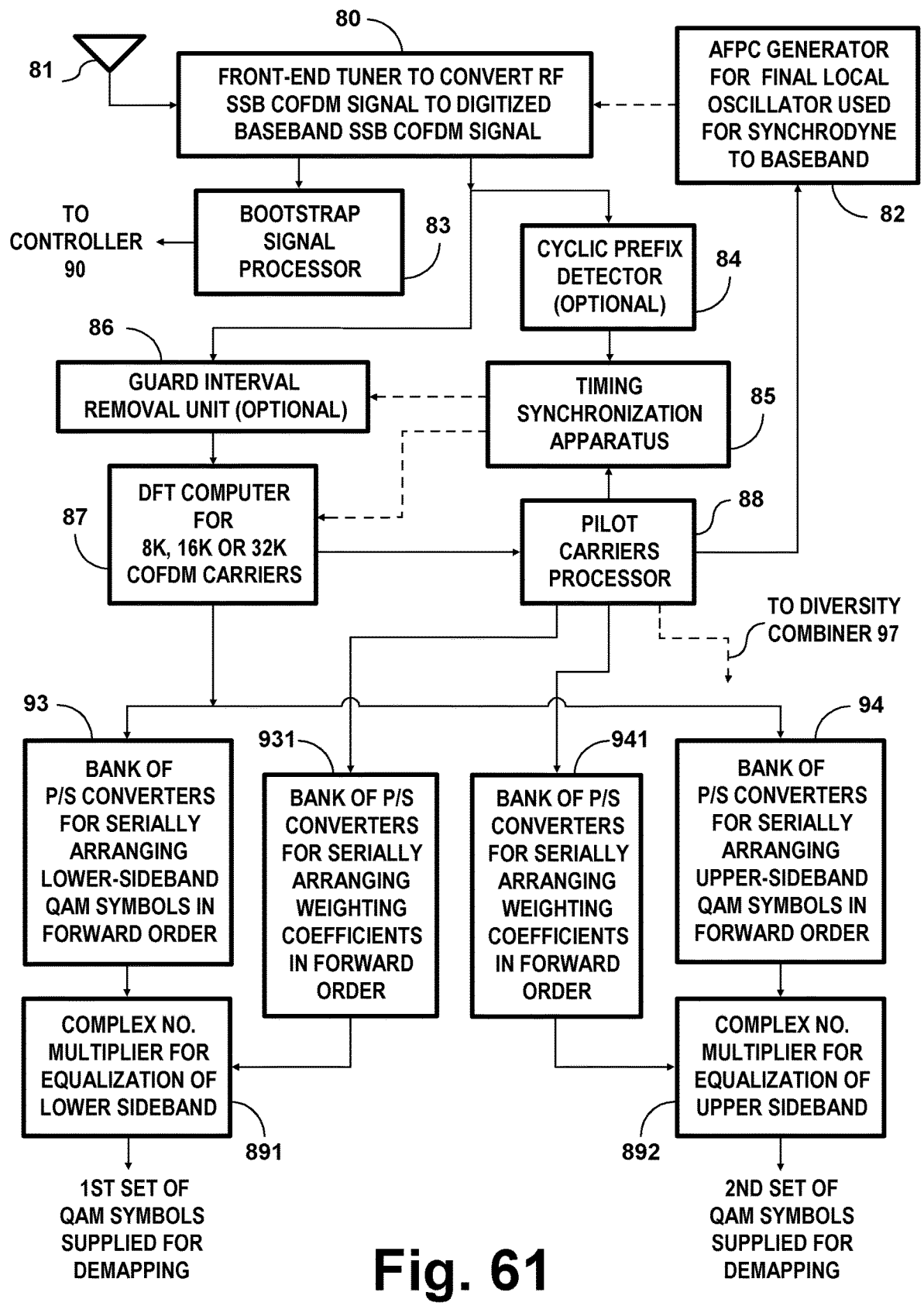
FIG. 61 is a schematic diagram of a variant of the FIG. 56 receiver structure.

FIG. 61 depicts a variant of the FIG. 56 receiver structure. The channel equalizer 89 that performed multiplications on each of the QAM symbols supplied in parallel from the DFT computer 87 is omitted. A complex-number multiplier 891 performs frequency-domain channel equalization on each of the QAM symbols extracted from the lower sideband of the COFDM DCM signal by the DFT computer 87 after their serialization by a selected one of the parallel-to-serial (P/S) converters in the bank 93 of them. Another complex-number multiplier 892 performs frequency-domain channel equalization on each of the QAM symbols extracted from the upper sideband of the COFDM DCM signal by the DFT computer 87 after their serialization by a selected one of the parallel-to-serial (P/S) converters in the bank 94 of them. The first and second sets of QAM symbols supplied from the respective product output ports of the multipliers 891 and 892 are suitable input signals for subsequent demapping apparatus depicted in FIG. 57.

More particularly, the QAM symbols that the DFT computer 87 extracts from the lower sideband of the COFDM DCM signal are supplied, in parallel and in forward spectral order, directly to the parallel input ports of the selected one of the P/S converters in the bank 93 of them. The output port of that selected P/S converter responds to supply serialized QAM symbols from the lower sideband of the COFDM DCM signal to the multiplicand input port of the multiplier 891. The parallel input ports of a selected one of the parallel-to-serial (P/S) converters in a bank 931 of them receives, in parallel from the pilot carriers processor 88, the weighting coefficients for frequency-domain channel equalization of the lower sideband of the COFDM DCM signal. The output port of that selected P/S converter responds to supply serialized weighting coefficients for the lower sideband of the COFDM DCM signal to the multiplier input port of the complex-number multiplier 891. The multiplier 891 responds to its multiplicand and multiplier input signals to supply from its product output port an equalized first set of QAM symbols, suitable for subsequent demapping.

More particularly, the QAM symbols that the DFT computer 87 extracts from the upper sideband of the COFDM DCM signal are supplied, in parallel and in forward spectral order, directly to the parallel input ports of the selected one of the P/S converters in the bank 94 of them. The output port of that selected P/S converter responds to supply serialized QAM symbols from the upper sideband of the COFDM DCM signal to the multiplicand input port of the multiplier 892. The parallel input ports of a selected one of the parallel-to-serial (P/S) converters in a bank 941 of them receives, in parallel from the pilot carriers processor 88, the weighting coefficients for frequency-domain channel equalization of the upper sideband of the COFDM DCM signal. The output port of that selected P/S converter responds to supply serialized weighting coefficients for the lower sideband of the COFDM DCM signal to the multiplier input port of the complex-number multiplier 892. The multiplier 892 responds to its multiplicand and multiplier input signals to supply from its product output port an equalized second set of QAM symbols, suitable for subsequent demapping.

Figure 62:
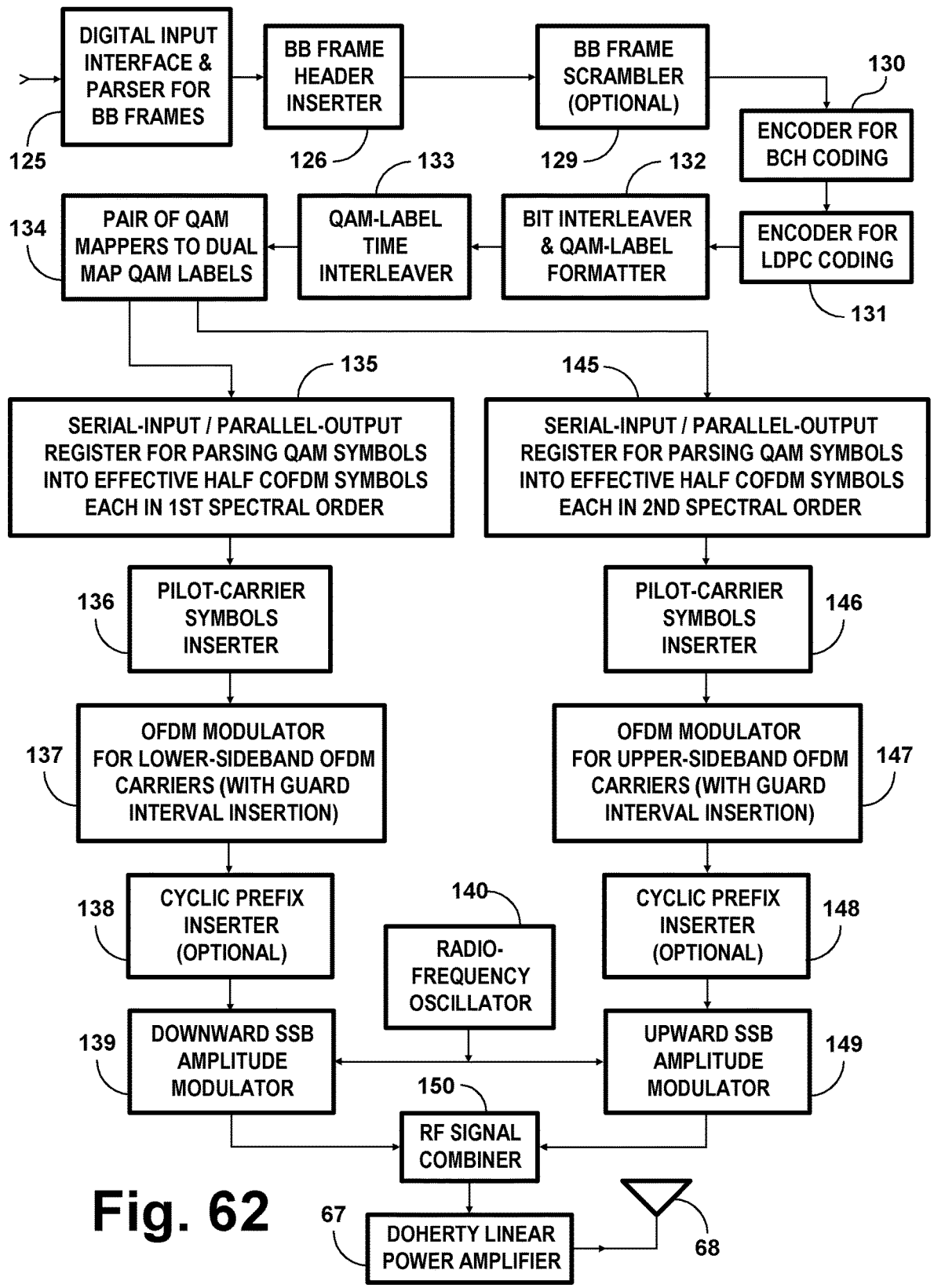
FIG. 62 is a schematic diagram of COFDM transmitter apparatus that is configured for transmitting COFDM DCM signals using independent-sideband (ISB) amplitude modulation of a center-channel principal carrier frequency.

FIG. 62 depicts a transmitter structure for transmitting coded data twice, once in the lower sideband of an independent-sideband COFDM signal and once in its upper sideband. A digital input interface and parser for baseband frames 125 responds to a digital data stream supplied to its input port for supplying baseband data frames to a baseband frame header inserter 126. FIG. 62 shows the output port of the BB FRAME header inserter 126 connected to the input port of a BBFRAME scrambler 129, which data randomizes the BBFRAME supplied from the output port of the BBFRAME scrambler 129 to the input port of an encoder 130 for BCH coding. If the BBFRAME scrambler 129 is omitted, which omission is optional, the output port of the BBFRAME header inserter 126 can connect directly to the input port of an encoder 130 for BCH coding. FIG. 62 shows the output port of the encoder 130 connected to the input port of an encoder 131 for LDPC coding. FIG. 62 shows the output port of the encoder 131 connected to the input port of a bit-interleaver and QAM label formatter 132. The cascade connection of the encoder 130 for BCH coding and the encoder 131 for LDPC coding is apt to be replaced by means for implementing other forms of forward error-correction coding in some variants of the FIG. 62 structure.

FIG. 62 shows the output port of the bit-interleaver and QAM label formatter 132 connected to the input port of a QAM-label time interleaver 133 and the output port of the QAM-label time interleaver 133 connected to the input port(s) of a pair 134 of QAM mappers that map QAM labels differently, thereby to dual map those QAM labels. The QAM-label time interleaver 133 is omitted in some variants of the FIG. 62 structure in which the output port of the bit-interleaver and QAM label formatter 132 connects directly to the input port(s) of the pair 134 of QAM mappers.

A first of the pair 134 of QAM mappers supplies a first stream of complex coordinates of QAM symbols to a serial-input/parallel-output register 135. The SIPO register 135 parses the QAM symbols into effective half COFDM symbols, arranging the QAM symbols therein in a first spectral order. The parallel output ports of the SIPO register 135 are connected to the parallel input ports of a pilot-carrier symbols insertion unit 136, which introduces pilot carrier symbols at suitable intervals between QAM symbols in each effective half COFDM symbol to generate a respective complete half COFDM symbol. The parallel output ports of the pilot-carrier symbols insertion unit 136 are connected to the parallel input ports of an OFDM modulator 137 for lower-sideband OFDM carriers. The OFDM modulator 137 performs an I-FFT and supplies the results from its output port to the input port of a cyclic prefixes inserter 138. The output port of the cyclic prefixes inserter 138 is connected for supplying amplitude-modulating signal to the modulating-signal input port of a downward single-sideband amplitude modulator 139, there to modulate radio-frequency carrier supplied from the output port of a radio-frequency oscillator 140 to a principal-carrier input port of the SSB amplitude modulator 139.

A second of the pair 134 of QAM mappers supplies a second stream of complex coordinates of QAM symbols to a serial-input/parallel-output register 145. The SIPO register 145 parses the QAM symbols into effective half COFDM symbols, arranging the QAM symbols therein in a second spectral order. The parallel output ports of the SIPO register 145 are connected to the parallel input ports of a pilot-carrier symbols insertion unit 146, which introduces pilot carrier symbols at suitable intervals between QAM symbols in each effective half COFDM symbol to generate a respective complete half COFDM symbol. The parallel output ports of the pilot insertion unit 146 are connected to the parallel input ports of an OFDM modulator 147 for upper-sideband OFDM carriers. The OFDM modulator 147 performs an I-FFT and supplies the results from its output port to the input port of a cyclic prefixes inserter 148. The output port of the cyclic prefixes inserter 148 is connected for supplying amplitude-modulating signal to the modulating-signal input port of an upward single-sideband amplitude modulator 149, there to modulate radio-frequency carrier supplied from the output port of the radio-frequency oscillator 140 to a principal-carrier input port of the SSB amplitude modulator 149.

The pilot-carrier symbols insertion units 136 and 146 combine with the SIPO registers 135 and 145 so as to constitute a COFDM symbol generator for supplying respective halves of COFDM symbols to the OFDM modulators 137 and 147, which halves of COFDM symbols are respectively responsive to first and second sets of QAM symbols supplied from respective ones of the pair 134 of QAM mappers. First and second input ports of a radio-frequency signal combiner 150 are respectively connected for receiving the lower-frequency SSB amplitude-modulated RF signal from the output port of the amplitude modulator 139 and for receiving the upper-frequency SSB amplitude-modulated RF signal from the output port of the amplitude modulator 149. The RF oscillator 140, SSB amplitude modulator 139, SSB amplitude modulator 149 and RF signal combiner 150 combine to constitute a generator of COFDM DCM radio-frequency signal. Owing to arrangements of first and second sets of successive QAM symbols in the frequency spectrum carried out by the preceding generator of COFDM symbols, the lower-frequency sideband of this RF signal conveys the first set of successive QAM symbols and the upper-frequency sideband of this RF signal conveys a second set of successive QAM symbols." The output port of the RF signal combiner 150 is connected for supplying ISB signal to the input port of the linear power amplifier 67, which is preferably of Doherty type. The output port of the linear power amplifier 67 is connected for driving RF analog COFDM signal power to the transmission antenna 68. The effective COFDM symbols are caused to have spectral response as shown in FIG. 5 by (a) arranging the SIPO register 135 to parse QAM symbols in descending spectral order in each effective half COFDM symbol for the lower sideband and (b) arranging the SIPO register 145 to parse QAM symbols in ascending spectral order in each effective half COFDM symbol for the upper sideband.

Figure 63:
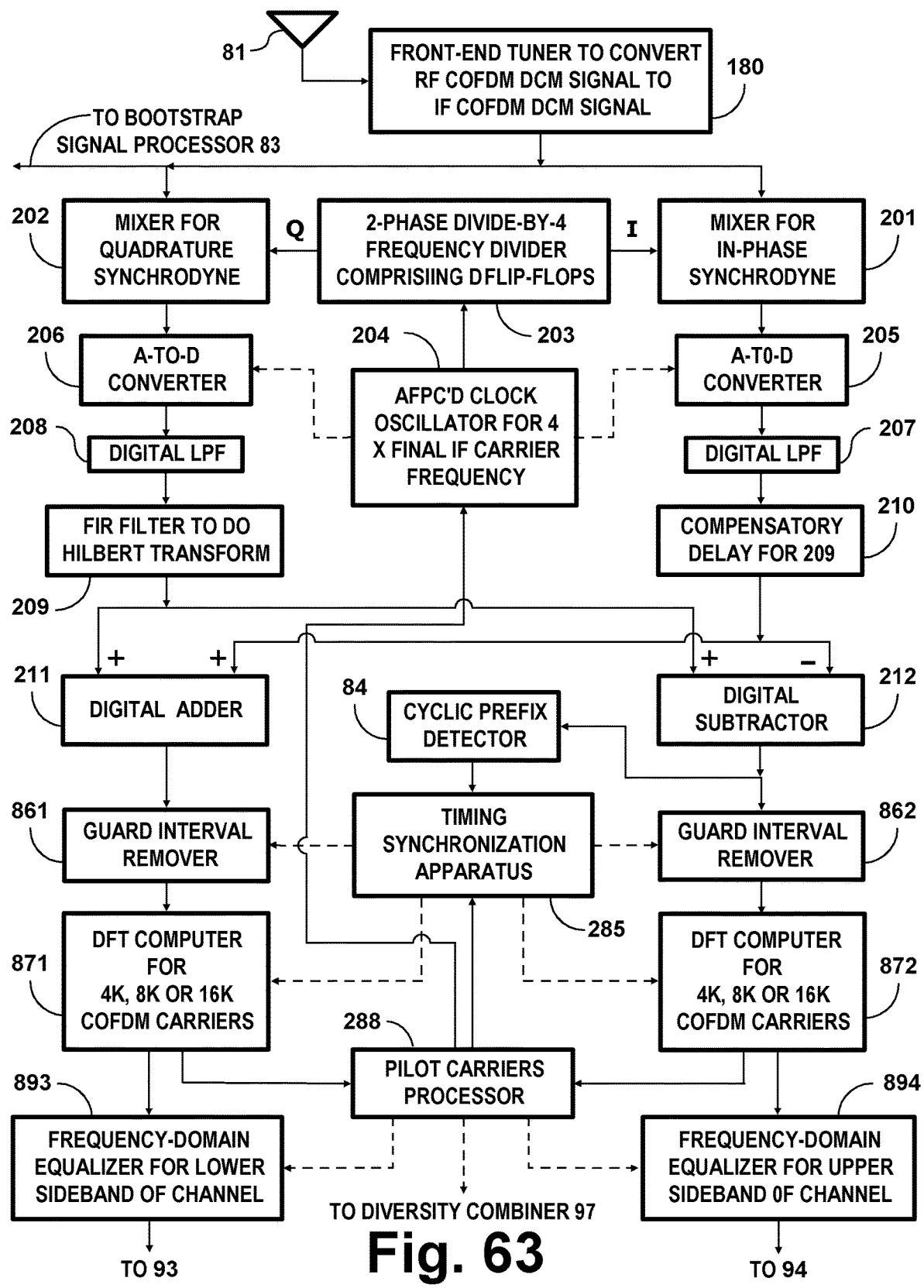

FIGS. 63 and 57 together depict receiver apparatus for independent-sideband (ISB) demodulation of COFDM signals using respective phase-shift methods to respond separately to the concurrent lower and upper sidebands of COFDM DCM signals. The receiver apparatus depicted in FIG. 63 applies the well-known phase-shift methods for demodulating SSB amplitude-modulation signals to demodulating the lower and upper sidebands of COFDM DCM signals to certain extent separately from each other. A reception antenna 81 captures the radio-frequency COFDM DCM signal for application as input signal to a front-end tuner 180 of the receiver. The front-end tuner 180 converts a selected radio-frequency COFDM DCM signal to an intermediate-frequency COFDM DCM signal, which is supplied to the respective signal input ports of mixers 201 and 202.

U.S. provisional Pat. App. 62/488,793 filed 23 Apr. 2017 by A. L. R. Limberg and titled "Double-sideband COFDM signal receivers that demodulate unfolded frequency spectrum" illustrates a beat-frequency oscillator (BFO) supplying in-phase (I) and quadrature-phase (Q) beat-frequency oscillations to the respective carrier input ports of analog mixers and via a direct connection and via a −90° phase-shifter, respectively. Such practice is problematic in the following two respects. It is difficult to realize a phase-shifter with analog circuitry, which phase-shifter provides exact −90° phase shift despite change in BFO frequency. Also, maintaining the amplitudes of the beat-frequency oscillations to the respective carrier input ports of the two analog mixers the same is rather difficult.

Figure 64:
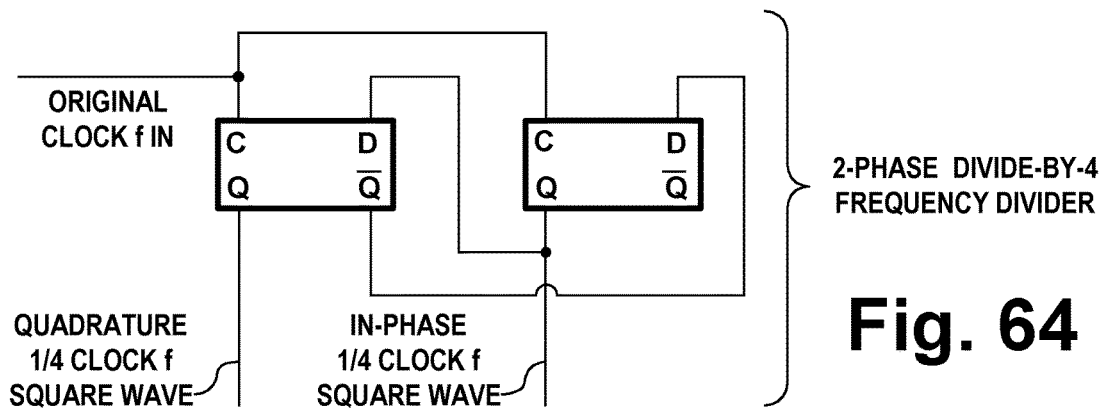
FIG. 64 is a schematic diagram of a two-phase divide-by-four frequency divider constructed from gated D flip-flops or data latches, which sort of frequency divider is an element in the receiver apparatus depicted in FIGS. 63, 66-68, 70 and 71.

The latter of these difficulties is avoided by mixers 201 and 202 being of switching type receiving I and Q square waves at their respective carrier input ports. Fundamental-frequency components of the I and Q square waves that are at quite exactly at 0° and −90° relative phasings, despite change in frequency, are supplied from a 2-phase divide-by-4 frequency divider 203 in response to rising edges of pulses from a clock oscillator 204. The frequency divider 203 can be constructed from two gated D flip flop-flops (or data latches) suitably connected as depicted in FIG. 64. The clock oscillator 204 is subject to automatic frequency and phase control (AFPC) that adjusts the frequency of clock pulses to be four times the final intermediate-frequency (IF) carrier of the COFDM signals. A voltage-controlled crystal oscillator (VCXO) supplying oscillations nominally at 44 MHz is perhaps the optimal choice for the clock oscillator 204. The mixer 201 is conditioned to perform an in-phase synchrodyne of intermediate-frequency COFDM DCM signal to baseband, responsive to its carrier input port receiving leading in-phase (I) square wave from the frequency divider 203. The mixer 202 is conditioned to perform a quadrature-phase synchrodyne of intermediate-frequency COFDM DCM signal to baseband, responsive to its carrier input port receiving lagging quadrature-phase (Q) square wave from the frequency divider 203.

An analog-to-digital converter 205 performs analog-to-digital conversion of baseband signal supplied from the output port of the mixer 201. The sampling of the mixer 201 output signal by the A-to-D converter 205 is timed by a first set of alternate clock pulses received from the clock oscillator 204. An analog-to-digital converter 206 performs analog-to-digital conversion of the baseband signal supplied from the output port of the mixer 202. The sampling of the mixer 202 output signal by the A-to-D converter 206 is timed by a second set of alternate clock pulses received from the clock oscillator 204. The digitized in-phase baseband signal supplied from the output port of the A-to-D converter 205 is supplied to the input port of a digital lowpass filter 207. The digitized quadrature-phase baseband signal supplied from the output port of the A-to-D converter 206 is supplied to the input port of a digital lowpass filter 208. The digital lowpass filters 207 and 208 are of similar design, each to supply a response to a respective sideband which response is free of components of image signal remnant from the synchrodyning procedures. Preferably, that is, the design of the digital lowpass filters 207 and 208 provides a rapid roll-off of their higher-frequency responses, so as to suppress adjacent-channel interference (ACI).

The response of the digital lowpass filter 208 to quadrature-phase baseband signal is supplied to the input port of a finite-impulse-response digital filter 209 for Hilbert transformation. The response of the digital lowpass filter 207 to in-phase baseband signal is supplied to the input port of a clocked digital delay line 210 that affords delay to compensate for the latent delay through the FIR filter 209. The Hilbert transform response of the FIR filter 209 and the response of the digital delay line 210 are supplied to respective addend input ports of a digital adder 211 operative to recover, at baseband, the lower sideband of the COFDM DCM signal at its sum output port. The Hilbert transform response of the FIR filter 209 and the response of the digital delay line 210 are supplied respectively to the minuend input port and the subtrahend input port of a digital subtractor 212 operative to recover, at baseband, the upper sideband of the COFDM DCM signal at its difference output port.

The sum output port of the digital adder 211 connects to the input port of a guard interval remover 861. The output port of the guard interval remover 861 is connected for supplying the input port of a discrete-Fourier-transform (DFT) computer 871 with windowed portions of the baseband digitized lower sideband of the COFDM DCM signal that span respective COFDM symbol intervals. The complex coordinates of QAM symbols the DFT computer 871 extracts from lower sideband carriers in each COFDM symbol sampling interval that convey coded data are supplied as parallel input signal to a frequency-domain channel equalizer 893 for just those QAM symbols connected for supplying equalized QAM symbols to the parallel inputs of the P/S converter 93 in the FIG. 57 portion of the television receiver.

Subsequent to the recovery of the digitized upper sideband of the COFDM DCM signal at baseband by phase shift method, it is supplied from the difference output port of the digital subtractor 212 to the input port of a guard interval remover 862. The output port of the guard interval remover 862 is connected for supplying the input port of a DFT computer 872 with windowed portions of the baseband digitized upper sideband of the COFDM DCM signal that span respective COFDM symbol intervals. The complex coordinates of QAM symbols the DFT computer 872 extracts from upper sideband carriers in each COFDM symbol sampling interval that convey coded data are supplied as parallel input signal to a frequency-domain channel equalizer 894 just for those QAM symbols. Parallel output ports of the channel equalizer 894 are connected for supplying equalized QAM symbols to the parallel inputs of the P/S converter 94 in the FIG. 57 portion of the television receiver.

The DFT computers 871 and 872 are similar in construction, each configured so it can demodulate any one of 8K, 16K or 32K options as to the nominal number of OFDM carriers. The correct option is chosen responsive to an instruction from a controller 90 that generates a number of instructions used to configure the COFDM receiver to suit the broadcast standard used transmissions currently received. The bootstrap signal processor 83, the controller 90, the extractor 91 of FEC frame preambles, and the processor 92 of COFDM frame preambles are not explicitly depicted in any of the FIGS. 63, 66, 67, 68, 70 and 71, but such elements are implicitly included in the structure of each of the COFDM DCM receivers shown in part in these figures of the drawing.

The guard interval removers 861 and 862 are each constructed similarly to the guard interval remover 86 in the FIG. 56 receiver apparatus, removing guard intervals responsive to the occurrences of cyclic prefixes having been detected by a cyclic prefix detector 84. FIG. 63 shows the input port of the cyclic prefix detector 84 connected for detecting the occurrences of cyclic prefixes in the digitized upper sideband of the COFDM DCM signal supplied at baseband from the output port of |the digital subtractor 212. Alternatively, the input port of the cyclic prefix detector 84 can instead be connected for detecting the occurrences of cyclic prefixes in the digitized lower sideband of the COFDM DCM signal supplied at baseband from the output port of the digital adder 211. The cyclic prefix detector 84 differentially combines the digitized samples of baseband COFDM signal with those samples as delayed by the duration of an effective COFDM symbol. Nulls in the difference signal so generated should occur, marking the guard intervals of the baseband COFDM signal. The nulls are processed to reduce any corruption caused by noise and to generate better-defined indications of the phasing of COFDM symbols. The output port of the cyclic prefix detector 84 is connected to supply these indications to a first of two input ports of timing synchronization apparatus 285. First and second output ports of the timing synchronization apparatus 285 are connected for supplying similar gating control signals to the control input ports of the guard interval removers 861 and 862. Third and fourth output ports of the timing synchronization apparatus 285 are connected for supplying indications of the phasing of COFDM symbols to the DFT computers 871 and 872 respectively.

The complex coordinates of QAM symbols extracted from pilot carriers in each COFDM symbol sampling interval are supplied as parallel input signal to a pilot carriers processor 288. The pilot carriers processor 288 responds to complex coordinates of QAM symbols extracted from lower-sideband pilot carriers to generate weighting coefficients for the frequency-domain channel equalizer 893 to apply to QAM symbols extracted from the upper sideband of the COFDM DCM signal. A first of five output ports of the processor 288 that are explicitly shown in FIG. 63 is connected for supplying these weighting coefficients (via wiring depicted as a dashed-line connection) to the frequency-domain channel equalizer 893, which uses those weighting coefficients for adjusting its responses to the demodulation results for each of the lower-sideband COFDM carriers that convey data. The pilot carriers processor 288 responds to complex coordinates of QAM symbols extracted from upper-sideband pilot carriers to generate weighting coefficients for the frequency-domain channel equalizer 894 to apply to QAM symbols extracted from the upper sideband of the COFDM DCM signal. A second of the five output ports of the processor 288 that are explicitly shown in FIG. 63 is connected for supplying these weighting coefficients (via wiring depicted as a dashed-line connection) to the frequency-domain channel equalizer 894, which uses them for adjusting its responses to the demodulation results for each of the upper-sideband COFDM carriers that convey data.

A third of the output ports of the pilot carriers processor 288 that are explicitly shown in FIG. 63 is connected for supplying more accurate window-positioning information to the second input port of the timing synchronization apparatus 285. This window-positioning information is an adjustment generated by a feedback loop that seeks to minimize the noise accompanying pilot carriers, which noise increases owing to intercarrier interference from adjoining modulated carriers when window positioning is not optimal. A fourth of the output ports of the pilot carriers processor 288 explicitly shown in FIG. 63 is connected for forwarding automatic frequency and phase control (AFPC) developed from unmodulated pilot carriers to the AFPC input port of the clock oscillator 204. The real components of the unmodulated pilot carriers are multiplied by their respective imaginary components in the pilot carriers processor 288. The processor 288 sums and low-pass filters the resulting products to develop the AFPC signal that the processor 288 supplies to the clock oscillator 204. Responsive to this AFPC signal, the clock oscillator 204 regulates the frequency of its oscillations to be four times the carrier frequency of the final IF signal that the front-end tuner 180 supplies to the input ports of the mixers 201 and 202. This AFPC signal controls the frequency and phase of the clock pulses that the clock oscillator 204 supplies to the 2-phase divide-by-4 frequency divider 203.

A fifth of the output ports of the pilot carriers processor 288 explicitly shown in FIG. 63 is connected for supplying a diversity combiner 97 (depicted in FIG. 57 and in FIG. 58) with information concerning the frequency spectrum of each successive COFDM symbol.

FIG. 64 depicts two data latches—i.e., gated D flip-flops—connected to provide a two-phase divide-by-four frequency divider, such as the frequency divider 203 depicted in FIG. 63. The respective clock (C) input connections of the two data latches are each connected for receiving an original clock signal of frequency f, which clock signal is received from the clock oscillator 204 for the frequency divider 203 depicted in FIG. 63. Each of the two data latches has its own normal (Q) output connection and its own complementary ($\overline{Q}$) output connection. There is wire connection from the complementary ($\overline{Q}$) output connection of the data latch at left to the data (D) input connection of the data latch at right, and there is wire connection from the normal (Q) output connection of the data latch at right to the data (D) input connection of the data latch at left. The normal (Q) output connection of the data latch at right supplies a leading square wave having an "in-phase" fundamental frequency f/4, and the normal (Q) output connection of the data latch at left supplies a lagging square wave having a "quadrature-phase" fundamental frequency f/4 that lags the "in-phase" fundamental frequency by 90°.

Figure 65:
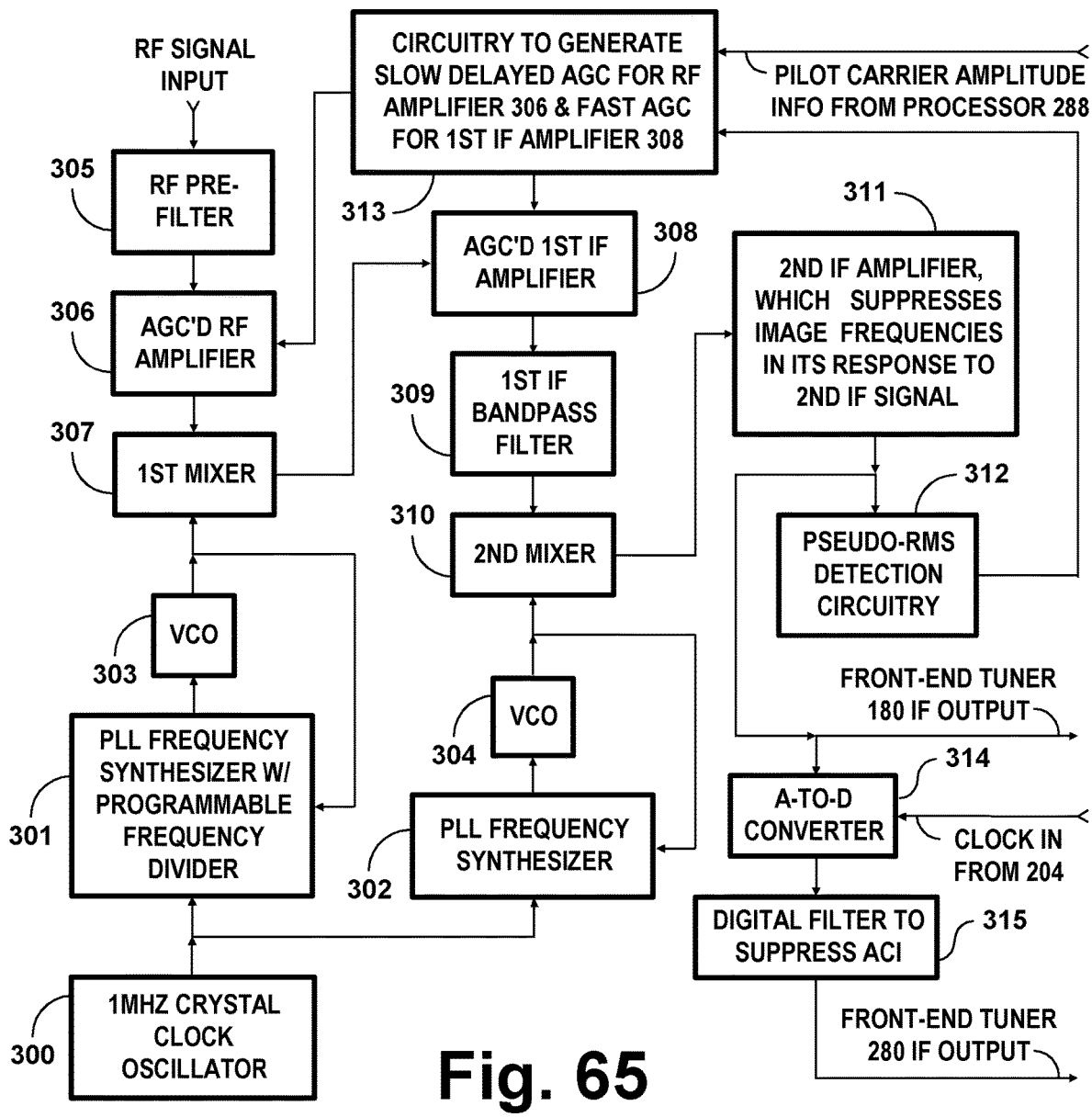
FIG. 65 is a schematic diagram of double superheterodyne front-end tuner structure suitable for inclusion in any of the apparatuses for demodulating COFDM DCM signals depicted in FIGS. 56, 61, 63 and 66-68.
Figure 66:
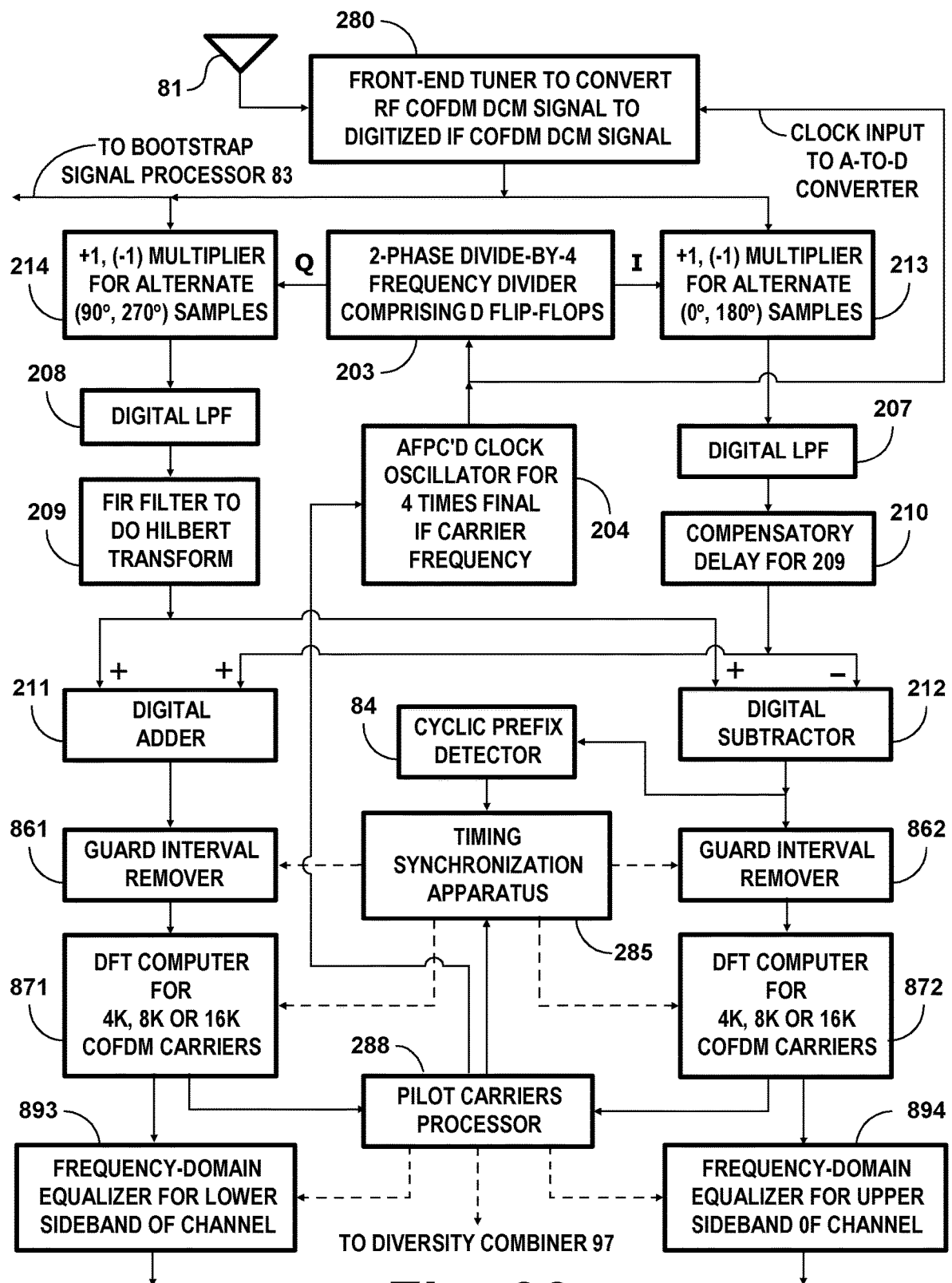
Figure 67:
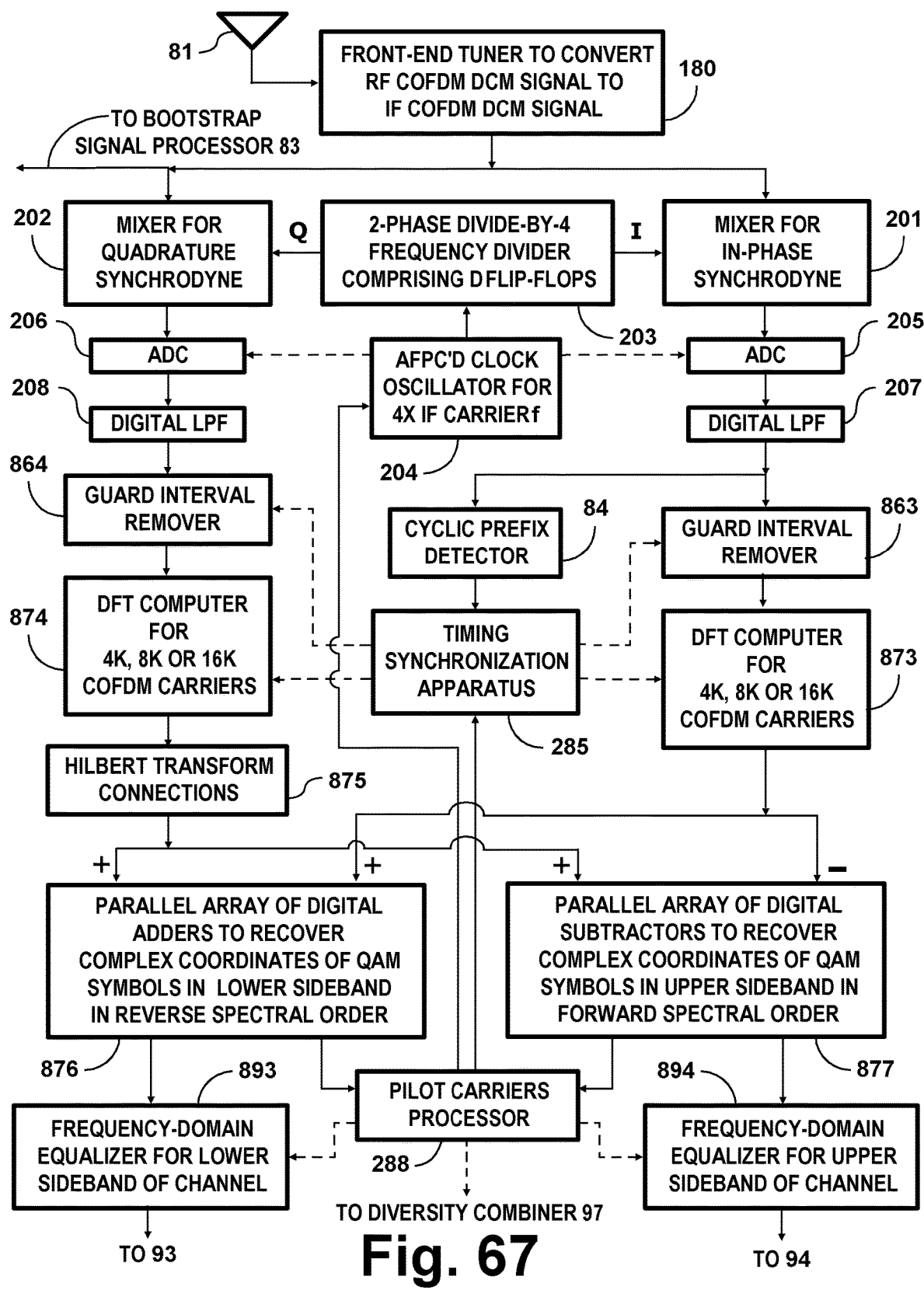
Figure 68:
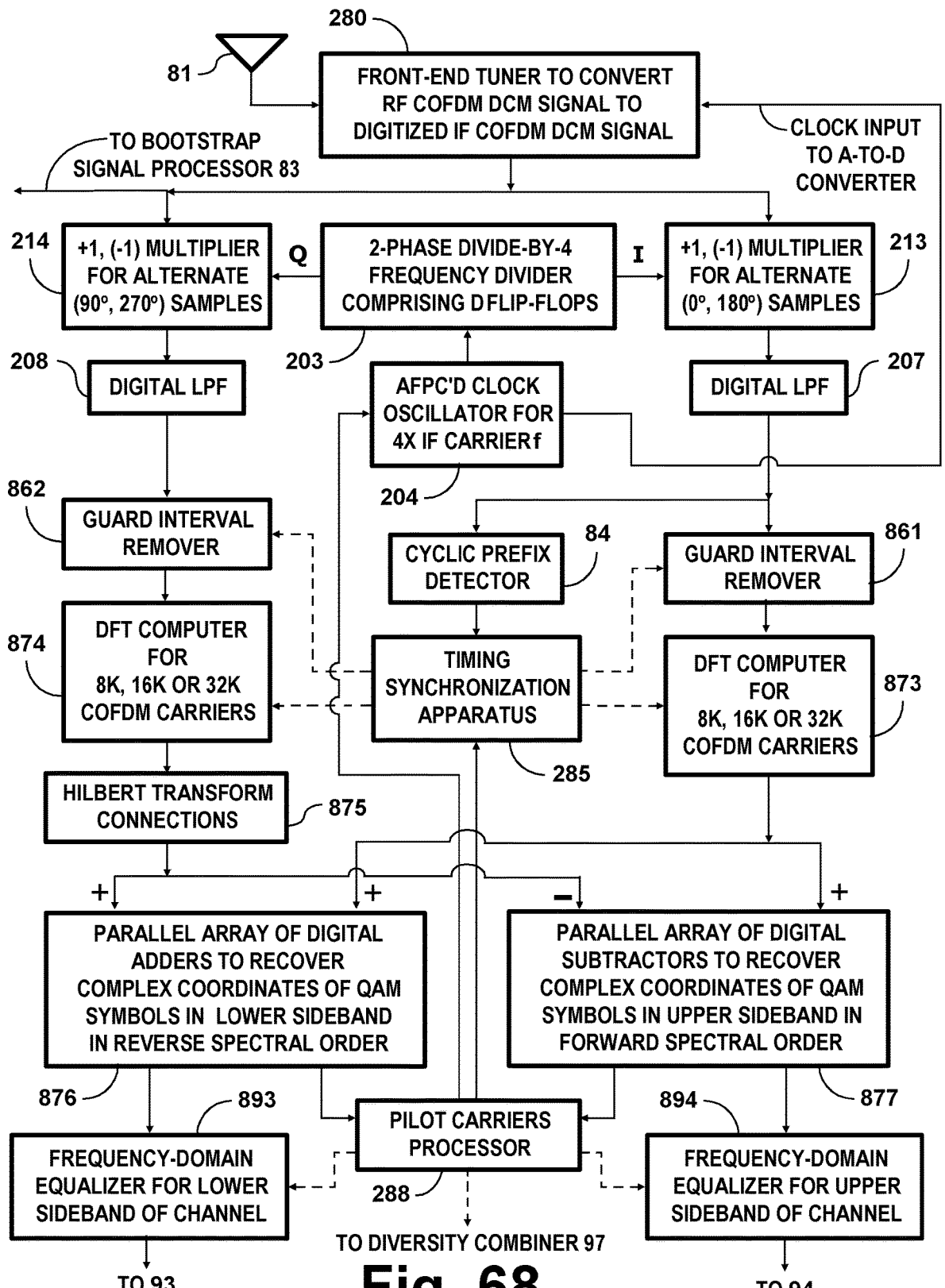

FIG. 65 depicts double-conversion front-end tuner structure suitable for the front-end tuner 180 depicted in FIGS. 63 and 67, and for the front-end tuner 280 depicted in FIGS. 66 and 68. Double-conversion front-end tuners are particularly advantageous over single-conversion front-end tuners when more television channels are more closely packed within the allocated television frequency spectrum. The structure is quite similar in general aspects to that described in U.S. Pat. No. 6,118,499 titled "Digital television signal receiver" granted to George Fang on 12 Sep. 2000. In a first frequency-conversion a selected radio-frequency COFDM DCM signal is up-converted in frequency to first-intermediate-frequency COFDM DCM signal at frequencies above the UHF television broadcasting band. The first-IF COFDM DCM signal is suitable for surface-acoustic-wave (SAW) bandpass filtering. In a second frequency-conversion the bandpass-filtered first-IF COFDM DCM signal is down-converted to second-intermediate-frequency COFDM DCM signal at frequencies substantially below the conventional "final intermediate frequency" (e.g., 41 to 47 MHz in U.S. television receivers). The second-IF COFDM DCM signal is at a sufficiently low frequency such that it can be directly sampled by an analog-to-digital converter after lowpass filtering to suppress image signal.

In FIG. 65 a crystal oscillator 300 is connected for supplying 1 MHz reference oscillations to phase-lock-loop frequency synthesizers 301 and 302. The PLL frequency synthesizer 301 is connected for supplying automatic frequency and phase control (AFPC) voltage to a voltage-controlled oscillator 303, which VCO 303 generates the first local oscillations used in the upward conversion of radio-frequency COFDM DCM signal to first-IF COFDM DCM signal. The PLL frequency synthesizer 302 is connected for supplying AFPC voltage to a voltage-controlled oscillator 304, which VCO 304 generates the second local oscillations used in the downward conversion of first-IF COFDM DCM signal to second-IF COFDM DCM signal.

The PLL frequency synthesizer 301 includes a programmable frequency divider, a clocked counter that counts the first local oscillations supplied to its counter input connection from the VCO 303. When the count reaches a selected large positive integer, the counter resets to zero count and generates a carry pulse supplied to an AFPC detector within the PLL frequency synthesizer 301. Responsive to carry pulses from the counter, that AFPC detector samples the 1 MHz oscillations from the crystal oscillator and integrates the response of such sampling to generate the AFPC voltage applied to the VCO 303. The crystal oscillator 300 is designed for supplying 1 MHz reference oscillations since it is the largest common submultiple of the central carrier frequencies of all the allocated TV broadcast channels in the U.S.A.

The PLL frequency synthesizer 302 includes a fixed frequency divider, a clocked counter that counts the second local oscillations supplied to its counter input connection from the VCO 304. When the count reaches a prescribed large positive integer, the counter resets to zero count and generates a carry pulse supplied to an AFPC detector within the PLL frequency synthesizer 302. Responsive to carry pulses from the counter, that AFPC detector samples the 1 MHz oscillations from the crystal oscillator and integrates the response of such sampling to generate the AFPC voltage applied to the VCO 304. Choosing the prescribed large positive integer at which the counter in the PLL frequency synthesizer 302 resets to zero count is preferably done so as to position the central carrier frequency of the second-IF COFDM DCM signal at 11 MHz. This frequency is low enough that analog-to-digital conversion of the second-IF COFDM DCM signal is practical. Also, the fourth harmonic of the central carrier frequency of the second-IF signal is at 44 MHZ, which is at the center of the 41-47 megahertz final IF signals commonly used in prior-art television receivers. Since these frequencies are not allocated for high-power RF transmissions, this reduces the possibility of strong interference with operation of the clock oscillator 204 depicted in FIGS. 63, 65-68, 70 and 71.

The input port of a pre-filter 305 is connected for receiving radio-frequency (RF) COFDM signal supplied by an antenna or a cable distribution system. (The pre-filter 305 is typically constructed either as a group of fixed frequency band pass filters, or as a tracking type of filter.) The pre-filter 305 reduces the bandwidth of the signal entering the subsequent radio-frequency amplifier 306, which RF amplifier 306 is subject to automatic gain control (AGC). The pre-filter 305 reduces the number of channels amplified by the AGC'd RF amplifier 306, thereby reducing the intermodulation interference generated by the amplifier 306 and subsequent circuits. In a pre-filter 305 comprising a group of fixed-frequency bandpass filters, the proper band is selected according to channel selection information supplied from a controller not explicitly depicted in FIG. 65. Alternatively, in a tracking type pre-filter, an analog control voltage is generated responsive to channel selection information supplied from the controller. The controller also supplies the channel selection information to the PLL frequency synthesizer 301 for determining the frequency division its programmable frequency divider affords to oscillations supplied thereto from the VCO 303.

The RF output of the pre-filter 305 is amplified or attenuated to a desired level by the AGC'd RF amplifier 306 and then supplied to a first mixer 307, there to be mixed with first local oscillations from the VCO 303. The signal at the output port of first mixer 307, resulting from the desired TV channel signal being multiplied by the VCO 303 oscillations, is defined as the first intermediate frequency signal. The frequency of this first IF signal is the difference between the frequency of the VCO 303 first local oscillations and the frequency of the COFDM DCM signal to be received. Since the mixer 307 shifts the spectrum of the desired TV channel to a frequency higher than the TV broadcast frequency, this operation is referred to as an up-conversion. The first IF is chosen to be above all of the spectrum used by terrestrial or cable distribution TV broadcasting in the particular environment in which the tuner operates in. By this choice, the image frequency (the frequency which is the numerical sum of the VCO 303 signal and the first IF frequency) generated in the up-conversion process can be rejected by the pre-filter 305. This choice of first intermediate frequencies also requires the frequency of the VCO 304 to be above the spectrum used by TV broadcasting, thereby avoiding other possible interference.

The first IF output signal supplied from the mixer 307 is amplified by a narrow-band amplifier 308 and then supplied to a first-IF bandpass filter 309 such as a dielectric resonance filter, a strip-line filter or a SAW filter. The characteristics of the first-IF BPF 309 are designed, with consideration to the characteristics of subsequent digital filtering that will be used to suppress ACI (adjacent-channel interference). I.e., the bandwidth of the first-IF BPF 309 is no less than that of a single digital TV channel, and the passband group delay response is sufficiently linear so as not to cause adverse effects on subsequent demodulation of a second-intermediate-frequency (second-IF) COFDM DCM signal. Furthermore, the first-IF BPF 309 is designed to have sufficient out-of-band attenuation at the image frequency range of the subsequent down-conversion process by a second mixer 310 so as not to introduce excessive image frequency interference to degrade the performance of the subsequent demodulation of the second-IF COFDM DCM signal. (In alternative front-end tuner designs the positions of the first-IF amplifier 308 and the first-IF BPF 309 within their cascade connection are interchanged.)

The output signal from the first-IF BPF 309 principally consists of just the desired TV channel signal as up-converted, possibly accompanied by small amounts of up-converted adjacent-channel signals that have not been completely attenuated owing to the band-edge roll-off characteristics of BPF 309. This signal is supplied to a second mixer 310 to be mixed with second local oscillations, which are supplied from the VCO 304. The signal supplied from the output port of the mixer 310, resulting from the first-IF COFDM DCM signal being multiplied by second local oscillations from the VCO 304, is defined as the second-intermediate-frequency (second-IF) COFDM DCM signal. The frequency of this second-IF COFDM DCM signal is the numerical difference between the frequency of second local oscillations from the VCO 304 and the somewhat lower frequencies of the first-IF COFDM DCM signal. The second-IF COFDM DCM signal supplied from the output port of the mixer 310 is amplified by a second IF amplifier 311 of such design as to suppress image signals that have frequencies almost twice that of the frequency of the second local oscillations above the UHF TV band. Since the mixer 310 shifts the first IF signal to a lower frequency, this operation is referred to as a down-conversion.

The amplified second-IF COFDM DCM signal supplied from the output port of the second IF amplifier 311 is applied to the input port of pseudo-RMS detection circuitry 312. The output port of the pseudo-RMS detection circuitry 312 is connected for supplying an approximation of the RMS (root-mean-square) voltage of the response from the second IF amplifier 311 to a first input port of circuitry 313 for generating respective automatic gain control (AGC) signals for the RF amplifier 306 and for the first IF amplifier 308. The peak-to-average ratio (PAPR) of COFDM signals is very high, and occasional peak clipping of them is better design. Detecting the peak voltage of the response from the second IF amplifier 311 would not provide a good basis from which to develop AGC signals.

A second port of the circuitry 313 for generating AGC signals is connected for receiving pilot carrier amplitude information from the pilot carriers processor 288 depicted in FIG. 63 or any of FIGS. 66-68. The pilot carrier amplitude information provides a more precise basis for assuring that the level of response from the second IF amplifier 311 is adjusted to suit subsequent analog-to-digital conversion and QAM demapping procedures.

Designs of circuitry for generating AGC signals in double-conversion radio receivers are known in the prior art. The circuitry 313 generates delayed AGC signal for the RF amplifier 306, avoiding reduction of the RF amplifier 306 gain as long as RF signal strength is not so strong that RF amplifier 306 response consistently drives the first mixer 307 outside its range of acceptably linear response. During the reception of such weaker strength RF signals, the circuitry 313 generates AGC signal for the first IF amplifier 308 that regulates its gain control to maintain desired value of the approximate RMS value of the second IF amplifier 311 response. This maintains the second mixer 310 within its range of acceptably linear response. The circuitry 313 generates the delayed AGC signal for the RF amplifier 306 so as to exhibit slower response to second IF amplifier 311 output signal than the AGC signal for the first IF amplifier 308. This accommodates clipping of occasional extraordinarily large peaks of received COFDM signal in the first mixer 307 and the RF amplifier 306. The AGC signal for the first IF amplifier 308 that circuitry 313 generates no longer reduces the gain of the first IF amplifier 308 when circuitry 313 supplies delayed AGC signal to the RF amplifier 306 for reducing its gain.

In a front-end tuner 280 configuration as used in FIGS. 66 and 68, the amplified second-IF COFDM DCM signal supplied from the output port of the second IF amplifier 311 is supplied to the input port of an analog-to-digital converter 314. The A-to-D converter 314 samples the amplified second-IF COFDM DCM signal at a clock rate determined by the clock oscillator 204 depicted in FIG. 66 or 68. The output port of the A-to-D converter 314 is connected for supplying the resulting digitized second-IF COFDM DCM signal to the input port of a digital bandpass filter 315. Both the lower- and higher-frequency roll-offs of the bandpass response at the output port of the filter 315 are very steep, better to suppress adjacent-channel interference (ACT). The bandpass-filtered digital second-IF COFDM DCM signal supplied from the output port of the filter 315 is suitable to provide the intermediate-frequency COFDM DCM output signal for a front-end tuner 280 configuration.

The amplified second-IF COFDM DCM signal supplied from the output port of the second IF amplifier 311 is suitable to provide the intermediate-frequency COFDM DCM output signal for a front-end tuner 180 configuration. In such front-end tuner 180 configuration the A-to-D converter 314 and the digital bandpass filter 315 are unnecessary and can be omitted.

FIGS. 66 and 57 together depict a variant of the receiver apparatus for independent-sideband (ISB) demodulation of COFDM DCM depicted in FIGS. 63 and 57, digital circuitry shown in FIG. 66 replacing some of the analog circuitry shown in FIG. 63. The front-end tuner 180 of FIG. 63 that converts a selected radio-frequency COFDM DCM signal to an analog intermediate-frequency COFDM DCM signal is replaced in FIG. 66 by a front-end tuner 280 that converts a selected RF COFDM DCM signal to a digitized intermediate-frequency COFDM DCM signal. This digitized COFDM DCM signal is supplied from the output port of the front-end tuner 280 to respective signal input ports of +1, (−1) multipliers 213 and 214. A 2-phase divide-by-4 frequency divider 203 responds to rising edges of pulses from a clock oscillator 204, by supplying I and Q square waves to respective carrier input ports of the +1, (−1) multipliers 213 and 214. The clock oscillator 204 is subject to automatic frequency and phase control (AFPC) that adjusts the frequency of clock pulses to be four times the final intermediate-frequency (IF) carrier of the COFDM signals. The clock oscillator 204 is connected for supplying the clock pulses to an analog-to-digital converter in the front-end tuner 280, which A-to-D converter digitizes the intermediate-frequency COFDM DCM signal supplied to respective signal input ports of the +1, (−1) multipliers 213 and 214.

The leading I square wave that the frequency divider 203 supplies to the control input port of the +1, (−1) multiplier 213 conditions the +1, (−1) multiplier 213 to perform a 2-to-1 decimation of the 0°, 90°, 180° and 270° digital samples of COFDM DCM signal supplied to its input port, selecting the 0° digital samples for multiplication by +1 responsive to positive half cycles of I square wave, and selecting the 180° digital samples for multiplication by −1 responsive to negative half cycles of I square wave. The output port of the +1, (−1) multiplier 213 is connected for supplying the in-phase synchrodyne results to the input port of a digital lowpass filter 207. The lowpass filter 207 responds to the baseband portion of the in-phase synchrodyne results, but not to image signal. FIG. 66 shows the output port of the lowpass filter 207 connected for supplying its response the input port of the clocked digital delay line 210 providing compensatory delay for the latent delay of the digital FIR filter 209 used to perform Hilbert transformation.

The lagging Q square wave that the frequency divider 203 supplies to the control input port of the +1, (−1) multiplier 214 conditions the +1, (−1) multiplier 214 to perform a 2-to-1 decimation of the 0°, 90°, 180° and 270° digital samples of COFDM DCM signal supplied to its input port, selecting the 90° digital samples for multiplication by −1 responsive to negative half cycles of Q square wave, and selecting the 270° digital samples for multiplication by +1 responsive to positive half cycles of Q square wave. The output port of the +1, (−1) multiplier 214 is connected for supplying quadrature-phase synchrodyne results to the input port of to the input port of a digital lowpass filter 208. The lowpass filter 208 responds to the baseband portion of the quadrature-phase synchrodyne results, but not to image signal. FIG. 66 shows the output port of the lowpass filter 208 connected for supplying its response the input port of the FIR filter 209 for performing Hilbert transformation.

If the front-end tuner 280 contains digital lowpass filtering of the digitized IF COFDM DCM signal with rapid roll-off to suppress ACI, there is no reason for the digital lowpass filters 207 and 208 necessarily having to have sharp roll-offs of higher frequencies to suppress ACI. The Hilbert transform response of the FIR filter 209 and the response from digital delay line 210 are utilized in the subsequent portions of the FIG. 66 and FIG. 57 receiver apparatus in the same way as in the corresponding portions of the FIG. 63 and FIG. 57 receiver apparatus.

FIGS. 67 and 57 together depict another general structure of receiver apparatus for ISB demodulation of COFDM DCM signals. In accordance with further aspects of the invention, the FIG. 67 portion of this receiver apparatus employs phase-shift methods of ISB demodulation modified in a novel first manner particularly well suited for COFDM DCM signals. However, initial portions of the FIG. 67 apparatus are similar to the initial portions of the FIG. 63 apparatus.

As with the FIG. 63 apparatus, a reception antenna 81 captures the radio-frequency COFDM DCM signal for application as input signal to a front-end tuner 180 of the receiver. The front-end tuner 180 converts a selected radio-frequency COFDM DCM signal to an intermediate-frequency COFDM DCM signal, which is supplied to the respective signal input ports of mixers 201 and 202. The mixers 201 and 202 are of switching type connected for receiving I and Q square waves at their respective carrier input ports, as supplied from a 2-phase divide-by-4 frequency divider 203 in response to rising edges of pulses from a clock oscillator 204. The clock oscillator 204 is subject to AFPC that adjusts the frequency of clock pulses to be four times the final IF carrier of the COFDM signals. The leading in-phase (I) square wave, which the frequency divider 203 supplies to the carrier input port of the mixer 201, conditions the mixer 201 to provide an in-phase synchrodyning of intermediate-frequency COFDM DCM signal to baseband. The lagging quadrature-phase (Q) square wave, which the frequency divider 203 supplies to the carrier input port of the mixer 202, conditions the mixer 202 to provide a quadrature-phase synchrodyning of intermediate-frequency COFDM DCM signal to baseband. As with the FIG. 63 apparatus, the clock oscillator 204, the frequency divider 203, and the mixers 201 and 202 constitute apparatus for performing an in-phase synchrodyne and a quadrature-phase synchrodyne of the intermediate-frequency COFDM DCM signal to recover first and second baseband signals respectively.

As with the FIG. 63 apparatus, an A-to-D converter 205 performs analog-to-digital conversion of the baseband signal supplied from the output port of the mixer 201. The digitized in-phase baseband signal supplied from the output port of the A-to-D converter 205 is supplied to the input port of a digital lowpass filter 207. An A-to-D converter 206 performs analog-to-digital conversion of the baseband signal supplied from the output port of the mixer 202. The digitized quadrature-phase baseband signal supplied from the output port of the A-to-D converter 206 is supplied to the input port of a digital lowpass filter 208.

Subsequent portions of the FIG. 67 apparatus differ from subsequent portions of the FIG. 63 apparatus. The digital FIR filter 209 that the FIG. 63 apparatus includes for performing Hilbert transform is complex in nature and takes up considerable area on the silicon die in a monolithic integrated circuit construction. The FIG. 67 apparatus dispenses with the digital FIR filter 209, the digital delay line 210, the digital adder 211, and the digital subtractor 212.

The digital lowpass filter 207 is connected for supplying digitized samples of baseband folded COFDM DCM signal to the input port of the cyclic prefix detector 84. (Alternatively, the digital lowpass filter 208 is connected for supplying digitized samples of baseband folded COFDM DCM signal to the input port of the cyclic prefix detector 84 instead). The cyclic prefix detector 84 differentially combines the digitized samples of baseband folded COFDM DCM signal with those samples as delayed by the duration of an effective COFDM symbol. Nulls in the difference signal so generated should occur, marking the guard intervals of the baseband folded COFDM DCM signal. The nulls are processed to reduce any corruption caused by noise and to generate better-defined indications of the phasing of COFDM symbols. The output port of the cyclic prefix detector 84 is connected to supply these indications to the first of two input ports of the timing synchronization apparatus 285.

The signal input port of a guard interval remover 863 is connected for receiving digitized samples of an in-phase baseband COFDM signal from the output port of the digital lowpass filter 207. The output port of the guard interval remover 863 is connected for supplying the input port of a discrete-Fourier-transform (DFT) computer 873 with windowed portions of the quadrature-phase baseband signal that span respective COFDM symbol intervals. The signal input port of the guard interval remover 864 is connected for receiving digitized samples of a quadrature-phase baseband COFDM signal from the output port of the digital lowpass filter 208. The output port of the guard interval remover 864 is connected for supplying the input port of a discrete-Fourier-transform (DFT) computer 874 with windowed portions of the in-phase baseband signal that span respective COFDM symbol intervals. The DFT computers 873 and 874 are similar in construction, each having the capability of transforming COFDM carriers nominally 8K, 16K or 32K in number to the complex coordinates of respective QAM symbols. The DFT computers 873 and 874 perform bandpass filtering of individual OFDM carriers which bandpass filtering should be unresponsive to frequencies outside baseband. This bandpass filtering may allow digital lowpass filters 207 and 208 to be replaced by respective direct connections in modified FIG. 67 structure.

The timing synchronization apparatus 285 is connected for supplying gating control signals to respective control input ports of the guard interval removers 863 and 864. The timing synchronization apparatus 285 is further connected for supplying COFDM symbol timing information to the DFT computers 873 and 874. The indications concerning the phasing of COFDM symbols that the cyclic prefix detector 84 supplies to the timing synchronization apparatus 285 are sufficiently accurate for (a) initial windowing of the in-phase baseband folded COFDM signal that the guard interval remover 863 supplies to the DFT computer 873 and (b) initial windowing of the quadrature-phase baseband folded COFDM signal that the guard interval remover 862 supplies to the DFT computer 874.

The output port of the DFT computer 874 is connected via Hilbert transformation connections 875 for supplying complex coordinates of QAM symbols conveyed by respective ones of the received COFDM carriers to first addend input ports of a parallel array 876 of digital complex-number adders and to minuend input ports of a parallel array 877 of digital complex-number subtractors. These connections 875 are such as to perform Hilbert transform of the complex coordinates of QAM symbols, which procedure is explained in greater detail in the remaining portion of this paragraph. The real coordinates of the complex coordinates of QAM symbols are applied as imaginary components of input signals to the first addend input ports of the parallel array 876 of digital adders and to the minuend input ports of the parallel array 877 of digital subtractors. The imaginary coordinates of the complex coordinates of QAM symbols are applied as real components of input signals to the first addend input ports of the parallel array 876 of digital adders and to the minuend input ports of the parallel array 877 of digital subtractors. There is essentially no delay in this Hilbert transformation procedure, and it takes up little (if any) extra area on the silicon die in a monolithic integrated circuit construction. The output port of the DFT computer 873 is connected for supplying complex coordinates of QAM symbols conveyed by respective ones of the received COFDM carriers to second addend input ports of the parallel array 876 of digital complex-number adders and to subtrahend input ports of the parallel array 877 of digital complex-number subtractors.

The parallel array 876 of digital adders additively combines the complex coordinates of QAM symbols the DFT computer 874 generates, as transformed by the Hilbert transformation connections 875, with the complex coordinates of corresponding QAM symbols the DFT computer 873 generates. The sum output ports of the parallel array 876 of digital adders recover at baseband the complex coordinates of QAM symbols from the lower sideband of the COFDM DCM signal. The complex coordinates of QAM symbols extracted from pilot carriers in each COFDM symbol sampling interval are supplied as parallel input signal to the pilot carriers processor 288. The complex coordinates of QAM symbols extracted from carriers in each COFDM symbol sampling interval that convey coded data are supplied as parallel input signal to the frequency-domain channel equalizer 893 for QAM symbols extracted from the lower sideband of the COFDM DCM signal.

The parallel array 877 of digital subtractors differentially combines the complex coordinates of QAM symbols the DFT computer 874 generates, as transformed by the Hilbert transformation connections 875, with the complex coordinates of corresponding QAM symbols the DFT computer 873 generates. The difference output ports of the parallel array 877 of digital subtractors recover at baseband the complex coordinates of QAM symbols from the upper sideband of the COFDM DCM signal. The complex coordinates of QAM symbols extracted from pilot carriers in each COFDM symbol sampling interval are supplied as parallel input signal to the pilot carriers processor 288. The complex coordinates of QAM symbols extracted from carriers in each COFDM symbol sampling interval that convey coded data are supplied as parallel input signal to the frequency-domain channel equalizer 894 for QAM symbols extracted from the upper sideband of the COFDM DCM signal.

FIGS. 68 and 57 together depict a variant of the receiver apparatus for ISB demodulation of COFDM DCM depicted in FIGS. 67 and 57, digital circuitry depicted in FIG. 68 replacing some of the analog circuitry depicted in FIG. 67. FIG. 68 depicts modification of FIG. 67 morphologically and operationally similar to the modification of FIG. 63 depicted in FIG. 66. The components 180, 201, 202, 205 and 206 of FIG. 67 are replaced in FIG. 68 by components 280, 213 and 214 described supra in reference to FIG. 66. As with the FIG. 66 apparatus, the clock oscillator 204, the frequency divider 203, and the multipliers 213 and 214 constitute apparatus for performing an in-phase synchrodyne and a quadrature-phase synchrodyne of the intermediate-frequency COFDM DCM signal to recover first and second baseband signals respectively. The DFT computers 873 and 874 perform bandpass filtering of individual OFDM carriers which bandpass filtering should be unresponsive to frequencies outside baseband. This bandpass filtering may allow digital lowpass filters 207 and 208 to be replaced by respective direct connections in modified FIG. 68 structure.

Figure 69:
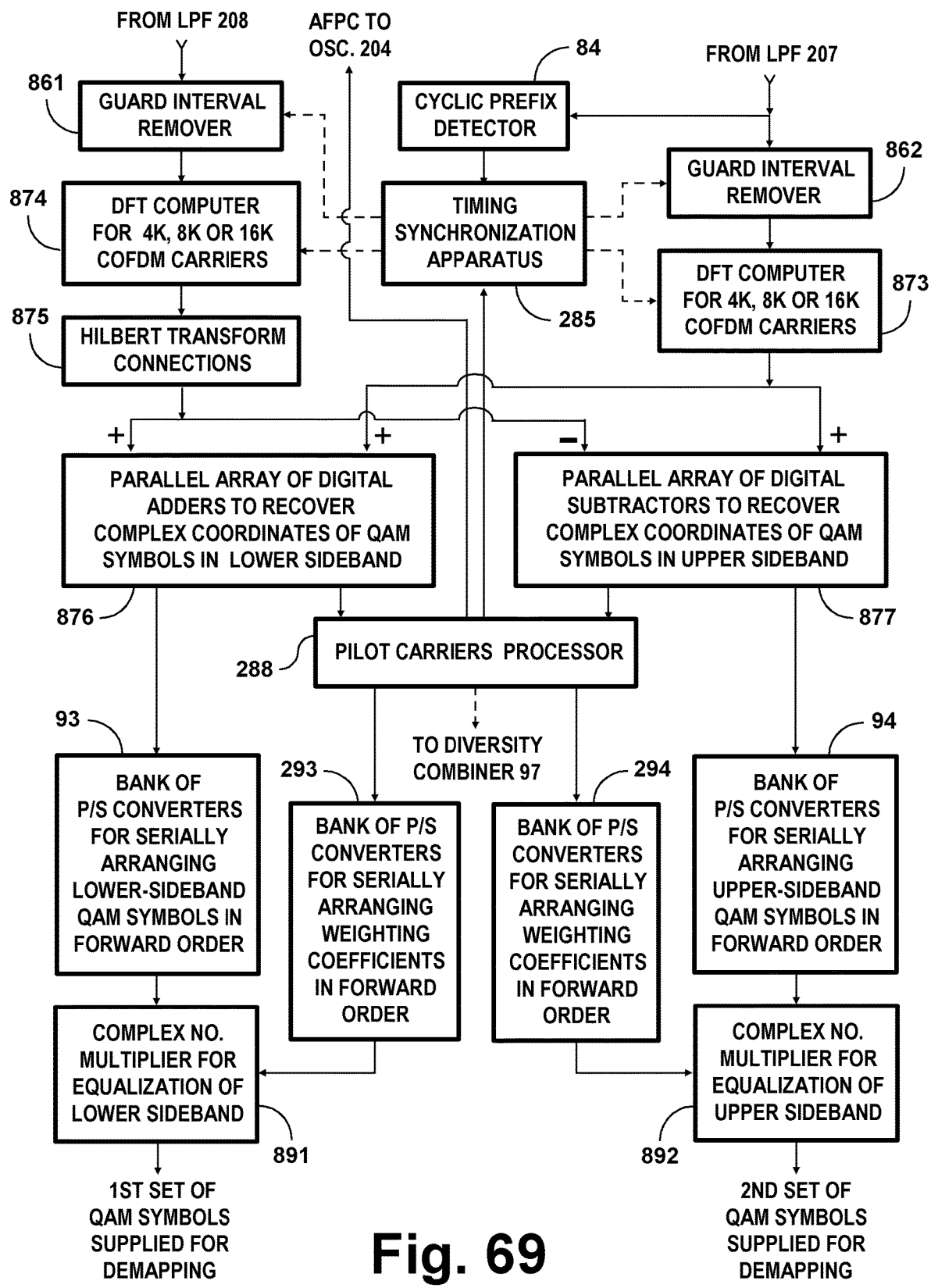
FIG. 69 is a schematic diagram of a modification suitable for both the FIG. 61 receiver structure and the FIG. 68 receiver structure.

FIG. 69 depicts modifications of either of the receiver structures depicted in FIGS. 67 and 68, which modifications reduce the number of complex-number multipliers needed for frequency domain channel equalization. The channel equalizer 893 that performed multiplications on each of the QAM symbols supplied it in parallel from the parallel array 876 of digital adders is omitted, and the channel equalizer 894 that performed multiplications on each of the QAM symbols supplied to it in parallel from the parallel array 877 of digital subtractors is also omitted. A complex-number multiplier 891 performs frequency-domain channel equalization on each of the QAM symbols from the lower sideband of the COFDM DCM signal furnished it by the parallel array 876 of digital adders after their serialization by a selected one of the parallel-to-serial (P/S) converters in the bank 93 of them. Another complex-number multiplier 892 performs frequency-domain channel equalization on each of the QAM symbols from the upper sideband of the COFDM DCM signal furnished it by the parallel array 877 of digital subtractors after their serialization by a selected one of the parallel-to-serial (P/S) converters in the bank 94 of them. The first and second sets of QAM symbols supplied from the respective product output ports of the multipliers 891 and 892 are suitable input signals for subsequent demapping apparatus—e.g., as depicted in FIG. 57 or 58.

More particularly, the QAM symbols from the lower sideband of the COFDM DCM signal that convey data are supplied by respective ones of the parallel array 876 of digital adders directly to respective ones of the parallel input ports of the selected one of the P/S converters in the bank 93 of them. The output port of that selected P/S converter responds to supply serialized QAM symbols from the lower sideband of the COFDM DCM signal to the multiplicand input port of the multiplier 891. The parallel input ports of a selected one of the parallel-to-serial (P/S) converters in a bank 931 of them receives, in parallel from the pilot carriers processor 288, the weighting coefficients for frequency-domain channel equalization of the lower sideband of the COFDM DCM signal. The output port of that selected P/S converter responds to supply serialized weighting coefficients for the lower sideband of the COFDM DCM signal to the multiplier input port of the complex-number multiplier 891. The multiplier 891 responds to its multiplicand and multiplier input signals to supply from its product output port an equalized first set of QAM symbols, suitable for subsequent demapping.

More particularly, the QAM symbols from the upper sideband of the COFDM DCM signal that convey data are supplied by respective ones of the parallel array 877 of digital subtractors directly to the parallel input ports of the selected one of the P/S converters in the bank 94 of them. The output port of that selected P/S converter responds to supply serialized QAM symbols from the upper sideband of the COFDM DCM signal to the multiplicand input port of the multiplier 892. The parallel input ports of a selected one of the parallel-to-serial (P/S) converters in a bank 941 of them receives, in parallel from the pilot carriers processor 288, the weighting coefficients for frequency-domain channel equalization of the upper sideband of the COFDM DCM signal. The output port of that selected P/S converter responds to supply serialized weighting coefficients for the lower sideband of the COFDM DCM signal to the multiplier input port of the complex-number multiplier 891. The multiplier 891 responds to its multiplicand and multiplier input signals to supply from its product output port an equalized second set of QAM symbols, suitable for subsequent demapping.

The modified phase shift method of ISB demodulation as described in connection with FIGS. 67-69 avoids the need for a digital FIR filter to perform Hilbert transform, but introduces parallel arrays of digital adders and digital subtractors to separate the lower-sideband QAM symbols from the upper-sideband QAM symbols. Receiver apparatus using a Weaver method of ISB demodulation as described in connection with FIGS. 70 and 57 also avoids the need for a digital FIR filter to perform Hilbert transform, but the modified phase shift method of ISB demodulation is more practical to implement.

Figure 70:
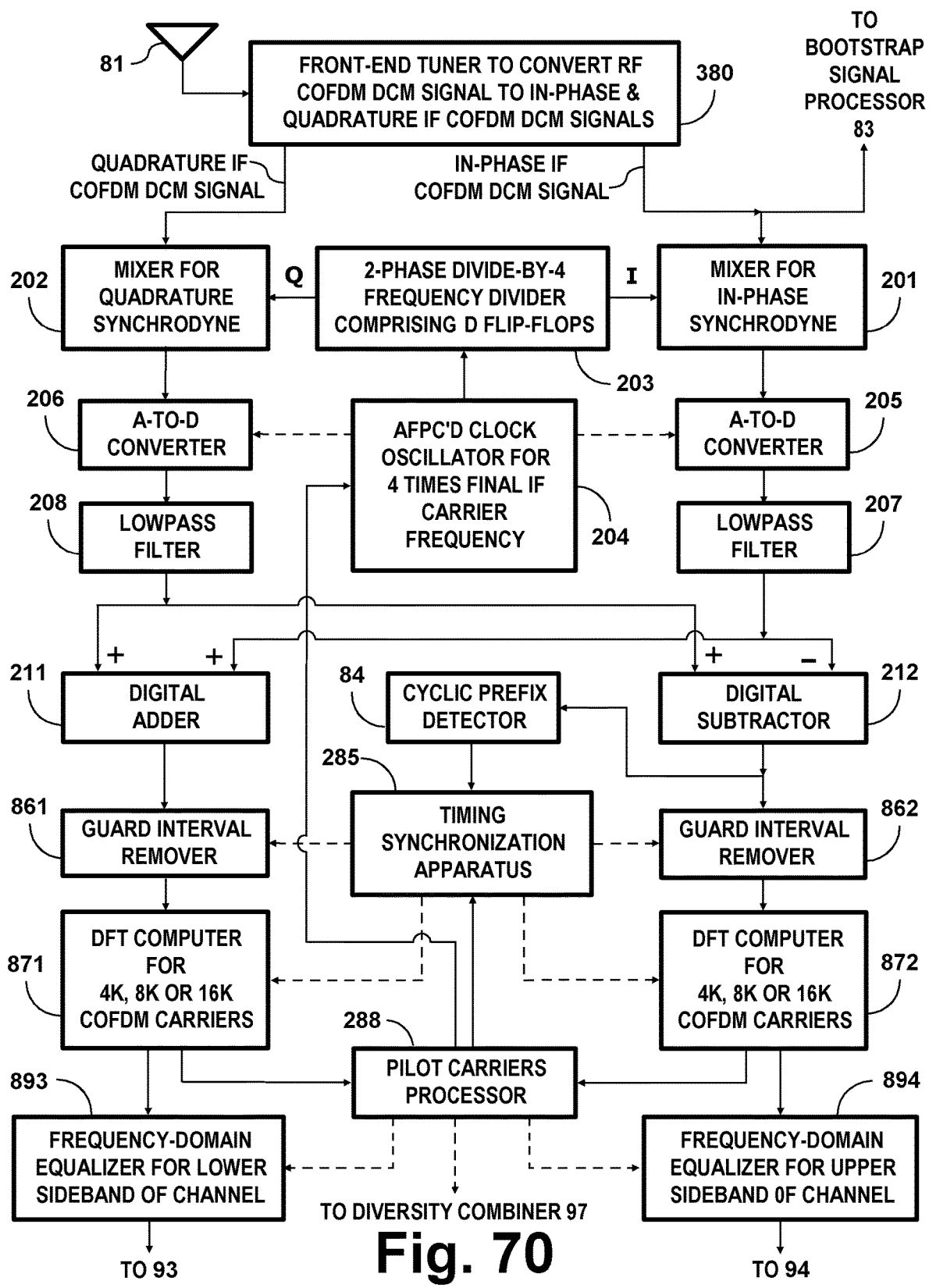

FIGS. 70 and 57 together depict the general structure of receiver apparatus for ISB demodulation of COFDM DCM signals using methods based on methods for demodulating SSB amplitude-modulation signals described by Donald K. Weaver, Jr. in his paper "A third method of generation and detection of single sideband signals", Proceedings of the IRE, vol. 44, December 1956 issue, pp. 1203-1205. The FIG. 70 structure for ISB demodulation of COFDM DCM signals differs from the FIG. 63 structure for ISB demodulation of COFDM DCM signals in the following regards. The front-end tuner 180 to convert RF COFDM DCM signal to IF COFDM DCM signal for application to the multiplicand input ports of the mixers 201 and 202 is replaced by a front-end tuner 380 to convert RF COFDM DCM signal to (a) an in-phase IF COFDM DCM signal for application to the multiplicand input port of the mixer 201 and (b) a quadrature IF COFDM DCM signal for application to the multiplicand input port of the mixer 202. The application of quadrature-phase IF COFDM DCM signal, rather than in-phase IF COFDM DCM signal, to the multiplicand input port of the mixer 202 obviates the need for an FIR digital filter 209 for Hilbert transformation. Accordingly, there is no call for digital delay line 210 to compensate for latent delay through the filter 209.

An A-to-D converter 205 performs analog-to-digital conversion of the in-phase and quadrature-phase components of the baseband signal supplied from the output port of the mixer 201. An A-to-D converter 206 performs analog-to-digital conversion of the in-phase and quadrature-phase components of the baseband signal supplied from the output port of the mixer 202. The digitized in-phase baseband signal supplied from the output port of the A-to-D converter 205 is supplied to the input port of a digital lowpass filter 207. The digitized quadrature-phase baseband signal supplied from the output port of the A-to-D converter 206 is supplied to the input port of a digital lowpass filter 208. Preferably, the design of the digital lowpass filters 207 and 208 provides a rapid roll-off in frequency response, so as to suppress adjacent-channel interference (ACI). The DFT computers 871 and 872 perform bandpass filtering of individual OFDM carriers which bandpass filtering should be unresponsive to frequencies outside baseband. This bandpass filtering may allow digital lowpass filters 207 and 208 to be replaced by respective direct connections in modified FIG. 72 structure.

The output port of the lowpass filter 207 and the output port of the lowpass filter 208 are connected to respective addend input ports of the digital adder 211, which is operative to recover at baseband the lower sideband of the COFDM DCM signal at its sum output port. The output ports of the lowpass filters 207 and 208 are respectively connected to the subtrahend input port and the minuend input port of the digital subtractor 212, which is operative to recover at baseband the upper sideband of the COFDM DCM signal at its difference output port. The responses from the sum output port of the digital adder 211 and from the difference output port of the digital subtractor 212 are utilized in the subsequent portions of the FIG. 70 and FIG.

57 receiver apparatus in the same way as in the corresponding portions of the FIG. 63 and FIG. 57 receiver apparatus.

Figure 71:
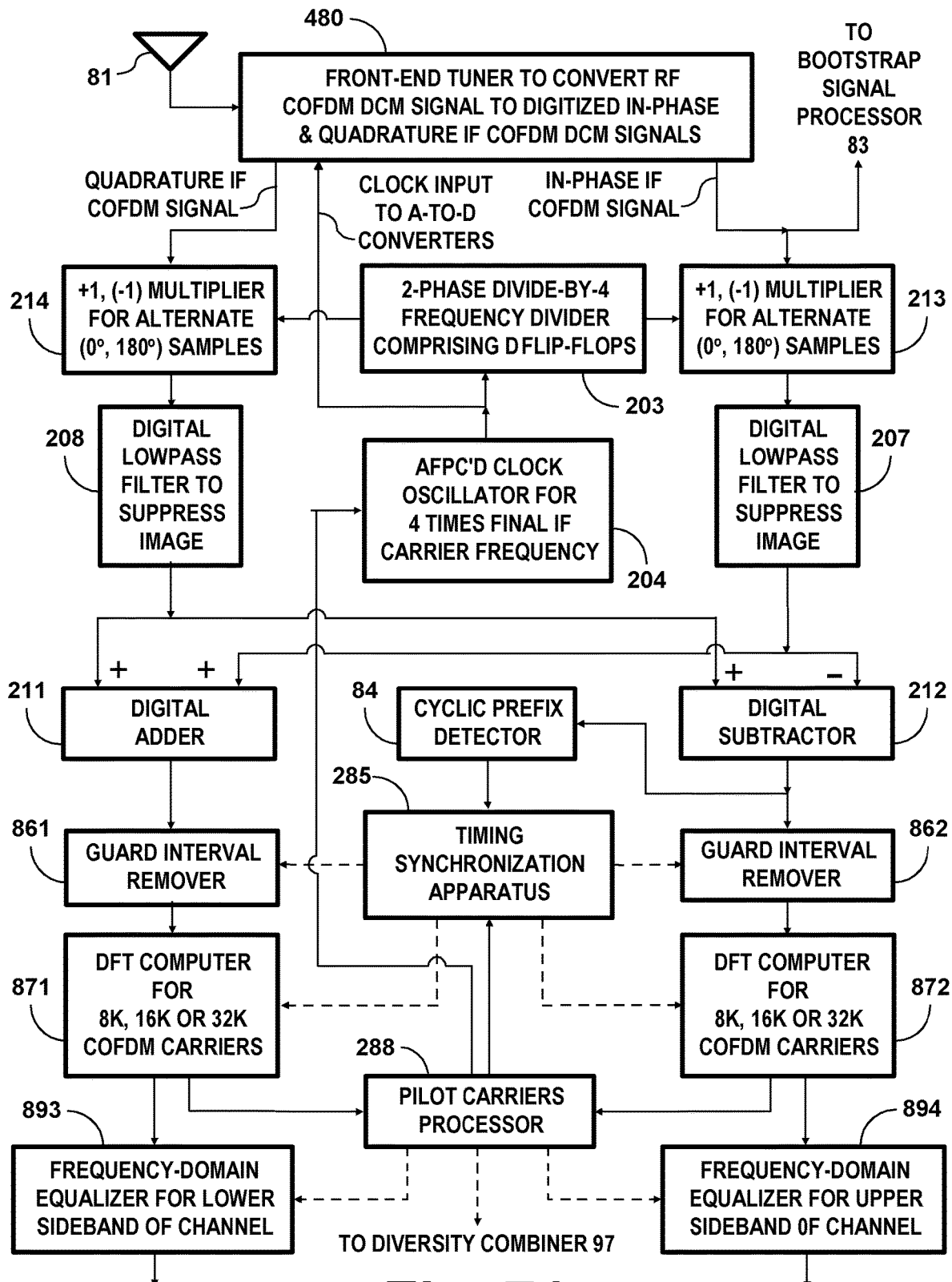

FIGS. 71 and 57 together form a schematic diagram of a variant of the receiver apparatus for ISB demodulation of COFDM DCM depicted in FIGS. and 57, digital circuitry depicted in FIG. 71 replacing some of the analog circuitry depicted in FIG. 70. The front-end tuner 380 depicted in FIG. 70 that is operable to convert RF COFDM signal to both in-phase and quadrature-phase analog IF COFDM signals is replaced in FIG. 71 by a front-end tuner 480 operable to convert RF COFDM signal to both in-phase and quadrature-phase digital IF COFDM DCM signals. The front-end tuner 480 is connected to supply the in-phase digital IF COFDM DCM signals to the multiplicand input port of the +1, (−1) multiplier 213 for in-phase synchrodyne to baseband. The front-end tuner 480 is connected to supply the quadrature-phase digital IF COFDM DCM signals to the multiplicand input port of a +1, (−1) multiplier 214 for quadrature-phase synchrodyne to baseband. A 2-phase divide-by-4 frequency divider 203 responds to rising edges of pulses from a clock oscillator 204, by supplying I and Q square waves to respective carrier input ports of the +1, (−1) multipliers 213 and 214. The clock oscillator 204 is subject to automatic frequency and phase control (AFPC) that adjusts the frequency of clock pulses to be four times the final intermediate-frequency (IF) carrier of the COFDM signals.

The leading I square wave that the frequency divider 203 supplies to the control input port of the +1, (−1) multiplier 213 conditions the +1, (−1) multiplier 213 to select the 0° digital samples of the in-phase second-IF COFDM DCM signal for multiplication by +1 responsive to positive half cycles of I square wave, and selecting the 180° digital samples of the in-phase second-IF COFDM DCM signal for multiplication by −1 responsive to negative half cycles of I square wave. The output port of the +1, (−1) multiplier 213 is connected for supplying the in-phase synchrodyne results to the input port of a digital lowpass filter 207. The lowpass filter 207 responds to the baseband portion of the in-phase synchrodyne results, but not to image signal.

The lagging Q square wave that the frequency divider 203 supplies to the control input port of the +1, (−1) multiplier 214 conditions the +1, (−1) multiplier 214 to select the −90° digital samples of the quadrature-phase second-IF COFDM DCM signal for multiplication by +1 responsive to positive half cycles of Q square wave, and selecting the 90° digital samples of the quadrature-phase second-IF COFDM DCM signal for multiplication by −1 responsive to negative half cycles of Q square wave. The output port of the +1, (−1) multiplier 214 is connected for supplying quadrature-phase synchrodyne results to the input port of to the input port of a digital lowpass filter 208. The lowpass filter 208 responds to the baseband portion of the quadrature-phase synchrodyne results, but not to image signal.

If the front-end tuner 480 contains digital lowpass filtering of the digitized IF COFDM DCM signal with rapid roll-off in frequency response for suppressing ACI, there is no reason for the digital lowpass filters 207 and 208 necessarily having to have rapid roll-offs in frequency response to suppress ACI. The output port of the lowpass filter 207 and the output port of the lowpass filter 208 are connected to respective addend input ports of the digital adder 211, which is operative to recover at baseband the lower sideband of the COFDM DCM signal at its sum output port. The output ports of the lowpass filters 207 and 208 are respectively connected to the minuend input port and the subtrahend input port of the digital subtractor 212, which is operative to recover at baseband the upper sideband of the COFDM DCM signal at its difference output port. The responses from the sum output port of of the digital adder 211 and from the difference output port of the digital subtractor 212 are utilized in the subsequent portions of the FIG. 71 and FIG. 57 receiver apparatus in the same way as in the corresponding portions of the FIG. 70 and FIG. 57 receiver apparatus. The bandpass filtering of individual OFDM carriers in DFT computers 871 and 872 may allow digital lowpass filters 207 and 208 to be replaced by respective direct connections in modified FIG. 71 structure.

Figure 72:
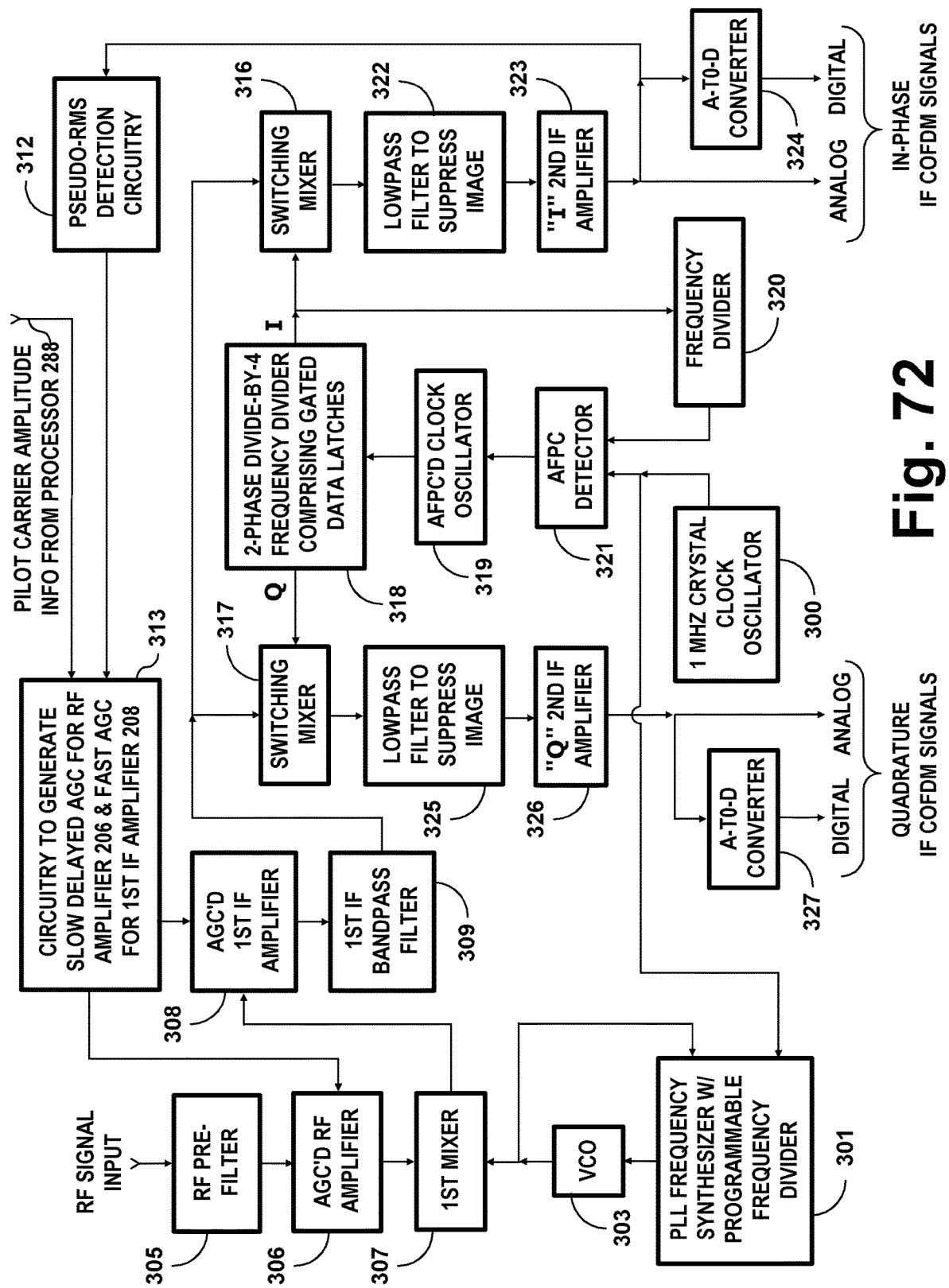
FIG. 72 is a schematic diagram of a double superheterodyne front-end tuner structure suitable for inclusion in either of the apparatuses for demodulating COFDM DCM signals depicted in FIGS. 70 and 71.

FIG. 72 depicts plural superheterodyne front-end tuner structure suitable for implementing the front-end tuner 380 depicted in FIG. 70 or for implementing the front-end tuner 480 depicted in FIG. 71. Elements 300-309, 312 and 313 of the FIG. 72 structure are similar to the elements 300-309, 312 and 313 in the FIG. 65 double-superheterodyne front-end tuner structure. A crystal clock oscillator 300 is connected for supplying 1 MHz reference oscillations to a PLL frequency synthesizer 301 that supplies AFPC voltage to a voltage-controlled oscillator 303. VCO 303 generates the first local oscillations used in the upward conversion of radio-frequency COFDM DCM signal to first-IF COFDM DCM signal. The input port of a pre-filter 305 is connected for receiving RF COFDM DCM signal supplied by an antenna or a cable distribution system. The RF output of the pre-filter 305 is amplified or attenuated to a desired level by an AGC'd RF amplifier 306 and then supplied to a first mixer 307, there to be mixed with oscillations from the first local oscillator 303 to generate first IF signal. The first IF output signal supplied from the mixer 307 is amplified by a narrow-band amplifier 308 and then supplied to a first-IF bandpass filter 309 such as a dielectric resonance filter, a strip-line filter or a SAW filter. The input port of pseudo-RMS detection circuitry 312 is connected for receiving amplified second-IF COFDM DCM signal supplied from the output port of a second IF amplifier. The output port of the pseudo-RMS detection circuitry 312 is connected for supplying an approximation of the root-mean-square RMS voltage of the amplified second-IF COFDM DCM signal to a first input port of circuitry 313 for generating respective automatic gain control (AGC) signals for the RF amplifier 306 and for the first IF amplifier 308. A second port of the circuitry 313 for generating AGC signals is connected for receiving pilot carrier amplitude information from the pilot carriers processor 288 depicted in FIG. 70 or in FIG. 71.

The single second mixer 310 of the FIG. 65 front-end tuner structure is replaced by two switching mixers 316 and 317 in the front-end tuner structure depicted in FIG. 72. A 2-phase divide-by-4 frequency divider 318 responds to rising edges of pulses from a clock oscillator 319, by supplying I and Q square waves to respective carrier input ports of the switching mixers 316 and 317. The fundamental frequency of the Q square wave lags the fundamental frequency of the Q square wave by 90° (π/4 radians). The clock oscillator 319 is subject to automatic frequency and phase control (AFPC) responsive to voltage supplied from a PLL frequency synthesizer comprising the divide-by-4 frequency divider 318, a further frequency divider 320 and an AFPC detector 321. The input port of the frequency divider 320 is connected to receive the I square wave applied to the carrier input port of the switching mixer 316. The output port of the frequency divider 230 is connected to a first input port of the AFPC detector 321. A second input port of the AFPC detector 321 is connected for receiving reference-frequency oscillations from the crystal oscillator 300. The output port of the AFPC detector 321 is connected for supplying voltage to the clock oscillator 319 to implement automatic frequency and phase control (AFPC) thereof.

The output port of the switching mixer 316 connects to the input port of a lowpass filter 322 that suppresses image signal in the response supplied from its output port to the input port of an amplifier 323 of the in-phase ("I") second-IF signal. The output port of the "I" second-IF amplifier 323 is connected to supply analog amplified in-phase second-IF signal that is suitable for an output signal from the FIG. 70 front-end tuner 380. FIG. 72 shows this amplified in-phase second-IF signal applied to the input port of an analog-to-digital converter 324 that responds to supply digital amplified in-phase second-IF signal suitable for a digital output signal from the FIG. 71 front-end tuner 480.

The output port of the switching mixer 317 connects to the input port of a lowpass filter 325 that suppresses image signal in the response supplied from its output port to the input port of an amplifier 326 of the quadrature-phase ("Q") second-IF signal. The output port of the "Q" second-IF amplifier 326 is connected to supply analog amplified quadrature-phase second-IF signal that is suitable for an output signal from the FIG. 70 front-end tuner 380. FIG. 72 shows this amplified quadrature-phase second-IF signal applied to the input port of an analog-to-digital converter 327 that responds to supply digital amplified quadrature-phase second-IF signal that is suitable for an output signal from the FIG. 71 front-end tuner 480.

FIG. 72 shows the input port of the pseudo-RMS detection circuitry 312 connected for receiving amplified in-phase second-IF signal from the output port of the "I" second-IF amplifier 323. With such connection the measurement of second-IF signal amplitude by the pseudo-RMS detection circuitry 312 takes into account the amplitudes of the pilot carriers in the COFDM DCM signal. Alternatively, the pseudo-RMS detection circuitry 312 is connected instead for receiving amplified quadrature-phase second-IF signal from the output port of the "Q" second-IF amplifier 326. With such connection the measurement of second-IF signal amplitude by the pseudo-RMS detection circuitry 312 is nonresponsive to the amplitudes of the pilot carriers in the COFDM DCM signal.

Each of the FIG. 70 and the FIG. 71 COFDM demodulation apparatuses obviates the need for an FIR digital filter to perform Hilbert transformation. However, in order for a Weaver method of demodulation to perform well, these front-end tuners 380 and 480 each need to convert RF COFDM DCM signal to both in-phase and quadrature-phase IF COFDM DCM signals subject to the same amplification. The orthogonal relationship between the in-phase and quadrature-phase IF COFDM DCM signals that either of these front-end tuners 380 and 480 supplies has to be scrupulously maintained, if a Weaver method of ISB demodulation is to perform well. Also, the respective gains of the in-phase and quadrature-phase IF COFDM DCM signals that the front-end tuner supplies have to match closely, if a Weaver method of ISB demodulation is to perform well. The FIG. 72 structure for front-end tuners addresses these problems by using the 2-phase divide-by-4 frequency divider 318 responsive to output signal from the clock oscillator 319. However, the frequency of oscillations supplied from the clock oscillator 319 will approach 3 GHz, in order to position the fundamental frequencies of the I and Q square waves from the frequency divider 318 above the UHF band for television broadcasting.

The structures depicted in FIGS. 63, 66, 67 and 68 are preferred over variants of them that defer lowpass digital filtering to suppress unwanted image frequencies until after the digital adder 211 and the digital subtractor 212.

Rather than operating two DFT computers in parallel in the in-phase and quadrature-phase branches of the receiver apparatus shown in any of FIGS. 63 and 66-71, it is possible to use a single DFT computer in time-division multiplex to serve both branches. While this can reduce "hardware" requirements, higher operating speeds will be required to implement such multiplex.

The improved methods of demodulating independent-sideband digital amplitude-modulation signals described supra can be broadly applied in a number of digital communications systems. Such methods can be utilized by the bootstrap signal processor 83 depicted in FIG. 57, by way of specific example.

Various other modifications and variations can be made in the specifically described apparatuses without departing from the spirit or scope of the invention in certain broader ones of its aspects. For example, in variations of the structures depicted in FIGS. 63, 66-68, 70 and 71 the AFPC'd clock oscillator 204 is replaced by a fixed-frequency clock oscillator, such as a crystal-controlled oscillator. AFPC signals from the pilot carriers processor 288 are supplied to the front-end tuner for fine-tuning a local oscillator therein, so that the principal carrier of intermediate-frequency COFDM DCM signal(s) supplied from the front end tuner is appropriate for in-phase and quadrature-phase synchrodynes to baseband in those variations of the structures depicted in FIGS. 63, 66-68, 70 and 71.

Persons skilled in the art of designing DTV systems and acquainted with this disclosure are apt to discern that various modifications and variations can be made in the specifically described apparatuses without departing from the spirit or scope of the invention in certain broader ones of its aspects. Accordingly, it is intended that such modifications and variations of the specifically described apparatuses be considered to result in further embodiments of the invention, to be included within the scope of the appended claims and their equivalents in accordance with the doctrine of equivalents.

In the appended claims, the word "said" rather than the word "the" is used to indicate the existence of an antecedent basis for a term being provided earlier in the claims. The word "the" is used for purposes other than to indicate the existence of an antecedent basis for a term appearing earlier in the claims, the usage of the word "the" for other purposes being consistent with customary grammar in the American English language.

What is claimed is:

1. A method of employing coded orthogonal frequency-division multiplexed (COFDM) dual-subcarrier-modulation (DCM) in a communication system, in which a lower-frequency sideband and an upper-frequency sideband of a COFDM DCM signal convey the same coded digital data in respective formats designed to minimize the peak-to-average-power ratio (PAPR) of said COFDM DCM signal, said method comprising successive steps of:

parsing said coded digital data into a succession of digital map labels of a prescribed size;

generating a first set of successive coded complex-modulation (CCM) symbols in accordance with a first pattern of mapping said succession of said digital map labels to CCM symbol constellations of a chosen type, said chosen type being one of various quadrature amplitude modulation (QAM) and amplitude-phase-shift keying (APSK) types, said first pattern of mapping digital map labels to CCM symbol constellations having a respective −I,+Q quadrant and a respective +I,+Q quadrant and a respective +I,−Q quadrant and a respective −I,−Q quadrant;

generating a second set of successive coded complex-modulation (CCM) symbols in accordance with a second pattern of mapping said succession of said digital map labels to CCM symbol constellations of said chosen type, said second pattern of mapping having a respective −I,+Q quadrant including the same digital map labels as the +I,−Q quadrant of said first pattern of mapping with the map labels associated with higher than average energy in each of these two quadrants being associated with lower than average energy in the other quadrant, said second pattern of mapping having a respective +I,+Q quadrant including the same digital map labels as the −I,−Q quadrant of said first pattern of mapping with the map labels associated with higher than average energy in each of these two quadrants being associated with lower than average energy in the other quadrant, said second pattern of mapping having a respective +I,−Q quadrant including the same digital map labels as the −I,+Q quadrant of said first pattern of mapping with the map labels associated with higher than average energy in each of these two quadrants being associated with lower than average energy in the other quadrant, said second pattern of mapping having a respective a −I,−Q quadrant including the same digital map labels as the +I,+Q quadrant of said first pattern of mapping with the map labels associated with higher than average energy in each of these two quadrants being associated with lower than average energy in the other quadrant;

employing inverse Fourier transform technique to generate coded complex modulation of a first set of subcarriers for inclusion in said lower-frequency sideband of said COFDM DCM signal, thus to convey said succession of said digital map labels via said first set of successive CCM symbol constellations which employ said first pattern of mapping digital map labels;

employing inverse Fourier transform technique to generate coded complex modulation of a second set of subcarriers for inclusion in said upper-frequency sideband of said COFDM DCM signal, thus to convey said succession of said digital map labels via said second set of successive CCM symbol constellations which employ said second pattern of mapping digital map labels;

up-converting said COFDM DCM signal to higher frequencies;

amplifying power of the resulting higher-frequency COFDM DCM signal; and transmitting said resulting higher-frequency COFDM DCM signal via a transmission medium.

2. The method of claim 1, comprising further steps of:
inserting pilot-carrier symbols at regular intervals into said first set of CCM symbols before said step of employing inverse Fourier transform technique to generate coded complex modulation of said first set of subcarriers for inclusion in said lower-frequency sideband of said COFDM DCM signal, thus to generate pilot subcarriers in said lower-frequency sideband responsive to said pilot carrier symbols inserted into said first set of CCM symbols; and
inserting pilot-carrier symbols at regular intervals into said second set of CCM symbols before said step of employing inverse Fourier transform technique to generate coded complex modulation of said second set of subcarriers for inclusion in said upper-frequency sideband of said COFDM DCM signal, thus to generate pilot subcarriers in said upper-frequency sideband responsive to said pilot carrier symbols inserted into said second set of CCM symbols.

3. The method of claim 1, wherein:
ones of said first set of subcarriers for inclusion in said lower-frequency sideband of said COFDM DCM signal are progressively higher in frequency responsive to successive ones of said first succession of said digital map labels; and
ones of said second set of subcarriers for inclusion in said higher-frequency sideband of said COFDM DCM signal are progressively higher in frequency responsive to successive ones of said second succession of said digital map labels.

4. The method of claim 1, wherein:
said first and said second patterns of mapping said digital map labels are for square CCM symbol constellations;
the digital map labels in the −I,+Q quadrant of said second pattern of mapping are positioned in diagonal opposition to the positioning of the same digital map labels in the +I,−Q quadrant of said first pattern of mapping;
the digital map labels in the +I,+Q quadrant of said second pattern of mapping are positioned in diagonal opposition to the positioning of the same digital map labels in the −I,−Q quadrant of said first pattern of mapping;
the digital map labels in the +I,−Q quadrant of said second pattern of mapping are positioned in diagonal opposition to the positioning of the same digital map labels in the −I,+Q quadrant of said first pattern of mapping; and
the digital map labels in the −I,−Q quadrant of said second pattern of mapping are positioned in diagonal opposition to the positioning of the same digital map labels in the +I,+Q quadrant of said first pattern of mapping.

5. The method of claim 1, wherein:
said first and said second patterns of mapping said digital map labels are for square CCM symbol constellations;
the digital map labels in the −I,+Q quadrant of said second pattern of mapping are positioned similarly to the positioning of the same digital map labels in the +I,−Q quadrant of said first pattern of mapping;
the digital map labels in the +I,+Q quadrant of said second pattern of mapping are positioned similarly to the positioning of the same digital map labels in the −I,−Q quadrant of said first pattern of mapping;
the digital map labels in the +I,−Q quadrant of said second pattern of mapping are positioned similarly to the positioning of the same digital map labels in the −I,+Q quadrant of said first pattern of mapping; and
the digital map labels in the −I,−Q quadrant of said second pattern of mapping are positioned similarly to the positioning of the same digital map labels in the +I,+Q quadrant of said first pattern of mapping.

6. The method of claim 1, wherein said first and said second patterns of mapping use Gray labeling of points in said CCM symbols.

7. The method of claim 6, wherein said first and said second patterns of mapping use Gray map labeling of lattice points in square 16QAM symbol constellations.

8. The method of claim 6, wherein said first and said second patterns of mapping use Gray map labeling of lattice points in square 64QAM symbol constellations.

9. The method of claim 6, wherein said first and said second patterns of mapping use Gray map labeling of lattice points in square 256QAM symbol constellations.

10. The method of claim 1, wherein said first and said second patterns of mapping said digital map labels use superposition-coded-modulation (SCM) labeling of lattice points in square CCM symbol constellations.

11. The method of claim 1, wherein said first and said second patterns of mapping said digital map labels use anti-Gray labeling of lattice points in square CCM symbol constellations.

12. Receiver apparatus for receiving said higher-frequency COFDM DCM signal transmitted via a transmission medium in accordance with the claim 1 method, said receiver apparatus comprising:
  means for selectively receiving said higher-frequency COFDM DCM signal transmitted via said transmission medium;
  means for regenerating said first and said second sets of coded complex-modulation (CCM) symbols, said regenerated first set of CCM symbols descriptive of the discrete Fourier transform of COFDM carriers from the lower half spectrum of the selectively received higher-frequency COFDM DCM signal, and said regenerated second set of CCM symbols descriptive of the discrete Fourier transform of COFDM carriers from the upper half spectrum of the selectively received higher-frequency COFDM DCM signal;
  means for serially arranging said regenerated first set of CCM symbols in each COFDM symbol in a first prescribed spectral order;
  means for serially arranging said regenerated second set of CCM symbols in each COFDM symbol in a second prescribed spectral order, such that each successive CCM symbol in said regenerated second set of QAM symbols conveys FEC-coded data related to FEC-coded data conveyed by a contemporaneous CCM symbol in said regenerated first set of CCM symbols as serially arranged in said first prescribed spectral order;
  first means for demapping, demapping in accordance with said first pattern of mapping, connected to respond to said regenerated first set of CCM symbols as thus serially arranged in said first prescribed spectral order to recover a first succession of CCM symbol map labels in soft-bit format;
  second means for demapping, demapping in accordance with said second pattern of mapping, connected to respond to said regenerated second set of CCM symbols as thus serially arranged in said second prescribed spectral order to recover a second succession of CCM symbol map labels in soft-bit format; and
  a diversity combiner for combining soft bits of corresponding CCM symbol map labels in said first and second successions thereof as received by said diversity combiner as first and second input signals thereto, thereby to reproduce soft bits of said coded data as response from said diversity combiner.

13. The receiver apparatus of claim 12, wherein said first and second demappers are configured to demap square QAM symbol constellations that are Gray-mapped.

14. The receiver apparatus of claim 12, wherein said first and second demappers are configured to demap square QAM symbol constellations that have superposition-coded-modulation (SCM) mapping.

15. The receiver apparatus of claim 12, wherein said means for selectively receiving a higher-frequency COFDM signal comprises:
  a front-end tuner for selectively receiving said higher-frequency COFDM signal as transmitted in analog form and down-converting said higher-frequency COFDM signal to a baseband COFDM signal; and
  means for digitizing successive samples of said baseband COFDM signal.

16. The receiver apparatus of claim 15, comprising:
  a computer connected for computing the discrete Fourier transform of said successive samples of said baseband COFDM signal, said computer constituting said means for regenerating said first and said second sets of CCM symbols;
  a frequency-domain channel equalizer for said regenerated first and second sets of CCM symbols that said computer computes from each of said successive samples of said baseband COFDM signal;
  a first parallel-to-serial converter connected for receiving in parallel each equalized said first set of CCM symbols and for supplying each equalized said first set of CCM symbols seriatim to said first means for demapping said regenerated first set of CCM symbols as thus serially arranged, said first parallel-to-serial converter constituting said means for serially arranging said regenerated first set of CCM symbols in each COFDM symbol in said first prescribed spectral order; and
  a second parallel-to-serial converter connected for receiving in parallel each equalized said second set of CCM symbols and for supplying each equalized said second set of CCM symbols seriatim to said second means for demapping said second set of CCM symbols as thus serially arranged, said second parallel-to-serial converter constituting said means for serially arranging said regenerated second set of CCM symbols in each COFDM symbol in said second prescribed spectral order.

17. The receiver apparatus of claim 15, comprising:
  a computer connected for computing the discrete Fourier transform of said successive samples of said baseband COFDM signal, said computer constituting said means for regenerating said first and said second sets of CCM symbols;
  a first parallel-to-serial converter connected for receiving in parallel each said regenerated first set of CCM symbols said computer computes from a respective one of said successive samples of said baseband COFDM signal, said first parallel-to-serial converter further connected for supplying each said first set of CCM symbols seriatim, said first parallel-to-serial converter constituting said means for serially arranging said regenerated first set of CCM symbols in each COFDM symbol in said first prescribed spectral order;
  a first frequency-domain channel equalizer for equalizing said regenerated first sets of CCM symbols supplied seriatim from said first parallel-to-serial converter to generate equalized first sets of CCM symbols supplied to said first means for demapping said regenerated first set of CCM symbols;
  a second parallel-to-serial converter connected for receiving in parallel each said regenerated second set of CCM symbols said computer computes from a respective one of said successive samples of said baseband COFDM signal, said second parallel-to-serial converter further connected for supplying each said regenerated second set of CCM symbols seriatim, said second parallel-to-serial converter constituting said means for serially arranging said regenerated second set of CCM symbols in each COFDM symbol in said second prescribed spectral order, and a second frequency-domain channel equalizer for equalizing said regenerated second sets of CCM symbols supplied seriatim from said second parallel-to-serial converter to generate equalized second sets of QAM symbols supplied to said second means for demapping said regenerated second set of CCM symbols.

18. The receiver apparatus of claim 12, wherein said means for selectively receiving a higher-frequency COFDM signal comprises:
a front-end tuner for selectively receiving said higher-frequency COFDM signal as transmitted in analog form and down-converting said higher-frequency COFDM signal to an intermediate-frequency COFDM signal; and
an independent-sideband demodulator for demodulating said intermediate-frequency COFDM signal to recover first and second baseband signals, said first baseband signal resulting from digitized demodulation of the lower sideband of said intermediate-frequency COFDM signal, and said second baseband signal resulting from digitized demodulation of the upper sideband of said intermediate-frequency COFDM signal.

19. The receiver apparatus of claim 18, wherein said independent-sideband demodulator is configured for (a) demodulating the lower-frequency sideband of said intermediate-frequency COFDM signal in accordance with a first phase-shift method to recover a first baseband signal and (b) demodulating the upper-frequency sideband of said intermediate-frequency COFDM signal in accordance with a second phase-shift method to recover a second baseband signal.

20. The receiver apparatus of claim 18, wherein said independent-sideband demodulator is configured for demodulating said intermediate-frequency COFDM signal to recover first and second baseband signals in accordance with a Weaver method.

21. The receiver apparatus of claim 18, comprising:
a first computer included in said means for regenerating said first and said second sets of CCM symbols, said first computer connected for computing the discrete Fourier transform of successive samples of said first baseband signal to regenerate said first set of CCM symbols descriptive of the discrete Fourier transform of COFDM carriers from the lower half spectrum of the selectively received COFDM higher-frequency signal;
a first frequency-domain channel equalizer for said regenerated first set of CCM symbols said first computer computes from successive samples of said first baseband signal;
a first parallel-to-serial converter connected for receiving in parallel equalized said regenerated first set of CCM symbols from each successive sample of said first baseband signal and for supplying the equalized generated first set of CCM symbols seriatim to said first means for demapping said regenerated first set of CCM symbols as thus serially arranged, said first parallel-to-serial converter constituting said means for serially arranging said regenerated first set of CCM symbols in each COFDM symbol in said first prescribed spectral order;
a second computer included in said means for regenerating said first and said second sets of CCM symbols, said second computer connected for computing the discrete Fourier transform of successive samples of said second baseband signal to regenerate said second set of CCM symbols descriptive of the discrete Fourier transform of COFDM carriers from the upper half spectrum of the selectively received COFDM higher-frequency signal;
a second frequency-domain channel equalizer for said regenerated second set of CCM symbols said second computer computes from said successive samples of said second baseband signal; and
a second parallel-to-serial converter connected for receiving in parallel each equalized said second set of CCM symbols and for supplying each equalized said second set of CCM symbols seriatim to said second means for demapping said regenerated second set of CCM symbols as thus serially arranged, said second parallel-to-serial converter constituting said means for serially arranging the regenerated said second set of CCM symbols in each COFDM symbol in said second prescribed spectral order.

22. The claim 18 receiver apparatus, comprising:
a first computer included in said means for regenerating said first and said second sets of CCM symbols, said first computer connected for computing the discrete Fourier transform of successive samples of said first baseband signal to regenerate said first set of CCM symbols descriptive of the discrete Fourier transform of COFDM carriers from the lower half spectrum of the selectively received COFDM higher-frequency signal;
a first parallel-to-serial converter connected for receiving in parallel each regenerated said first set of CCM symbols and for supplying each regenerated said first set of CCM symbols seriatim, said first parallel-to-serial converter constituting said means for serially arranging said regenerated first set of CCM symbols in each COFDM symbol in said first prescribed spectral order;
a first frequency-domain channel equalizer for equalizing said regenerated first sets of CCM symbols supplied seriatim from said first parallel-to-serial converter to generate equalized first sets of CCM symbols supplied to said first means for demapping said first set of CCM symbols;
a second computer included in said means for regenerating said first and said second sets of CCM symbols, said second computer connected for computing the discrete Fourier transform of successive samples of said second baseband signal to regenerate said second set of CCM symbols descriptive of the discrete Fourier transform of COFDM carriers from the upper half spectrum of the selectively received COFDM higher-frequency signal;
a second parallel-to-serial converter connected for receiving in parallel each equalized said second set of CCM symbols and for supplying each equalized said second set of QAM symbols seriatim, said second parallel-to-serial converter constituting said means for serially arranging said regenerated second set of CCM symbols in each COFDM symbol in said second prescribed spectral order; and
a second frequency-domain channel equalizer for equalizing said regenerated second set of CCM symbols supplied seriatim from said second parallel-to-serial converter to generate equalized second sets of CCM symbols supplied to said second means for demapping said regenerated second set of CCM symbols.

23. Receiver apparatus for receiving said higher-frequency COFDM DCM signal transmitted via a transmission medium in accordance with the claim 1 method, said receiver apparatus comprising:

a front-end tuner for selectively receiving said higher-frequency COFDM DCM signal as transmitted in analog form and down-converting said higher-frequency COFDM DCM signal to an intermediate-frequency COFDM DCM signal;

means for performing an in-phase synchrodyne and a quadrature-phase synchrodyne of said intermediate-frequency COFDM DCM signal to recover first and second baseband signals respectively;

a first computer connected for computing the discrete Fourier transform of said first baseband signal in digital form, as successively sampled during prescribed sampling intervals;

a second computer connected for computing the discrete Fourier transform of said second baseband signal in digital form, as successively sampled during prescribed sampling intervals;

a parallel array of digital adders for regenerating increments of said first set of CCM symbols responsive to respective sums of (a) the complex coordinates of respective components of the discrete Fourier transform of successive samples of said first baseband signal supplied through respective Hilbert transform connections to respective first addend connections of said digital adders and (b) the complex coordinates of respective components of the discrete Fourier transform of successive samples of said second baseband signal supplied through respective connections to respective second addend connections of said digital adders;

a parallel array of digital subtractors for regenerating increments of said second set of CCM symbols responsive to respective differences between (a) the complex coordinates of respective components of the discrete Fourier transform of successive samples of said first baseband signal supplied through respective Hilbert transform connections to respective subtrahend connections of said digital adders and (b) the complex coordinates of respective components of the discrete Fourier transform of successive samples of said second baseband signal supplied through respective connections to respective minuend connections of said digital subtractors;

a first frequency-domain channel equalizer for each successive one of said increments of said regenerated first set of CCM symbols supplied from sum output connections of said parallel array of digital adders;

a second frequency-domain channel equalizer for each successive one of said increments of said regenerated second set of CCM symbols supplied from difference output connections of said parallel array of digital subtractors;

a first parallel-to-serial converter connected for receiving in parallel each equalized successive increment of said regenerated first set of QAM symbols and for supplying equalized said regenerated first set of CCM symbols seriatim, said first parallel-to-serial converter serially arranging said regenerated first set of CCM symbols in each COFDM symbol in said first prescribed spectral order;

means for demapping, in accordance with said first pattern of mapping, said regenerated first set of CCM symbols as thus serially arranged in said first prescribed spectral order, thereby to recover a first succession of CCM symbol map labels in soft-bit format;

a second parallel-to-serial converter connected for receiving in parallel each equalized successive increment of said regenerated second set of CCM symbols and for supplying equalized said regenerated second set of CCM symbols seriatim, said second parallel-to-serial converter serially arranging said regenerated second set of CCM symbols in each COFDM symbol in said second prescribed spectral order;

means for demapping, in accordance with said second pattern of mapping, said regenerated second set of CCM symbols as thus serially arranged in said second prescribed spectral order to recover a second succession of CCM symbol map labels in soft-bit format; and a diversity combiner for combining soft bits of corresponding CCM symbol map labels in said first and second successions thereof as received by said diversity combiner as first and second input signals thereto, thereby to reproduce soft bits of said coded data as response from said diversity combiner.

24. Receiver apparatus for receiving said higher-frequency COFDM DCM signal transmitted via a transmission medium in accordance with the claim 1 method, said receiver apparatus comprising:

a front-end tuner for selectively receiving said higher-frequency COFDM DCM signal as transmitted in analog form and down-converting said higher-frequency COFDM DCM signal to an intermediate-frequency COFDM DCM signal;

means for performing an in-phase synchrodyne and a quadrature-phase synchrodyne of said intermediate-frequency COFDM DCM signal to recover first and second baseband signals respectively;

a first computer connected for computing the discrete Fourier transform of successive samples of said first baseband signal in digital form;

a second computer connected for computing the discrete Fourier transform of successive samples of said second baseband signal in digital form;

a parallel array of digital adders for regenerating said first set of CCM symbols responsive to respective sums of (a) the complex coordinates of respective components of the discrete Fourier transform of successive samples of said first baseband signal supplied through respective Hilbert transform connections to respective first addend connections of said digital adders and (b) the complex coordinates of respective components of the discrete Fourier transform of successive samples of said second baseband signal supplied through respective connections to respective second addend connections of said digital adders;

a parallel array of digital subtractors for regenerating said second set of CCM symbols responsive to respective differences between (a) the complex coordinates of respective components of the discrete Fourier transform of successive samples of said first baseband signal supplied through respective Hilbert transform connections to respective subtrahend connections of said digital adders and (b) the complex coordinates of respective components of the discrete Fourier transform of successive samples of said second baseband signal supplied through respective connections to respective minuend connections of said digital subtractors;

a first parallel-to-serial converter connected for receiving in parallel each regenerated said first set of CCM symbols and for supplying each regenerated said first set of CCM symbols seriatim;

a first frequency-domain channel equalizer for equalizing said regenerated first sets of CCM symbols supplied seriatim from said first parallel-to-serial converter to generate equalized first sets of CCM symbols means for demapping, in accordance with said first pattern of mapping, each said regenerated first set of CCM symbols after its equalization by said first frequency-domain channel equalizer, thereby to recover a first succession of CCM symbol map labels in soft-bit format;

a second parallel-to-serial converter connected for receiving in parallel each regenerated said second set of CCM symbols and for supplying each said second set of CCM symbols seriatim; and a second frequency-domain channel equalizer for equalizing said regenerated second sets of CCM symbols supplied seriatim from said second parallel-to-serial converter to generate equalized second sets of CCM symbols means for demapping, in accordance with said second pattern of mapping, each said regenerated second set of CCM symbols after its equalization by said second frequency-domain channel equalizer, thereby to recover a second succession of CCM symbol map labels in soft-bit format; and a diversity combiner for combining soft bits of corresponding CCM symbol map labels in said first and second successions thereof as received by said diversity combiner as first and second input signals thereto, thereby to reproduce soft bits of said coded data as response from said diversity combiner.

\* \* \* \* \*